(12) United States Patent
Nishida et al.

(10) Patent No.: US 10,645,384 B2
(45) Date of Patent: *May 5, 2020

(54) ENCODING APPARATUS AND ENCODING METHOD AS WELL AS DECODING APPARATUS AND DECODING METHOD

(71) Applicant: SONY CORPORATION, Tokyo (JP)

(72) Inventors: Koji Nishida, Tokyo (JP); Takahiro Nagano, Kanagawa (JP); Kenichiro Hosokawa, Kanagawa (JP); Keisuke Chida, Saitama (JP); Takuro Kawai, Tokyo (JP); Ohji Nakagami, Tokyo (JP); Masaru Ikeda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/086,481

(22) PCT Filed: Apr. 18, 2017

(86) PCT No.: PCT/JP2017/015522
§ 371 (c)(1),
(2) Date: Sep. 19, 2018

(87) PCT Pub. No.: WO2017/191750
PCT Pub. Date: Nov. 9, 2017

(65) Prior Publication Data
US 2019/0104308 A1   Apr. 4, 2019

(30) Foreign Application Priority Data

May 2, 2016  (JP) .................................. 2016-092651
Jan. 12, 2017 (JP) .................................. 2017-003466

(51) Int. Cl.
*H04N 19/117* (2014.01)
*H04N 19/182* (2014.01)
(Continued)

(52) U.S. Cl.
CPC ......... *H04N 19/117* (2014.11); *H04N 19/119* (2014.11); *H04N 19/14* (2014.11);
(Continued)

(58) Field of Classification Search
CPC .... H04N 19/117; H04N 19/119; H04N 19/14; H04N 19/147; H04N 19/182;
(Continued)

(56) References Cited

U.S. PATENT DOCUMENTS

2007/0064798 A1* 3/2007 Paniconi .............. H04N 19/105
375/240.12
2007/0064804 A1* 3/2007 Paniconi ................ H04N 19/56
375/240.16
(Continued)

FOREIGN PATENT DOCUMENTS

EP     2477403 A1    7/2012
JP     2000-083225 A 3/2000
(Continued)

OTHER PUBLICATIONS

Feb. 1, 2019, European Search Report issued for related EP Application No. 17792683.9.

*Primary Examiner* — Reza Aghevli
(74) *Attorney, Agent, or Firm* — Paratus Law Group, PLLC

(57) ABSTRACT

The present technology relates to an encoding apparatus and an encoding method as well as a decoding apparatus and a decoding method that make it possible to improve the compression efficiency.

The encoding apparatus transmits reduction filter information that reduces tap coefficients for individual ones of a plurality of classes determined by learning that uses a student image equivalent to a first image obtained by addition of a residual of prediction encoding and a prediction (Continued)

image and a teacher image equivalent to an original image corresponding to the first image. The decoding apparatus accepts the reduction filter information and performs prediction arithmetic operation using tap coefficients obtained using the reduction filter information to perform a filter process for the first image to generate a second image. The present technology can be applied, for example, an encoding apparatus and a decoding apparatus of an image.

24 Claims, 105 Drawing Sheets

(51) Int. Cl.
    *H04N 19/82*     (2014.01)
    *H04N 19/14*     (2014.01)
    *H04N 19/46*     (2014.01)
    *H04N 19/196*     (2014.01)
    *H04N 19/463*     (2014.01)
    *H04N 19/119*     (2014.01)
    *H04N 19/147*     (2014.01)
    *H04N 19/36*     (2014.01)

(52) U.S. Cl.
    CPC ......... *H04N 19/147* (2014.11); *H04N 19/182* (2014.11); *H04N 19/196* (2014.11); *H04N 19/36* (2014.11); *H04N 19/46* (2014.11); *H04N 19/463* (2014.11); *H04N 19/82* (2014.11)

(58) Field of Classification Search
    CPC ...... H04N 19/196; H04N 19/36; H04N 19/46; H04N 19/463; H04N 19/82
    See application file for complete search history.

(56) References Cited

U.S. PATENT DOCUMENTS

| | | | |
|---|---|---|---|
| 2007/0064805 A1* | 3/2007 | Carrig | H04N 19/46 375/240.16 |
| 2012/0087595 A1* | 4/2012 | Minezawa | H04N 19/167 382/233 |
| 2012/0328192 A1* | 12/2012 | Fukuhara | H04N 19/597 382/166 |
| 2013/0315493 A1* | 11/2013 | Sato | H04N 19/85 382/232 |
| 2013/0322545 A1* | 12/2013 | Kondow | H04N 19/52 375/240.16 |
| 2019/0124327 A1* | 4/2019 | Kawai | H04N 19/50 |

FOREIGN PATENT DOCUMENTS

| | | | | |
|---|---|---|---|---|
| JP | 2003-299096 A | | 10/2003 | |
| JP | 2003299096 A | * | 10/2003 | ............... H04N 7/30 |
| JP | 3890638 B2 | | 3/2007 | |
| JP | 4670169 B2 | | 4/2011 | |
| WO | WO 2010/146771 A1 | | 12/2010 | |
| WO | WO 2013/055923 A1 | | 4/2013 | |
| WO | WO-2018173873 A1 | * | 9/2018 | ............. H04N 19/46 |

* cited by examiner

FIG. 18
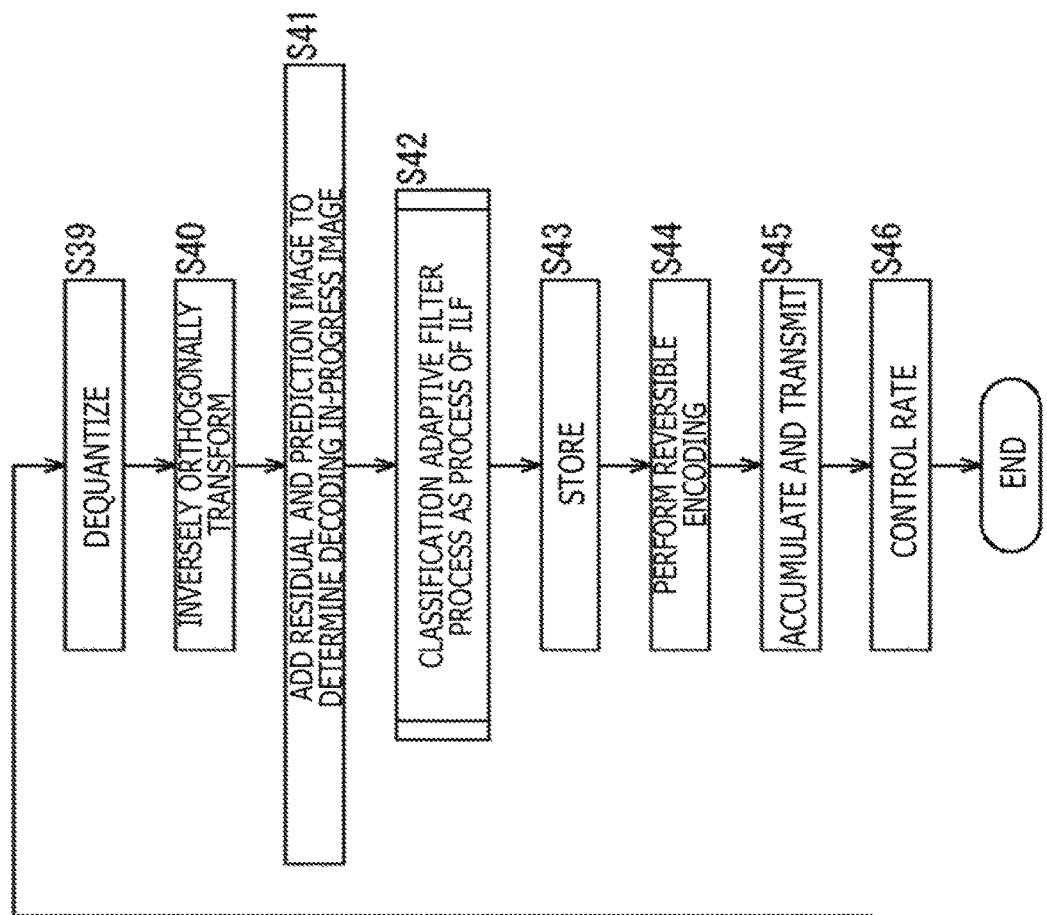
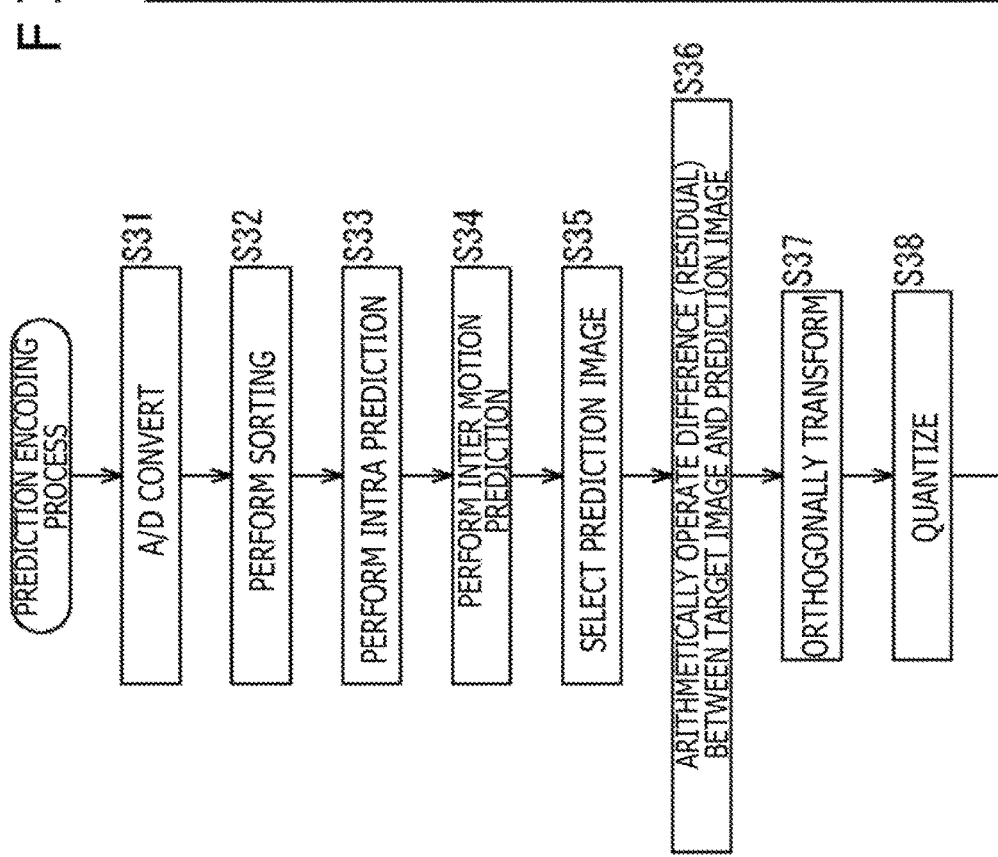

| METHOD OF CLASSIFICATION | REDUCTION METHOD OF TAP COEFFICIENTS |
|---|---|
| CLASSIFICATION OF LOCAL WAVEFORM PATTERN (DEGENERATION OF CLASS) | |
| CLASSIFICATION OF PHASE OF ENCODED BLOCK (REDUCTION OF TAP COEFFICIENTS THEMSELVES) | |

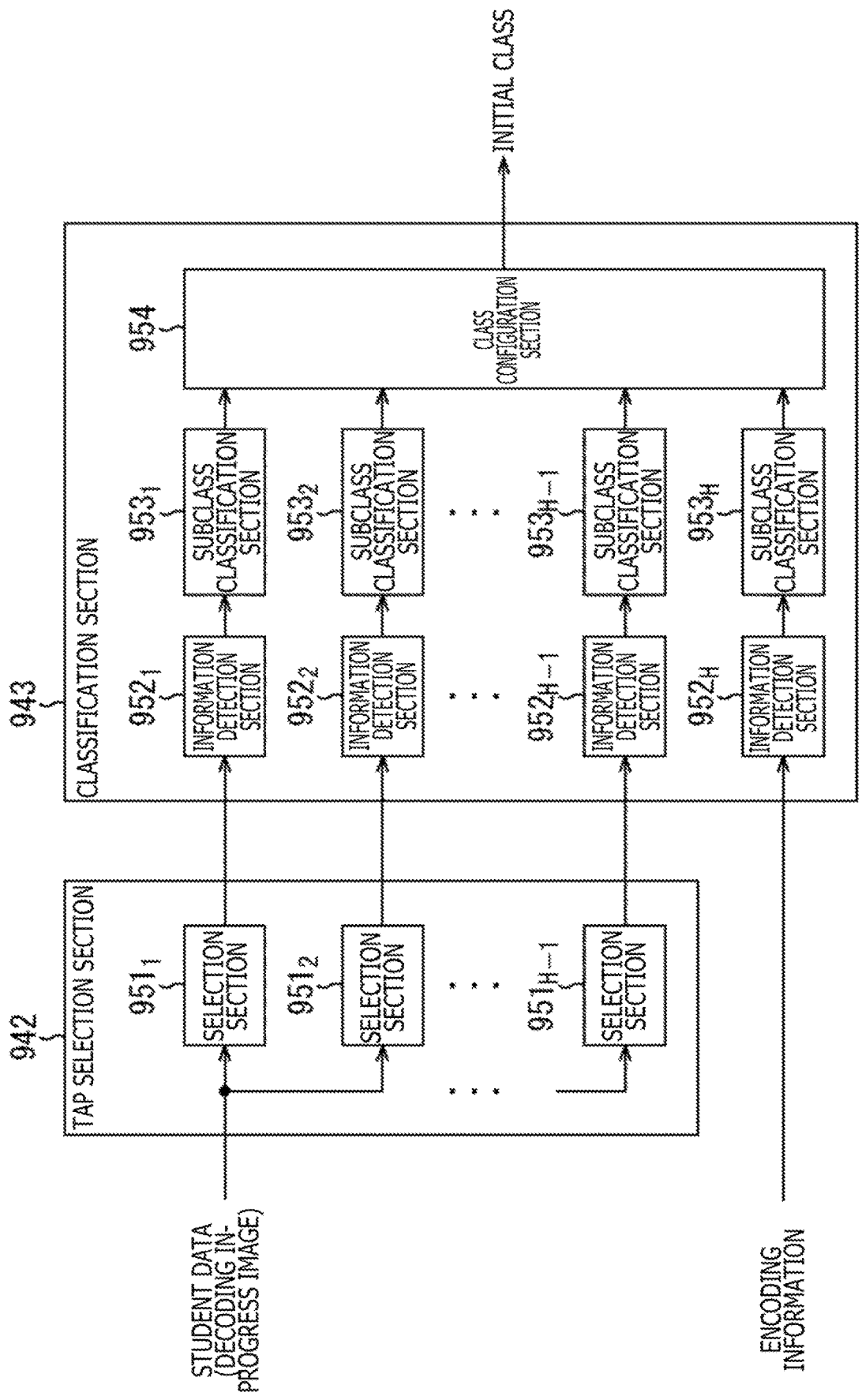

FIG. 68

| PIXEL RELATED INFORMATION (IMAGE CHARACTERISTIC AMOUNT) | | | CALCULATION METHOD |
|---|---|---|---|
| | | AT WHAT LOCATION IT IS EFFECTIVE | |
| WAVEFORM PATTERN | ADRC | EXHAUSTIVELY CLASSIFY WAVEFORM PATTERNS IN TAPS (INCLUDING DIRECTION OF EDGE, TEXTURE AND SO FORTH), OPTIMUM RESTORATION EFFECT FOR EACH PATTERN | DIVIDE LUMINANCE INTO TWO VALUES (IN CASE OF 1-bitADRC) WITH THRESHOLD VALUE USING DR |
| AMPLITUDE | DR | SMALL: REDUCTION OF NOISE ETC. OF FLAT PORTION GREAT: RESTORATION OF EDGE | DIFFERENCE BETWEEN MAXIMUM LUMINANCE AND MINIMUM LUMINANCE WITHIN REFERENCE RANGE |
| GRADIENT | DiffMax | SMALL: REDUCTION OF FALSE CONTOUR OF GRADATION GREAT: RESTORATION OF STEEP EDGE (STEP) | MAXIMUM VALUE DiffMax/DR OF HORIZONTAL VERTICAL OBLIQUE ADJACENT PIXEL DIFFERENCE ABSOLUTE VALUE OR TWO-AXIS REPRESENTATION OF DiffMax AND DR CAN BE MADE INDEX TO WHAT NUMBER OF PIXELS ARE REQUIRED TO CLIMB UP AMPLITUDE WITHIN REFERENCE RANGE |
| STRUCTURE | STATIONARITY | SMALL: RESTORATION OF TEXTURE (TO NOISE) GREAT: RESTORATION OF EDGE (STRUCTURE LINE) | DIFFERENCE BETWEEN DIRECTION IN WHICH ADJACENT PIXEL DIFFERENCE ABSOLUTE VALUE SUM FOR EACH DIRECTION IS IN THE MAXIMUM AND DIRECTION IN WHICH IT IS IN THE MINIMUM |
| | ACTIVITY | SMALL: STEP EDGE (SIMPLE PATTERN) GREAT: TEXTURE (COMPLEX PATTERN) | HORIZONTAL VERTICAL ADJACENT PIXEL DIFFERENCE ABSOLUTE VALUE SUM |
| | SECONDARY DIFFERENTIAL SUM | SMALL: STEP EDGE (SIMPLE PATTERN) GREAT: TEXTURE (COMPLEX PATTERN) | HORIZONTAL VERTICAL ADJACENT PIXEL SECONDARY DIFFERENTIAL ABSOLUTE VALUE SUM |
| DIRECTION | MAXIMUM DIRECTION DIFFERENCE | CLASSIFICATION OF DIRECTIONS OF AMPLITUDE, GRADIENT, STRUCTURE ETC. OPTIMUM RESTORATION EFFECT FOR EACH DIRECTION | DIRECTION IN WHICH HORIZONTAL VERTICAL OBLIQUE ADJACENT PIXEL DIFFERENCE ABSOLUTE VALUE SUM IS IN THE MAXIMUM |
| | FILTER BANK | CLASSIFICATION ACCURACY IS HIGHER THAN THAT OF MAXIMUM DIRECTION DIFFERENCE IT IS TO BE NOTED THAT CALCULATION COST IS HIGHER | PLURAL BAND PASS FILTERS HAVING DIRECTIONALITIES |

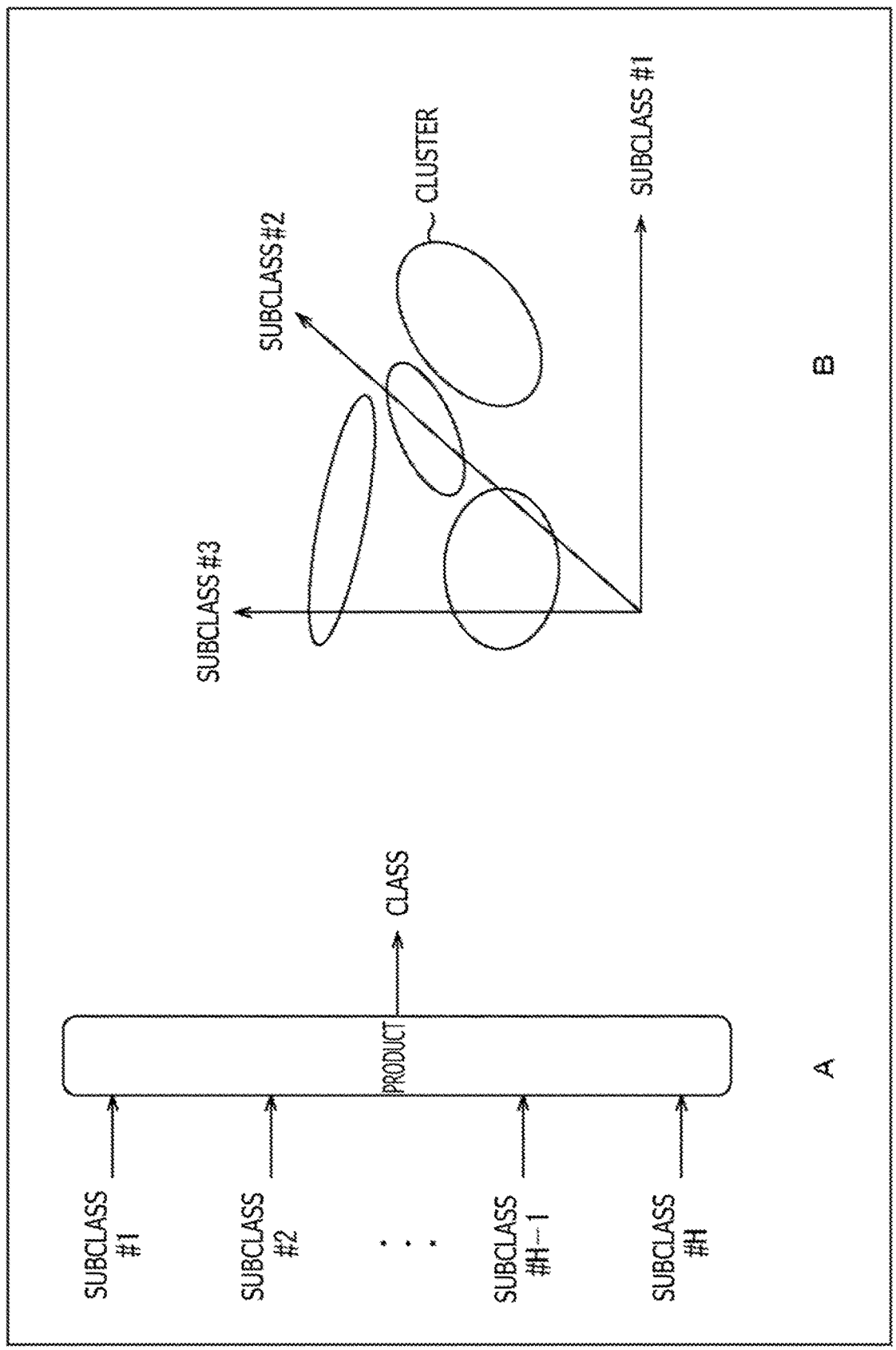

ENCODING APPARATUS AND ENCODING METHOD AS WELL AS DECODING APPARATUS AND DECODING METHOD

CROSS REFERENCE TO PRIOR APPLICATION

This application is a National Stage Patent Application of PCT International Patent Application No. PCT/JP2017/015522 (filed on Apr. 18, 2017) under 35 U.S.C. § 371, which claims priority to Japanese Patent Application Nos. 2016-092651 (filed on May 2, 2016) and 2017-003466 (filed on Jan. 12, 2017), which are all hereby incorporated by reference in their entirety.

TECHNICAL FIELD

The present technology relates to an encoding apparatus and an encoding method as well as a decoding apparatus and a decoding method, and particularly to an encoding apparatus and an encoding method as well as a decoding apparatus and a decoding method that make it possible, for example, to improve the compression efficiency of an image.

BACKGROUND ART

For example, a classification adaptive process for converting a first image into a second image has been proposed previously. In the classification adaptive process, a pixel that becomes a prediction tap to be used for prediction arithmetic operation for determining a pixel value of a corresponding pixel of a second image corresponding to a noticed pixel noticed in a first image is selected from within the first image, and the noticed pixel is classified to one of a plurality of classes in accordance with a fixed rule. Then, in the classification adaptive process, a tap coefficient of the class of the noticed pixel is acquired from among tap coefficients to be used for the prediction arithmetic operation for each of a plurality of classes determined by learning for minimizing statistical errors between a result of the prediction arithmetic operation in which a student image equivalent to the first image is used and a teacher image equivalent to the second image. Then, a pixel value of the corresponding pixel is determined by performing prediction arithmetic operation using the tap coefficient of the class of the noticed pixel and a prediction tap of the noticed pixel.

It is to be noted that, in regard to the classification adaptive process, a technology that integrates tap coefficients of two or more classes (for example, PTL 1) and another technology that determines a seed coefficient from which a tap coefficient is determined by predetermined arithmetic operation with a parameter (for example, PTL 2) have been proposed.

CITATION LIST

Patent Literature

[PTL 1]
Japanese Patent No. 3890638
[PTL 2]
Japanese Patent No. 4670169

SUMMARY

Technical Problem

Incidentally, for example, in prediction encoding of an image, improvement of the compression efficiency is requested.

The present technology has been made in view of such a situation as described above and makes it possible to improve the compression efficiency of an image.

Solution to Problem

The encoding apparatus of the present technology is an encoding apparatus including a filter processing section that includes a prediction tap selection section configured to select, from within a first image obtained by addition of a residual of prediction encoding and a prediction image, pixels that become a prediction tap to be used for prediction arithmetic operation for determining a pixel value of a corresponding pixel of a second image, which corresponds to a processing target pixel that is a processing target in the first image and is to be used for prediction of the prediction image, a classification section configured to classify the processing target pixel to one of a plurality of classes, a tap coefficient acquisition section configured to acquire tap coefficients of the class of the processing target pixel from among tap coefficients obtained using reduction filter information that reduces tap coefficients for individual ones of the plurality of classes determined by learning that uses a student image corresponding to the first image and a teacher image equivalent to an original image corresponding to the first image, and an arithmetic operation section configured to determine a pixel value of the corresponding pixel by performing the prediction arithmetic operation using the tap coefficients of the class of the processing target pixel and the prediction tap of the processing target pixel, and performs a filter process for the first image to generate the second image, and a transmission section configured to transmit the reduction filter information.

The encoding method of the present technology is an encoding method including performing a filter process for a first image to generate a second image, the performing a filter process including selecting, from within the first image that is obtained by addition of a residual of prediction encoding and a prediction image, pixels that become a prediction tap to be used for prediction arithmetic operation for determining a pixel value of a corresponding pixel of the second image, which corresponds to a processing target pixel that is a processing target in the first image and is to be used for prediction of the prediction image, classifying the processing target pixel to one of a plurality of classes, acquiring tap coefficients of the class of the processing target pixel from among tap coefficients obtained using reduction filter information that reduces tap coefficients for individual ones of the plurality of classes determined by learning that uses a student image corresponding to the first image and a teacher image equivalent to an original image corresponding to the first image, and determining a pixel value of the corresponding pixel by performing the prediction arithmetic operation using the tap coefficients of the class of the processing target pixel and the prediction tap of the processing target pixel, and transmitting the reduction filter information.

In the encoding apparatus and the encoding method of the present technology, from within a first image that is obtained by addition of a residual of prediction encoding and a prediction image, pixels that become a prediction tap to be used for prediction arithmetic operation for determining a pixel value of a corresponding pixel of the second image, which corresponds to a processing target pixel that is a processing target in the first image and is to be used for prediction of the prediction image, are selected, and the processing target pixel is classified to one of a plurality of classes. Further, tap coefficients of the class of the processing target pixel are acquired from among tap coefficients obtained using reduction filter information that reduces tap coefficients for individual ones of the plurality of classes determined by learning that uses a student image corresponding to the first image and a teacher image equivalent to an original image corresponding to the first image, and a pixel value of the corresponding pixel is determined by performing the prediction arithmetic operation using the tap coefficients of the class of the processing target pixel and the prediction tap of the processing target pixel. A filter process is performed thereby for the first image, and a second image is generated. Further, the reduction filter information is transmitted.

The decoding apparatus of the present technology is a decoding apparatus including an acceptance section configured to accept reduction filter information that reduces tap coefficients for individual ones of a plurality of classes determined by learning that uses a student image equivalent to a first image obtained by adding a residual of prediction encoding and a prediction image and a teacher image equivalent to an original image corresponding to the first image, and a filter processing section that includes a prediction tap selection section configured to select, from within the first image, pixels that become a prediction tap to be used for prediction arithmetic operation for determining a pixel value of a corresponding pixel of a second image, which is used for prediction of the prediction image, corresponding to a processing target pixel that is a processing target from within the first image, a classification section configured to classify the processing target pixel to one of the plurality of classes, a tap coefficient acquisition section configured to acquire a tap coefficient of the class of the processing target pixel from the tap coefficients obtained using the reduction filter information, and an arithmetic operation section configured to determine a pixel value of the corresponding pixel by performing the prediction arithmetic operation using the tap coefficient of the class of the processing target pixel and the prediction tap of the processing target pixel, and performs a filter process for the first image to generate the second image.

The decoding method of the present technology is a decoding method including accepting reduction filter information that reduces tap coefficients for individual ones of a plurality of classes determined by learning that uses a student image equivalent to a first image obtained by adding a residual of prediction encoding and a prediction image and a teacher image equivalent to an original image corresponding to the first image, and performing a filter process for the first image to generate a second image, the performing a filter process including selecting, from within the first image, pixels that become a prediction tap to be used for prediction arithmetic operation for determining a pixel value of a corresponding pixel of a second image, which is used for prediction of the prediction image, corresponding to a processing target pixel that is a processing target from within the first image, classifying the processing target pixel to one of the plurality of classes, acquiring a tap coefficient of the class of the processing target pixel from the tap coefficients obtained using the reduction filter information, and determining a pixel value of the corresponding pixel by performing the prediction arithmetic operation using the tap coefficient of the class of the processing target pixel and the prediction tap of the processing target pixel.

In the decoding apparatus and the decoding method of the present technology, reduction filter information is accepted which reduces tap coefficients for individual ones of a plurality of classes determined by learning that uses a student image equivalent to a first image obtained by adding a residual of prediction encoding and a prediction image and a teacher image equivalent to an original image corresponding to the first image. Further, from within the first image, pixels are selected which become a prediction tap to be used for prediction arithmetic operation for determining a pixel value of a corresponding pixel of a second image, which is used for prediction of the prediction image, corresponding to a processing target pixel that is a processing target from within the first image, and the processing target pixel is classified to one of the plurality of classes. Then, a tap coefficient of the class of the processing target pixel is acquired from the tap coefficients obtained using the reduction filter information, and a pixel value of the corresponding pixel is determined by performing the prediction arithmetic operation using the tap coefficient of the class of the processing target pixel and the prediction tap of the processing target pixel. By this, a filter process for the first image is performed, and a second image is generated.

It is to be noted that each of the encoding apparatus and the decoding apparatus may be an independent apparatus or may be an internal block that configures one apparatus.

Further, each of the encoding apparatus and the decoding apparatus can be implemented by causing a computer to execute a program.

Further, the program that causes a computer to function as the encoding apparatus or the decoding apparatus can be provided by transmitting the same through a transmission medium or by recording the same on a recording medium.

Advantageous Effect of Invention

With the present technology, the compression efficiency of an image can be improved.

It is to be noted that the advantageous effect described herein is not necessarily restrictive, and any advantageous effect described in the present disclosure may be applicable.

BRIEF DESCRIPTION OF DRAWINGS

FIG. 18 is a flow chart illustrating an example of a prediction encoding process at step S21.

FIG. 30 is a block diagram depicting a configuration example of the reduction apparatus 321.

FIG. 62 is a view illustrating a different example of reduction filter information that reduces tap coefficients for individual classes obtained by tap coefficient learning.

FIG. 67 is a block diagram depicting a configuration example of a tap selection section 942 and a classification section 943.

FIG. 68 is a view depicting an example of an image characteristic amount that becomes pixel-related information.

FIG. 69 is a view depicting an example of a method by which a class configuration section 954 configures an initial class from first to Hth sub classes.

DESCRIPTION OF EMBODIMENTS

<Image Processing System to which Present Technology is Applied>

Figure 1:
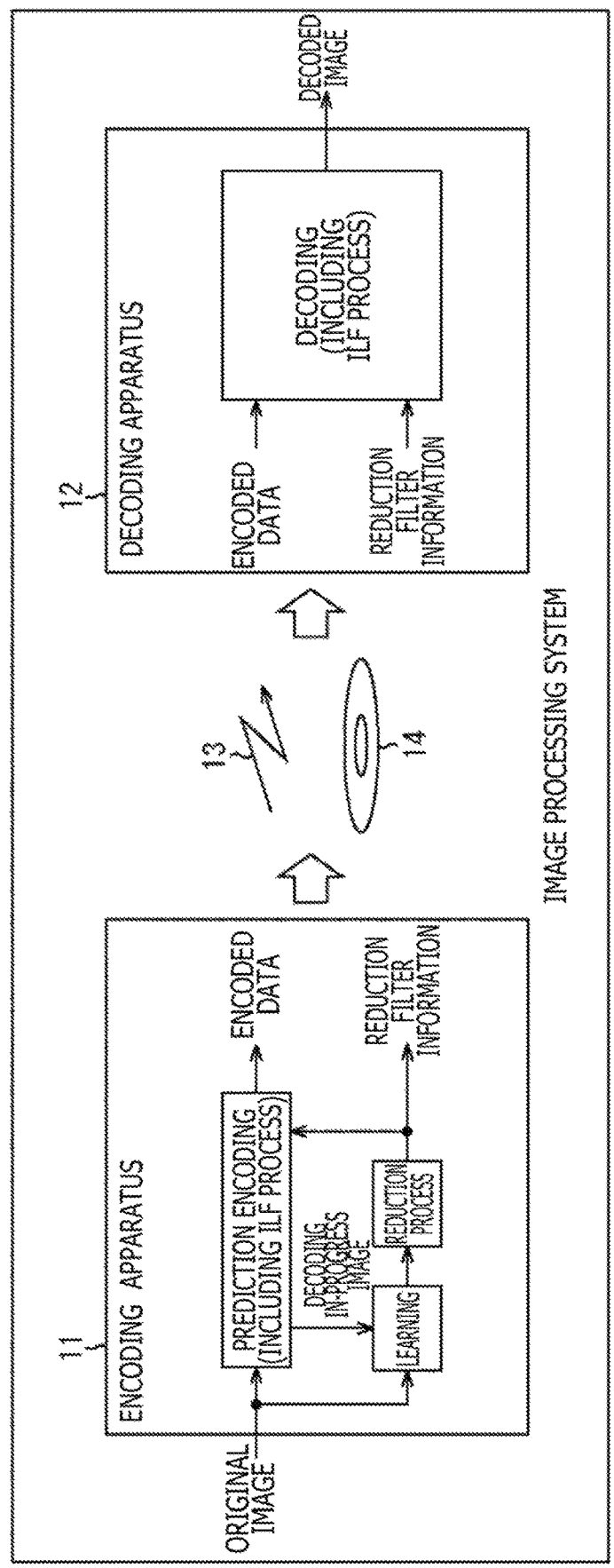
FIG. 1 is a view depicting a configuration example of an embodiment of an image processing system to which the present technology is applied.

FIG. 1 is a view depicting a configuration example of an embodiment of an image processing system to which the present technology is applied.

Referring to FIG. 1, the image processing system includes an encoding apparatus 11 and a decoding apparatus 12.

An original image of an encoding target is supplied to the encoding apparatus 11.

The encoding apparatus 11 encodes the original image by prediction encoding such as, for example, HEVC (High Efficiency Video Coding), AVC (Advanced Video Coding), MPEG (Moving Picture Experts Group) or the like. It is to be noted that the prediction encoding of the encoding apparatus 11 is not limited to such HEVC or the like as described above.

In prediction encoding of the encoding apparatus 11, a prediction image of an original image is generated and a residual between the original image and the prediction image is encoded.

Further, in the prediction encoding of the encoding apparatus 11, an ILF (In Loop Filter) process for applying an ILF is performed for a decoding in-progress image obtained by adding the residual of the prediction encoding and the prediction image to generate a reference image to be used for prediction of the prediction image.

Here, an image obtained by performing a filter process (filtering) as the ILF process for the decoding in-progress image is referred to sometimes as post-filter image.

The encoding apparatus 11 performs not only prediction encoding but also learning using a decoding in-progress image and an original image to determine a tap coefficient or the like for performing such a filtering process as an ILF process that the post-filter image becomes similar to the original image as far as possible.

Further, the encoding apparatus 11 performs a reduction process to generate reduction filter information that reduces tap coefficients.

The ILF process of the encoding apparatus 11 is performed using tap coefficients obtained using the reduction filter information determined by the reduction process.

Here, learning for determining tap coefficients or the like and a reduction process for generating reduction filter information can be performed for example, for each of one or a plurality of sequences of original images, for each of one or a plurality of scenes (frames each from a scene change to a next scene change) of an original image, for each of one or a plurality of frames (pictures) of an original image, for each of one or a plurality of slices of an original image, for each of one or a plurality of lines of a block (CU, PU or the like) of a unit of encoding of a picture or for some other arbitrary unit. Further, learning for determining reduction filter information can be performed, for example, in the case where a residual obtained by prediction encoding becomes equal to or greater than a threshold value or in a like case.

The encoding apparatus 11 transmits encoded data obtained by prediction encoding of an original image and reduction filter information obtained by the reduction process through a transmission medium 13 or transmits them to a recording medium 14 so as to be recorded.

It is to be noted that generation of reduction filter information (including learning of tap coefficients as occasion demands) can be performed by an apparatus separate from the encoding apparatus 11.

Also it is possible not only to transmit reduction filter information separately from encoded data and but also to place and transmit reduction filter information into and together with encoded data.

Further, learning for calculating tap coefficients or the like can be performed not only using an original image itself (and a decoding in-progress image obtained by prediction encoding of the original image) but using an image that is different from the original image but is similar in image characteristic amount of the original image.

The decoding apparatus 12 accepts (receives) (acquires) encoded data and reduction filter information transmitted from the encoding apparatus 11 through the transmission medium 13 or the recording medium 14, and decodes the encoded data by a method corresponding to that of the prediction encoding of the encoding apparatus 11.

In particular, the decoding apparatus 12 processes the encoded data from the encoding apparatus 11 to determine a residual of prediction encoding. Further, the decoding apparatus 12 adds the residual and the prediction image to determine a decoding in-progress image similar to that obtained in the encoding apparatus 11. Then, the decoding apparatus 12 performs a filter process as an ILF process using tap coefficients and so forth obtained using the reduction filter information from the encoding apparatus 11 for the decoding in-progress image to determine a post-filter image.

In the decoding apparatus 12, the post-filter image is outputted as a decoded image of the original image and is temporarily stored as a reference image to be used for prediction of a prediction image.

The filter process as an ILF process of the encoding apparatus 11 and decoding apparatus 12 is performed by a classification adaptive process. The classification adaptive process is described below.

<Classification Adaptive Process>

Figure 2:
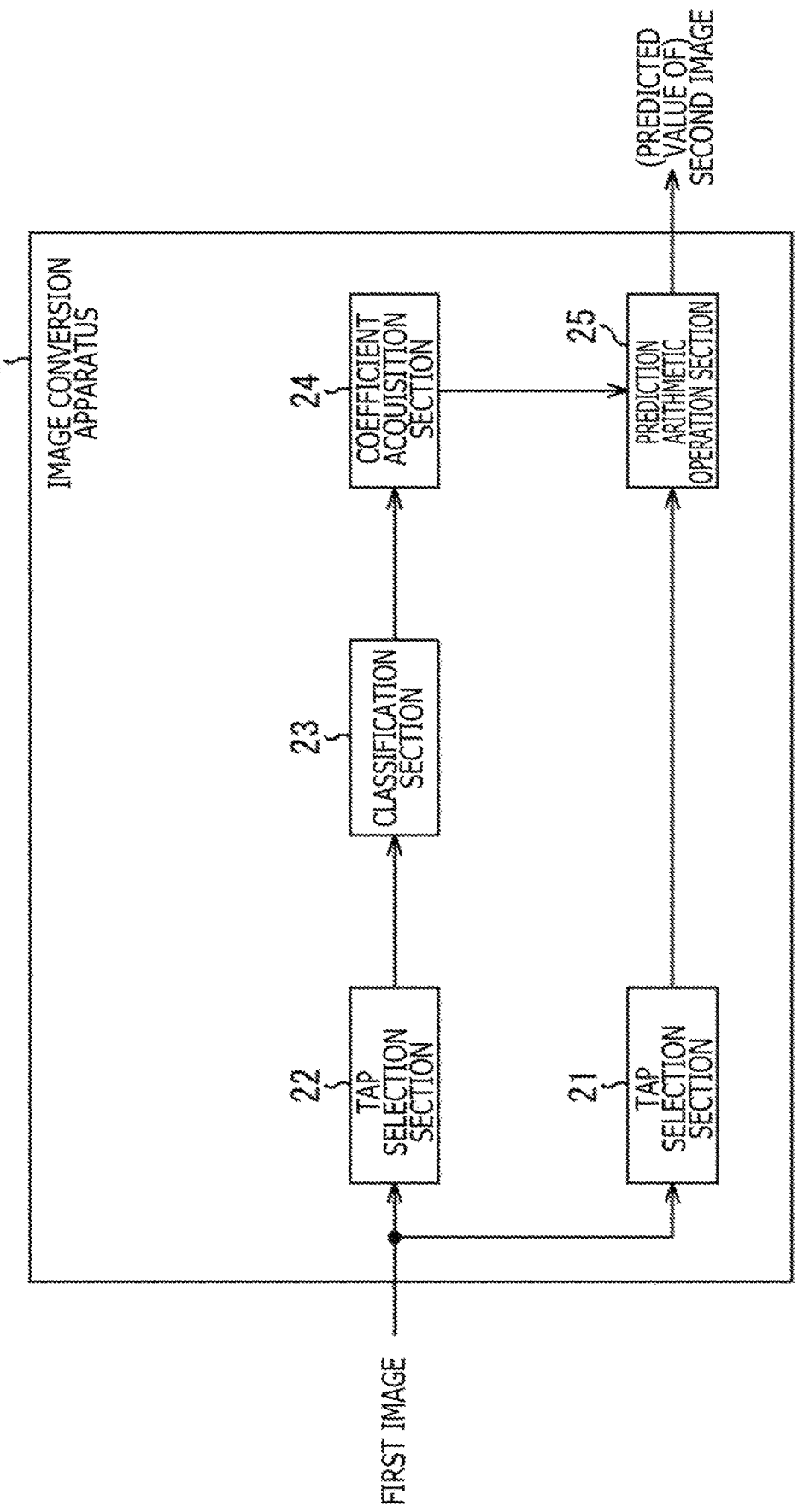
FIG. 2 is a block diagram depicting a first configuration example of an image conversion apparatus that performs a classification adaptive process.

FIG. 2 is a block diagram depicting a first configuration example of an image conversion apparatus that performs the classification adaptive process.

Here, the classification adaptive process can be considered, for example, as an image conversion process for converting a first image into a second image.

The image conversion process for converting a first image into a second image becomes various signal processes depending upon the definition of the first and second images.

In particular, for example, if the first image is an image of a low spatial resolution and the second image is an image of a high spatial resolution, then the image conversion process can be considered as a spatial resolution creation (improvement) process for improving the spatial resolution.

On the other hand, for example, if the first image is an image of a low S/N (Signal to Noise Ratio) and the second image is an image of a high S/N, then the image conversion process can be considered as a noise removing process for removing noise.

Furthermore, for example, if the first image is an image having a predetermined number of pixels (size) and the second image is an image whose number of pixels is made higher or lower than the number of pixels of the first image, then the image conversion process can be considered as a resize process for performing resizing (enlargement or reduction) of an image.

Further, for example, if the first image is a decoded image obtained by decoding an image encoded in a unit of a block such as HEVC or the like and the second image is an original image before encoding, then the image conversion process can be considered as a distortion removing process for removing block distortion generated by encoding and decoding in a unit of a block.

It is to be noted that, in the classification adaptive process, not only an image but also, for example, sound can be made a target of processing. The classification adaptive process whose target is sound can be considered as an acoustic conversion process for converting first sound (for example, sound having a low S/N or the like) into second sound (for example, sound having a high S/N or the like).

In the classification adaptive process, a pixel value of a noticed pixel is determined by prediction arithmetic operation using tap coefficients of a class obtained by classifying a pixel value of a noticed pixel (processing target pixel of a processing target) noticed from within the first image to one of a plurality of classes and prediction and pixel values of the number of pixels equal to that of the tap coefficients of the first image selected with respect to the noticed pixel.

FIG. 2 depicts a configuration example of the image conversion apparatus that performs an image conversion process by the classification adaptive process.

Referring to FIG. 2, an image conversion apparatus 20 includes tap selection sections 21 and 22, a classification section 23, a coefficient acquisition section 24 and a prediction arithmetic operation section 25.

A first image is supplied to the image conversion apparatus 20. The first image supplied to the image conversion apparatus 20 is supplied to the tap selection sections 21 and 22.

The tap selection section 21 selects pixels configuring the first image successively as a noticed pixel. Further, the tap selection section 21 selects some of (pixel values of) pixels configuring the first image to be used for prediction of (a pixel value of) a corresponding pixel of a second image corresponding to the noticed pixel as a prediction tap.

In particular, the tap selection section 21 selects a plurality of pixels of the first image at a spatially or temporally close position from the spatio-temporal position of the noticed pixel.

The tap selection section 22 selects some of (pixel values of) pixels configuring the first image to be used for classification for classifying the noticed pixel to one of several classes as a class tap. In particular, the tap selection section 22 selects a class tap similarly to the selection of a prediction tap by the tap selection section 21.

It is to be noted that a prediction tap and a class tap may have a same tap structure or may have tap structures different from each other.

A prediction tap obtained by the tap selection section 21 is supplied to the prediction arithmetic operation section 25, and a class tap obtained by the tap selection section 22 is supplied to the classification section 23.

The classification section 23 classifies the noticed pixel in accordance with a fixed rule, and supplies a class code corresponding to a class obtained as a result of the classification to the coefficient acquisition section 24.

In particular, the classification section 23 classifies the noticed pixel, for example, using the class tap from the tap selection section 22 and supplies a class code corresponding to a class obtained as a result of the classification to the coefficient acquisition section 24.

For example, the classification section 23 determines an image characteristic amount of the notice image using the class tap. Further, the classification section 23 classifies the noticed pixel according to the image characteristic amount of the noticed pixel and supplies a class code corresponding to a class obtained as a result of the classification to the coefficient acquisition section 24.

Here, as a method for performing classification, for example, ADRC (Adaptive Dynamic Range Coding) or the like can be adopted.

In the method that uses the ADRC, (pixel values of) pixels configuring the class tap are ADRC processed, and a class of the noticed pixel is determined in accordance with an ADRC code (ADRC value) obtained as a result of the ADRC process. The ADRC code represents a waveform pattern as the image characteristic amount of a small region including the noticed pixel.

It is to be noted that, in L bit ADRC, for example, a maximum value MAX and a minimum value MIN of pixel values of pixels configuring a class tap are detected, and DR=MAX−MIN is determined as a local dynamic range of a set and the pixel values of the pixels configuring the class tap are re-quantized to L bits on the basis of the dynamic range DR. In particular, the minimum value MIN is subtracted from the pixel value of each of the pixels of configuring the class tap and the subtraction values are divided (re-quantized) by $DR/2^L$. Then, a bit string in which the pixel values of the pixels of the L bits configuring the class tap obtained as in such a manner as described above are lined up in a predetermined order is outputted as an ADRC code. Accordingly, in the case where the class tap is processed, for example, by one-bit ADRC processing, the pixel values of the pixels configuring the class tap are divided (truncate a fractional part) by an average value of the maximum value MAX and the minimum value MIN, and, as a result, the pixel value of each pixel comes to be represented by 1 bit (binarized). Then, a bit string in which the pixel values of 1 bit are lined up in a predetermined order is outputted as an ADRC code.

It is to be noted that it is possible to cause the classification section 23 to output, for example, a pattern of a level distribution of the pixel values of the pixels configuring the class tap as it is as a class code. However, in this case, if the class tap is configured from pixel values of N pixels and A bits are allocated to the pixel value of each pixel, then the number of cases of the class code to be outputted from the classification section 23 is $(2^N)^A$ and is a huge number which increases in exponential proportion to the bit number A of the pixel values of the pixels.

Accordingly, it is preferable for the classification section 23 to perform classification by compressing the information amount of class taps by the ADRC process described above or by vector quantization or the like.

The coefficient acquisition section 24 stores tap coefficients for individual classes determined by learning hereinafter described and further acquires tap coefficients of a class represented by a class code supplied from the classification section 23 from among the stored tap coefficients, namely, tap coefficient of a class of a noticed pixel. Further, the coefficient acquisition section 24 supplies the tap coefficient of the class of the noticed pixel to the prediction arithmetic operation section 25.

Here, the tap coefficient is a coefficient equivalent to a coefficient to be multiplied by input data in a so-called tap in a digital filter.

The prediction arithmetic operation section 25 performs predetermined prediction arithmetic operation for determining a prediction value of a true value of a pixel value of a pixel (corresponding pixel) of a second image corresponding to the noticed pixel using the prediction tap outputted from the tap selection section 21 and the tap coefficient supplied from the coefficient acquisition section 24. Consequently, the prediction arithmetic operation section 25 determines and outputs (a prediction value of) a pixel value of the corresponding pixel, namely, a pixel value of a pixel configuring the second image.

Figure 3:
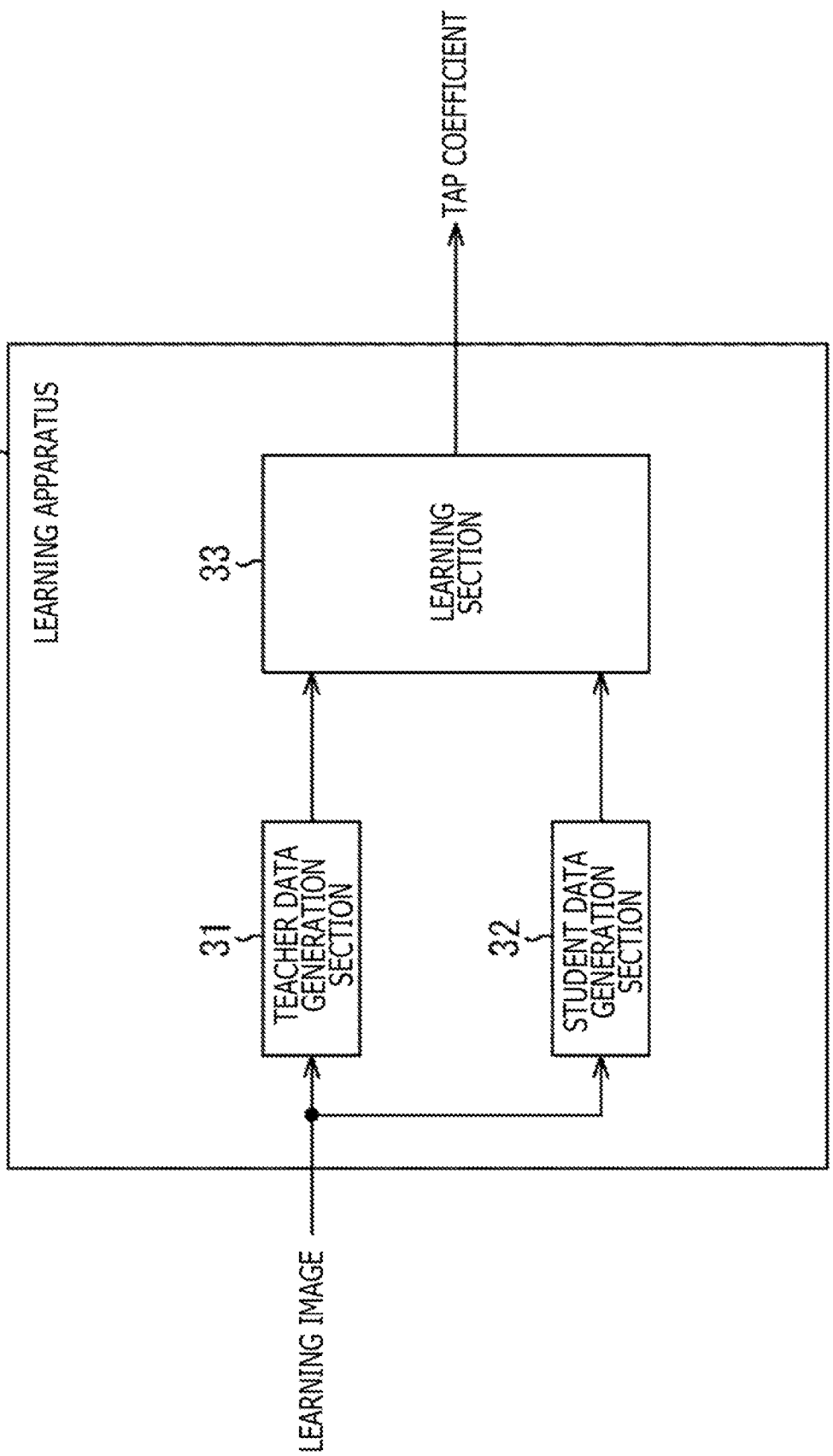
FIG. 3 is a block diagram depicting a configuration example of a learning apparatus that performs learning of a tap coefficient to be stored into a coefficient acquisition section 24.

FIG. 3 is a block diagram depicting a configuration example of a learning apparatus that performs learning of a tap coefficient to be stored into the coefficient acquisition section 24.

Here, for example, it is conceived that, determining an image having high picture quality (high picture quality image) as a second image and determining an image having low picture quality (low picture quality image) whose picture quality (resolution) is decreased by filtering or the like of the high picture quality image by an LPF (Low Pass Filter), a prediction tap is selected from within the low picture quality image and a pixel value of a pixel of the high picture quality image (high picture quality pixel) is determined (predicted) by predetermined prediction arithmetic operation using the prediction tap and the tap coefficient.

For example, if linear primary prediction arithmetic operation is adopted as the predetermined prediction arithmetic operation, then the pixel value y of the high picture quality pixel is determined by the following linear primary expression.

[Math. 1]

$$y = \sum_{n=1}^{N} w_n x_n \qquad (1)$$

However, in the expression (1), $X_n$ represents the pixel value of an nth pixel of the low picture quality image (hereinafter referred to suitably as low picture quality pixel) configuring the prediction tap with respect to a high picture quality pixel y as the corresponding pixel, and $w_n$ represents the nth tap coefficient to be multiplied with (the pixel value of) the nth low picture quality pixel. It is to be noted that, in the expression (1), it is assumed that the prediction tap is configured from N low picture quality pixels $x_1, x_2, \ldots$ and $x_N$.

Here, the pixel value y of the high picture quality pixel can be determined not depending upon the linear primary expression indicated by the expression (1) but by a high-order expression of the second- or higher-order.

Here, if the true value of the pixel value of the high picture quality pixel of a kth sample is represented by $y_k$ and a prediction value of the true value $y_k$ obtained by the expression (1) is represented by $y_k'$, then the prediction error $e_k$ is represented by the following expression.

[Math. 2]

$$e_k = y_k - y_k' \qquad (2)$$

Now, since the prediction value $y_k'$ of the expression (2) is determined in accordance with the expression (1), if $y_k'$ of the expression (2) is rewritten in accordance with the expression (1), then the following expression is obtained.

[Math. 3]

$$e_k = y_k - \left(\sum_{n=1}^{N} w_n x_{n,k}\right) \quad (3)$$

However, in the expression (3), $x_{n,k}$ represents the nth low picture quality pixel configuring the prediction tap with respect to the high picture quality pixel of the kth sample as the corresponding pixel.

Although the tap coefficient $w_n$ with which the prediction error $e_k$ of the expression (3) (or expression (2)) becomes 0 is optimum for prediction of the high picture quality pixel, it is generally difficult to determine such a tap coefficient $w_n$ as just described in regard to all of the high picture quality pixels.

Therefore, if, for example, a least squares method is adopted as a norm representing that the tap coefficient $w_n$ is optimum, then an optimum tap coefficient $w_n$ can be determined by minimizing the sum total E (statistical errors) of square errors represented by the following expression.

[Math. 4]

$$E = \sum_{k=1}^{K} e_k^2 \quad (4)$$

It is to be noted that, in the expression (4), K represents a sample number (number of samples for learning) of a set of the high picture quality pixel $y_k$ as the corresponding pixel and the low picture quality pixels $x_{1,k}, x_{2,k}, \ldots$ and $x_{N,k}$ configuring the prediction tap with respect to the high picture quality pixel $y_k$.

The lowest value (minimum value) of the sum total E of square errors of the expression (4) is given by $w_n$ with which a value when the sum total E is partially differentiated with the tap coefficient $w_n$ is made 0 as given by the expression (5).

[Math. 5]

$$\frac{\partial E}{\partial w_n} = e_1 \frac{\partial e_1}{\partial w_n} + e_2 \frac{\partial e_2}{\partial w_n} + \ldots + e_k \frac{\partial e_k}{\partial w_n} = 0 \quad (n = 1, 2, \ldots, N) \quad (5)$$

Therefore, if the expression (3) given above is partially differentiated with the tap coefficient $W_n$, then the following expression is obtained.

[Math. 6]

$$\frac{\partial e_k}{\partial w_1} = -x_{1,k}, \frac{\partial e_k}{\partial w_2} = -x_{2,k}, \ldots, \frac{\partial e_k}{\partial w_N} = -x_{N,k}, (k = 1, 2, \ldots, K) \quad (6)$$

The following expression is obtained from the expressions (5) and (6).

[Math. 7]

$$\sum_{k=1}^{K} e_k x_{1,k} = 0, \sum_{k=1}^{K} e_k x_{2,k} = 0, \ldots \sum_{k=1}^{K} e_k x_{N,k} = 0 \quad (7)$$

The expression (7) can be represented by a normal equation represented by the expression (8) by substituting the expression (3) into $e_k$ of the expression (7).

[Math. 8]

$$\begin{bmatrix} \left(\sum_{k=1}^{K} x_{1,k} x_{1,k}\right) & \left(\sum_{k=1}^{K} x_{1,k} x_{2,k}\right) & \cdots & \left(\sum_{k=1}^{K} x_{1,k} x_{N,k}\right) \\ \left(\sum_{k=1}^{K} x_{2,k} x_{1,k}\right) & \left(\sum_{k=1}^{K} x_{2,k} x_{2,k}\right) & \cdots & \left(\sum_{k=1}^{K} x_{2,k} x_{N,k}\right) \\ \vdots & \vdots & \ddots & \vdots \\ \left(\sum_{k=1}^{K} x_{N,k} x_{1,k}\right) & \left(\sum_{k=1}^{K} x_{N,k} x_{2,k}\right) & \cdots & \left(\sum_{k=1}^{K} x_{N,k} x_{N,k}\right) \end{bmatrix} \begin{bmatrix} w_1 \\ w_2 \\ \vdots \\ w_N \end{bmatrix} = \begin{bmatrix} \left(\sum_{k=1}^{K} x_{1,k} y_k\right) \\ \left(\sum_{k=1}^{K} x_{2,k} y_k\right) \\ \vdots \\ \left(\sum_{k=1}^{K} x_{N,k} y_k\right) \end{bmatrix} \quad (8)$$

The normal equation of the expression (8) can be solved for the tap coefficient $w_n$ by using, for example, a sweeping method (elimination method of Gauss-Jordan) or the like.

By establishing and solving the normal equation of the expression (8) for each class, an optimum tap coefficient (here, tap coefficient that minimizes the sum total E of square errors) $w_n$ can be determined for each class.

FIG. 3 depicts a configuration example of a learning apparatus that performs learning for establishing and solving a normal equation of the expression (8) to determine the tap coefficient $W_n$.

Referring to FIG. 3, the learning apparatus 30 includes a teacher data generation section 31, a student data generation section 32 and a learning section 33.

A learning image to be used for learning of the tap coefficient $w_n$ is supplied to the teacher data generation section 31 and the student data generation section 32. As the learning image, for example, a high picture quality image having a high resolution can be used.

The teacher data generation section 32 generates a teacher image to be used as a mapping destination of mapping as prediction arithmetic operation in accordance with the expression (1) as teacher data to be used as a teacher (true value) of learning of the tap coefficient, namely, teacher data to be obtained by a classification adaptive process, and supplies the generated teacher image to the learning section 33. Here, the teacher data generation section 32 supplies, for example, a high picture quality pixel as the learning image as it is as the teacher image to the learning section 33.

The student data generation section 32 generates, from a learning image, a student image to be made a conversion target by mapping as prediction arithmetic operation in accordance with the expression (1) as student data to be used as a student of learning of a tap coefficient, namely, as student data to be made a target of prediction arithmetic operation with a tap coefficient, and supplies the generated student image to the learning section 33. Here, the student data generation section 32 performs, for example, filtering of the high picture quality image as the learning image with an LPF (Low Pass Filter) to decrease the resolution to generate a low picture quality image, and supplies the low picture quality image as the student image to the learning section 33.

The learning section 33 successively determines pixels configuring the student image as student data from the student data generation section 32 as a noticed pixel, and selects, in regard to the noticed pixels, pixels having a tap structure same as that selected by the tap selection section 21 of FIG. 2 as a prediction tap from the student image. Further, the learning section 33 establishes and solves a normal equation of the expression (8) for each class using the corresponding pixel configuring the teacher image corresponding to the noticed pixel and the prediction tap of the noticed pixel to determine tap coefficients for each class.

Figure 4:
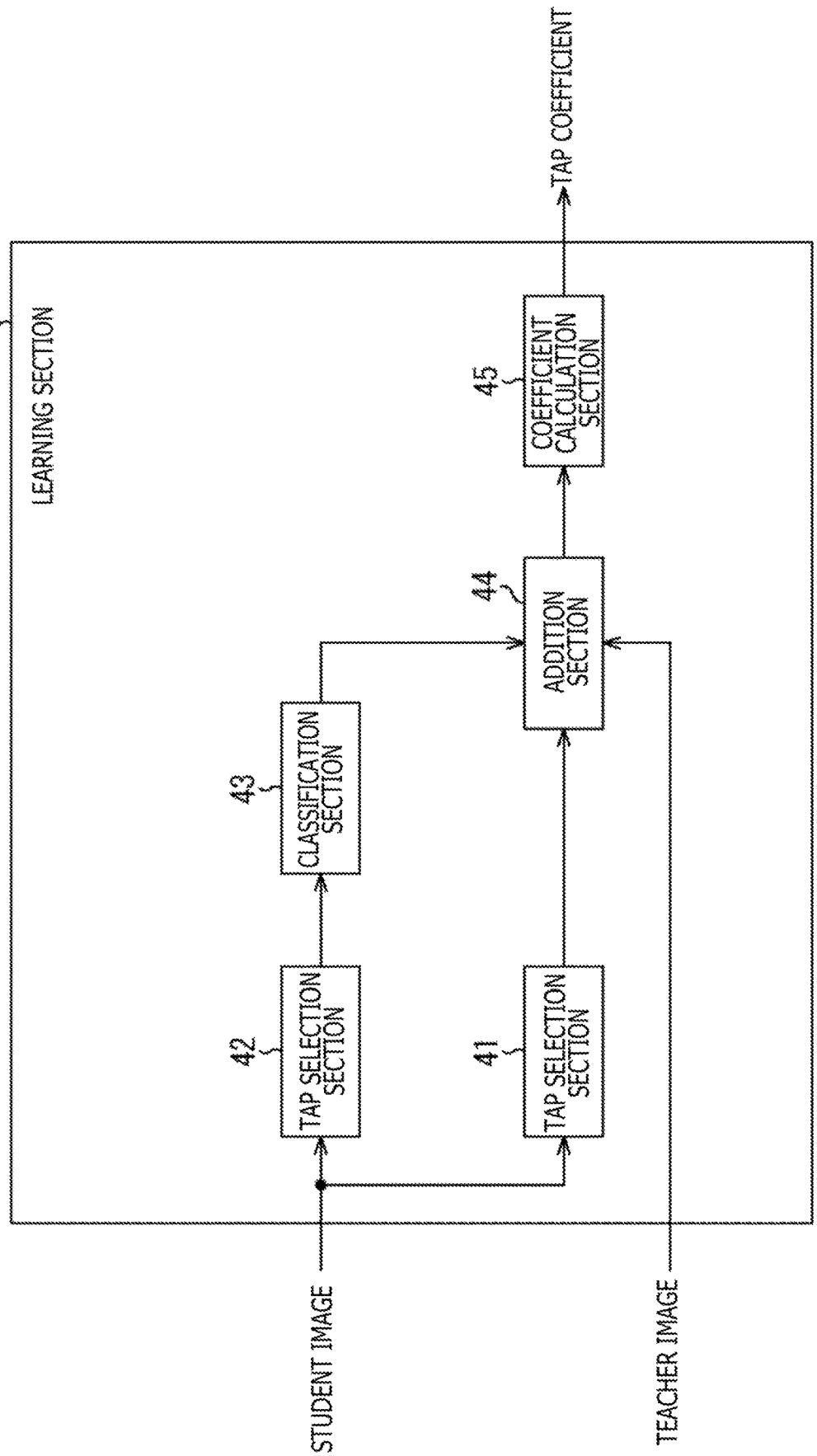
FIG. 4 is a block diagram depicting a configuration example of a learning section 33.

FIG. 4 is a block diagram depicting a configuration example of the learning section 33 of FIG. 3.

Referring to FIG. 4, the learning section 33 includes tap selection sections 41 and 42, a classification section 43, an addition section 44 and a coefficient calculation section 45.

A student image is supplied to the tap selection sections 41 and 42 while a teacher image is supplied to the addition section 44.

The tap selection section 41 successively selects pixels configuring the student image as a noticed pixel and supplies information representing the noticed pixel to necessary blocks.

Further, the tap selection section 41 selects, in regard to the noticed pixel, pixels same as those selected by the tap selection section 21 of FIG. 2 from among the pixels configuring the student image to a prediction tap, and, as a result, obtains a prediction tap having a tap structure same as that obtained by the tap selection section 21. Then, tap selection section 41 supplies the obtained prediction tap to the addition section 44.

The tap selection section 42 selects, in regard to the noticed pixel, pixels same as those selected by the tap selection section 22 of FIG. 2 to a prediction tap from among the pixels configuring the student image, and, as a result, obtains a class tap having a tap structure same as that obtained by the tap selection section 22. Then, the tap selection section 42 supplies the obtained class tap to the classification section 43.

The classification section 43 performs classification same as that of the classification section 23 of FIG. 2 using the class tap from the tap selection section 42 and outputs a class code corresponding to a class of the noticed pixel obtained as a result of the classification to the addition section 44.

The addition section 44 acquires (a pixel value of) the corresponding pixel corresponding to the noticed pixel from the pixels configuring the teacher image and performs addition whose target is the corresponding pixel and (the pixel values of) the pixels of the student image configuring the prediction tap regarding the noticed pixel supplied from the tap selection section 41 for each class code supplied from the classification section 43.

In particular, a corresponding pixel $y_k$ of the teacher image as teacher data, a prediction tap $x_n$ of the noticed pixel as student data and a class code representing the class of the noticed pixel are supplied to the addition section 44.

The addition section 44 performs, for each class of the noticed pixel, multiplication $(x_{n,k}x_{n',k})$ of the student data in the matrix on the left side of the expression (8) and arithmetic operation equivalent to summation (E) using the prediction tap (student data) $x_{n,k}$.

Further, the addition section 44 also performs, using the prediction tap (student data) $x_{n,k}$ and the teacher data $y_k$ for each class of the noticed pixel, multiplication $(x_{n,k}y_k)$ of the student data $x_{n,k}$ and the teacher data $y_k$ in the vector on the right side of the expression (8) and arithmetic operation equivalent to summation ($\Sigma$).

In particular, the addition section 44 has stored in a built-in memory (not depicted) thereof the component $(\Sigma x_{n,k}x_{n',k})$ of the matrix on the left side and the component $(\Sigma x_{n,k}y_k)$ of the vector on the right side of the expression (8) determined in regard to the corresponding pixel corresponding to the noticed pixel as teacher data in the preceding operation cycle, and adds a corresponding component $x_{n,k+1}x_{n',k+1}$ or $x_{n,k+1}y_{k+1}$ calculated using the teacher data $y_{k+1}$ and the student data $x_{n,k+1}$ in regard to the teacher data that has newly become a corresponding pixel corresponding to the new noticed pixel to the component $(\Sigma x_{n,k}x_{n',k})$ of the matrix or the component $(\Sigma x_{n,k}y_k)$ of the vector (performs addition represented by summation of the expression (8)).

Then, the addition section 44 performs the addition described above setting, for example, all of the pixels of the student image as a noticed pixel to establish a normal equation represented by the expression (8) in regard to each class and then supplies the normal equation to the coefficient calculation section 45.

The coefficient calculation section 45 solves the normal equation regarding each class supplied from the addition section 44 to determine an optimum tap coefficient $w_n$ for each class and supplies the determined optimum tap coefficients $w_n$.

The tap coefficients $w_n$ for the individual classes determined in such a manner as described above can be stored into the coefficient acquisition section 24 in the image conversion apparatus 20 of FIG. 2.

Figure 5:
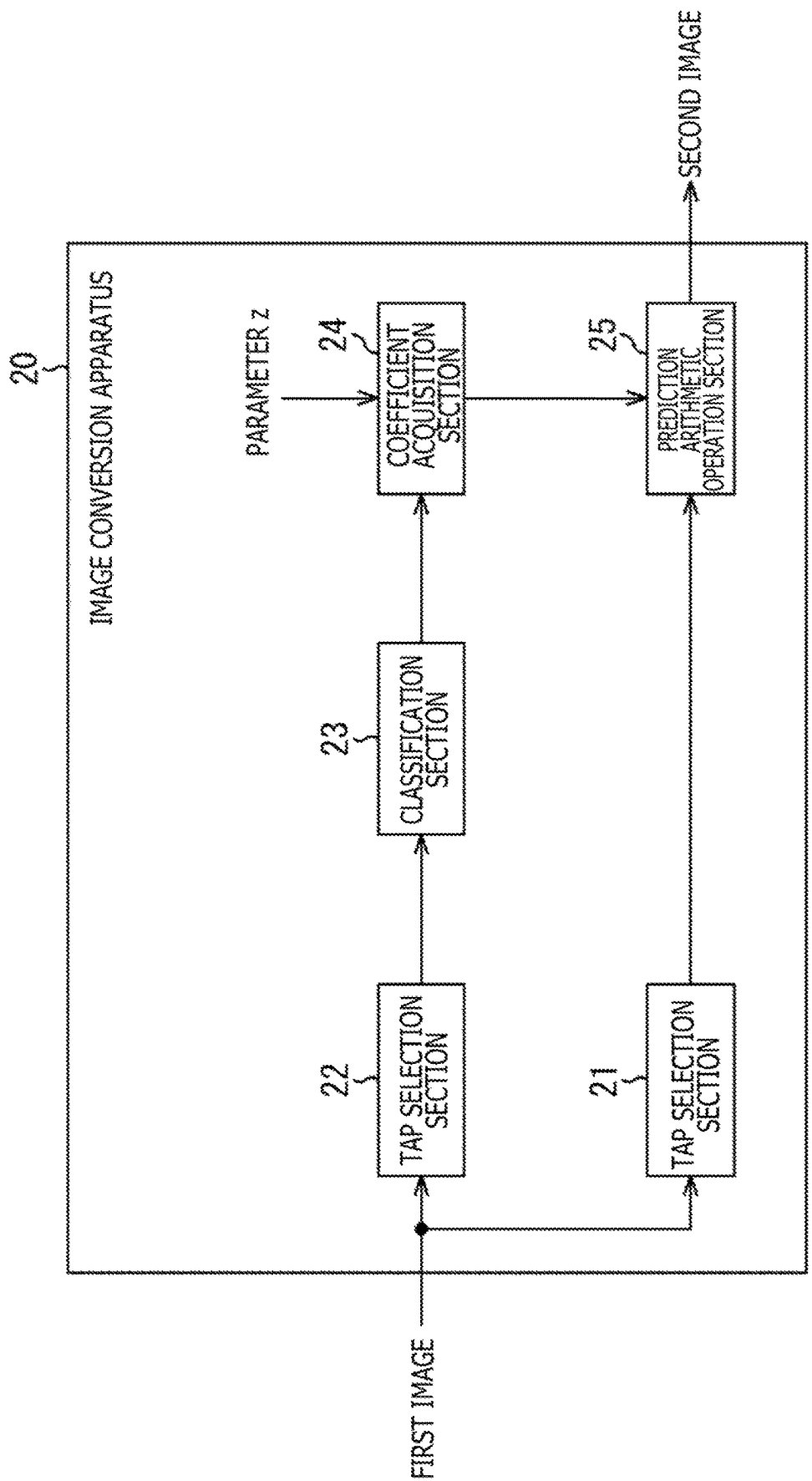
FIG. 5 is a block diagram depicting a second configuration example of the image conversion apparatus that performs a classification adaptive process.

FIG. 5 is a block diagram depicting a second configuration example of the image conversion apparatus that performs a classification adaptive process.

It is to be noted that, in FIG. 5, like elements to those in FIG. 2 are denoted by like reference characters and description thereof is suitably omitted in the following description.

Referring to FIG. 5, the image conversion apparatus 20 includes the tap selection sections 21 and 22, classification section 23, coefficient acquisition section 24 and prediction arithmetic operation section 25.

Accordingly, the image conversion apparatus 20 of FIG. 5 is configured similarly to that of FIG. 2.

However, in FIG. 5, the coefficient acquisition section 24 stores a seed coefficient hereinafter described. Further, in FIG. 5, a parameter z is supplied from the outside to the coefficient acquisition section 24.

The coefficient acquisition section 24 generates a tap coefficient for each class corresponding to the parameter z from the seed coefficient, acquires a tap coefficient of the class from the classification section 23 from the tap coefficients for the individual classes, and supplies the acquired tap coefficients to the prediction arithmetic operation section 25.

Here, while the coefficient acquisition section 24 in FIG. 2 stores the tap coefficients as they are, the coefficient acquisition section 24 in FIG. 5 stores the seed coefficient. From the seed coefficient, tap coefficients can be generated by applying (determining) the parameter z. From such a point of view, the seed coefficient can be regarded as information equivalent to the tap coefficients.

Figure 6:
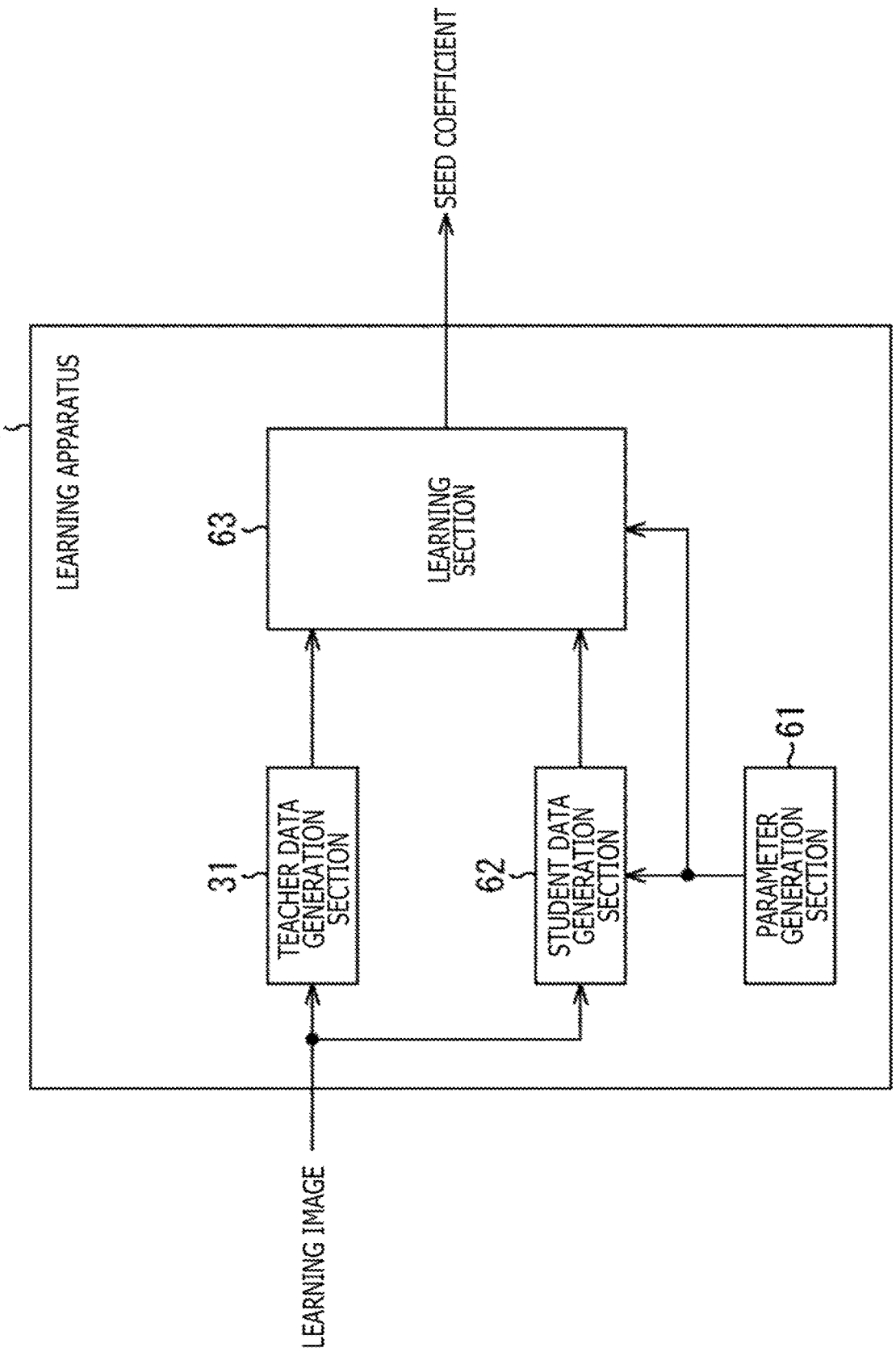
FIG. 6 is a block diagram depicting a configuration example of the learning apparatus that performs learning of a seed coefficient to be stored into the coefficient acquisition section 24.

FIG. 6 is a block diagram depicting a configuration example of a learning apparatus that performs learning of a seed coefficient to be stored into the coefficient acquisition section 24.

Here, for example, similarly as in the case described with reference to FIG. 3, it is conceived that, determining that an image having high picture quality (high picture quality image) is a second image and another image having low picture quality (low picture quality image) obtained by decreasing the spatial resolution of the high picture quality image is a first image, a prediction tap is selected from within the low picture quality image and the pixel value of a high picture quality pixel that is a pixel of the high picture quality image is determined (predicted) using the prediction tap and the tap coefficient, for example, by the linear primary prediction arithmetic operation of the expression (1).

Here, it is assumed that the tap coefficient w is generated by the following expression using the seed coefficient and the parameter z.

[Math. 9]

$$w_n = \sum_{m=1}^{M} \beta_{m,n} z^{m-1} \tag{9}$$

It is to be noted that, in the expression (9), $\beta_{m,n}$ represents an mth seed coefficient used for determination of the nth tap coefficient $w_n$. It is to be noted that, in the expression (9), the tap coefficient $w_n$ is determined using M seed coefficients $\beta_{1,n}, \beta_{2,n}, \ldots$ and $\beta_{M,n}$.

Here, the expression for determining the tap coefficient $w_n$ from the seed coefficient $\beta_{m,n}$ and the parameter z is not limited to the expression (9).

Now, a value $z^{m-1}$ that depends upon the parameter z in the expression (9) is defined by the following expression introducing a new variable $t_m$.

[Math. 10]

$$t_m = z^{m-1} \quad (m=1,2,\ldots,M) \tag{10}$$

The following expression is obtained by substituting the expression (10) into the expression (9).

[Math. 11]

$$w_n = \sum_{m=1}^{M} \beta_{m,n} t_m \tag{11}$$

According to the expression (11), the tap coefficient $w_n$ is determined by a linear primary expression of the seed coefficient $\beta_{m,n}$ and the variable $t_m$.

Incidentally, if the true value of the pixel value of the high picture quality pixel of the kth sample is represented as $y_k$ and the prediction value of the true value $y_k$ obtained by the expression (1) is represented as $y_k'$, then the prediction error $e_k$ is represented by the following expression.

[Math. 12]

$$e_k = y_k - y_k' \tag{12}$$

Now, since the prediction value $y_k'$ of the expression (12) is determined in accordance with the expression (1), if $y_k'$ of the expression (12) is replaced in accordance with the expression (1), then the following expression is obtained.

[Math. 13]

$$e_k = y_k - \left(\sum_{n=1}^{N} w_n x_{n,k}\right) \tag{13}$$

It is to be noted that, in the expression (13), $x_{n,k}$ represents an nth low picture quality pixel configuring the prediction tap in regard to the high picture quality pixel of the kth sample as the corresponding pixel.

By substituting the expression (11) into $w_n$ of the expression (13), the following expression is obtained.

[Math. 14]

$$e_k = y_k - \left(\sum_{n=1}^{N}\left(\sum_{m=1}^{M} \beta_{m,n} t_m\right) x_{n,k}\right) \tag{14}$$

While the seed coefficient $\beta_{m,n}$ with which the prediction error $e_k$ of the expression (14) is made 0 is optimum for prediction of the high picture quality pixel, it is generally difficult to determine such a seed coefficient $\beta_{m,n}$ as described above for all high picture quality pixels.

Therefore, if, for example, a minimal square method is adopted as a norm representing that the seed coefficient $\beta_{m,n}$ is optimum, then an optimum seed coefficient $\beta_{m,n}$ can be determined by minimizing the sum total E (total errors) of square errors represented by the following expression.

[Math. 15]

$$E = \sum_{k=1}^{K} e_k^2 \tag{15}$$

It is to be noted that, in the expression (15), K represents the sample number (number of samples for learning) of a set of the high picture quality pixel $y_k$ as the corresponding pixel and the low picture quality pixels $x_{1,k}, x_{2,k}, \ldots$ and $x_{N,k}$ configuring the prediction tap with respect to the high picture quality pixel $y_k$.

A minimum value (lowest value) of the sum total E of square errors of the expression (15) is given by $\beta_{m,n}$ with which a result obtained by partial differentiation of the sum total E with the seed coefficient m,n is made 0 as indicated by the expression (16).

[Math. 16]

$$\frac{\partial E}{\partial \beta_{m,n}} = \sum_{k=1}^{K} 2 \cdot \frac{\partial e_k}{\partial \beta_{m,n}} \cdot e_k = 0 \tag{16}$$

By substituting the expression (13) into the expression (16), the following expression is obtained.

[Math. 17]

$$\sum_{k=1}^{K} t_m x_{n,k} e_k = \sum_{k=1}^{K} t_m x_{n,k} \left(y_k - \left(\sum_{n=1}^{N}\left(\sum_{m=1}^{M} \beta_{m,n} t_m\right) x_{n,k}\right)\right) = 0 \tag{17}$$

Now, $X_{i,p,j,q}$ and $Y_{i,p}$ are defined as indicated by the following expressions (18) and (19), respectively.

[Math. 18]

$$X_{i,p,j,q} = \sum_{k=1}^{K} x_{i,k} t_p x_{j,k} t_q \tag{18}$$

$(i = 1, 2, \ldots, N; j = 1, 2, \ldots, N; p = 1, 2, \ldots, M; q = 1, 2, \ldots, M)$ -continued

[Math. 19]

$$Y_{i,p} = \sum_{k=1}^{K} x_{i,k} t_p y_k \quad (19)$$

In this case, the expression (17) can be represented by a normal equation indicated by the expression (20) using $X_{i,p,j,q}$ and $Y_{i,p}$.

[Math. 20]

$$\begin{bmatrix} X_{1,1,1,1} & X_{1,1,1,2} & \cdots & X_{1,1,1,M} & X_{1,1,2,1} & \cdots & X_{1,1,N,M} \\ X_{1,2,1,1} & X_{1,2,1,2} & \cdots & X_{1,2,1,M} & X_{1,2,2,1} & \cdots & X_{1,2,N,M} \\ \vdots & \vdots & \ddots & \vdots & \vdots & & \vdots \\ X_{1,M,1,1} & X_{1,M,1,2} & \cdots & X_{1,M,1,M} & X_{1,M,2,1} & \cdots & X_{1,M,N,M} \\ X_{2,1,1,1} & X_{2,1,1,2} & \cdots & X_{2,M,1,M} & X_{2,M,2,1} & \cdots & X_{2,M,N,M} \\ \vdots & \vdots & & \vdots & \vdots & \ddots & \vdots \\ X_{N,M,1,1} & X_{N,M,1,2} & \cdots & X_{N,M,1,M} & X_{N,M,2,M} & \cdots & X_{N,M,N,M} \end{bmatrix} \begin{bmatrix} \beta_{1,1} \\ \beta_{2,1} \\ \vdots \\ \beta_{M,1} \\ \beta_{1,2} \\ \vdots \\ \beta_{M,N} \end{bmatrix} = \begin{bmatrix} Y_{1,1} \\ Y_{1,2} \\ \vdots \\ Y_{1,M} \\ Y_{2,1} \\ \vdots \\ Y_{N,M} \end{bmatrix} \quad (20)$$

The normal equation of the expression (20) can be solved for the seed coefficient $\beta_{m,n}$ by using, for example, a sweeping method or the like.

In the image conversion apparatus 20 of FIG. 5, the seed coefficient $\beta_{m,n}$ for each class determined by performing learning for establishing and solving a normal equation of the expression (20) for each class using a great number of high picture quality pixels $y_1, y_2, \ldots$ and $y_k$ as the teacher data and the low picture quality pixels $x_{1,k}, x_{2,k}, \ldots$ and $x_{N,k}$ configuring the prediction tap with respect to each high picture quality pixel $y_k$ as the student data is stored into the coefficient acquisition section 24. Then, in the coefficient acquisition section 24, the tap coefficient $w_n$ for each class is generated in accordance with the expression (9) from the seed coefficient $\beta_{m,n}$ and the parameter z given from the outside, and, in the prediction arithmetic operation section 25, calculation of the expression (1) is performed using the tap coefficient $w_n$ and the low picture quality pixels (pixels of the first image) $x_n$ configuring the prediction taps regarding the noticed pixel to determine (prediction value close to) the pixel value of the high picture quality pixel (corresponding pixel of the second image).

FIG. 6 depicts a configuration example of a learning apparatus that establishes and solves a normal equation of the expression (20) to perform learning for determining the seed coefficient $\beta_{m,n}$ for each class.

It is to be noted that, in FIG. 6, like elements to those in FIG. 3 are denoted by like reference characters and description of them is suitably omitted below.

Referring to FIG. 6, the learning apparatus 30 includes the teacher data generation section 31, a parameter generation section 61, a student data generation section 62 and a learning section 63.

Accordingly, the learning apparatus 30 of FIG. 6 is common to that of FIG. 3 in that it includes the teacher data generation section 31.

However, the learning apparatus 30 of FIG. 6 is different from that of FIG. 3 in that it newly includes the parameter generation section 61. Further, the learning apparatus 30 of FIG. 6 is different from that of FIG. 3 in that it includes the student data generation section 62 and the learning section 63 in place of the student data generation section 32 and the learning section 33, respectively.

The parameter generation section 61 generates and supplies several values within a range that can be taken by the parameter z to the student data generation section 62 and the learning section 63.

For example, if it is assumed that the value that can be taken by the parameter z is a real number of a range of 0 to z, then the parameter generation section 61 generates, for example, parameters z having values of z=0, 1, 2, . . . and Z and supplies the parameters z to the student data generation section 62 and the learning section 63.

A learning image similar to that supplied to the teacher data generation section 31 is supplied to the student data generation section 62.

The student data generation section 62 generates a student image from the learning image similarly to the student data generation section 32 of FIG. 3 and supplies the student image as student data to the learning section 63.

Here, several values within the range that can be taken by the parameter z are supplied from the parameter generation section 61 to the student data generation section 62.

The student data generation section 62 performs filtering of a high picture quality image as a learning image, for example, by an LPF having a cutoff frequency corresponding to the parameter z supplied thereto to generate a low picture quality image as a student image with regard to each of the several values of the parameter z.

In particular, in the student data generation section 62, Z+1 kinds of low picture quality images as student images among which the spatial resolution is different are generated in regard to the high picture quality image as the learning image.

It is to be noted that it is assumed that the high picture quality image is filtered to generate low picture quality images as student images using, for example, an LPF whose cutoff frequency increases as the value of the parameter z increases. In this case, the low picture quality image as a student image corresponding to the parameter z having a high value has a high spatial resolution.

Further, the student data generation section 62 can generate a low picture quality image as a student image in which the spatial resolution in one of or both the horizontal direction and the vertical direction of the high picture quality image as a learning image is decreased in response to the parameter z can be generated.

Furthermore, in the case where a low picture quality image as a student image in which the spatial resolution in both the horizontal direction and the vertical direction of the high picture quality image as a learning image is to be generated, the spatial resolutions in the horizontal direction and the vertical direction of the high picture quality image as a learning image can be decreased independently of each other in response to parameters different from each other, namely, in response to two parameters z and z'.

In this case, in the coefficient acquisition section 24 of FIG. 5, two parameters z and z' are given from the outside and tap coefficients are generated using the two parameters z and z' and the seed coefficient.

As described above, a seed coefficient from which tap coefficients can be generated can be determined using, as the seed coefficient, the one parameter z, the two parameters z and z' or the three or more parameters. However, in the present specification, for the convenience of simplified description, description is given taking a seed coefficient from which tap coefficients are generated using a single parameter z as an example.

The learning section 63 determines a seed coefficient for each class using a teacher image as teacher data from the teacher data generation section 31, a parameter z from the parameter generation section 61 and a student image as student data from the student data generation section 62, and outputs the seed coefficients for the individual classes.

Figure 7:
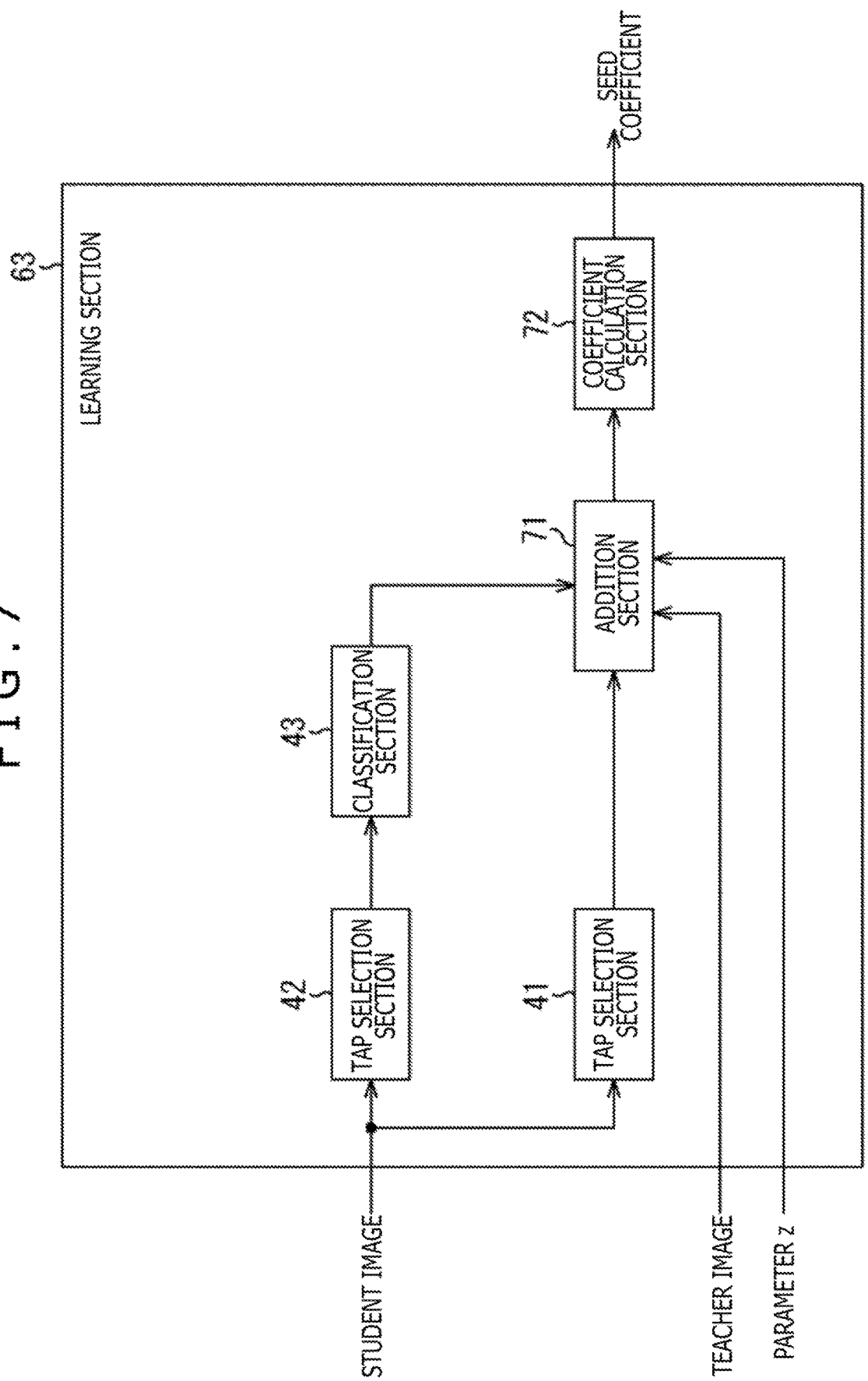
FIG. 7 is a block diagram depicting a configuration example of a learning section 63.

FIG. 7 is a block diagram depicting a configuration example of the learning section 63 of FIG. 6.

It is to be noted that, in FIG. 7, like elements to those of the learning section 33 in FIG. 3 are denoted by like reference characters and description of them is suitably omitted below.

Referring to FIG. 7, the learning section 63 includes the tap selection sections 41 and 42, the classification section 43, an addition section 71 and a coefficient calculation section 72.

Accordingly, the learning section 63 of FIG. 7 is common to the learning section 33 of FIG. 4 in that it includes the tap selection sections 41 and 42 and the classification section 43.

However, the learning section 63 is different from the learning section 33 in that it includes the addition section 71 and the coefficient calculation section 72 in place of the addition section 44 and the coefficient calculation section 45, respectively.

In FIG. 7, the tap selection sections 41 and 42 select a prediction tap and a class tap from a student image (here, a low picture quality image as student data generated using an LPF of a cutoff frequency corresponding to the parameter z) generated corresponding to the parameter z generated by the parameter generation section 61.

The addition section 71 acquires a corresponding pixel corresponding to a noticed pixel from a teacher image from the teacher data generation section 31 of FIG. 6 and performs addition whose target is the corresponding pixel, student data (pixels of the student image) configuring a prediction tap configured in regard to the noticed pixel supplied from the tap selection section 41 and parameter z upon generation of the student data for each class supplied from the classification section 43.

In particular, to the addition section 71, the teacher data $y_k$ as the corresponding pixel corresponding to the noticed pixel, prediction tap $x_{i,k}$ ($x_{j,k}$) relating to the noticed pixel outputted from the tap selection section 41 and class of the noticed pixel outputted from the classification section 43 are supplied and the parameter z when the student data configuring the prediction tap regarding the noticed pixel is generated is supplied from the parameter generation section 61.

Then, the addition section 71 performs, using the prediction tap (student data) $x_{i,k}$ ($x_{j,k}$) and the parameter z for each class supplied from the classification section 43, multiplication ($x_{i,k}t_p x_{j,k}t_q$) of the student data and the parameter z for determining the component $X_{i,p,j,q}$ defined by the expression (18) in the matrix on the left side of the expression (20) and arithmetic operation equivalent to the summation (Σ). It is to be noted that $t_p$ of the expression (18) is calculated from the parameter z in accordance with the expression (10). Also $t_q$ of the expression (18) is determined similarly.

Further, the addition section 71 also performs, using the prediction tap (student data) $x_{i,k}$, teacher data $y_k$ and parameter z for each class supplied from the classification section 43, multiplication ($x_{i,k}t_p y_k$) of the student data $x_{i,k}$, teacher data $y_k$ and parameter z for determination of the component $Y_{i,p}$ defined by the expression (19) in the vector on the right side of the expression (20) and arithmetic operation corresponding to the summation (Σ). It is to be noted that $t_q$ of the expression (19) is calculated from the parameter z in accordance with the expression (10).

In particular, the addition section 71 has stored in a built-in memory thereof (not depicted) the component $X_{i,p,j,q}$ in the matrix on the left side of the expression (20) determined, as the teacher data in the preceding operation cycle, in regard to the corresponding pixel corresponding to the noticed pixel and the component $Y_{i,p}$ of the vector on the right side, and adds a corresponding component $x_{i,k}t_p x_{j,k}t_q$ or $x_{i,k}t_p y_k$ calculated using the teacher data $y_k$, student data $x_{i,k}$ ($x_{j,k}$) and parameter z in regard to the teacher data that has become a corresponding pixel corresponding to a new noticed pixel for the component $X_{i,p,j,p}$ of the matrix or the component $Y_{i,p}$ of the vector (performs addition represented by summation in the component $X_{i,p,j,p}$ of the expression (18) or the component $Y_{i,p}$ of the expression (19)).

Then, the addition section 71 establishes a normal equation indicated by the expression (20) for each class by performing addition described above setting all pixels of the student image as the noticed pixel for all values of 0, 1, . . . and Z of the parameter z, and supplies the normal equations to the coefficient calculation section 72.

The coefficient calculation section 72 solves the normal equation for each class supplied from the addition section 71 to determine the seed coefficient $\beta_{m,n}$ for each class and outputs the seed coefficients $\beta_{m,n}$.

Incidentally, while the learning apparatus 30 of FIG. 6 performs learning in which, determining a high picture quality image as a learning image as teacher data and setting a low picture quality image the spatial resolution of whose high picture quality image is degraded corresponding to the parameter z as the student data, the seed coefficient $\beta_{m,n}$ that directly minimizes the sum total of square errors of the prediction value y of the teacher data predicted by a linear primary expression of the expression (1) from the tap coefficient $w_n$ and the student data $x_n$, as the learning of the seed coefficient $\beta_{m,n}$, learning for determining the seed coefficient $\beta_{m,n}$ that, as it were, indirectly minimize the sum total of square errors of the prediction value y of the teacher data can be performed.

In particular, using a high picture quality image as a learning image as teacher data and using, as student data, a low picture quality image whose horizontal resolution and vertical resolution are reduced by filtering the high picture quality image by an LPF of a cutoff frequency corresponding to the parameter z, at first a tap coefficient $w_n$ that minimizes the sum total of square errors of the prediction value y of the teacher data predicted by the linear primary prediction expression of the expression (1) using the tap coefficient $w_n$ and the student data $x_n$ is determined for each value of the parameter z (here, z=0, 1, . . . and Z). Then, using the tap coefficient $w_n$ determined for each value of the parameter z as teacher data and using the parameter z as student data, the seed coefficient $\beta_{m,n}$ that minimizes the sum total of square errors of prediction values of the tap coefficient $w_n$ as the teacher data predicted from the variable $t_m$ corresponding to the seed coefficient $\beta_{m,n}$ and the parameter z that is the student data in accordance with the expression (11).

Here, the tap coefficient $w_n$ that minimizes (makes minimum) the sum total E of square errors of the prediction value y of the teacher data predicted by the linear primary prediction expression of the expression (1) can be determined for each value (z=0, 1, ... and Z) of the parameter z for each class by establishing and solving a normal equation of the expression (8) similarly as in the case of the learning apparatus 30 of FIG. 3.

Incidentally, the tap coefficient is determined from the seed coefficient $\beta_{m,n}$ and the variable $t_m$ corresponding to the parameter z as indicated by the expression (11). Thus, if it is assumed now that the tap coefficient determined by the expression (11) is represented by $w_n'$, then the seed coefficient $\beta_{m,n}$ with which the error $e_n$ between the optimum tap coefficient $w_n$ and a tap coefficient $w_n'$ determined by the expression (11), which is represented by the following expression (21), becomes 0 is a seed coefficient optimum for determination of the optimum tap coefficient $w_n$. However, it is generally difficult to determine such a seed coefficient $\beta_{m,n}$ as described above for all tap coefficients $w_n$.

[Math. 21]

$$e_n = w_n - w_n' \quad (21)$$

It is to be noted that the expression (21) can be transformed into the following expression with the expression (11).

[Math. 22]

$$e_n = w_n - \left(\sum_{m=1}^{M} \beta_{m,n} t_m\right) \quad (22)$$

Thus, for example, if the minimum square method is adopted as a norm representing that the seed coefficient $\beta_{m,n}$ is optimum, then the optimum seed coefficient $\beta_{m,n}$ can be determined by minimizing the sum total E (statistical errors) of square errors represented by the following expression.

[Math. 23]

$$E = \sum_{n=1}^{N} e_n^2 \quad (23)$$

A minimum value (lowest value) of the sum total E of square errors of the expression (23) is given by $\beta_{m,n}$ with which a result obtained by partial differentiation of the sum total E with the seed coefficient $\beta_{m,n}$ is made 0 as indicated by the expression (24).

[Math. 24]

$$\frac{\partial E}{\partial \beta_{m,n}} = \sum_{m=1}^{M} 2 \frac{\partial e_n}{\partial \beta_{m,n}}, e_n = 0 \quad (24)$$

The following expression is obtained by substituting the expression (22) by the expression (24).

[Math. 25]

$$\sum_{m=1}^{M} t_m \left(w_n - \left(\sum_{m=1}^{M} \beta_{m,n} t_m\right)\right) = 0 \quad (25)$$

Now, $X_{i,j}$ and $Y_i$ are defined as indicated by the expressions (26) and (27), respectively.

[Math. 26]

$$X_{i,j} = \sum_{z=0}^{Z} t_i t_j \quad (26)$$

$(i = 1, 2, \ldots, M; j = 1, 2, \ldots, M)$

[Math. 27]

$$Y_i = \sum_{z=0}^{Z} t_i w_n \quad (27)$$

In this case, the expression (25) can be represented by a normal equation indicated by the expression (28) using $X_{i,j}$ and $Y_i$.

[Math. 28]

$$\begin{bmatrix} X_{1,1} & X_{1,2} & \ldots & X_{1,M} \\ X_{2,1} & X_{2,1} & \ldots & X_{2,2} \\ \vdots & \vdots & \ddots & \vdots \\ X_{M,1} & X_{M,2} & \ldots & X_{M,M} \end{bmatrix} \begin{bmatrix} \beta_{1,n} \\ \beta_{2,n} \\ \vdots \\ \beta_{M,n} \end{bmatrix} = \begin{bmatrix} Y_1 \\ Y_1 \\ \vdots \\ Y_M \end{bmatrix} \quad (28)$$

Also the normal equation of the expression (28) can be solved for the seed coefficient $\beta_{m,n}$, for example, by using a sweeping method or the like.

Figure 8:
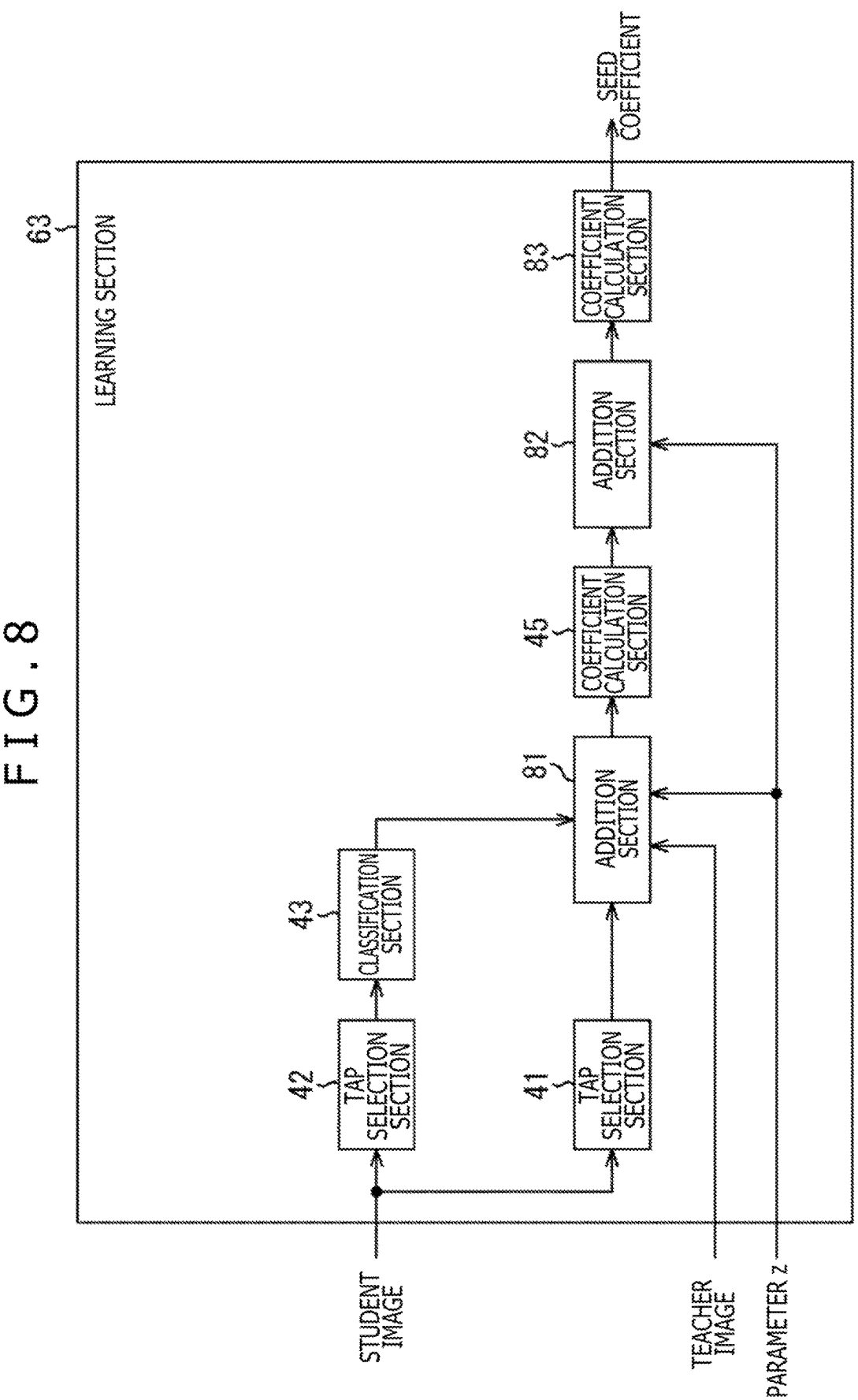
FIG. 8 is a block diagram depicting another configuration example of a learning section 63.

FIG. 8 is a block diagram depicting a different configuration example of the learning section 63 of FIG. 6.

In particular, FIG. 8 depicts a configuration example of the learning section 63 that establishes and solves a normal equation of the expression (28) to determine a seed coefficient $\beta_{m,n}$.

It is to be noted that, in FIG. 8, like elements to those in FIGS. 4 and 7 are denoted by like reference characters and description of them is omitted suitably below.

The learning section 63 of FIG. 8 includes the tap selection sections 41 and 42, the classification section 43, the coefficient calculation section 45, addition sections 81 and 82 and a coefficient calculation section 83.

Accordingly, the learning section 63 of FIG. 8 is common to the learning section 33 of FIG. 4 in that it includes the tap selection sections 41 and 42, classification section 43 and coefficient calculation section 45.

However, the learning section 63 of FIG. 8 is different from the learning section 33 of FIG. 4 in that it includes the addition section 81 in place of the addition section 44 and newly includes the addition section 82 and the coefficient calculation section 83.

A class of a noticed pixel outputted from the classification section 43 and a parameter z outputted from the parameter generation section 61 are supplied to the addition section 81. The addition section 81 performs addition, whose target is teacher data as a corresponding pixel corresponding to the noticed pixel from within a teacher image from the teacher data generation section 31 and student data configuring a prediction tap regarding the noticed pixel supplied from the tap selection section 41, for each class supplied from the classification section 43 and for each value of the parameter z outputted from the parameter generation section 61.

In particular, the teacher data $y_k$, prediction tap $x_{n,k}$, class of the noticed pixel and parameter z when a student image that configures the prediction tap $x_{n,k}$ is generated are supplied to the addition section 81.

The addition section 81 performs, using the prediction tap (student data) $x_{n,k}$ for each class of the noticed pixel and for each value of the parameter z, multiplication ($x_{n,k}\, x_{n',k}$) of the student data in the matrix on the left side of the expression (8) and arithmetic operation equivalent to the summation ($\Sigma$).

Further, the addition section 81 performs, using the prediction tap (student data) $x_{n,k}$ and the teacher data $y_k$ for each class of the noticed pixel and for each value of the parameter z, multiplication ($x_{n,k}\, y_k$) of the student data $x_{n,k}$ and the teacher data $y_k$ in the vector on the right side of the expression (8) and arithmetic operation equivalent to the summation ($\Sigma$).

In particular, the addition section 81 stores the component ($\Sigma x_{n,k} x_{n',k}$) in the matrix of the left side and the component ($\Sigma x_{n,k} y_k$) of the vector at the right side in the expression (8) determined relating to the corresponding pixel corresponding to the noticed pixel at the last time as the teacher data in a built-in memory (not depicted), and adds a corresponding component $x_{n,k+1} x_{n',k+1}$ or $x_{n,k+1} y_{k+1}$ determined using the teacher data $y_k+1$ and the student data $x_{n,k+1}$ relating to the teacher data including the corresponding pixel corresponding to a new noticed pixel to the component ($\Sigma x_{n,k} x_{n',k}$) in the matrix or the component ($\Sigma x_{n,k} y_k$) in the vector (performs addition represented by the summation of the expression (8)).

Then, the addition section 81 performs addition described above using all pixels of the student image as the noticed pixel to establish a normal equation indicated by the expression (8) for each value of the parameter z for each class and then supplies the normal equations to the coefficient calculation section 45.

Accordingly, the addition section 81 establishes a normal equation of the expression (8) for each class similarly to the addition section 44 of FIG. 4. However, the addition section 81 is different from the addition section 44 in that it establishes a normal equation of the expression (8) also for each value of the parameter z.

The coefficient calculation section 45 solves the normal equation for each value of the parameter z for each class supplied from the addition section 81 to determine a tap coefficient $w_n$ optimum for each value of the parameter z for each class and then supplies the tap coefficients to the addition section 82.

The addition section 82 performs addition whose target is (the variable $t_m$ corresponding to) the parameter z supplied from the parameter generation section 61 (FIG. 6) and the optimum tap coefficient $w_n$ supplied from the coefficient calculation section 45 for each class.

In particular, the addition section 82 performs, using the variable $t_i$ ($t_j$) determined by the expression (10) from the parameter z supplied from the parameter generation section 61, multiplication ($t_i t_j$) of the variables $t_i$ ($t_j$) corresponding to the parameter z for determining the component $X_{i,j}$ defined by the expression (26) in the matrix on the left side of the expression (28) and arithmetic operation equivalent to the summation ($\Sigma$) for each class.

Here, since the component $X_{i,j}$ depends only upon the parameter z and has no relation to the class, actually calculation of the component $X_{i,j}$ need not be performed for each class but may be performed by only once.

Further, the addition section 82 performs, using the variable $t_i$ determined by the expression (10) from the parameter z supplied from the parameter generation section 61 and the optimum tap coefficient $w_n$ supplied from the coefficient calculation section 45, multiplication ($t_i w_n$) of the variable $t_i$ corresponding to the parameter z and the optimum tap coefficient $w_n$ for determining the component $Y_i$ defined by the expression (27) in the vector on the right side of the expression (28) and arithmetic operation equivalent to the summation ($\Sigma$) for each class.

The addition section 82 determines the component $X_{i,j}$ represented by the expression (26) and the component $Y_i$ represented by the expression (27) for each class to establish a normal equation of the expression (28) for each class, and supplies the normal equations to the coefficient calculation section 83.

The coefficient calculation section 83 solves the normal equation of the expression (28) for each class supplied from the addition section 82 to determine a seed coefficient $\beta_{m,n}$ for each class and outputs the seed coefficients $\beta_{m,n}$.

It is possible for store the seed coefficients $\beta_{m,n}$ for each class determined in such a manner as described above into the coefficient acquisition section 24 of FIG. 5.

It is to be noted that, also in the learning of a seed coefficient, it is possible to obtain seed coefficients for performing various image conversion processes as the seed coefficient depending upon the manner of selection of images to be made student data corresponding to a first image and teacher data corresponding to a second image similarly as in the case of the learning of a tap coefficient.

In particular, in the case described above, learning of a seed coefficient is performed using the learning image as it is as the teacher data corresponding to the second image and using the low picture quality image obtained by degrading the spatial resolution of the learning image as the student data corresponding to the first image. Therefore, as the seed coefficient, a seed coefficient for performing a image conversion process as the spatial resolution creation process for converting the first image into the second image whose spatial resolution is improved can be obtained.

In this case, in the image conversion apparatus 20 of FIG. 5, the horizontal resolution and the vertical resolution of an image can be improved to the resolution corresponding to the parameter z.

Further, for example, by performing learning of a seed coefficient setting a high picture quality image as teacher data and setting an image obtained by superimposing noise of a level corresponding to the parameter z with the high picture quality image as the teacher data as student data, as the seed coefficient, a seed coefficient for performing the image conversion process as a noise removing process for converting the first image into the second image whose noise is removed (reduced) is obtained. In this case, in the image conversion apparatus 20 of FIG. 5, an image having an S/N corresponding to the parameter z (image for which noise removal of a strength corresponding to the parameter z is performed) can be obtained.

It is to be noted that, while, in the case described above, the tap coefficient $w_n$ is defined by $\beta_{1,n} z^0 + \beta_{2,n} z^1 + \ldots + \beta_{M,n} z^{M-1}$ as indicated by the expression (9) and the tap coefficient $w_n$ for improving both of the spatial resolutions in the horizontal and vertical resolutions in accordance with the parameter z is determined by the expression (9), also it is possible to determine, as the tap coefficient $w_n$, a tap coefficient that improves the horizontal resolution and the vertical resolution independently of each other in accordance with parameters $z_x$ and $z_y$ independent of each other.

In particular, the tap coefficient $w_n$ is defined, for example, by a cubic polynomial $\beta_{1,n}z_x^0z_y^0+\beta_{2,n}z_x^1z_y^0+\beta_{3,n}z_x^2z_y^0+\beta_{4,n}z_x^3z_y^0+\beta_{5,n}z_x^0z_y^1+\beta_{6,n}z_x^0z_y^2+\beta_{7,n}z_x^0z_y^3+\beta_{8,n}z_x^1z_y^1+\beta_{9,n}z_x^2z_y^1+\beta_{10,n}z_x^1z_y^2$ in place of the expression (9), and the variable $t_m$ defined by the expression (10) is defined, for example, as $t_1=z_x^0z_y^0$, $t_2=z_x^1z_y^0$, $t_3=z_x^2z_y^0$, $t_4=z_x^3z_y^0$, $t_5=z_x^0z_y^1$, $t_6=z_x^0z_y^2$, $t_7=z_x^0z_y^3$, $t_8=z_x^1z_y^1$, $t_9=z_x^2z_y^1$ and $t_{10}=z_x^1z_y^2$ in place of the expression (10). Also in this case, the tap coefficient $w_n$ can be finally represented by the expression (11). Accordingly, in the learning apparatus 30 of FIG. 6, by performing learning using, as student data, an image obtained by degrading the horizontal resolution and the vertical resolution of teacher data in accordance with the parameters $z_x$ and $z_y$, to determine the seed coefficient $\beta_{m,n}$, a seed coefficient $\beta_{m,n}$ that improves the horizontal resolution and the vertical resolution independently of each other in accordance with the parameters $z_x$ and $z_y$ independent of each other can be determined.

Further, by further introducing the parameter $z_t$ corresponding to a resolution in the time direction in addition to the parameters $z_x$ and $z_y$ corresponding to the horizontal resolution and the vertical resolution, respectively, tap coefficients $w_n$ that improve the horizontal resolution, vertical resolution and time resolution independently of each other in accordance with the parameters $z_x$, $z_y$ and $z_t$ independent of each other can be determined.

Further, in the learning apparatus 30 of FIG. 6, by performing learning using, as student data, an image obtained by degrading the horizontal resolution and the vertical resolution of teacher data in accordance with the parameter $z_x$ and adding noise to the teacher data in accordance with the parameter $z_y$ to determine a seed coefficient $\beta_{m,n}$, it is possible to determine the tap coefficient $w_n$ that improves the horizontal resolution and the vertical resolution in accordance with the parameter $z_x$ and performs noise removal in accordance with the parameter $z_y$.

<First Configuration Example of Encoding Apparatus 11>

Figure 9:
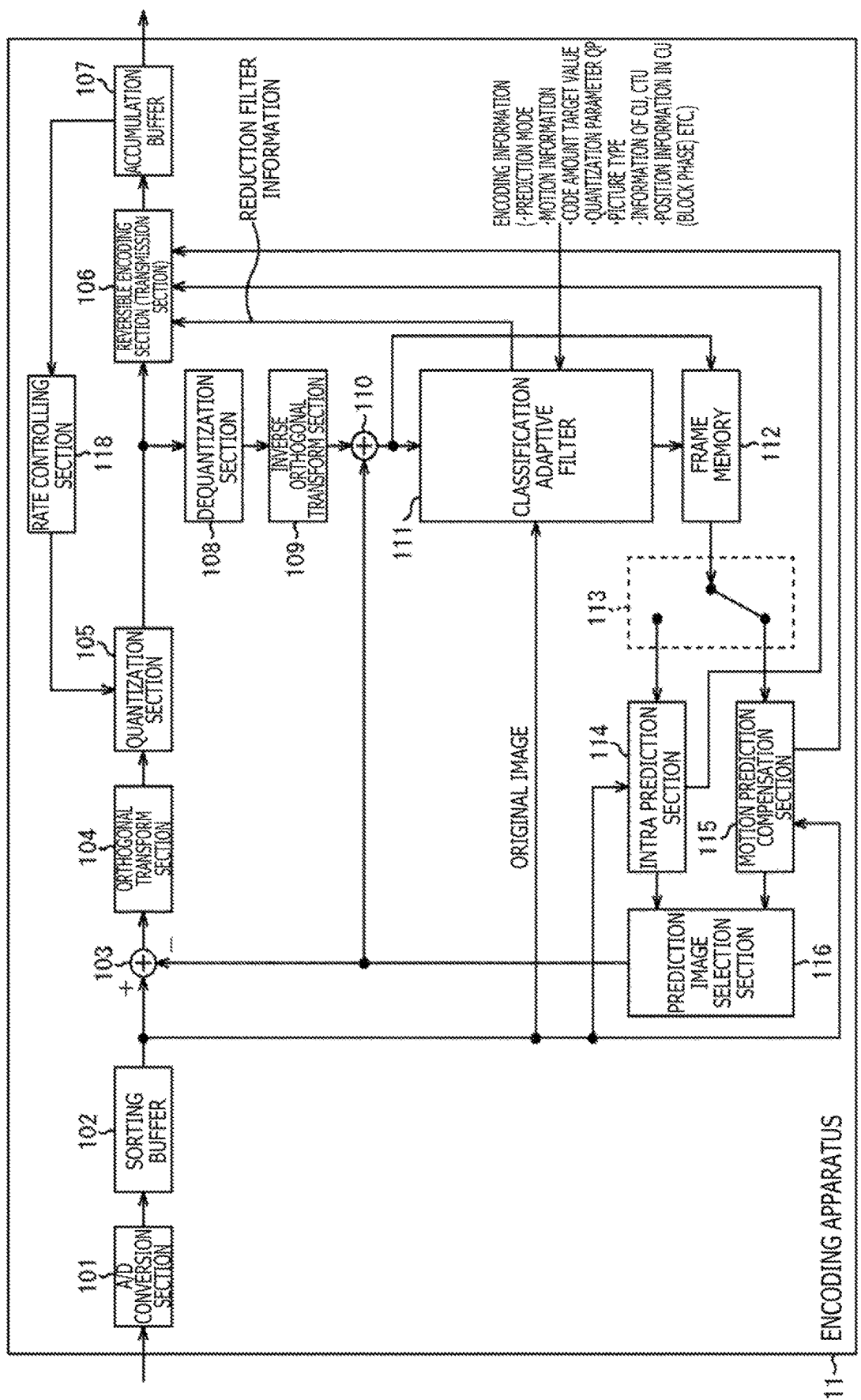
FIG. 9 is a block diagram depicting a first configuration example of an encoding apparatus 11.

FIG. 9 is a block diagram depicting a first configuration example of the encoding apparatus 11 of FIG. 1.

Referring to FIG. 9, the encoding apparatus 11 includes an A/D conversion section 101, a sorting buffer 102, an arithmetic operation section 103, an orthogonal transform section 104, a quantization section 105, a reversible encoding section 106 and an accumulation buffer 107. The encoding apparatus 11 further includes a dequantization section 108, an inverse orthogonal transform section 109, an arithmetic operation section 110, a classification adaptive filter 111, a frame memory 112, a selection section 113, an intra-prediction section 114, a motion prediction compensation section 115, a prediction image selection section 116 and a rate controlling section 117.

The A/D conversion section 101 A/D converts an original image of an analog signal into an original image of a digital signal and supplies the original image of a digital signal to the sorting buffer 102 so as to be stored into the sorting buffer 102.

The sorting buffer 102 sorts frames of the original image from a displaying order to an encoding (decoding) order in response to the GOPs (Groups Of Pictures) and supplies the frames to the arithmetic operation section 103, intra-prediction section 114, motion prediction compensation section 115 and classification adaptive filter 111.

The arithmetic operation section 103 subtracts a prediction image supplied from the intra-prediction section 114 or the motion prediction compensation section 115 through the prediction image selection section 116 from the original image from the sorting buffer 102 and supplies a residual (prediction residual) obtained by the subtraction to the orthogonal transform section 104.

For example, in the case of images for which inter encoding is to be performed, the arithmetic operation section 103 subtracts a prediction image supplied from the motion prediction compensation section 115 from an original image read out from the sorting buffer 102.

The orthogonal transform section 104 performs orthogonal transform such as discrete cosine transform or Karhunen-Loeve transform for the residual supplied from the arithmetic operation section 103. It is to be noted that the method for orthogonal transform is arbitrary. The orthogonal transform section 104 supplies transform coefficients obtained by the orthogonal transform to the quantization section 105.

The quantization section 105 quantizes the transform coefficients supplied from the orthogonal transform section 104. The quantization section 105 sets a quantization parameter QP on the basis of a target value for a code amount (code amount target value) supplied from the rate controlling section 117 to perform quantization of the transform coefficients. It is to be noted that the method for the quantization is arbitrary. The quantization section 105 supplies the quantized transform coefficients to the reversible encoding section 106.

The reversible encoding section 106 encodes the transform coefficients quantized by the quantization section 105 by a predetermined reversible encoding method. Since the transform coefficients have been quantized under the control of the rate controlling section 117, the code amount of encoded data obtained by the reversible encoding of the reversible encoding section 106 becomes equal to the code amount target value set by the rate controlling section 117 (or becomes close to the code amount target value).

Further, the reversible encoding section 106 acquires necessary encoding information from within encoding information relating to prediction encoding by the encoding apparatus 11 from the associated blocks.

Here, as the encoding information, for example, a prediction mode such as intra prediction or inter prediction, motion information of a motion vector or the like, a code amount target value, a quantization parameter QP, a picture type (I, P, B), information of a CU (Coding Unit) or a CTU (Coding Tree Unit) and so forth are available.

For example, the prediction mode can be acquired from the intra-prediction section 114 or the motion prediction compensation section 115. Further, for example, the motion information can be acquired from the motion prediction compensation section 115.

The reversible encoding section 106 acquires encoding information and acquires, from the classification adaptive filter 111, reduction information that reduces the tap number to be used for a classification adaptive process by the classification adaptive filter 111.

The reversible encoding section 106 encodes (multiplexes) encoding information and reduction filter information by an arbitrary reversible encoding method to form part of header information of encoded data.

The reversible encoding section 106 transmits encoded data through the accumulation buffer 107. Accordingly, the reversible encoding section 106 functions as a transmission section that transmits encoded data and eventually transmits encoding information and reduction filter information included in the encoded data.

As the reversible encoding method of the reversible encoding section 106, for example, variable length coding, arithmetic coding or the like can be adopted. As the variable length coding, for example, CAVLC (Context-Adaptive Variable Length Coding) prescribed in the H.264/AVC method and so forth are available. As the arithmetic coding, for example, CABAC (Context-Adaptive Binary Arithmetic Coding) and so forth are available.

The accumulation buffer 107 temporarily accumulates encoded data supplied from the reversible encoding section 106. The encoded data accumulated in the accumulation buffer 107 are read out and transmitted at a predetermined timing.

Transform coefficients quantized by the quantization section 105 are supplied to the reversible encoding section 106 and supplied also to the dequantization section 108. The dequantization section 108 dequantizes the quantized transform coefficients by a method corresponding to quantization by the quantization section 105. This dequantization method may be any method if it is a method corresponding to the quantization process by the quantization section 105. The dequantization section 108 supplies transform coefficients obtained by the dequantization to the inverse orthogonal transform section 109.

The inverse orthogonal transform section 109 inversely orthogonally transforms the transform coefficients supplied from the dequantization section 108 by a method corresponding to the orthogonal transform process by the orthogonal transform section 104. This inverse orthogonal transform method may be any method if it is a method corresponding to the orthogonal transform process by the orthogonal transform section 104. An inversely orthogonally transformed output (restored residual) is supplied to the arithmetic operation section 110.

The arithmetic operation section 110 adds a prediction image supplied from the intra-prediction section 114 or the motion prediction compensation section 115 through the prediction image selection section 116 to the inverse orthogonal transform result supplied from the inverse orthogonal transform section 109, namely, to the restored residual, and outputs a result of the addition as a decoding in-progress image that is in the process of decoding.

The decoding in-progress image outputted from the arithmetic operation section 110 is supplied to the classification adaptive filter 111 or the frame memory 112.

The classification adaptive filter 111 performs a classification adaptive process to perform an ILF process by a classification adaptive process by a filter that functions as an ILF.

To the classification adaptive filter 111, not only a decoding in-progress image is supplied from the arithmetic operation section 110, but also an original image corresponding to the decoding in-progress image is supplied from the sorting buffer 102 and necessary encoding information is supplied from the associated blocks of the encoding apparatus 11.

The classification adaptive filter 111 uses a student image equivalent to a decoding in-progress image from the arithmetic operation section 110 and a teacher image equivalent to an original image from the sorting buffer 102 and uses encoding information as occasion demands to perform learning for determining tap coefficients for each class.

In particular, the classification adaptive filter 111 uses, for example, a decoding in-progress image itself from the arithmetic operation section 110 as a student image and uses an original image itself from the sorting buffer 102 as a teacher image to perform learning for determining tap coefficients for each class using encoding information as occasion demands.

Further, the classification adaptive filter 111 performs a reduction process for reducing the tap coefficients for each class and generates reduction filter information that reduces tap coefficients for each class by the reduction process. The reduction filter information is supplied from the classification adaptive filter 111 to the reversible encoding section 106.

Further, the classification adaptive filter 111 uses tap coefficients obtained using the reduction filter information to convert the decoding in-progress image from the arithmetic operation section 110 into an after-filter image.

In particular, the classification adaptive filter 111 performs (image conversion by) a classification adaptive process using the tap coefficients for each class using the decoding in-progress image from the arithmetic operation section 110 as a first image and using encoding information as occasion demands to convert the decoding in-progress image as the first image into an after-filter image as a second image equivalent to the original image (generates an after-filter image) and outputs the after-filter image.

The after-filter image outputted from the classification adaptive filter 111 is supplied to the frame memory 112.

Here, in the classification adaptive filter 111, learning is performed using a decoding in-progress image as a first image and using an original image as a teacher image as described above, and tap coefficients obtained by the leaning are used to perform a classification adaptive process for converting the decoding in-progress image into an after-filter image. Accordingly, the after-filter image obtained by the classification adaptive filter 111 is an image very close to the original image.

The frame memory 112 temporarily stores a decoding in-progress image supplied from the arithmetic operation section 110 or an after-filter image supplied from the classification adaptive filter 111 as a decoded image decoded locally. The decoded image stored in the frame memory 112 is supplied as a reference image to be used for generation of a prediction image to the selection section 113 at a necessary timing.

For example, from between a decoding in-progress image supplied from the arithmetic operation section 110 and an after-filter image supplied from the classification adaptive filter 111 as decoded images stored in the frame memory 112, the decoding in-progress image is used as a reference image for intra prediction. Meanwhile, the after-filter image is used as a reference image for inter prediction.

The selection section 113 selects a supply destination of a reference image supplied from the frame memory 112. For example, in the case where intra prediction is to be performed by the intra-prediction section 114, the selection section 113 supplies the reference image supplied from the frame memory 112 to the intra-prediction section 114. On the other hand, for example, in the case where inter prediction is to be performed by the motion prediction compensation section 115, the selection section 113 supplies the reference image supplied from the frame memory 112 to the motion prediction compensation section 115.

The intra-prediction section 114 uses an original image supplied from the sorting buffer 102 and a reference image supplied from the frame memory 112 through the selection section 113 to perform intra prediction (in-screen prediction) basically using a PU (Prediction Unit) as a unit of processing. The intra-prediction section 114 selects an optimum intra prediction mode on the basis of a predetermined cost function and supplies a prediction image generated by the optimum intra prediction mode to the prediction image selection section 116. Further, as described hereinabove, the intra-prediction section 114 suitably supplies a prediction mode indicative of the intra prediction mode selected on the basis of the cost function to the reversible encoding section 106 and so forth.

The motion prediction compensation section 115 uses an original image supplied from the sorting buffer 102 and a reference image supplied from the frame memory 112 through the selection section 113 to perform motion prediction (inter prediction) basically using a PU as a unit of processing. Further, the motion prediction compensation section 115 performs motion compensation in response to a motion vector detected by the motion prediction to generate a prediction image. The motion prediction compensation section 115 performs inter prediction in a plurality of inter prediction modes prepared in advance to generate prediction images.

The motion prediction compensation section 115 selects an optimum inter prediction mode on the basis of a predetermined cost function for the prediction images obtained individually in regard to the inter prediction modes. Further, the motion prediction compensation section 115 supplies the prediction image generated by the optimum inter prediction mode to the prediction image selection section 116.

Further, the motion prediction compensation section 115 supplies a prediction mode indicative of an inter prediction mode selected on the basis of the cost function, motion information of a motion vector or the like necessary upon decoding of encoded data encoded in the inter prediction mode and so forth to the reversible encoding section 106.

The prediction image selection section 116 selects a supplying source of the prediction image (intra-prediction section 114 or motion prediction compensation section 115) to be supplied to the arithmetic operation sections 103 and 110 and supplies a prediction image supplied from the selected supplying source to the arithmetic operation sections 103 and 110.

The rate controlling section 117 controls the rate of quantization operation of the quantization section 105 on the basis of the code amount of encoded data accumulated in the accumulation buffer 107 such that an overflow or an underflow does not occur. In particular, the rate controlling section 117 sets a target code amount for encoded data such that an overflow and an underflow of the accumulation buffer 107 do not occur, and supplies the target code amount to the quantization section 105.

<Configuration Example of Classification Adaptive Filter 111>

Figure 10:
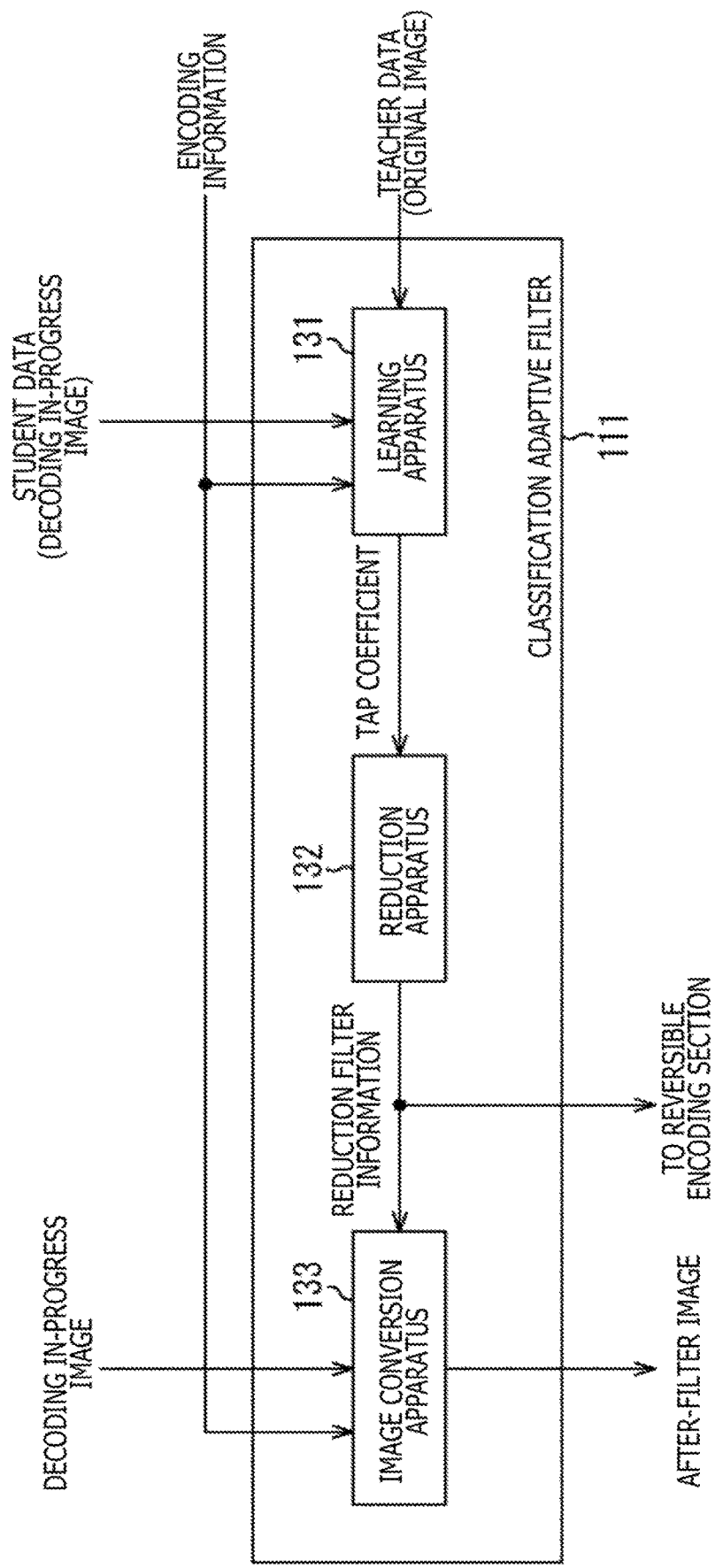
FIG. 10 is a block diagram depicting a configuration example of a classification adaptive filter 111.

FIG. 10 is a block diagram depicting a configuration example of the classification adaptive filter 111 depicted in FIG. 9.

Referring to FIG. 10, the classification adaptive filter 111 includes a learning apparatus 131, a reduction apparatus (reduction section) 132 and an image conversion apparatus 133.

To the learning apparatus 131, an original image is supplied from the sorting buffer 102 (FIG. 9) and a decoding in-progress image is supplied from the arithmetic operation section 110 (FIG. 9). Further, encoding information is applied to the learning apparatus 131.

The learning apparatus 131 uses the decoding in-progress image as student data and uses the original image as teacher data to perform learning for determining tap coefficients for each class (hereinafter referred to as tap coefficient learning).

Further, the learning apparatus 131 supplies the tap coefficients for each class obtained by the tap coefficient learning to the reduction apparatus 132.

It is to be noted that the learning apparatus 131 uses the encoding information as occasion demands to perform classification in the tap coefficient learning.

The reduction apparatus 132 performs a reduction process for generating reduction filter information that reduces the tap coefficients for each class from the learning apparatus 131 and supplies the reduction filter information obtained by the reduction process to the image conversion apparatus 133 and the reversible encoding section 106 (FIG. 9).

To the image conversion apparatus 133, a decoding in-progress image is supplied from the arithmetic operation section 110 (FIG. 9) and reduction filter information is supplied from the reduction apparatus 132. Further, encoding information is supplied to the image conversion apparatus 133.

The image conversion apparatus 133 updates tap coefficients for each class using the reduction filter information of the reduction apparatus 132. Further, the image conversion apparatus 133 uses the decoding in-progress process as a first image to perform image conversion by a classification adaptive process using the tap coefficients for each class to convert the decoding in-progress image as the first image into an after-filter image as a second image equivalent to an original image (generates an after-filter image), and supplies the after-filter image to the frame memory 112 (FIG. 9).

It is to be noted that the image conversion apparatus 133 uses encoding information as occasion demands to perform classification in the classification adaptive process.

<Example of Update Timing of Tap Coefficient of Image Conversion Apparatus 133>

Figure 11:
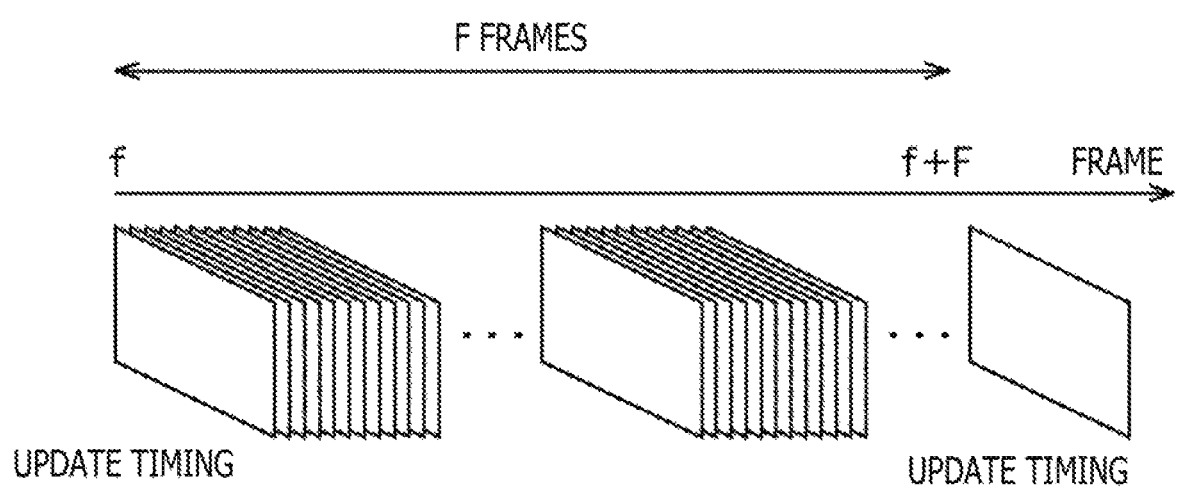
FIG. 11 is a view depicting an example of an update timing of a tap coefficient to be used for the classification adaptive process by an image conversion apparatus 133.

FIG. 11 is a view depicting an example of an update timing of tap coefficients to be used for a classification adaptive process by the image conversion apparatus 133.

The image conversion apparatus 133 updates tap coefficients, for example, using a timing of after every F frames equal to or greater than 1 frame as an update timing for updating tap coefficients to be used for a classification adaptive process as depicted in FIG. 11.

At the update timing, the learning apparatus 131 performs tap coefficient learning to determine tap coefficients for each class. Here, a tap coefficient determined by the latest tap coefficient learning is referred to as latest coefficient.

In the image conversion apparatus 133, at each update timing, tap coefficients at present (hereinafter referred to as coefficients at present) used in the classification adaptive process are updated to the latest coefficients.

In the encoding apparatus 11, in the case where the image conversion apparatus 133 updates the coefficients at present to the latest coefficients, it is necessary also for the decoding apparatus 12 (FIG. 1) to update coefficients at present to the latest coefficients similarly as in the encoding apparatus 11.

In order for the decoding apparatus 12 to update the coefficients at present to the latest coefficients, it is necessary, for example, to transmit the latest coefficients from the encoding apparatus 11 to the decoding apparatus 12.

However, to transmit the latest coefficients of all classes from the encoding apparatus 11 to the decoding apparatus 12 at each update timing degraded the compression efficiency.

Therefore, in the encoding apparatus 11, the reduction apparatus 132 performs a reduction process for generating reduction filter information that reduces the latest coefficients for each class from the learning apparatus 131 and transmits the reduction filter information obtained by the reduction process to the decoding apparatus 12 to improve the compression efficiency.

<Example of Reduction Process of Reduction Apparatus 132>

Figure 12:
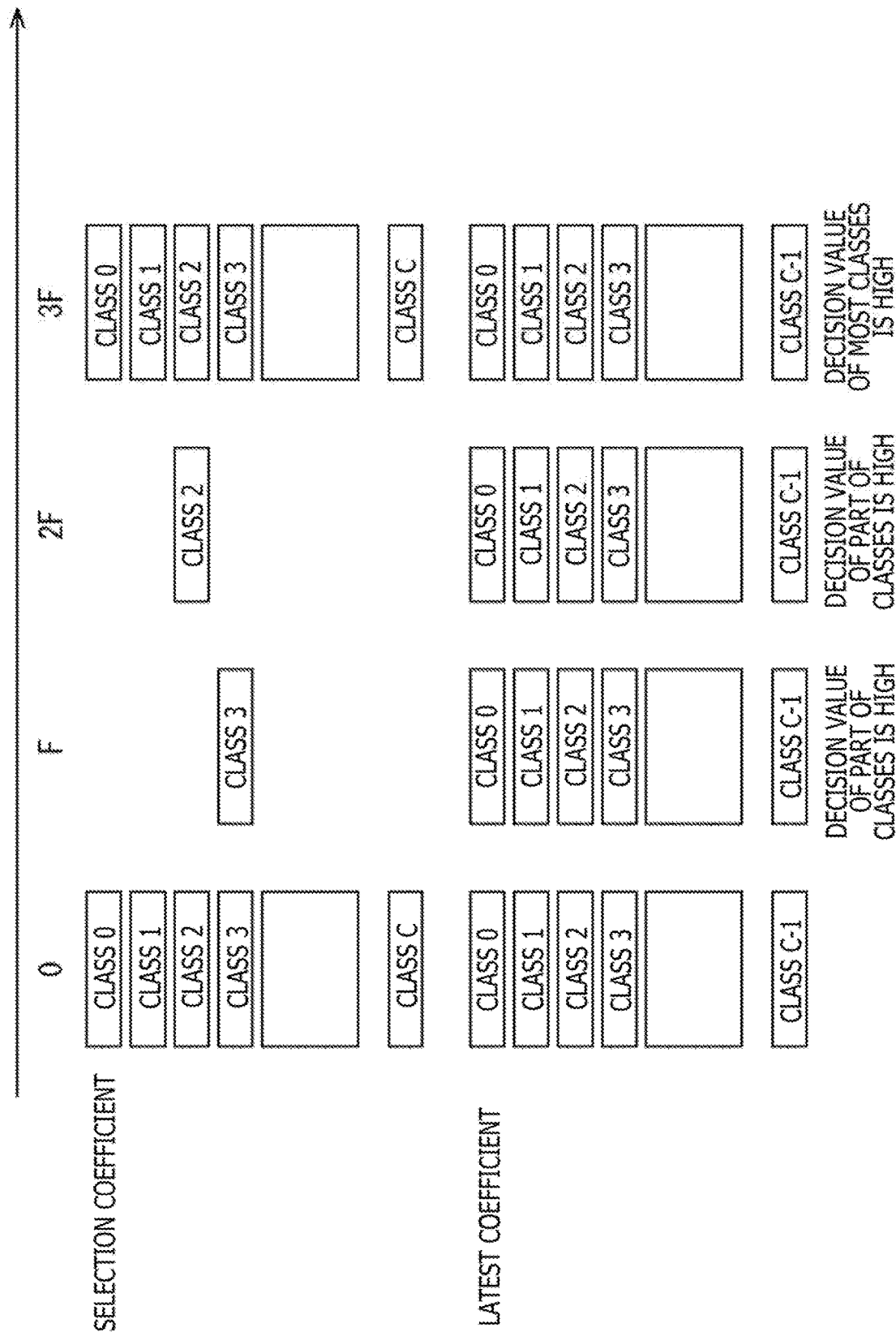
FIG. 12 is a view illustrating an example of a reduction process of a reduction apparatus 132.

FIG. 12 is a view illustrating an example of a reduction process of the reduction apparatus 132.

In FIG. 12, timings of frames after every F frames like the 0th frame, Fth frame, 2Fth frame, 3Fth frame, . . . are update timings.

At each update timing, the learning apparatus 131 performs tap coefficient learning to determine the latest coefficients for each class.

The reduction apparatus 132 selects the latest coefficients of classes of 0 class or more from among the latest coefficients for each class obtained by tap coefficient learning in a reduction process and outputs the selection coefficients as reduction filter information.

For example, the reduction apparatus 132 determines a merit decision value representative of a degree of a merit in the case where the latest coefficients are used for (prediction arithmetic operation of the expression (1) of) a classification adaptive process in place of the coefficients at present for each class. Then, the reduction apparatus 132 selects the latest coefficients of classes in regard to which the merit decision value is equal to or higher than a threshold value as selection coefficients.

In FIG. 12, the latest coefficients of C classes 0, 1, . . . , C−1 are determined by tap coefficient learning at update timings.

At the update timing for the 0th frame, namely, for example, at a timing at which encoding is started, the latest coefficients of all of the C classes 0 to C−1 are selected as selection coefficients.

Then, at the update timing for the Fth frame, from among the latest coefficients of the classes 0 to C−1, the latest coefficients of the class 3 are the latest coefficients of a class whose merit decision value is equal to or higher than the threshold value and is selected as a selection coefficient. On the other hand, at the update timing for the 2Fth frame, from among the latest coefficients for the classes 0 to C−1, the latest coefficients for the class 2 are the latest coefficients of a class whose merit decision value is equal to or higher than the threshold value and the selection coefficients are selected.

As described above, the reduction apparatus 132 selects, from among the latest coefficients for the C classes 0 to C−1, the latest coefficients of a class or classes whose merit decision value is equal to or higher than the threshold value as selection coefficients and outputs the selection coefficients as reduction filter information.

Accordingly, since, at each update timing, from the encoding apparatus 11 to the decoding apparatus 12, not the latest coefficients of all C classes 0 to C−1 but the latest coefficients for the selected classes as selection coefficients are transmitted as reduction filter information, the compression efficiency can be improved in comparison with that in an alternative case in which the latest coefficients of all of the C classes 0 to C−1 are normally transmitted at an update timing.

It is to be noted that, in the case where the merit decision value of the latest coefficients of most classes from among the latest coefficients of the C classes 0 to C−1 is equal to or higher than the threshold value, namely, in the case where the number of classes of the latest coefficients with regard to which the merit decision value is equal to or higher than the threshold value is equal to or greater than a predetermined number close to the total number C of classes, the reduction apparatus 132 does not select the latest coefficients of classes whose merit decision value is equal to or higher than the threshold value as selection coefficients but can select the latest coefficients of all of the C classes 0 to C−1 as selection coefficients and output the selected selection coefficients as reduction filter information.

Further, as the merit decision value, for example, a value corresponding to the RD (Rate-Distortion) cost can be adopted. In particular, if a class of tap coefficients whose merit decision value is to be determined is set as noticed class to be noticed, then as the merit decision value (of the latest coefficients) of the noticed class, then the RD cost itself in the case where the latest coefficients are used in regard to the noticed class or a value representative of a degree by which the RD cost in the case where the latest coefficients are used is superior (difference between RD cost values or the like) in regard to the noticed class can be adopted.

Further, as the merit decision value, for example, a value corresponding to an inter-coefficient distance between the latest coefficient of the noticed class and the current coefficient in the tap coefficient space having coefficient axes of N tap coefficients $w_1, w_2, \ldots, w_N$ of one class, namely, for example, an inter-coefficient distance between the latest coefficient and the current coefficient, can be adopted.

Further, as the merit decision value, for example, for the noticed class, a value corresponding to the S/N of the after-filter image determined using the latest coefficients can be adopted. In particular, as the merit decision value, for example, the S/N itself of the after-filtered image determined using the latest coefficients in regard to the noticed class, or, a value representative of the degree by which the S/N of the after-filter image determined using the latest coefficients in comparison with the S/N of the after-filter image determined using the coefficients at present in regard to the noticed class (difference between the S/N values) can be adopted.

Furthermore, as the merit decision value, for example, a value corresponding to the use frequency by which the tap coefficient (current coefficient) of the noticed class is used (for the prediction arithmetic operation of the expression (1)) in the classification adaptive process can be adopted. In particular, for example, the number of times by which the tap coefficients of the noticed block are used in the classification adaptive process within the latest fixed period such as a period from the update timing in the preceding operation cycle to the update timing in the current operation cycle can be adopted.

From the point of view of improvement of the compression efficiency and improvement of the S/N of the decoded image, it is desirable to adopt a value corresponding to the RD cost as the merit decision value. However, in the case where the RD cost is adopted as the merit decision value, a high calculation cost is required for calculation of the merit decision value. By adopting, as the merit decision value, a value corresponding, for example, to the inter-coefficient distance, S/N of the after-filter image or use frequency described above, the calculation cost required for calculation of the merit decision value can be reduced.

<Configuration Example of Learning Apparatus 131>

Figure 13:
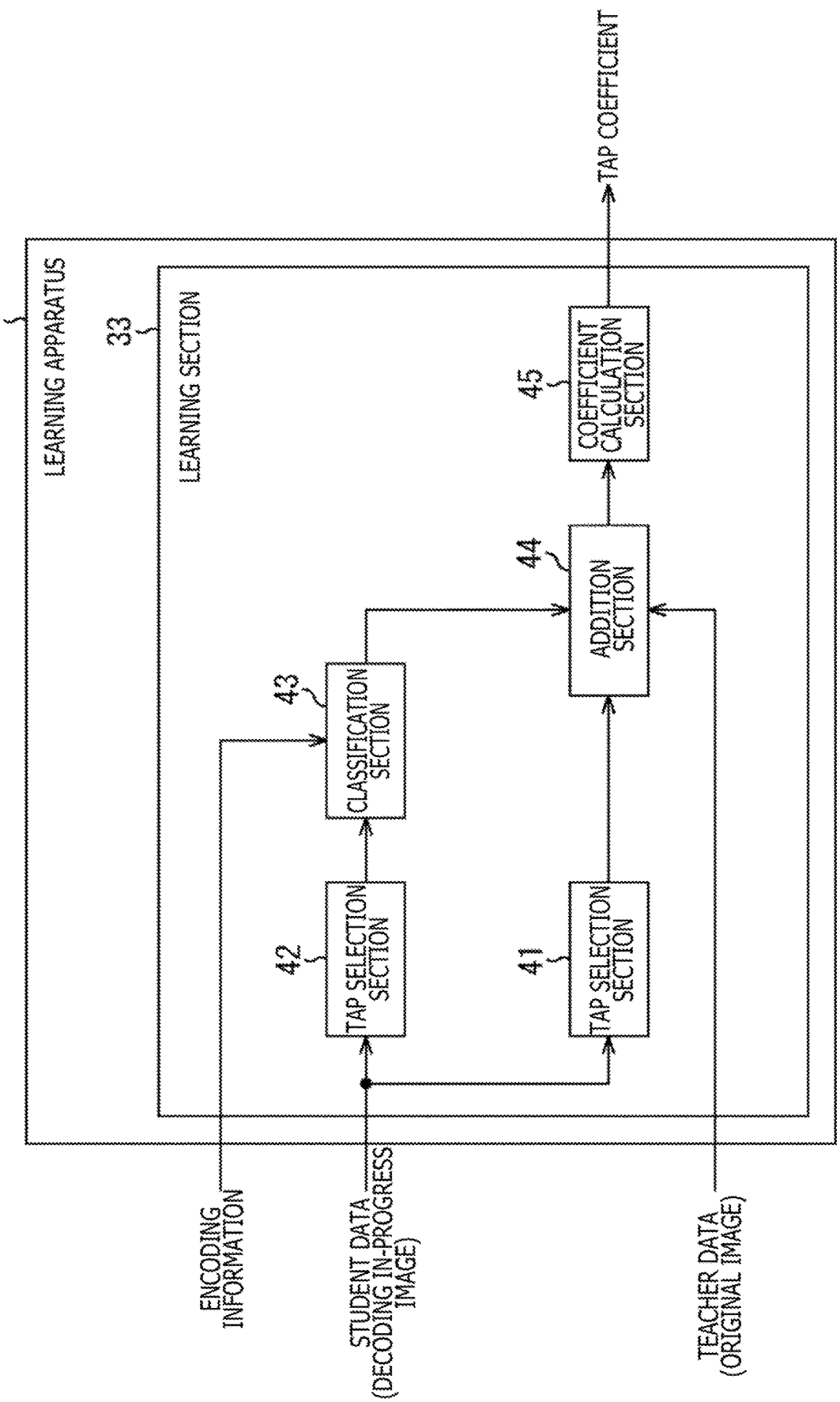
FIG. 13 is a block diagram depicting a configuration example of a learning apparatus 131.

FIG. 13 is a block diagram depicting a configuration example of the learning apparatus 131 of FIG. 10.

It is to be noted that, in FIG. 13, elements corresponding to those of FIGS. 3 and 4 are denoted by like reference numerals and description of them is hereinafter omitted suitably.

Referring to FIG. 13, the learning apparatus 131 includes a learning section 33. The learning section 33 includes tap selection sections 41 and 42, a classification section 43, an addition section 44 and a coefficient calculation section 45.

Accordingly, the learning apparatus 131 of FIG. 13 is common to that of FIG. 3 in that it includes the learning section 33. Further, the learning apparatus 131 is common to that of FIG. 4 in that the learning section 33 includes the components from the tap selection section 41 to the coefficient calculation section 45.

However, the learning apparatus 131 of FIG. 13 is different from that of FIG. 3 in that it includes neither of the teacher data generation section 31 and the student data generation section 32.

Further, the learning apparatus 131 of FIG. 13 is different from that of FIG. 4 in that, in the learning section 33, encoding information is supplied to the classification section 43.

In the learning apparatus 131 of FIG. 13, the classification section 23 performs classification using (image characteristic amounts obtained from) class taps or encoding information as occasion demands.

Further, in the learning apparatus 131 of FIG. 13, tap coefficient learning is performed using a decoding in-progress image as student data and using an original image corresponding to the decoding in-progress image as teacher data, and tap coefficients for each class obtained by the tap coefficient learning are supplied as the latest coefficients from the coefficient calculation section 45 to the reduction apparatus 132.

The tap coefficient learning by the learning apparatus 131 not only can be performed in parallel to encoding of an original image but also can be performed in advance irrespective of encoding of an original image.

In the case where the tap coefficient learning is performed in advance irrespective of encoding of the original image, the tap coefficient learning can be performed for each category using original images of a plurality of categories as teacher data. Then, at an update timing, for example, the tap coefficients of a category that minimizes a predetermined cost function from among the tap coefficients of the plurality of categories can be outputted as the latest coefficients.

It is to be noted that the classification section 43 can perform classification using one or both of an image characteristic amount of a noticed pixel obtained from pixel values of the pixels in the decoding in-progress image as a class tap and encoding information of the noticed pixel.

As the class tap, for example, nine pixels of a cross shape centered at the noticed pixel, nine pixels in a square of 3×3 pixels centered at the noticed pixel, 13 pixels in a diamond shape centered at the noticed pixel and having diagonals in a horizontal direction and a vertical direction or the like can be adopted.

Further, the class tap can be configured, for example, from pixels of a noticed frame that is a frame (picture) of the noticed pixel and pixels of a frame other than the noticed frame such as a frame adjacent the noticed pixel.

Further, as the image characteristic amount to be used for classification, for example, the ADRC code (ADRC value) obtained by a 1-bit ADRC process for the class tap can be adopted.

Now, if it is assumed that, for simplified description, the classification section 43 performs classification of a noticed pixel using only an ADRC code as an image characteristic amount, then the classification section 43 classifies the noticed pixel, for example, into a class of a class code corresponding to an ADRC code.

For example, in the case where the class code is represented by a decimal number, the class code corresponding to the ADRC code signifies a value obtained by converting, regarding the ADRC code as a binary number, the ADRC code of the binary number into a decimal number.

For example, if the ADRC code obtained by a 1-bit ADRC process for a class tap configured from nine pixels is 000011100, then the class code corresponding to the ADRC code 000011100 is 28.

Here, as the image feather value to be used for classification, in addition to the ADRC code obtained from the class tap, an image characteristic amount other than the ADRC code such as a dynamic range, difference absolute value sum or the like of pixel values of pixels configuring the class tap can be adopted.

In the case where, for example, the dynamic range of pixel values of pixels configuring the class tap is adopted as the image characteristic amount to be used for classification, for example, by threshold processing the dynamic range with one or more threshold values, the noticed pixel can be classified into one of two or more classes.

Furthermore, the classification can be performed not using one image characteristic amount such as the ADRC mode but using a plurality of image characteristic amounts such as, for example, the ADRC code and a dynamic range or the like.

Further, the classification can be performed using encoding information of the noticed pixel in addition to an image characteristic amount of the noticed pixel.

As the encoding information of the noticed pixel to be used for classification, for example, a block phase representative of the position of the noticed pixel in a block such as a CU or a PU including the noticed pixel, a picture type of a picture including the notice pixel, a quantization parameter QP of a PU including the noticed pixel or the like can be adopted.

In the case where the block phase is adopted as the encoding information of the noticed pixel to be used for classification, the noticed pixel can be classified, for example, depending upon whether or not the noticed pixel is a pixel on the boundary of a block.

On the other hand, in the case where the picture type is adopted as the encoding information of the noticed pixel to be used for classification, the noticed pixel can be classified, for example, depending upon which one of an I picture, a P picture and a B picture the picture including the noticed pixel is.

Further, in the case where the quantization parameter QP is adopted as the encoding information of the noticed pixel to be used for classification, the noticed pixel can be classified, for example, depending upon the roughness (fineness) of quantization.

Further, classification can be performed not only using an image characteristic amount or encoding information but also using both an image characteristic amount and encoding information.

<Configuration Example of Reduction Apparatus 132>

Figure 14:
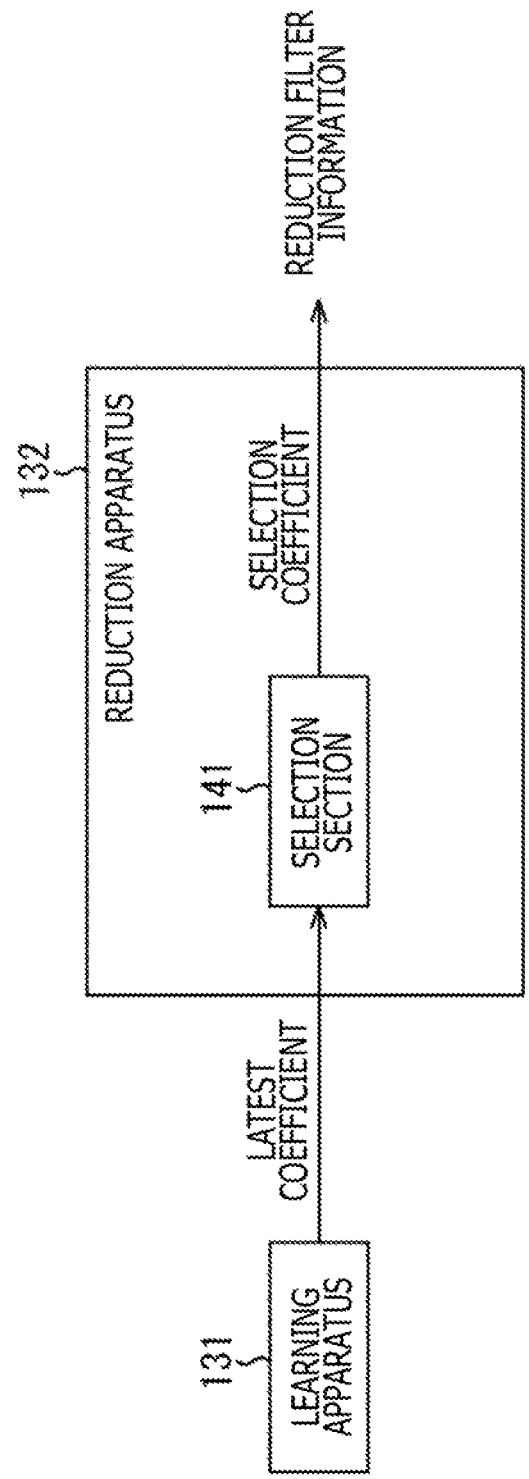
FIG. 14 is a block diagram depicting a configuration example of the reduction apparatus 132.

FIG. 14 is a block diagram depicting an example of a configuration example of the reduction apparatus 132 of FIG. 10.

Referring to FIG. 14, the reduction apparatus 132 includes a selection section 141.

To the selection section 141, tap coefficients for each class as the latest coefficients are supplied from the learning apparatus 131.

The selection section 141 determines a merit decision value representative of a degree of a merit in the case where the latest coefficients are used for (prediction arithmetic operation of the expression (1) of) a classification adaptive process in place of the coefficients at present for each class of the latest coefficients from the learning apparatus 131.

Then, the selection section 141 selects the latest coefficients of classes in regard to which the merit decision value is equal to or higher than a threshold value as selection coefficients and supplies the selection coefficients as reduction filter information to the image conversion apparatus 133 (FIG. 10) and the reversible encoding section 106 (FIG. 9).

<Configuration Example of Image Conversion Apparatus 133>

Figure 15:
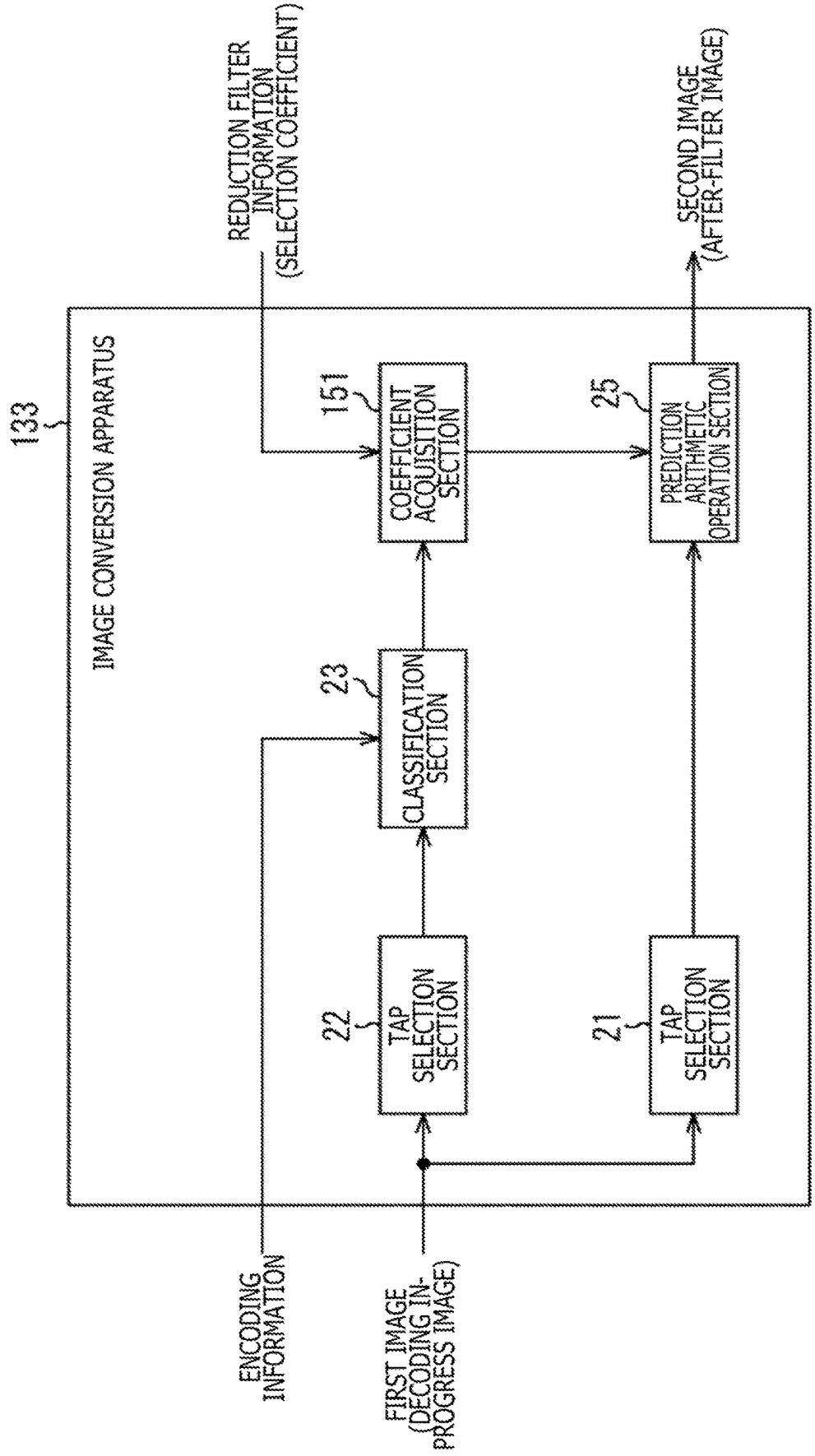
FIG. 15 is a block diagram depicting a configuration example of the image conversion apparatus 133.

FIG. 15 is a block diagram depicting a configuration example of the image conversion apparatus 133 of FIG. 10.

It is to be noted that, in FIG. 15, elements corresponding to those of the image conversion apparatus 20 of FIG. 2 are denoted by like reference numerals and description of them is hereinafter omitted suitably.

Referring to FIG. 15, the image conversion apparatus 133 includes the components from the tap selection section 21 to the classification section 23, the prediction arithmetic operation section 25 and a coefficient acquisition section 151.

Accordingly, the image conversion apparatus 133 is configured similarly to the image conversion apparatus 20 of FIG. 2 in that it includes the components from the tap selection section 21 to the classification section 23, and the prediction arithmetic operation section 25.

However, the image conversion apparatus 133 is different from the image conversion apparatus 20 in that it includes the coefficient acquisition section 151 in place of the coefficient acquisition section 24.

In the image conversion apparatus 133, a decoding in-progress image is supplied as a first image to the tap selection sections 21 and 22, and the prediction arithmetic operation section 25 determines an after-filter image as a second image.

Further, in the image conversion apparatus 133, encoding information is supplied to the classification section 23, and the classification section 23 performs classification similar to that by the classification section 43 of the learning apparatus 131 (FIG. 13) using a class tap and the encoding information as occasion demands.

To the coefficient acquisition section 151, selection coefficients as reduction filter information are supplied from the reduction apparatus 132.

The coefficient acquisition section 151 uses the selection coefficients as the reduction filter information from the reduction apparatus 132 to obtain tap coefficients for each class to be used for a classification adaptive process. Then, the coefficient acquisition section 151 acquires tap coefficients of the class of the noticed pixel from the tap coefficients for the individual classes obtained using the election coefficients as the reduction filter process and supplies the tap coefficients to the prediction arithmetic operation section 25.

Figure 16:
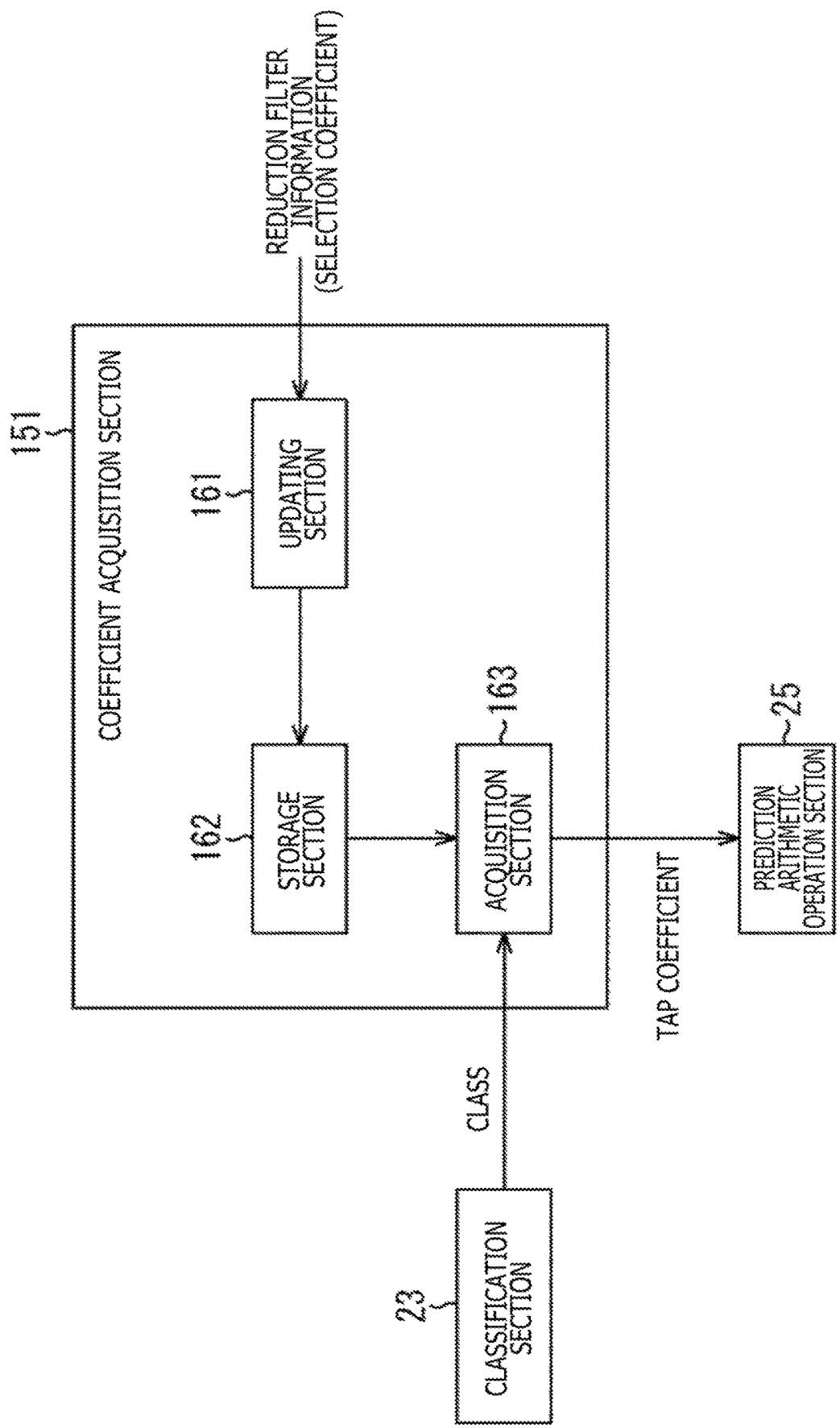
FIG. 16 is a block diagram depicting a configuration example of a coefficient acquisition section 151.

FIG. 16 is a block diagram depicting a configuration example of the coefficient acquisition section 151 of FIG. 15.

Referring to FIG. 16, the coefficient acquisition section 151 includes an updating section 161, a storage section 162 and an acquisition section 163.

To the updating section 161, selection coefficients as reduction filter information are supplied from the reduction apparatus 132.

The updating section 161 updates tap coefficients for individual classes as coefficients at present stored in the storage section 162 with the selection coefficients as the reduction filter information from the reduction apparatus 132.

The storage section 162 stores the tap coefficients for the individual classes.

Here, the storage section 162 is reset at a predetermined timing such as, for example, a timing at which the power supply to the encoding apparatus 11 is turned on, a timing at which encoding of a sequence of an original image is started in the encoding apparatus 11 or the like (the storage substance of the storage section 162 is initialized).

The timing for resetting of the storage section 162 (hereinafter referred to as initialization timing) is an update timing of the tap coefficients, and the learning apparatus 131 performs tap coefficient learning and tap coefficients for each class as the latest coefficients obtained by the tap coefficient learning are supplied to the reduction apparatus 132.

At the initialization timing, the reduction apparatus 132 selects tap coefficients of all classes as the latest coefficients from the learning apparatus 131 as selection coefficients and outputs the selection coefficients as reduction filter information to the reversible encoding section 106 (FIG. 9) and the updating section 161.

In this case, the updating section 161 stores the tap coefficients of all classes as the reduction filter information from the reduction apparatus 132 into the storage section 162.

The image conversion apparatus 133 performs a classification adaptive process using the tap coefficients for the individual classes stored in the storage section 162 in such a manner as described above as the coefficients at present.

Then, when an update timing comes thereafter and reduction filter information is supplied from the reduction apparatus 132 to the updating section 161, the updating section 161 updates the coefficients at present of the classes of the selection coefficients from among the coefficients at present stored in the storage section 162 into the selection coefficients as the reduction filter information from the reduction apparatus 132 with the selection coefficients.

To the acquisition section 163, (a class code of) a class of the noticed pixel is supplied from the classification section 23. The acquisition section 163 acquires tap coefficients as the coefficients at present of the class of the noticed pixel from the coefficients at present stored in the storage section 162 and supplies the tap coefficients to the prediction arithmetic operation section 25.

<Encoding Process>

Figure 17:
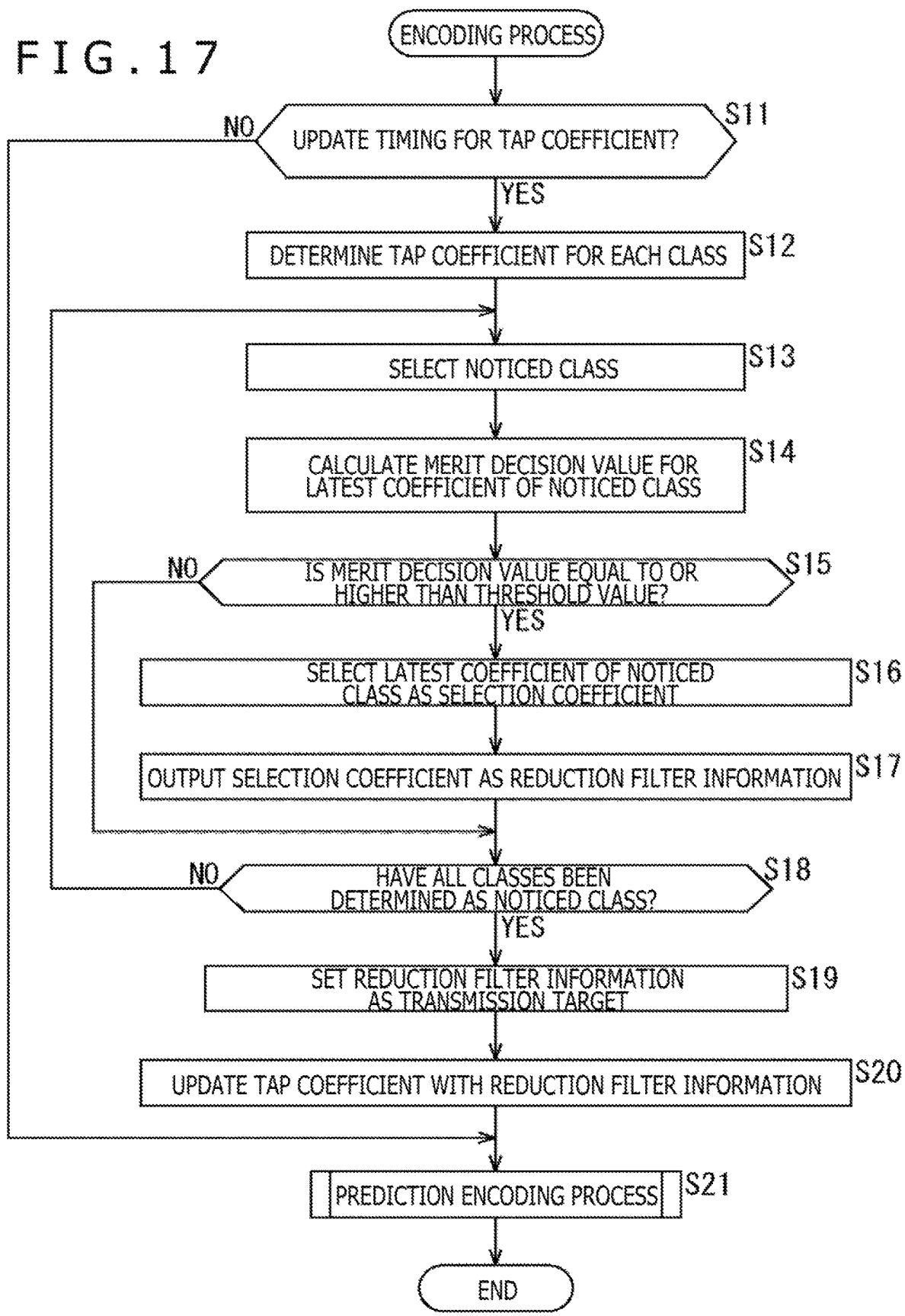
FIG. 17 is a flow chart illustrating an example of an encoding process of the encoding apparatus 11.

FIG. 17 is a flow chart illustrating an example of the encoding process of the encoding apparatus 11 of FIG. 9.

It is to be noted that the order of steps of the encoding process depicted in FIG. 17 and so forth is an order for the convenience of description, and steps of an actual encoding process are performed suitably in parallel in a necessary order. This similarly applies also to the encoding process hereinafter described.

In the encoding apparatus 11, the learning apparatus 131 (FIG. 10) of the classification adaptive filter 111 temporarily stores a decoding in-progress image supplied thereto as student data and temporarily stores an original image corresponding to the decoding in-progress image as teacher data.

Then at step S11, the learning apparatus 131 decides whether the timing at present is an update timing for tap coefficients.

Here, the update timing for tap coefficients can be determined in advance such as a timing, for example, after every one or more frames (pictures), after every one or more sequences, after every one or more slices, after every one or more line of a predetermined block such as a CTU or the like.

Further, as the update timing for tap coefficients, not only a periodic (fixed) timing such as a timing after one or more frames (pictures) but also a so-called dynamic timing such as a timing at which the S/N of an after-filter image becomes equal to or lower than a threshold value (timing at which the error of an after-filter image from an original image becomes equal to or greater than a threshold value), a timing at which the (absolute value sum or the like of) the residual becomes equal to or greater than a threshold value can be adopted.

In the case where it is decided at step S11 that the timing at present is not an update timing for tap coefficients, the processing advances to step S21 skipping steps S12 to S20.

On the other hand, in the case where it is decided at step S11 that the timing at present is an update timing for tap coefficients, the processing advances to step S12, at which the learning apparatus 131 performs tap coefficient learning.

In particular, the learning apparatus 131 performs tap coefficient learning using an after-filter image and an original image that have been stored after an update timing in the preceding operation cycle till an update timing in the current operation cycle to determine tap coefficients as the latest coefficients for each class.

Then, the learning apparatus 131 supplies the latest coefficients for each class obtained by the tap coefficient learning to the reduction apparatus 132, and the processing advances from step S12 to step S13.

At step S13, the selection section 141 of the reduction apparatus 132 (FIG. 14) selects one class that has not been selected as the noticed class from among all classes in regard to which tap coefficients are to be determined by tap coefficient learning as a noticed class, and the processing advances to step S14.

At step S14, the selection section 141 calculates a merit decision value such as, for example, an RD cost or the like in regard to the latest coefficients of the noticed class, and the processing advances to step S15.

At step S15, the selection section 141 decides whether the merit decision value regarding the latest coefficients of the noticed class is equal to or higher than a threshold value determined in advance.

In the case where it is decided at step S15 that the merit decision value regarding the latest coefficients of the noticed class is equal to or higher than the threshold value, the processing advances to step S16, at which the selection section 141 selects the latest coefficients of the noticed class as selection coefficients.

Then, the processing advances from step S16 to step S17, at which the selection section 141 outputs the selection coefficients as reduction filter information to the reversible encoding section 106 (FIG. 9) and the image conversion apparatus 133 (FIG. 10). Thereafter, the processing advances to step S18.

On the other hand, in the case where it is decided at step S15 that the merit decision value regarding the latest coefficients of the noticed class is not equal to or higher than the threshold value, the processing advances to step S18 skipping steps S16 and S17.

Accordingly, the latest coefficients of the noticed class are supplied, only in the case where the merit decision value thereof is equal to or higher than the threshold value, as reduction filter information to the reversible encoding section 106 (FIG. 9) and the image conversion apparatus 133 (FIG. 10).

At step S18, the selection section 141 of the reduction apparatus 132 (FIG. 14) decides whether all classes whose tap coefficient is to be determined by tap coefficient learning have been determined as a noticed class.

In the case where it is decided at step S18 that all classes have not been determined as a noticed class as yet, the processing returns to step S13, whereafter similar processes are repeated.

On the other hand, at step S18, in the case where it is decided that all classes have been determined as a noticed class, the processing advances to step S19, at which the reversible encoding section 106 (FIG. 9) sets the reduction filter information from the selection section 141 of the reduction apparatus 132 as a transmission target. Thereafter, the processing advances to step S20. The reduction filter process set as the transmission target is included into and transmitted together with encoding data in a prediction encoding process that is performed at step S21 hereinafter described.

At step S20, in the image conversion apparatus 133, the updating section 161 of the coefficient acquisition section 151 (FIG. 16) uses the selection coefficients as the reduction filter information from the reduction apparatus 132 to update the tap coefficients of the class of the selection coefficients from among the coefficients at present stored in the storage section 162 from the coefficients at present to the selection coefficients, and the processing advances to step S21.

At step S21, a prediction encoding process for the original image is performed, and the encoding process ends therewith.

FIG. 18 is a flow chart illustrating an example of the prediction encoding process at step S21 of FIG. 17.

In the prediction encoding process, at step S31, the A/D conversion section 101 (FIG. 9) A/D converts the original image and supplies the original image after the A/D conversion to the sorting buffer 102, whereafter the processing advances to step S32.

At step S32, the sorting buffer 102 stores the original image from the A/D conversion section 101, sorts the original image in an encoding order and outputs the original image after the sorting, whereafter the processing advances to step S33.

At step S33, the intra-prediction section 114 performs an intra-prediction process of an intra-prediction mode, and the processing advances to step S34. At step S34, the motion prediction compensation section 115 performs an inter motion prediction process in which motion prediction and motion compensation in the inter-prediction mode are performed, and the processing advances to step S35.

In the intra-prediction process of the intra-prediction section 114 and the inter motion prediction process of the motion prediction compensation section 115, a cost function for various prediction modes is arithmetically operated and a prediction image is generated.

At step S35, the prediction image selection section 116 determines an optimum prediction mode on the basis of cost functions obtained by the intra-prediction section 114 and the motion prediction compensation section 115. Then, the prediction image selection section 116 selects and outputs a prediction image of an optimum prediction mode from between the prediction image generated by the intra-prediction section 114 and the prediction image generated by the motion prediction compensation section 115, and the processing advances from step S35 to step S36.

At step S36, the arithmetic operation section 103 arithmetically operates the residual between the target image of the encoding target that is the original image outputted from the sorting buffer 102 and the prediction image outputted from the prediction image selection section 116 and outputs the residual to the orthogonal transform section 104, whereafter the processing advances to step S37.

At step S37, the orthogonal transform section 104 orthogonally transforms the residual from the arithmetic operation section 103 and supplies the transform coefficients obtained as a result of the orthogonal transform to the quantization section 105. Thereafter, the processing advances to step S38.

At step S38, the quantization section 105 quantizes the transform coefficients from the orthogonal transform section 104 and supplies quantization coefficients obtained by the quantization to the reversible encoding section 106 and the dequantization section 108. Thereafter, the processing advances to step S39.

At step S39, the dequantization section 108 dequantizes the quantization coefficients from the quantization section 105 and supplies transform coefficients obtained as a result of the dequantization to the inverse orthogonal transform section 109. Then, the processing advances to step S40. At step S40, the inverse orthogonal transform section 109 inversely orthogonally transforms the transform coefficients from the dequantization section 108 and supplies a residual obtained as a result of the inverse orthogonal transform to the arithmetic operation section 110. Thereafter, the processing advances to step S41.

At step S41, the arithmetic operation section 110 adds the residual from the inverse orthogonal transform section 109 and the prediction image outputted from the prediction image selection section 116 to generate a decoding in-progress image corresponding to the original image that has become the target of the arithmetic operation of the residual by the arithmetic operation section 103. The arithmetic operation section 110 supplies the decoding in-progress image to the classification adaptive filter 111 or the frame memory 112, and the processing advances from step S41 to step S42.

In the case where the decoding in-progress image is supplied from the arithmetic operation section 110 to the classification adaptive filter 111, at step S42, the classification adaptive filter 111 performs a classification adaptive process (classification adaptive filter process) as an ILF process for the decoding in-progress image from the arithmetic operation section 110. Since the classification adaptive process is performed for the decoding in-progress image, an after-filter image closer to the original image than that in the case where the decoding in-progress image is filtered by an ILF is determined (generated).

The classification adaptive filter 111 supplies the after-filter image obtained by the classification adaptive process to the frame memory 112, and the processing advances from step S42 to step S43.

At step S43, the frame memory 112 stores the after-filter image supplied from the arithmetic operation section 110 or the after-filter image supplied from the classification adaptive filter 111 as a decoded image, and the processing advances to step S44. The decoded image stored in the frame memory 112 is used as a reference image on the basis of which a prediction image is to be generated as step S34 or S35.

At step S44, the reversible encoding section 106 encodes the quantization coefficients from the quantization section 105. Further, the reversible encoding section 106 encodes encoding information such as the quantization parameter QP used in the quantization by the quantization section 105, the prediction mode obtained by the intra-prediction process by the intra-prediction section 114, the prediction mode or the motion information obtained by the intra-prediction process by the motion prediction compensation section 115 and so forth as occasion demands, and places the encoded encoding information into encoded data.

Further, the reversible encoding section 106 encodes reduction filter information set as the transmission target at step S19 of FIG. 17 and places the encoded reduction filter information into the encoded data. Then, the reversible encoding section 106 supplies the encoded data to the accumulation buffer 107, and the processing advances from step S44 to step S45.

At step S45, the accumulation buffer 107 accumulates the encoded data from the reversible encoding section 106, and the processing advances to step S46. The encoded data accumulated in the accumulation buffer 107 are suitably read out and transmitted.

At step S46, the rate controlling section 117 controls the rate of the quantization operation of the quantization section 105 on the basis of the code amount (generated code amount) of the encoded data accumulated in the accumulation buffer 107 such that an overflow or an underflow may not occur, and then the encoding process is ended.

Figure 19:
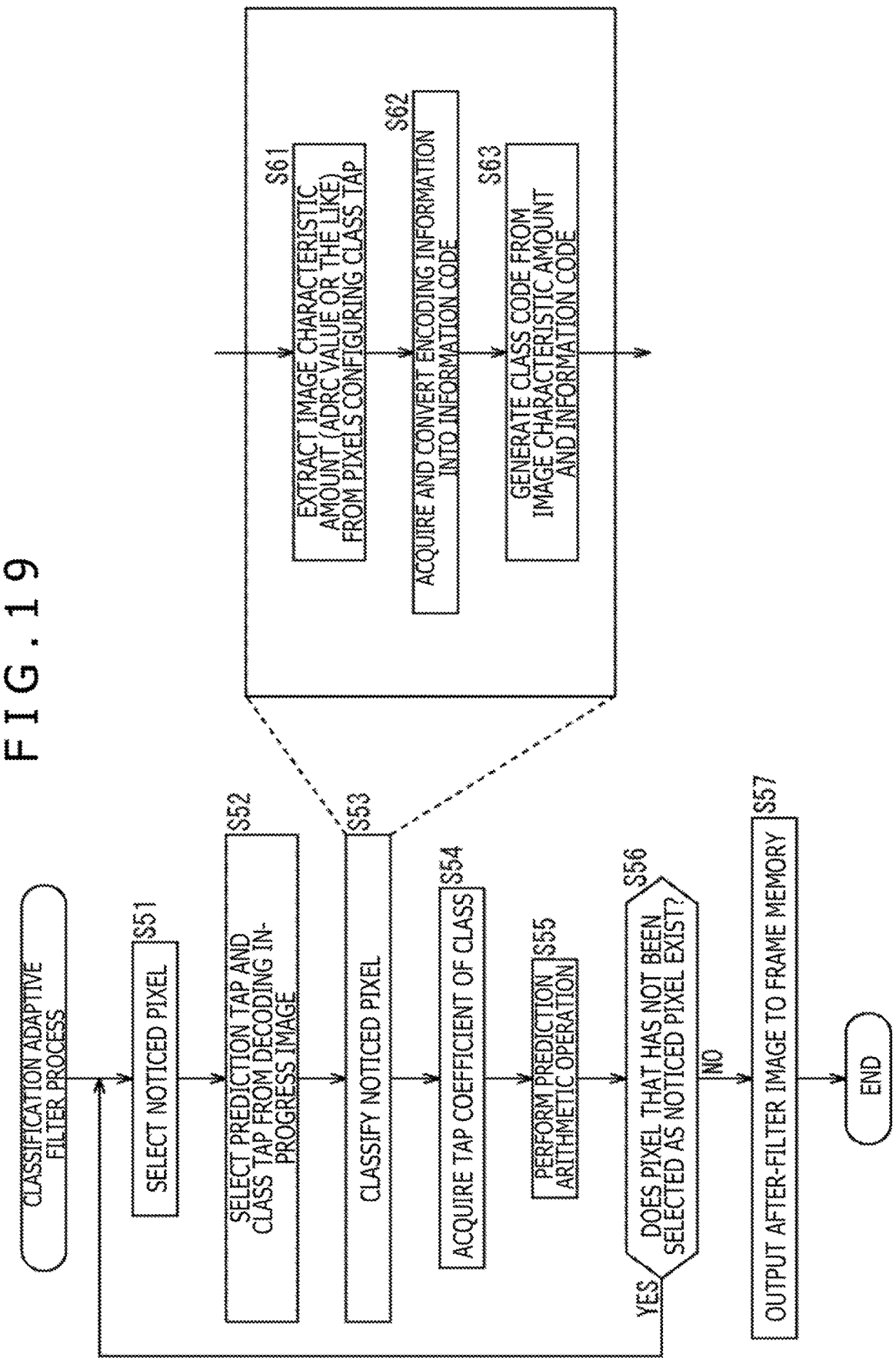
FIG. 19 is a flow chart illustrating an example of a classification adaptive process performed at step S42.

FIG. 19 is a flow chart illustrating an example of the classification adaptive process performed at step S42 of FIG. 18.

In the image conversion apparatus 133 (FIG. 15) of the classification adaptive filter 111, the tap selection section 21 selects, at step S51, one of pixels that have not been determined as a notice pixel as yet from among pixels (of a block as) the decoding in-progress image supplied from the arithmetic operation section 110 as a noticed pixel (processing target pixel), and the processing advances to step S52.

At step S52, the tap selection sections 21 and 22 select pixels to be made prediction taps and class taps regarding the noticed pixel from within the decoding in-progress image supplied from the arithmetic operation section 110, respectively. Then, the tap selection section 21 supplies the prediction tap to the prediction arithmetic operation section 25, and the tap selection section 22 supplies the class tap to the classification section 23.

Thereafter, the processing advances from step S52 to step S53, at which the classification section 23 performs classification of the noticed pixel using the class tap regarding the noticed pixel and the encoding information regarding the noticed pixel.

In particular, in the classification, the classification section 23 extracts (calculates), at step S61, an image characteristic amount such as, for example, an ADRC code (ADRC value) from the pixels that configure the class tap from the tap selection section 22. Thereafter, the processing advances to step S62.

At step S62, the classification section 23 acquires necessary encoding information regarding the noticed pixel and converts the encoding information into an information code in accordance with a rule determined in advance. Then, the processing advances to step S63.

In particular, in the case where the encoding information is, for example, a picture type such as an I picture, a P picture or a B picture, since, for example, information codes 0, 1 and 2 are allocated to an I picture, a P picture and a B picture, respectively, the picture type of the noticed pixel is converted into an information code in accordance with the allocation.

At step S63, the classification section 23 generates a class code representative of the class of the noticed pixel from the image characteristic amount and the information code and supplies the class code to the coefficient acquisition section 151, and the classification at step S53 is ended.

For example, in the case where the image characteristic amount is an ADRC code, the classification section 23 generates a numerical value obtained by adding the information code to upper bits of the ADRC code as the information characteristic amount as a class code representative of the class of the noticed pixel.

After the classification at step S53 ends, the processing advances to step S54, at which the coefficient acquisition section 151 acquires tap coefficients of the class represented by the class code supplied from the classification section 23 from among the tap coefficients for the individual classes stored in the storage section 162 (FIG. 16) and supplies the tap coefficients to the prediction arithmetic operation section 25. Then, the processing advances to step S55.

Here, the tap coefficients for the individual classes stored in the storage section 162 of the coefficient acquisition section 151 (FIG. 16) are updated using selection coefficients as reduction filter information from the reduction apparatus 132 at step S20 of FIG. 17.

At step S55, the prediction arithmetic operation section 25 performs a prediction arithmetic operation of the expression (1) using the prediction tap from the tap selection section 21 and the tap coefficients from the coefficient acquisition section 151. Consequently, the prediction arithmetic operation section 25 determines the prediction value of the pixel value of the corresponding pixel of the original image corresponding to the noticed pixel as a pixel value of the after-filter image, and the processing advances to step S56.

At step S56, the tap selection section 21 decides whether a pixel that has not been determined as a noticed pixel as yet remains in the pixels of (the block as the) decoding in-progress image from the arithmetic operation section 110. In the case where it is decides at step S56 that a pixel that has not been determined as a noticed pixel as yet remains, the processing returns to step S51, and similar processes are repeated thereafter.

On the other hand, in the case it is decided at step S56 that a pixel that has not been determined as a noticed pixel as yet does not remain, the processing advances to step S57, at which the prediction arithmetic operation section 25 supplies the after-filter image configured from the pixel values obtained for (the block as the) decoding in-progress image from the arithmetic operation section 110 to the frame memory 112 (FIG. 9). Then, the classification adaptive process is ended, and the processing returns.

As described above, in the encoding apparatus 11 of FIG. 9, since not the latest coefficients of all classes but the latest coefficients of the classes selected as selection coefficients are transmitted as reduction filter information, the compression efficiency can be improved in comparison with that in an alternative case in which the latest coefficients of all classes are transmitted.

Here, by setting the class number to be used for a classification adaptive process to a great number, basically it is possible to improve the S/N of the decoded image. However, where the class number is set to a great number, if tap coefficients of such a class number as just described are transmitted from the encoding apparatus 11 to the decoding apparatus 12, the compression efficiency decreases.

Therefore, the encoding apparatus 11 selects tap coefficients of classes that are superior in merit decision value (in the present embodiment, equal to or higher than a threshold value) from among coefficients as the latest coefficients for the individual classes as selection coefficients and transmits not the tap coefficients of all classes but only the selection coefficients. Consequently, the S/N of the decoded image can be improved and the compression efficiency can be improved.

Here, in regard to a class of the latest coefficients that is not superior in merit decision value (hereinafter referred to also as non-update class), for example, the latest coefficients and the coefficients at present have similar values to each other. As a case in which the latest coefficients and the coefficients at present have similar values to each other, a case is available in which, for example, the original image (and decoding in-progress image) that has been used for tap coefficient learning of the latest coefficients and the original image (and decoding in-progress image) that has been used for tack coefficient learning of the coefficients at present are images having identity.

In particular, in regard to a non-update class, a series of original images from an original image in the past in time used for the tap coefficient learning of the current coefficient to an original image latest in time used for the tap coefficient learning of the latest coefficients have identity in the time direction, and the latest coefficients and the coefficients at present come to have similar values to each other arising from the identity in the time direction.

Then, if the latest coefficients have values similar to those of the coefficients at present, then whichever one of the latest coefficients and the coefficients at present is used in the classification adaptive process, there is little influence on the S/N of the decoded image.

Therefore, the encoding apparatus 11 does not transmit the latest coefficients of non-update classes that have little influence on the S/N of the decoded image such that the compression efficiency is improved. Accordingly, it can be considered that such improvement of the compression rate is improvement of the compression rate that utilizes the identity of original images (tap coefficients) in the time direction.

<First Configuration Example of Decoding Apparatus 12>

Figure 20:
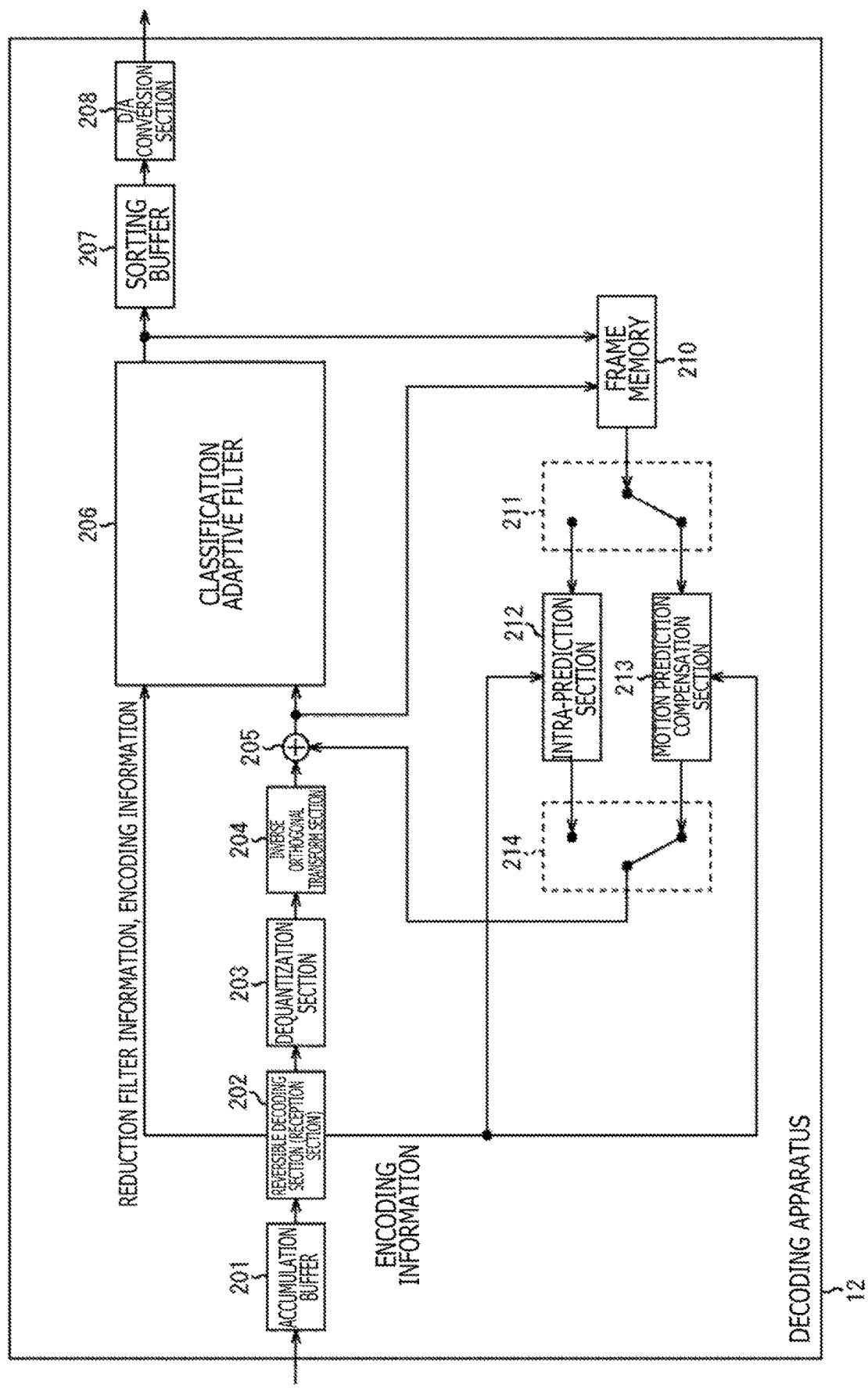
FIG. 20 is a block diagram depicting a first configuration example of a decoding apparatus 12.

FIG. 20 is a block diagram depicting a first configuration example of the decoding apparatus 12 of FIG. 1.

Referring to FIG. 20, the decoding apparatus 12 includes an accumulation buffer 201, a reversible decoding section 202, a dequantization section 203, an inverse orthogonal transform section 204, an arithmetic operation section 205, a classification adaptive filter 206, a sorting buffer 207 and a D/A conversion section 208. The decoding apparatus 12 further includes a frame memory 210, a selection section 211, an intra-prediction section 212, a motion prediction compensation section 213 and a selection section 214.

The accumulation buffer 201 temporarily accumulates encoded data transmitted from the encoding apparatus 11 and supplies the encoded data to the reversible decoding section 202 at a predetermined timing.

The reversible decoding section 202 acquires the encoded data from the accumulation buffer 201.

Accordingly, the reversible decoding section 202 functions as an acceptance section that accepts encoded data transmitted from the encoding apparatus 11 and eventually accepts encoding information and reduction filter information included in the encoded data.

The reversible decoding section 202 decodes the encoded data acquired from the accumulation buffer 201 by a method corresponding to the encoding method of the reversible encoding section 106 of FIG. 9.

Then, the reversible decoding section 202 supplies quantization coefficients obtained by decoding of the encoded data to the dequantization section 203.

Further, in the case where encoding information or reduction filter information is obtained by decoding of the encoded data, the reversible decoding section 202 supplies necessary encoding information to the intra-prediction section 212, motion prediction compensation section 213 and other necessary blocks.

Furthermore, the reversible decoding section 202 supplies the encoding information and the reduction filter information to the classification adaptive filter 206.

The dequantization section 203 dequantizes the quantization coefficients from the reversible decoding section 202 by a method corresponding to the quantization method of the quantization section 105 of FIG. 9 and supplies transform coefficients obtained by the dequantization to the inverse orthogonal transform section 204.

The inverse orthogonal transform section 204 inversely orthogonally transforms the transform coefficients supplied from the dequantization section 203 by a method corresponding to the orthogonal transform method of the orthogonal transform section 104 of FIG. 9 and supplies a residual obtained as a result of the inverse orthogonal transform to the arithmetic operation section 205.

To the arithmetic operation section 205, not only the residual is supplied from the inverse orthogonal transform section 204, but also a prediction image is supplied from the intra-prediction section 212 or the motion prediction compensation section 213 through the selection section 214.

The arithmetic operation section 205 adds the residual from the inverse orthogonal transform section 204 and the prediction image from the selection section 214 to generate a decoding in-progress image and supplies the decoding in-progress image to the classification adaptive filter 206 or to the sorting buffer 207 and the frame memory 210. For example, decoding in-progress images that are to be made reference images to be used for intra-prediction from among decoding in-progress images are supplied to the sorting buffer 207 and the frame memory 210, and the other decoding in-progress images are supplied to the classification adaptive filter 206.

The classification adaptive filter 206 performs a classification adaptive process similarly to the classification adaptive filter 111 of FIG. 9 to perform ILF processing (processing of an ILF) by a classification adaptive process using a filter that functions as an ILF.

In particular, the classification adaptive filter 206 performs (image conversion by) a classification adaptive process using tap coefficients for each class obtained using the reduction filter information from the reversible decoding section 202 using the decoding in-progress image from the arithmetic operation section 205 as a first image by using encoding information from the reversible decoding section 202 as occasion demands to convert the decoding in-progress image as a first image into an after-filter image as a second image that corresponds to the original image (to generate an after-filter image), and outputs the after-filter image.

The after-filter image outputted from the classification adaptive filter 206 is an image similar to an after-filter image outputted from the classification adaptive filter 111 of FIG. 9, and is supplied to the sorting buffer 207 and the frame memory 210.

The sorting buffer 207 temporarily stores a decoding in-progress image supplied from the arithmetic operation section 205 or an after-filter image supplied from the classification adaptive filter 206 as a decoded image, and sorts the arrangement of frames (pictures) of the decoded image from the encoding (decoding) order to a displaying order and outputs the sorted decoded image to the D/A conversion section 208.

The D/A conversion section 208 D/A converts the decoded image supplied from the sorting buffer 207 and outputs the resulting analog decoded image to a display not depicted such that it is displayed on the display.

The frame memory 210 temporarily stores a decoding in-progress image supplied from the arithmetic operation section 205 or an after-filter image supplied from the classification adaptive filter 206 as a decoded image. Further, the frame memory 210 supplies the decoded image as a reference image to be used for generation of a prediction image to the selection section 211 at a predetermined timing on the basis of an external request from the intra-prediction section 212, motion prediction compensation section 213 or the like.

The selection section 211 selects a supplying destination of the reference image supplied from the frame memory 210. In the case where an intra-encoded image is to be decoded, the selection section 211 supplies the reference image supplied from the frame memory 210 to the intra-prediction section 212. On the other hand, in the case where an inter-encoded image is to be decoded, the selection section 211 supplies the reference image supplied from the frame memory 210 to the motion prediction compensation section 213.

The intra-prediction section 212 performs intra prediction using a reference image supplied from the frame memory 210 through the selection section 211 in the intra-prediction mode used by the intra-prediction section 114 of FIG. 9 in accordance with a prediction mode included in encoding information supplied from the reversible decoding section 202. Then, the intra-prediction section 212 supplies a prediction image obtained by the intra prediction to the selection section 214.

The motion prediction compensation section 213 performs inter prediction using a reference image supplied from the frame memory 210 through the selection section 211 in the intra-prediction mode used by the motion prediction compensation section 115 of FIG. 9 in accordance with a prediction mode included in encoding information supplied from the reversible decoding section 202. The inter prediction is performed using motion information or the like included in encoding information supplied from the reversible decoding section 202 as occasion demands.

The motion prediction compensation section 213 supplies the prediction image obtained by the inter prediction to the selection section 214.

The selection section 214 selects the prediction image supplied from the intra-prediction section 212 or the prediction image supplied from the motion prediction compensation section 213 and supplies the selected prediction image to the arithmetic operation section 205.

<Configuration Example of Classification Adaptive Filter 206>

Figure 21:
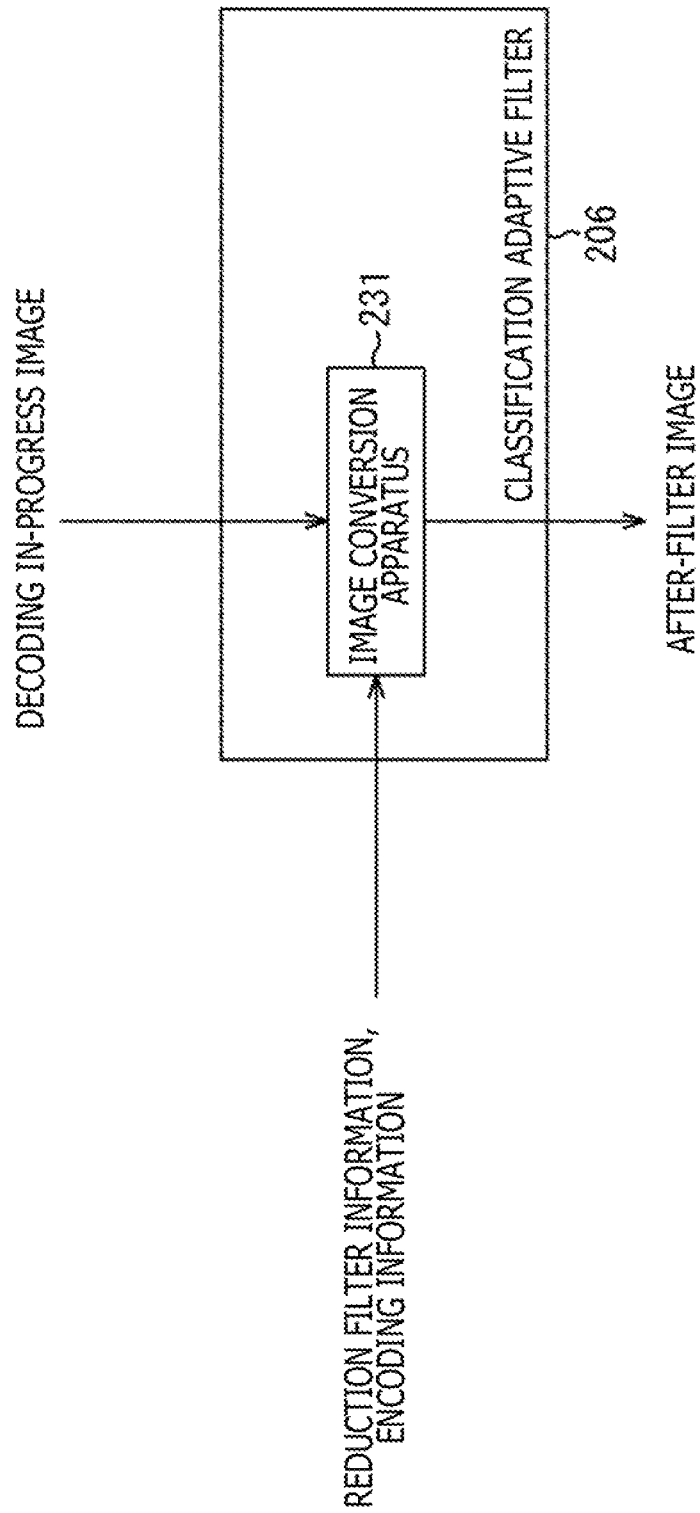
FIG. 21 is a block diagram depicting a configuration example of a classification adaptive filter 206.

FIG. 21 is a block diagram depicting a configuration example of the classification adaptive filter 206 of FIG. 20.

Referring to FIG. 21, the classification adaptive filter 206 includes an image conversion apparatus 231.

To the image conversion apparatus 231, a decoding in-progress image is supplied from the arithmetic operation section 205 (FIG. 20) and reduction filter information and encoding information are supplied from the reversible decoding section 202.

The image conversion apparatus 231 performs image conversion by a classification adaptive process using tap coefficients for the individual classes using a decoding in-progress image as a first image to convert the decoding in-progress image as the first image into an after-filter image as a second image equivalent to an original image similarly to the image conversion apparatus 133 of FIG. 10, and supplies the after-filter image to the sorting buffer 207 and the frame memory 210 (FIG. 20).

It is to be noted that the image conversion apparatus 231 obtains (updates) tap coefficients to be used in a classification adaptive process using reduction filter information similarly to the image conversion apparatus 133 of FIG. 10.

Further, the image conversion apparatus 231 performs, in a classification adaptive process, classification using encoding information as occasion demands similarly to the image conversion apparatus 133 of FIG. 10.

<Configuration Example of Image Conversion Apparatus 231>

Figure 22:
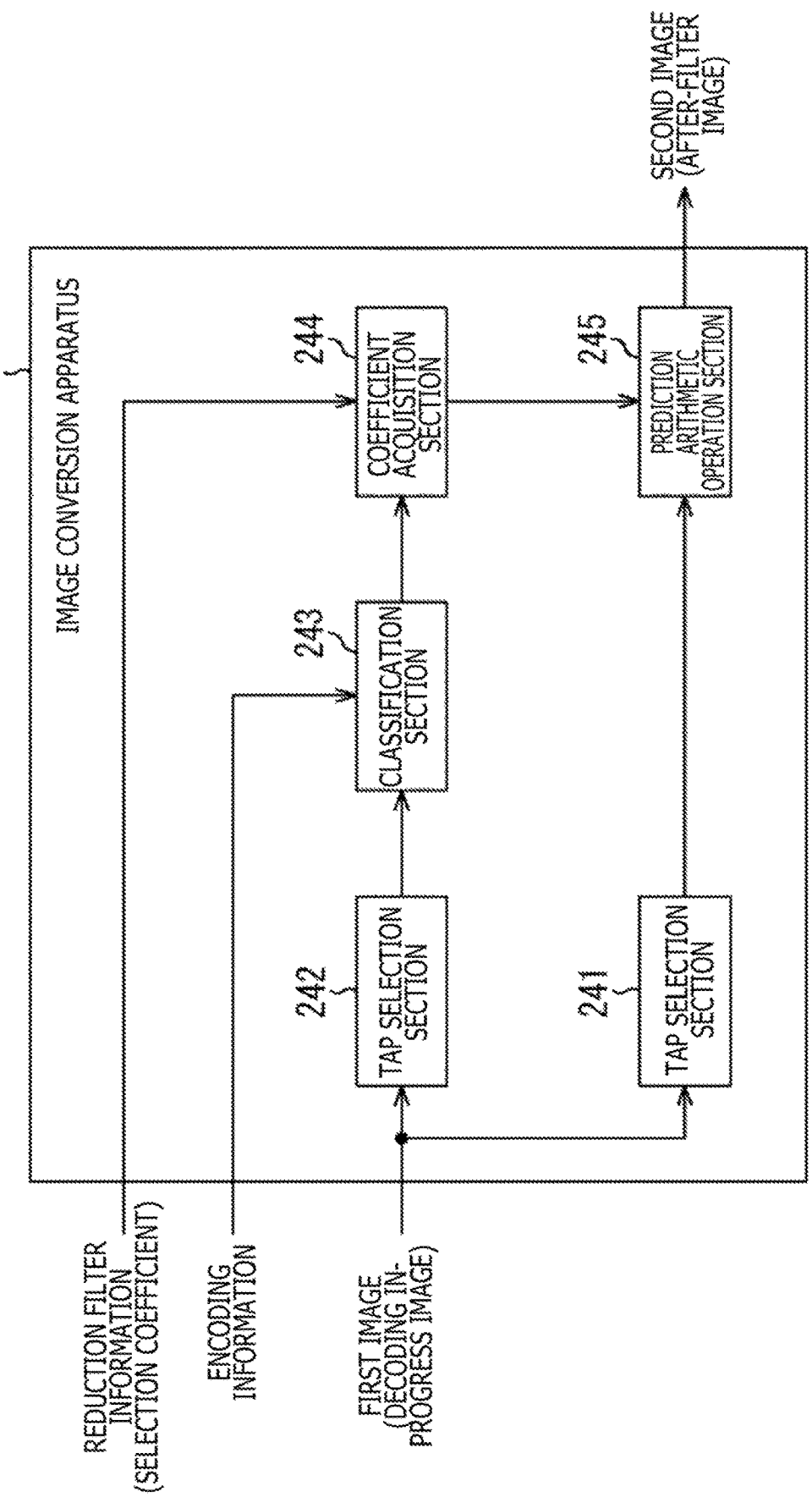
FIG. 22 is a block diagram depicting a configuration example of an image conversion apparatus 231.

FIG. 22 is a block diagram depicting a configuration example of the image conversion apparatus 231 of FIG. 21.

Referring to FIG. 22, the image conversion apparatus 231 includes tap selection sections 241 and 242, a classification section 243, a coefficient acquisition section 244 and a prediction arithmetic operation section 245.

The components from the tap selection section 241 to the prediction arithmetic operation section 245 are configured similarly to the components from the tap selection section 21 to the classification section 23, the coefficient acquisition section 151 and the prediction arithmetic operation section 25 that configure the image conversion apparatus 133 (FIG. 15), respectively.

To the tap selection sections 241 and 242, a decoding in-progress image is supplied from the arithmetic operation section 205 (FIG. 20).

The tap selection section 241 uses the decoding in-progress image from the arithmetic operation section 205 as a first image to successively select pixels of the decoding in-progress image as a noticed pixel.

Further, the tap selection section 241 selects, in regard to the noticed pixel, a prediction tap of a structure same as the structure of a prediction tap selected by the tap selection section 21 of FIG. 15 from within the decoding in-progress image, and supplies the selected prediction tap to the prediction arithmetic operation section 245.

The tap selection section 242 uses a decoding in-progress image from the arithmetic operation section 205 as a first image to select, in regard to the noticed pixel, a class tap of a structure same as the structure of a class tap selected by the tap selection section 22 of FIG. 15 from the pixels of the decoding in-progress image, and supplies the selected class tap to the classification section 243.

To the classification section 243, not only the class tap is supplied from the tap selection section 242 but also encoding information is supplied from the reversible decoding section 202 (FIG. 20).

The classification section 243 uses the class tap from the tap selection section 242 and the encoding information from the reversible decoding section 202 to perform classification same as that by the classification section 23 of FIG. 15 and supplies (a class code representative of) the class of the noticed pixel to the coefficient acquisition section 244.

To the coefficient acquisition section 244, not only the class of the noticed pixel is supplied from the classification section 243 but also reduction filter information is supplied from the reversible decoding section 202.

The coefficient acquisition section 244 uses a selection coefficient as the reduction filter information from the reversible decoding section 202 to obtain tap coefficients for each class to be used in the classification adaptive process. Then, the coefficient acquisition section 244 acquires the tap coefficients of the class of the noticed pixel from the classification section 243 from among the tap coefficients for the individual classes obtained using the selection coefficients as the reduction filter information and supplies the acquired tap coefficients to the prediction arithmetic operation section 245.

The prediction arithmetic operation section 245 performs prediction arithmetic operation of the expression (1) using the prediction tap from the tap selection section 241 and the tap coefficients from the coefficient acquisition section 244 to determine a prediction value of the pixel value of a corresponding pixel of the original image corresponding to the noticed pixel of the decoding in-progress image as a pixel value of the pixel of the decoding in-progress image as a second image, and outputs the determined pixel value of the pixel.

Figure 23:
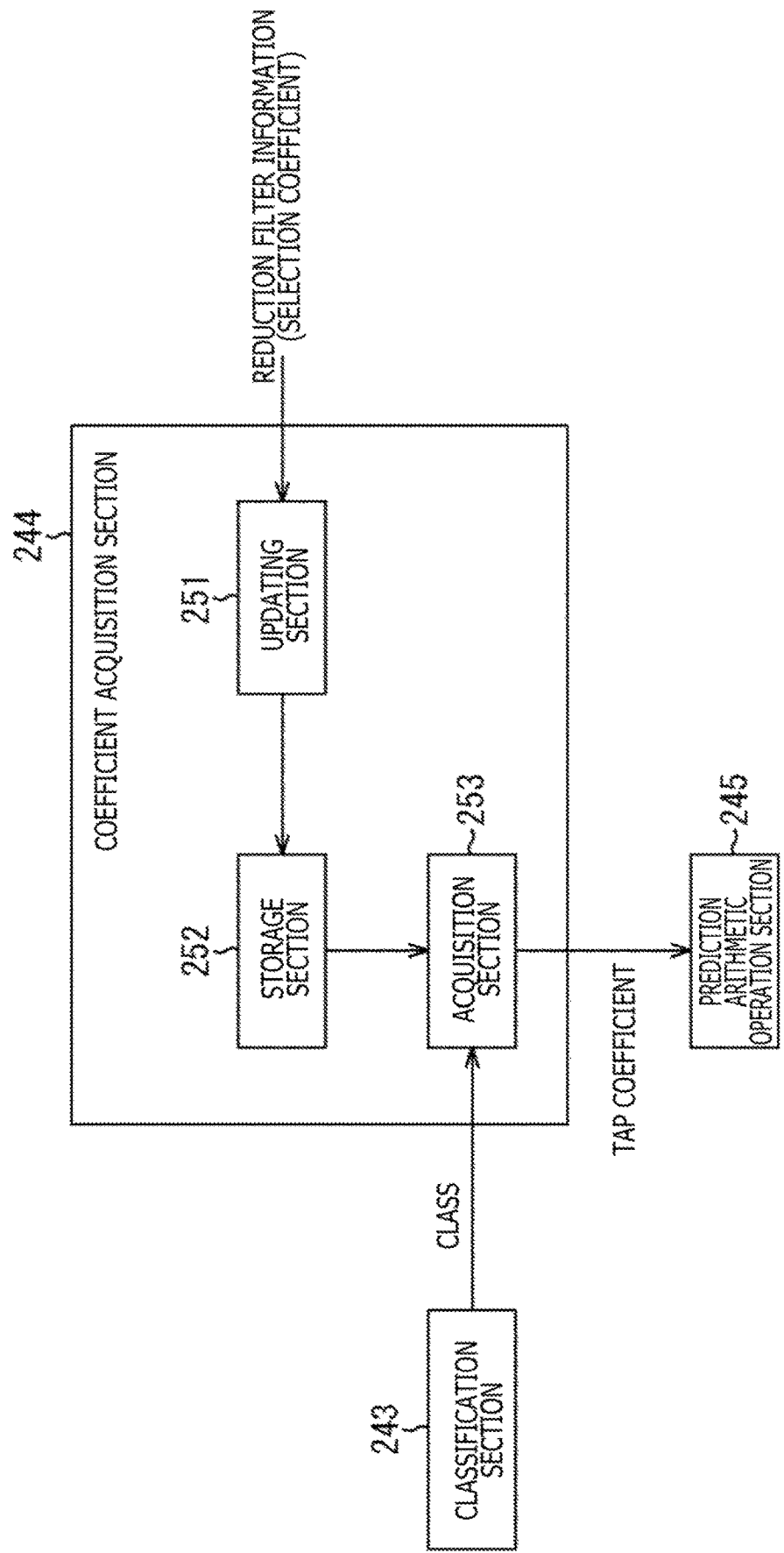
FIG. 23 is a block diagram depicting a configuration example of a coefficient acquisition section 244.

FIG. 23 is a block diagram depicting a configuration example of the coefficient acquisition section 244 of FIG. 22.

Referring to FIG. 23, the coefficient acquisition section 244 includes an updating section 251, a storage section 252 and an acquisition section 253.

To the updating section 251, selection coefficients as reduction filter information are supplied from the reversible decoding section 202 (FIG. 20).

The updating section 251 updates tap coefficients for the individual classes as coefficients at present stored in the storage section 252 with the selection coefficients as reduction filter information from the reversible decoding section 202.

The storage section 252 stores tap coefficients for the individual classes.

Here, as described hereinabove with reference to FIG. 16, in the encoding apparatus 11, at an initialization timing such as, for example, a timing at which the power supply is turned on or a timing at which encoding of a sequence of an original image is started, the reduction apparatus 132 (FIG. 10) selects the tap coefficients of all classes as the latest coefficients from the learning apparatus 131 as selection coefficients and outputs the tap coefficients as reduction filter information to the reversible encoding section 106.

Accordingly, at the initialization timing, reduction filter information transmitted from the encoding apparatus 11 to the decoding apparatus 12 is tap coefficients (latest coefficients) of all classes, and the updating section 251 stores the tap coefficients of all classes as the reduction filter information into the storage section 252.

In the image conversion apparatus 231 (FIG. 22), a classification adaptive process is performed using the tap coefficients for the individual classes stored in the storage section 252 in such a manner as described above as the coefficients at present.

Then, when an update timing comes thereafter and reduction filter information is transmitted from the encoding apparatus 11 to the decoding apparatus 12, the updating section 251 updates the current coefficients of the class of the selection coefficients from among the tap coefficients as the coefficients at present stored in the storage section 252 with and to the selection coefficients as the reduction filter information from the encoding apparatus 11.

To the acquisition section 253, (a class code of) a class of a noticed pixel is supplied from the classification section 243. The acquisition section 253 acquires tap coefficients as the coefficients at present of the class of the noticed pixel from the coefficients at present stored in the storage section 252 and supplies the tap coefficients to the prediction arithmetic operation section 245.

<Decoding Process>

Figure 24:
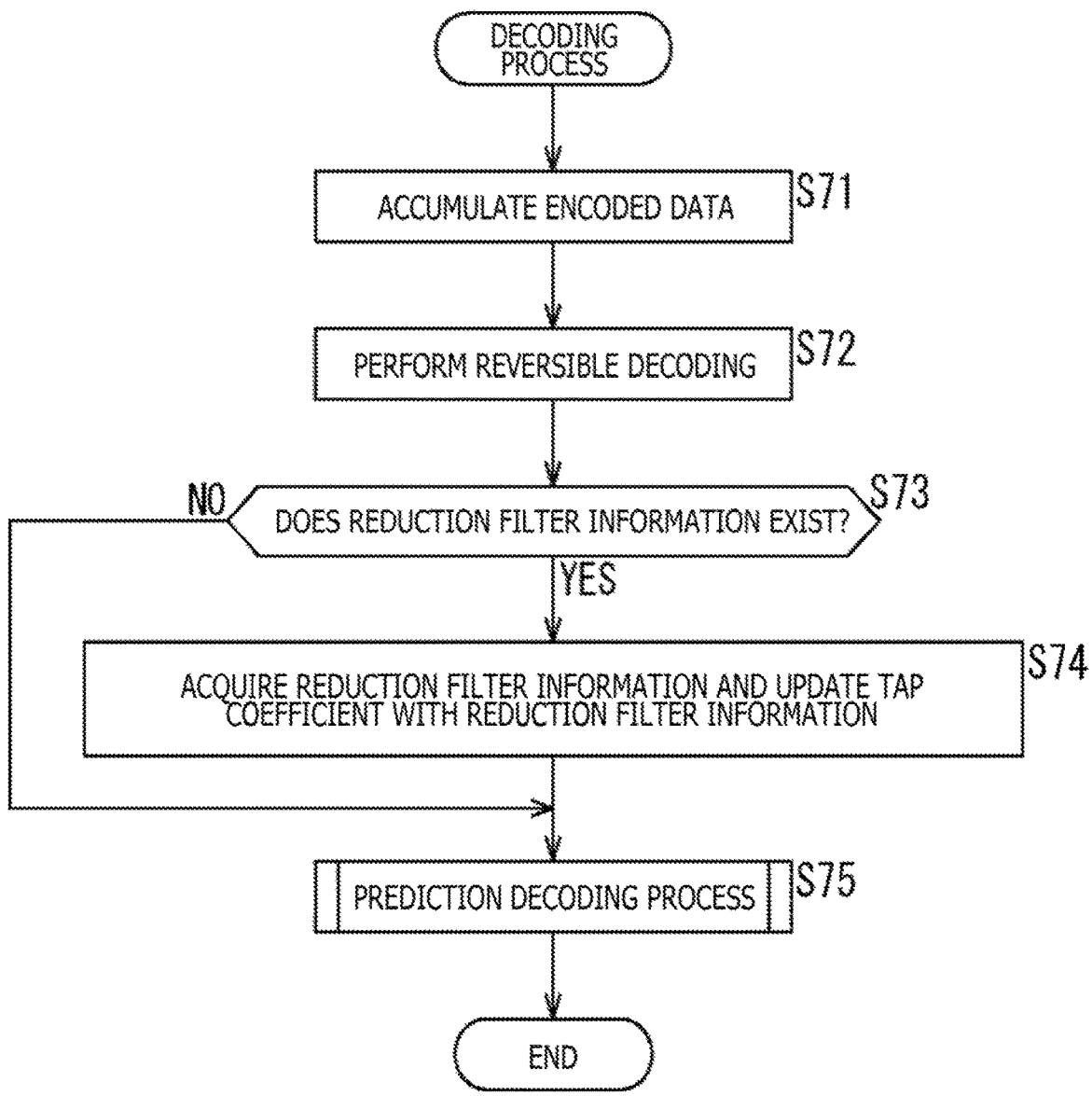
FIG. 24 is a flow chart illustrating an example of a decoding process of the decoding apparatus 12.

FIG. 24 is a flow chart illustrating an example of a decoding process of the decoding apparatus 12 of FIG. 20.

It is to be noted that the order of steps of the decoding process depicted in FIG. 24 and so forth is an order for the convenience of description, and steps of an actual encoding process are performed suitably in parallel in a necessary order. This similarly applies also to the decoding process hereinafter described.

In the decoding process, at step S71, the accumulation buffer 201 temporarily accumulates encoded data transmitted from the encoding apparatus 11 and suitably supplies the encoded data to the reversible decoding section 202. Then, the processing advances to step S72.

At step S72, the reversible decoding section 202 receives and decodes the encoded data supplied from the accumulation buffer 201 and supplies quantization coefficients obtained by the decoding to the dequantization section 203.

Further, in the case where encoding information or reduction filter information is obtained by the decoding of the encoded data, the reversible decoding section 202 supplies necessary encoding information to the intra-prediction section 212, motion prediction compensation section 213 and other necessary blocks.

Furthermore, the reversible decoding section 202 supplies the encoding information and the reduction filter information to the classification adaptive filter 206.

Thereafter, the processing advances from step S72 to step S73, at which the classification adaptive filter 206 decides whether reduction filter information is supplied from the reversible decoding section 202.

In the case where it is decided at step S73 that reduction filter information is not supplied, the processing advances to step S75 skipping step S74.

On the other hand, in the case where it is decided at step S73 that reduction filter information is supplied, the processing advances to step S74, at which the updating section 251 of the coefficient acquisition section 244 (FIG. 23) that configures the image conversion apparatus 231 (FIG. 22) of the classification adaptive filter 206 acquires selection coefficients as the reduction filter information from the reversible decoding section 202 and updates the tap coefficients for the individual classes as the coefficients at present stored in the storage section 252 with the selection coefficients as the reduction filter information.

Then, the processing advances from step S74 to step S75, at which a prediction decoding process is performed, and then the decoding process comes to an end.

Figure 25:
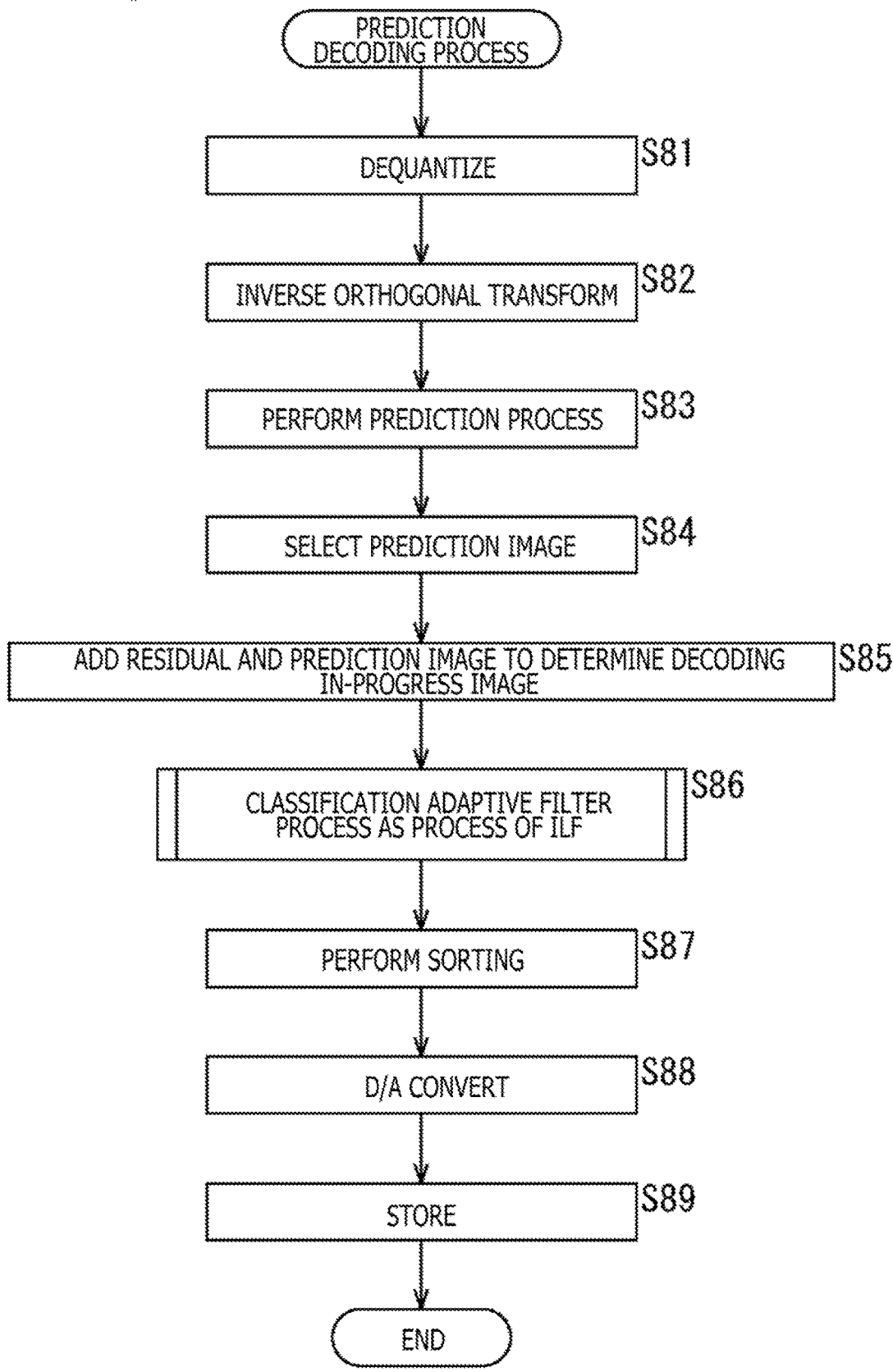
FIG. 25 is a flow chart illustrating an example of a prediction decoding process at step S75.

FIG. 25 is a flow chart illustrating an example of the prediction decoding process at step S75 of FIG. 24.

At step S81, the dequantization section 203 dequantizes the quantization coefficients from the reversible decoding section 202 and supplies conversion coefficients obtained as a result of the dequantization to the inverse orthogonal transform section 204. Then, the processing advances to step S82.

At step S82, the inverse orthogonal transform section 204 inversely orthogonally transforms the conversion coefficients from the dequantization section 203 and supplies a residual obtained as a result of the inverse orthogonal transform to the arithmetic operation section 205, and then the processing advances to step S83.

At step S83, the intra-prediction section 212 or the motion prediction compensation section 213 performs a prediction process for generating a prediction image using a reference image supplied from the frame memory 210 through the selection section 211 and encoding information supplied from the reversible decoding section 202. Then, the intra-prediction section 212 or the motion prediction compensation section 213 supplies a prediction image obtained by the prediction process to the selection section 214, and the processing advances from step S83 to step S84.

At step S84, the selection section 214 selects the prediction image supplied from the intra-prediction section 212 or the motion prediction compensation section 213 and supplies the selected prediction image to the arithmetic operation section 205. Then, the processing advances to step S85.

At step S85, the arithmetic operation section 205 adds the residual from the inverse orthogonal transform section 204 and the prediction image supplied from the selection section 214 to generate a decoding in-progress image. Then, the arithmetic operation section 205 supplies the decoding in-progress image to the classification adaptive filter 206 or the sorting buffer 207 and the frame memory 210, and then the processing advances from step S85 to step S86.

In the case where the decoding in-progress image is supplied from the arithmetic operation section 205 to the classification adaptive filter 206, the classification adaptive filter 206 performs, at step S86, a classification adaptive process (classification adaptive filter process) as a process of an ILF for the decoding in-progress image from the arithmetic operation section 205. By performing the classification adaptive process for the decoding in-progress image, similarly as in the case of the encoding apparatus 11, an after-filter image closer to the original image than that in the case where the decoding in-progress image is filtered by an ILF is determined.

The classification adaptive filter 206 supplies the decoding in-progress image obtained by the classification adaptive process to the sorting buffer 207 and the frame memory 210, and the processing advances from step S86 to step S87.

At step S87, the sorting buffer 207 temporarily stores the decoding in-progress image supplied from the arithmetic operation section 205 or the decoding in-progress image supplied from the classification adaptive filter 206 as a decoded image. Further, the sorting buffer 207 sorts the stored decoded image into a displaying order and supplies the sorted decoded image to the D/A conversion section 208, and the processing advances from step S87 to step S88.

At step S88, the D/A conversion section 208 D/A converts the decoded image from the sorting buffer 207, and the processing advances to step S89. The decoded image after the D/A conversion is outputted to and displayed on the display not depicted.

At step S89, the frame memory 210 temporarily stores the decoding in-progress image supplied from the arithmetic operation section 205 or the decoding in-progress image supplied from the classification adaptive filter 206 as a decoded image, and the decoding process comes to an end. The decoded image stored in the frame memory 210 is used as a reference image that is made an original from which a prediction image is to be generated by the prediction process at step S83.

Figure 26:
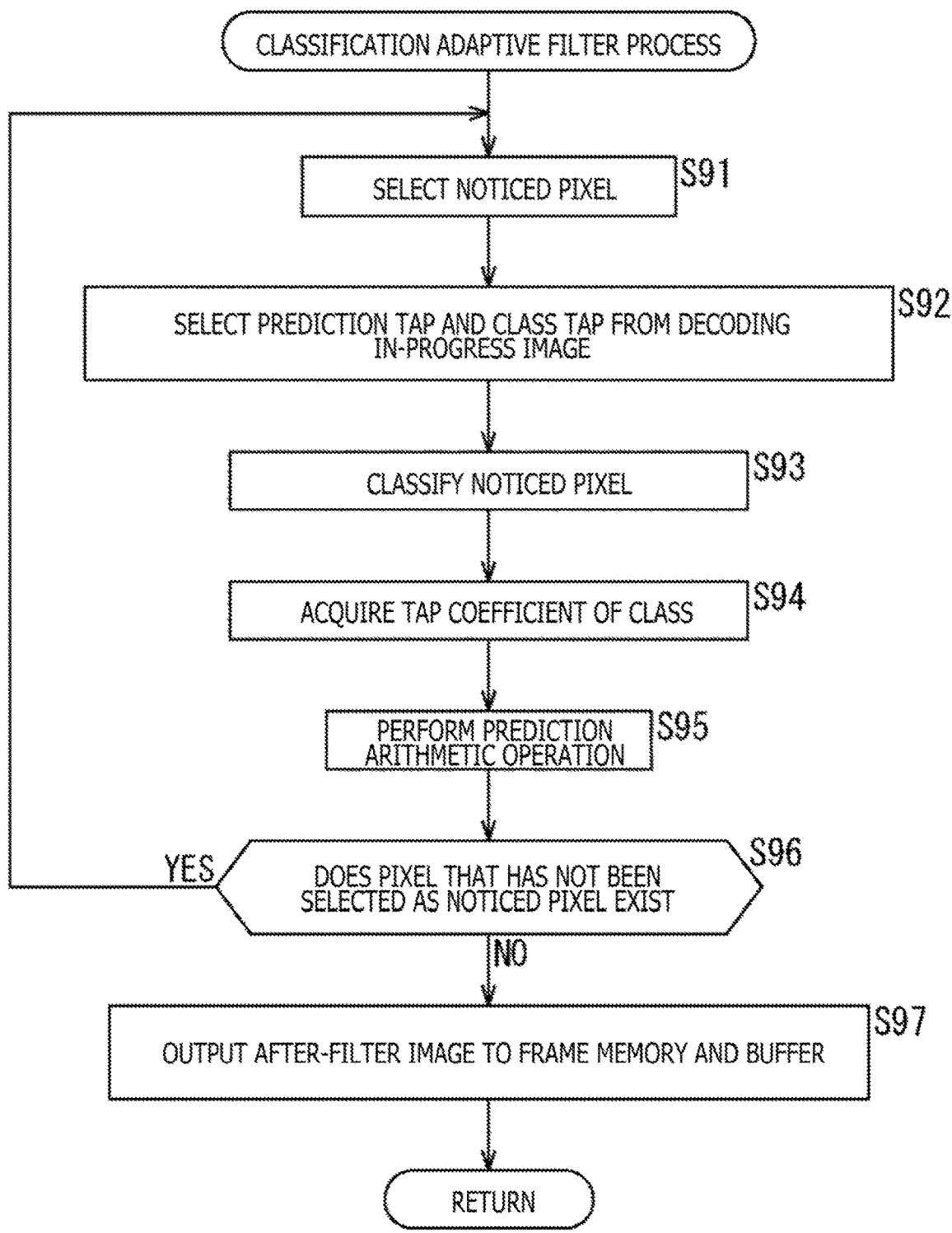
FIG. 26 is a flow chart illustrating an example of a classification adaptive process performed at step S86.

FIG. 26 is a flow chart illustrating an example of the classification adaptive process performed at step S86 of FIG. 24.

In the image conversion apparatus 231 (FIG. 22) of the classification adaptive filter 206, at step S91, the tap selection section 241 selects one of pixels that have not been set as a noticed pixel as yet from among the pixels (of a block as) the decoding in-progress image supplied from the arithmetic operation section 205 as a noticed pixel, and the processing advances to step S92.

At step S92, the tap selection sections 241 and 242 select pixels to be made prediction taps and class taps in regard to the noticed pixel from within the decoding in-progress image supplied from the arithmetic operation section 205, respectively. Then, the tap selection section 241 supplies the prediction taps to the prediction arithmetic operation section 245, and the tap selection section 242 supplies the class taps to the classification section 243.

Thereafter, the processing advances from step S92 to step S93, at which the classification section 243 performs classification of the noticed pixel similar to that in the case described hereinabove with reference to FIG. 19 using the class taps regarding the noticed pixel supplied from the tap selection section 242 and the encoding information regarding the noticed pixel supplied from the reversible decoding section 202.

The classification section 243 generates a class code representative of the class of the noticed pixel obtained by the classification and supplies the generated class code to the coefficient acquisition section 244, and the processing advances from step S93 to step S94.

At step S94, the coefficient acquisition section 244 acquires tap coefficients of the class represented by the class code supplied from the classification section 243 from the tap coefficients stored in the storage section 252 (FIG. 23) updated at step S74 of FIG. 24 and supplies the acquired tap coefficients to the prediction arithmetic operation section 245, and the processing advances to step S95.

At step S95, the prediction arithmetic operation section 245 performs prediction arithmetic operation of the expression (1) using the prediction taps from the tap selection section 241 and the tap coefficients from the coefficient acquisition section 244. Consequently, the prediction arithmetic operation section 245 determines the prediction value of the pixel value of the corresponding pixel of the original image corresponding to the noticed pixel as a pixel value of the after-filter image, and the processing advances to step S96.

At step S96, the tap selection section 241 decides whether a pixel that has not been set as a notice pixel as yet exists in the pixels (of a block as) the decoding in-progress image from the arithmetic operation section 205. In the case where it is decided at step S96 that a pixel that has not been set as a noticed pixel as yet exits, the processing returns to step S91 and similar processes are repeated thereafter.

On the other hand, in the case where it is decided at step S96 that a pixel that has not been set as a noticed pixel does not exit, the processing advances to step S97, at which the prediction arithmetic operation section 245 supplies an after-filter image configured from pixel values obtained for (a block as) the decoding in-progress image from the arithmetic operation section 205 to the sorting buffer 207 and the frame memory 210 (FIG. 9). Then, the classification adaptive process is encoded, and the processing returns.

As described above, in the encoding apparatus 11 of FIG. 9 and the decoding apparatus 12 of FIG. 20, since an ILF process is performed by a classification adaptive process, an after-filter image closer to the original image than that by a processing result of the ILF can be obtained. As a result, the S/N of the decoded image can be improved. Further, since an after-filter image close to the original image can be obtained, the residual reduces, and therefore, the compression efficiency can be improved. Further, in the encoding apparatus 11, since the latest coefficients of classes in regard to which the limit decision value is equal to or higher than a threshold value to generate reduction filter information that decreases the tap coefficients for the individual classes and not the tap coefficients of the latest coefficients of all classes but the reduction filter information is transmitted to the decoding apparatus 12, the compression efficiency can be improved further.

It is to be noted that, as the ILF, for example, a DF (Deblocking Filter) for reducing block noise, a SAO (Sample Adaptive Offset) for reducing ringing and an ALF (Adaptive Loop Filter) for minimizing the encoding error (error of the decoded image with respect to the original image) are available.

The DF controls the filter strength depending upon the quantization parameter QP or upon whether or not the pixel is a pixel on the boundary of a block to reduce block noise (distortion).

However, in the DF, the number of filter strengths that can be applied to a block is as small as two. Further, in the DF, the unit of control of the filter strength is slice, and the filter strength cannot be controlled for each pixel.

In the SAO, the filter mode in which noise around an edge is to be reduced or DC correction is to be performed is changed over for each CTU, and by deciding an offset value for each pixel, reduction of ringing or DC correction is performed.

However, in the SAO, it is difficult to perform changeover of the filter mode for each pixel. Further, in the SAO, only one of the processes of reduction of noise and DC correction can be performed, and both processes cannot be performed simultaneously.

The ALF performs classification for classifying into 15 classes using the direction of an edge and the activity and performs a filter process based on filter coefficients prepared statistically optimally.

However, in the ALF, since the unit of a filter process is a unit of 4×4 pixels, for each pixel, fine control of the filter strength according to a waveform pattern or a block phase around the pixel cannot be performed. Further, in the ALF, since the class number that becomes a target of classification is as small as 15 classes, fine control of the filter strength cannot be performed also from this point.

In contrast, in the classification adaptive process, since, for each pixel, classification is performed for a target of a class number greater than 15 classes of the ALF and tap coefficients that are obtained by learning and are statistically optimum are used to perform a filter process for converting a decoding in-progress image into an after-filter image, the picture quality (S/N) can be improved significantly from that of the existing ILF.

Especially, in the classification adaptive process, since, for each pixel, classification is performed using an image characteristic amount such as an ADRC code, a dynamic range or the like as an image characteristic amount that represents a waveform pattern around the pixel and encoding information such as a quantization parameter QP, a picture type, a block phase or the like, an image very close to the original image can be obtained as an after-filter image. As a result, not only in the case where the ILF is not used in prediction encoding, but also in comparison with an alternative case in which the ILF is used, the S/N and the compression efficiency of images can be improved significantly.

Further, the classification adaptive process does not have, in regard to tap coefficients to be used for prediction arithmetic operation of the expression (1) as a filter process, a restriction of point symmetry as in the case of the ALF or such restriction that the number of filter coefficients is 13. Therefore, tap coefficients that make a statistical error of the after-filter image from the original image smaller than that by the ALF can be determined by learning.

Furthermore, in the classification adaptive process, the number of tap coefficients, namely, the number of pixels for configuring a prediction tap, or a structure of the prediction tap can be designed, for example, taking the data amount of tap coefficients and the S/N and the compression efficiency of a decoded image into consideration.

Further, in the classification adaptive process, prediction taps can be configured including not only a frame of a noticed pixel but also pixels of preceding and succeeding frames of the frame.

As described above, since, in the classification adaptive process, prediction arithmetic operation of the expression (1) as classification and a filter process is performed for each pixel, it is possible to cause, for each pixel, an effect of a filter process suitable for the pixel.

As a result, for example, it is possible to cause an effect of NR (Noise Reduction) or suppress ringing without excessively crushing an edge or a texture. In particular, for example, it is possible to maintain, in regard to pixels at an edge portion, the edge portion (to leave details) and to remove, in regard to pixels at a flat portion, noise sufficiently.

Further, in the classification adaptive process, for example, by performing classification using encoding information of the block phase or the like, the effect of NR can be adjusted depending upon whether the noticed pixel is a pixel on the boundary of a block. As a result, it is possible to perform, for a pixel that suffers from block distortion, a filter process suitable to remove the block distortion and perform, for a pixel that suffers from noise other than block distortion, a filter process suitable to remove the noise.

Furthermore, in the classification adaptive process, by configuring prediction taps including, for example, not only a frame of the noticed pixel but also pixels of preceding and succeeding frames of the frame, degradation of the picture quality arising from a movement such as motion blur can be moderated.

Here, in the present technology, since the classification adaptive process is performed for a decoding in-progress image that is handled in the encoding apparatus 11 and the decoding apparatus 12, a block phase and information regarding a block necessary to specify the block phase (for example, a size of the block, a boundary of the block and so forth) can be obtained by an encoding process or a decoding process.

Meanwhile, for example, Japanese Patent No. 4770711 describes a technology for improving the picture quality of a decoded image outputted from an MPEG decoder by a classification adaptive process that uses a block phase. In the technology described in Japanese Patent No. 4770711, since a classification adaptive process for a decoded image outputted from an MPEG decoder is performed outside the MPEG decoder, it is necessary for information regarding a block to be definitely decided or be detected by some method.

It is to be noted that, while, in the first configuration example of the encoding apparatus 11 of FIG. 9, the ILF, namely, all processes of the DF, SAO and ALF, are performed by the classification adaptive process, in the classification adaptive process, not all of the ILF but one or two of the DF, SAO and ALF can be performed. This similarly applies also to the first configuration example of the decoding apparatus 12 of FIG. 20 and other configuration examples of the encoding apparatus 11 and the decoding apparatus 12 hereinafter described.

<Second Configuration Example of Encoding Apparatus 11>

Figure 27:
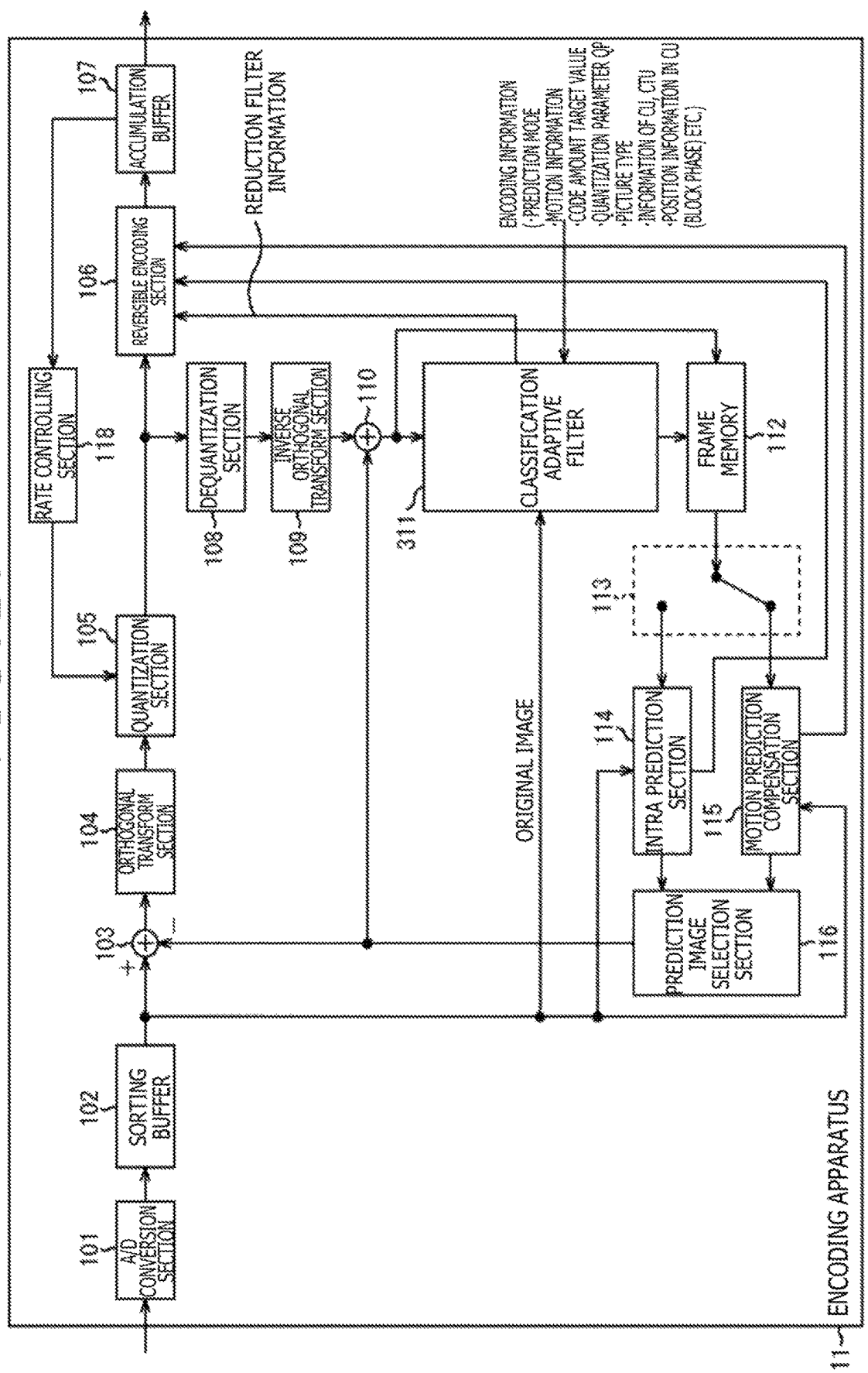
FIG. 27 is a block diagram depicting a second configuration example of the encoding apparatus 11.

FIG. 27 is a block diagram depicting a second configuration example of the encoding apparatus 11 of FIG. 1.

It is to be noted that, in FIG. 27, elements corresponding to those of FIG. 9 are denoted by like reference numerals and description of them is hereinafter omitted suitably.

Referring to FIG. 27, the encoding apparatus 11 includes the components from the A/D conversion section 101 to the arithmetic operation section 110 and from the frame memory 112 to the rate controlling section 117, and a classification adaptive filter 311.

Accordingly, the encoding apparatus 11 of FIG. 27 is common to that of FIG. 9 in that it includes the components from the A/D conversion section 101 to the arithmetic operation section 110 and from the frame memory 112 to the rate controlling section 117.

However, the encoding apparatus 11 of FIG. 27 is different from that of FIG. 9 in that it includes the classification adaptive filter 311 in place of the classification adaptive filter 111.

The classification adaptive filter 311 is common to the classification adaptive filter 111 in that it is a filter that functions as an ILF by performing a classification adaptive process and performs an ILF process by the classification adaptive process.

However, the classification adaptive filter 311 is different from the classification adaptive filter 111 in that tap coefficients for individual integration classes where a plurality of classes determined by tap coefficient learning are integrated to the number of classes equal to or smaller than the number of the plurality of classes by reduction of the tap coefficients of the classes by a reduction process and a corresponding relationship LUT (Look Up Table) as corresponding relationship information representative of a corresponding relationship between the plurality of original classes and the integration classes are generated as reduction filter information.

Further, the classification adaptive filter 311 is different from the classification adaptive filter 111 in that it performs a classification adaptive process using the tap coefficients for the individual integration classes as the reduction filter information and the corresponding relationship LUT.

<Configuration Example of Classification Adaptive Filter 311>

Figure 28:
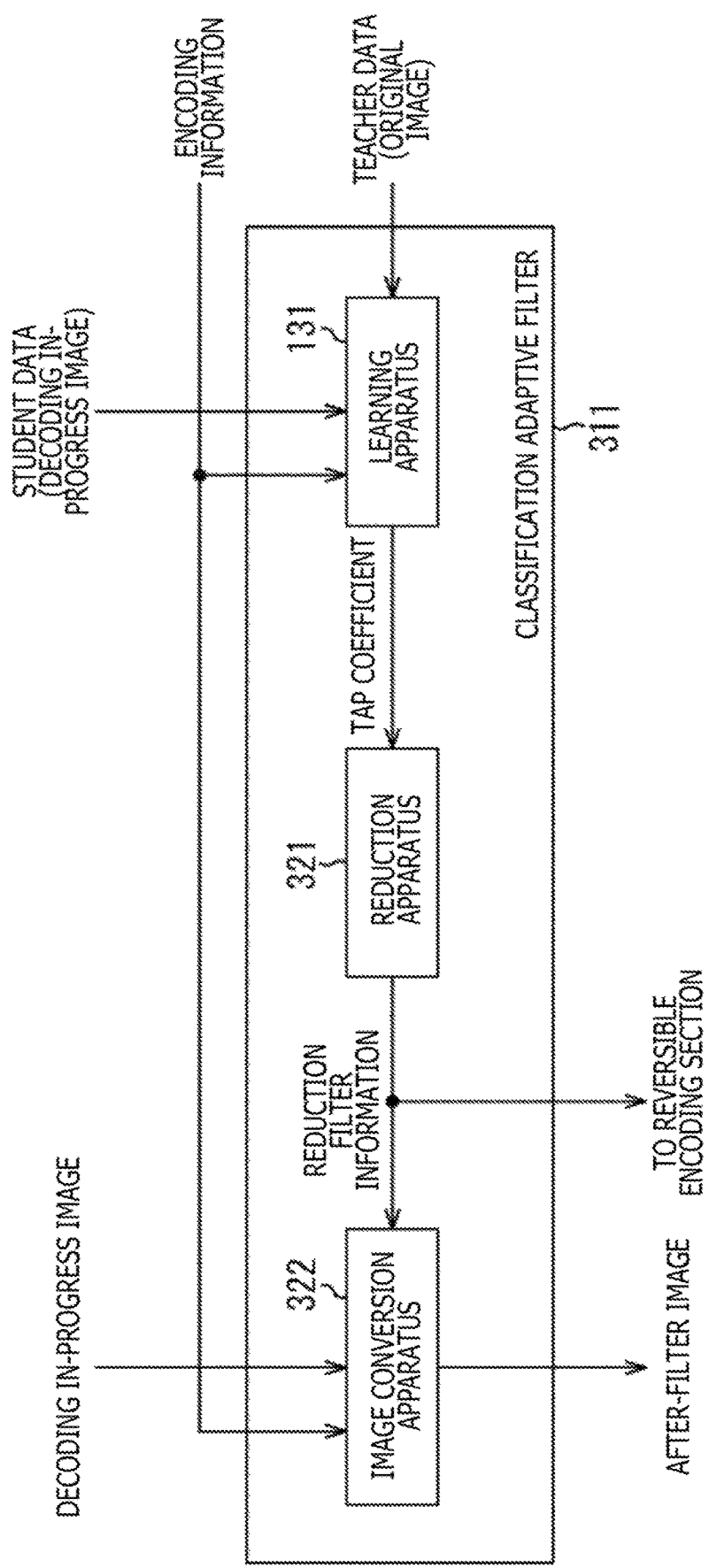
FIG. 28 is a block diagram depicting a configuration example of a classification adaptive filter 311.

FIG. 28 is a block diagram depicting a configuration example of the classification adaptive filter 311 of FIG. 27.

It is to be noted that, in FIG. 28, elements corresponding to those of the classification adaptive filter 111 of FIG. 10 are denoted by like reference numerals and description of them is hereinafter omitted suitably.

Referring to FIG. 28, the classification adaptive filter 311 includes a learning apparatus 131, a reduction apparatus (reduction section) 321 and an image conversion apparatus 322.

Accordingly, the classification adaptive filter 311 is common to the classification adaptive filter 111 of FIG. 10 in that it includes the learning apparatus 131.

However, the classification adaptive filter 311 is different from the classification adaptive filter 111 in that it includes the reduction apparatus 321 and the image conversion apparatus 322 in place of the reduction apparatus 132 and the image conversion apparatus 133, respectively.

To the reduction apparatus 321, tap coefficients of a plurality of classes obtained by tap coefficient learning are supplied from the learning apparatus 131.

Here, a class with regard to which tap coefficients are determined by the learning apparatus 131 is referred to also as initial class. Further, it is assumed that the number of initial classes (total class number) is C (classes).

The reduction apparatus 321 performs a reduction process for reducing the tap coefficients of the C initial classes from the learning apparatus 131 to generate reduction filter information and supplies the reduction filter information obtained by the reduction process to the image conversion apparatus 322 and the reversible encoding section 106 (FIG. 27).

In particular, in the reduction process, the reduction apparatus 321 integrates the tap coefficients for the C individual initial classes to U classes smaller than the C classes to generate tap coefficients for the individual integrated classes.

Further, the reduction apparatus 321 generates a corresponding relationship LUT as corresponding relationship information representative of a corresponding relationship between the initial classes and the integrated classes.

Then, the reduction apparatus 321 supplies the tap coefficients for the U individual integrated classes and the corresponding relationship LUT as reduction filter information to the image conversion apparatus 322 and the reversible encoding section 106 (FIG. 27).

To the image conversion apparatus 322, a decoding in-progress image is supplied from the arithmetic operation section 110 (FIG. 27) and reduction filter information is supplied from the reduction apparatus 321. Further, encoding information is supplied to the image conversion apparatus 322.

The image conversion apparatus 322 performs, using the decoding in-progress image as a first image, image conversion by a classification adaptive process using the tap coefficients for the individual integrated classes (tap coefficients obtained using the reduction filter information) as the reduction filter information from the reduction apparatus 321 and the corresponding relationship LUT to convert the decoding in-progress image as the first image into an after-filter image as the second image equivalent to the original image (generates an after-filter image) and supplies the after-filter image to the frame memory 112 (FIG. 27).

It is to be noted that the image conversion apparatus 322 performs classification in the classification adaptive process using encoding information as occasion demands.

<Example of Reduction Process of Reduction Apparatus 321>

Figure 29:
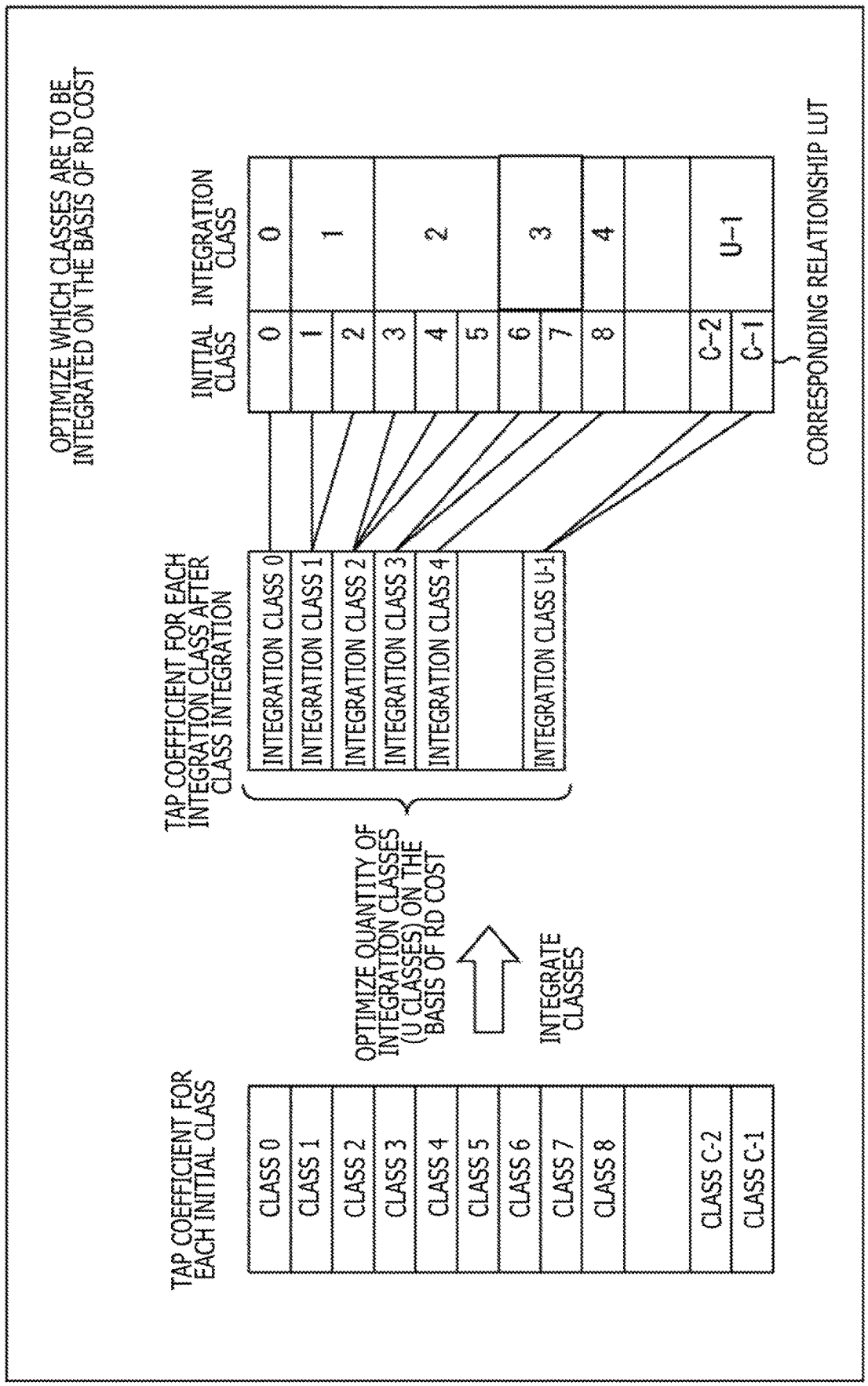
FIG. 29 is a view illustrating an example of a reduction process of a reduction apparatus 321.

FIG. 29 is a view illustrating an example of the reduction process of the reduction apparatus 321.

In FIG. 29, at an update timing for tap coefficients to be used in a classification adaptive process, tap coefficients of C initial classes 0, 1, . . . , C−1 are determined by tap coefficient learning by the learning apparatus 131.

The reduction apparatus 321 calculates a tap coefficient evaluation value representative of appropriateness in use of tap coefficients for each integrated class in the case where each two or more initial classes from among the C initial classes 0 to C−1 are integrated into an integration candidate class in (prediction arithmetic operation of the expression (1) of) a classification adaptive process.

Further, the reduction apparatus 321 integrates integration candidate classes according to the tap coefficient evaluation values and repeats similar integration using the tap coefficient for each class after the integration as a target. Then, the reduction apparatus 321 outputs tap coefficients of the U classes (integration classes) 0, 1, . . . , U−1 equal to or smaller than C as reduction filter information finally obtained by the integration.

Further, the reduction apparatus 321 generates and outputs a corresponding relationship LUT between the initial classes and the integration classes as reduction filter information.

In FIG. 29, for example, the initial class 0 is not integrated with another class and is set as it is as integrated class 0. Meanwhile, for example, the initial classes 1 and 2 are integrated into an integrated class 1. Therefore, in the corresponding relationship LUT of FIG. 29, the initial class 0 and the integrated class 0 are associated with each other, and the initial classes 1 and 2 and the integrated claim 1 are associated with each other.

In the classification adaptive process performed by the image conversion apparatus 322 (FIG. 28), an initial class as a class of a noticed pixel obtained by the classification is converted into an integrated class in accordance with the corresponding relationship LUT as reduction filter information. Then, from the tap coefficients for the individual integrated classes as the reduction filter information, the tap coefficients of the integrated class of the noticed pixel are acquired, and prediction arithmetic operation is performed using the tap coefficients.

Here, as the tap coefficient evaluation value, for example, a value corresponding to the RD cost can be adopted. For example, it is possible to adopt the RD cost as the tap coefficient evaluation value and select integration candidate classes from initial classes to perform integration such that the RD cost is improved. Further, integration of classes can be performed repetitively, for example, until the RD cost does not improve anymore (is continued as long as the RD cost improves).

By adopting the RD cost as the tap coefficient evaluation value and repeating selection and integration of integration candidate classes in response to the RD cost in such a manner as described above, it is possible to achieve optimization of classes for which integration is to be performed and optimization of the quantity U of integration classes obtained finally by the integration and thus improve the compression efficiency and the S/N of decoded images.

Further, as the tap coefficient evaluation value, for example, a value corresponding to an inter-coefficient distance between tap coefficients of different classes can be adopted. For example, it is possible to adopt the inter-coefficient distance between tap coefficients of different classes as the tap coefficient evaluation value and repeat selection and integration of integration candidate classes such that classes having a small inter-coefficient distance do not remain.

Furthermore, as the tap coefficient evaluation value, for example, a value corresponding to the S/N of an after-filter image can be adopted. For example, it is possible to adopt the S/N of an after-filter image as the tap coefficient evaluation value and repeat selection and integration of integration candidate classes such that the S/N of the after-filter image is improved.

Further, as the tap coefficient evaluation value, for example, a value corresponding to the use frequency in which tap coefficients are used in the classification adaptive process can be adopted. For example, it is possible to adopt the use frequency of tap coefficients as the tap coefficient evaluation value and repeat selection and integration of integration candidate classes such that classes of tap coefficients whose use frequency, namely, classes from which the number of classes obtained as a result of classification of a noticed pixel is small, are integrated such that integration classes with regard to which the use frequency of tap coefficients is low do not remain.

Furthermore, as the tap coefficient evaluation value, for example, a value corresponding to a difference between tap coefficients of a mono class that is a specific one class and tap coefficients of a different class can be adopted.

Here, it is possible to adopt, as tap coefficients of a certain one class among initial classes, an average tap coefficient of tap coefficients of a different class (for example, tap coefficients obtained by tap coefficient learning setting the class number to one class). Now, it is assumed that this one class is referred to as mono class.

As the tap coefficient evaluation value, for example, a difference absolute value sum or the like of tap coefficients of a mono class and tap coefficients of a different class can be adopted. In this case, selection and integration of integration candidate classes can be repeated such that classes of tap coefficients with regard to which the difference absolute value sum with the tap coefficients of the mono class is small do not remain anymore.

From the point of view of improvement of the compression efficiency and improvement of the S/N of the decoded image, it is desirable to adopt a value corresponding to the RD cost as the tap coefficient evaluation value. However, in the case where the RD cost is adopted as the tap coefficient evaluation value, a high calculation cost is required for calculation of the tap coefficient evaluation value. By adopting, as the tap coefficient evaluation value, for example, the inter-coefficient distance described hereinabove, the S/N of the after-filter image or a value corresponding to the difference from the tap coefficients of the mono class, the calculation cost required for calculation of the tap coefficient evaluation value can be reduced.

<Configuration Example of Reduction Apparatus 321>

Figure 30:
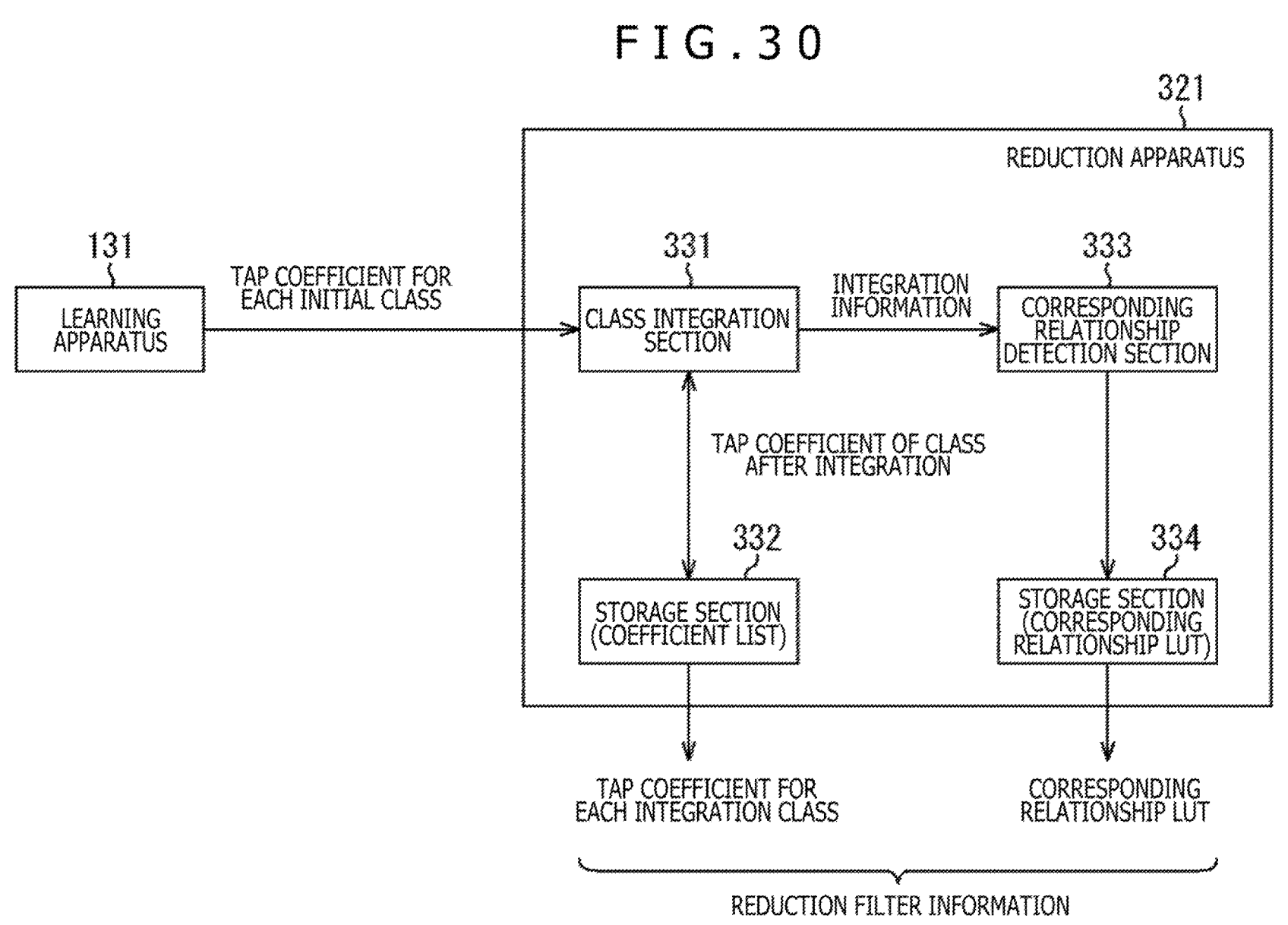

FIG. 30 is a block diagram depicting a configuration example of the reduction apparatus 321 of FIG. 28.

Referring to FIG. 30, the reduction apparatus 321 includes a class integration section 331, a storage section 332, a corresponding relationship detection section 333 and another storage section 334.

To the class integration section 331, tap coefficients for each initial class are supplied from the learning apparatus 131.

The class integration section 331 registers the tap coefficients for each initial class from the learning apparatus 131 into a coefficient list stored in the storage section 332 (list into which tap coefficients for each class are to be registered).

Further, the class integration section 331 selects, for example, two classes from among the classes whose tap coefficient is registered in the coefficient list of the storage section 332 as integration candidate classes.

Then, the class integration section 331 calculates the RD costs or the like as the tap coefficient evaluation value before and after integration of the integration candidate classes, and in the case where the tap coefficient evaluation value after integration improves from that before integration, the class integration section 331 integrates the tap coefficients of the integration candidate classes and updates the coefficient list of the storage section 332 with the tap coefficient of the class after the integration (for example, rewrites the tap coefficients of the integration candidate classes into the tap coefficients after the integration and collected).

Here, in the integration of the tap coefficients of the two classes C1 and C2, the tap coefficients of one of the classes C1 and C2, an average value of the tap coefficients of the classes C1 and C2 or the like can be adopted as the tap coefficients of the class after the integration.

Further, tap coefficients of a class after integration where the classes C1 and C2 are integrated can be determined, for example, by retaining the components $(\Sigma x_{n,k} x_{n',k})$ of the matrix of the left side and the components $(\Sigma x_{n,k} y_k)$ of the vector of the right side of the expression (8) used when the tap coefficients of the classes C1 and C2 are determined, adding the components $(\Sigma_{n,k} x_{n',k})$ or the components $(\Sigma x_{n,k} y_k)$ of the vector used when the tap coefficients of the class C1 are determined and the components $(\Sigma x_{n,k} x_{n',k})$ of the matrix or the components $(\Sigma x_{n,k} y_k)$ of the vector used when the tap coefficients of the class C2 are determined to determine the components $(\Sigma x_{n,k} x_{n',k})$ of the matrix and the components $(\Sigma x_{n,k} y_k)$ of the vector of the class after the integration, respectively, and solving the normal equation indicated by the expression (8) defined by the components $(\Sigma x_{n,k} x_{n',k})$ of the matrix and the components $(\Sigma x_{n,k} y_k)$ of the vector of the class after the integration.

The class integration section 331 integrates the tap coefficients of the integration candidate classes and updates the coefficient list of the storage section 332 with the tap coefficients of the class after the integration, and then supplies integration information representative of the integrated classes (integration candidate classes) and the classes after the integration to the corresponding relationship detection section 333.

The storage section 332 has stored therein the coefficient list in which the tap coefficients for the individual classes are registered.

The coefficient list of the storage section 332 is updated in response to integration of classes by the class integration section 331. Then, after the integration of classes by the class integration section 331 ends, the tap coefficients registered in the coefficient list, namely, the tap coefficients of the integration class, are outputted as reduction filter information from the reduction apparatus 321.

The corresponding relationship detection section 333 detects classes before integration and a class after integration from the integration information supplied from the class integration section 331 and updates the corresponding relationship LUT of the storage section 334 such that the classes before the integration and the class after the integration are associated with each other.

The storage section 334 stores the corresponding relationship LUT in which a corresponding relationship between the initial classes and the integration classes is registered.

In the corresponding relationship LUT stored in the storage section 334, as initial values, for example, information that associates initial classes c and integration classes c with each other is registered.

Then, the corresponding relationship LUT is updated by the corresponding relationship detection section 333 such that, for example, in the case where the initial classes c1 and c2 are integrated and the class after the integration is a class u1, the initial classes c1 and c2 and the integration class u1 are associated with each other.

<Configuration Example of Image Conversion Apparatus 322>

Figure 31:
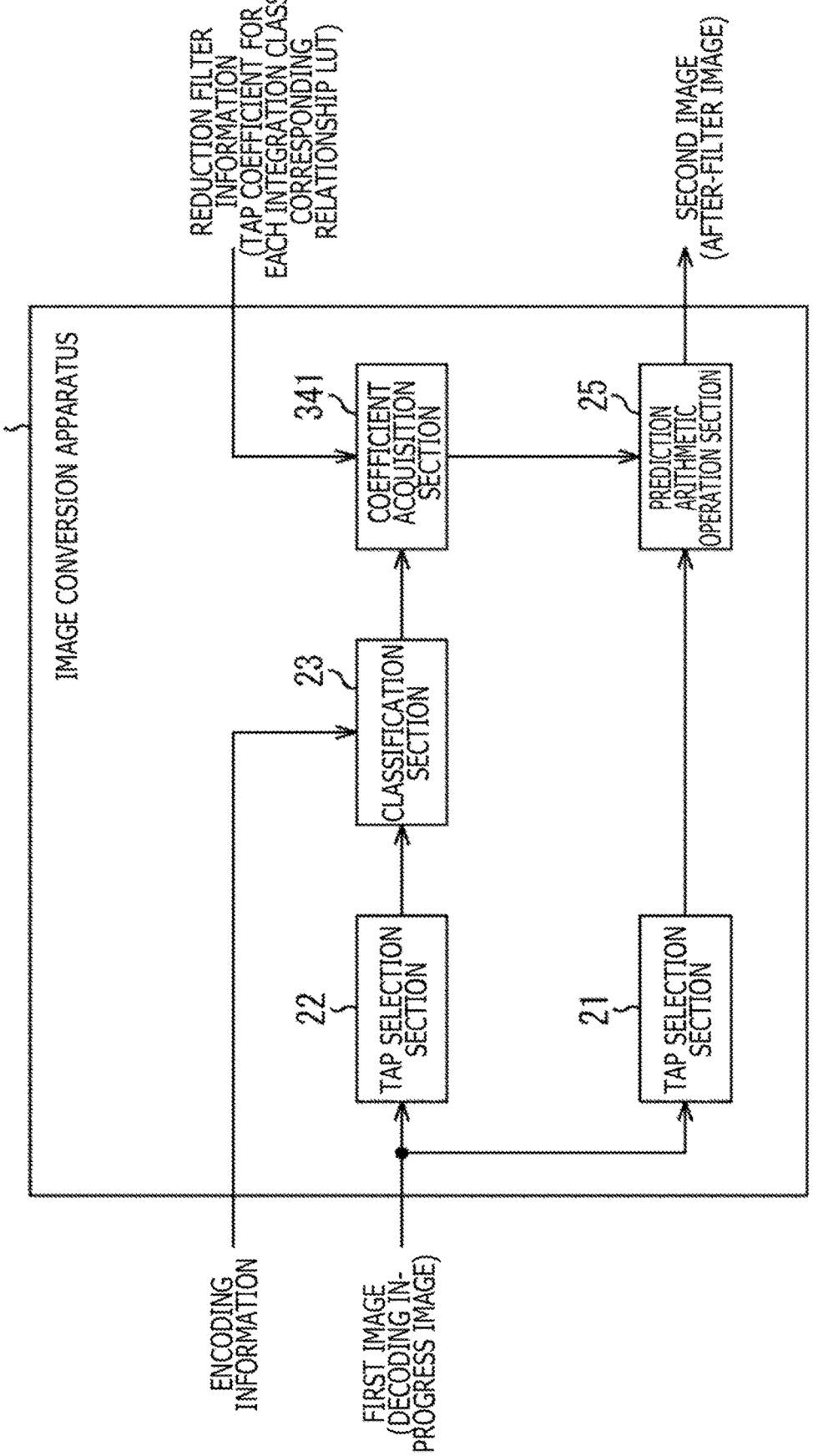
FIG. 31 is a block diagram depicting a configuration example of an image conversion apparatus 322.

FIG. 31 is a block diagram depicting a configuration example of the image conversion apparatus 322 of FIG. 28.

It is to be noted that, in FIG. 31, elements corresponding to those of the image conversion apparatus 133 of FIG. 15 are denoted by like reference numerals and description of them is hereinafter omitted suitably.

Referring to FIG. 31, the image conversion apparatus 322 includes the components from the tap selection section 21 to the classification section 23, the prediction arithmetic operation section 25 and a coefficient acquisition section 341.

Accordingly, the image conversion apparatus 322 is configured similarly to the image conversion apparatus 133 of FIG. 15 in that it includes the components from the tap selection section 21 to the classification section 23 and the prediction arithmetic operation section 25.

However, the image conversion apparatus 322 is different from the image conversion apparatus 133 in that it includes the coefficient acquisition section 341 in place of the coefficient acquisition section 151.

To the coefficient acquisition section 341, tap coefficients for each integration class as reduction filter information and a corresponding relationship LUT are supplied from the reduction apparatus 321.

The coefficient acquisition section 341 determines tap coefficients for individual integration classes as reduction filter information from the reduction apparatus 321 as tap coefficients for individual classes to be used for a classification adaptive process and acquires the tap coefficient of the integration class of a noticed pixel from among the tap coefficients for the individual integration classes, and then supplies the tap coefficient to the prediction arithmetic operation section 25.

In particular, the coefficient acquisition section 341 converts the class (initial class) of the noticed pixel from the classification section 23 into an integration class in accordance with the corresponding relationship LUT as the reduction filter information from the reduction apparatus 321. Further, the coefficient acquisition section 341 acquires the tap coefficient of the integrated class of the noticed pixel from among the tap coefficients for the individual classes as the reduction filter information, and then supplies the tap coefficient to the prediction arithmetic operation section 25.

Figure 32:
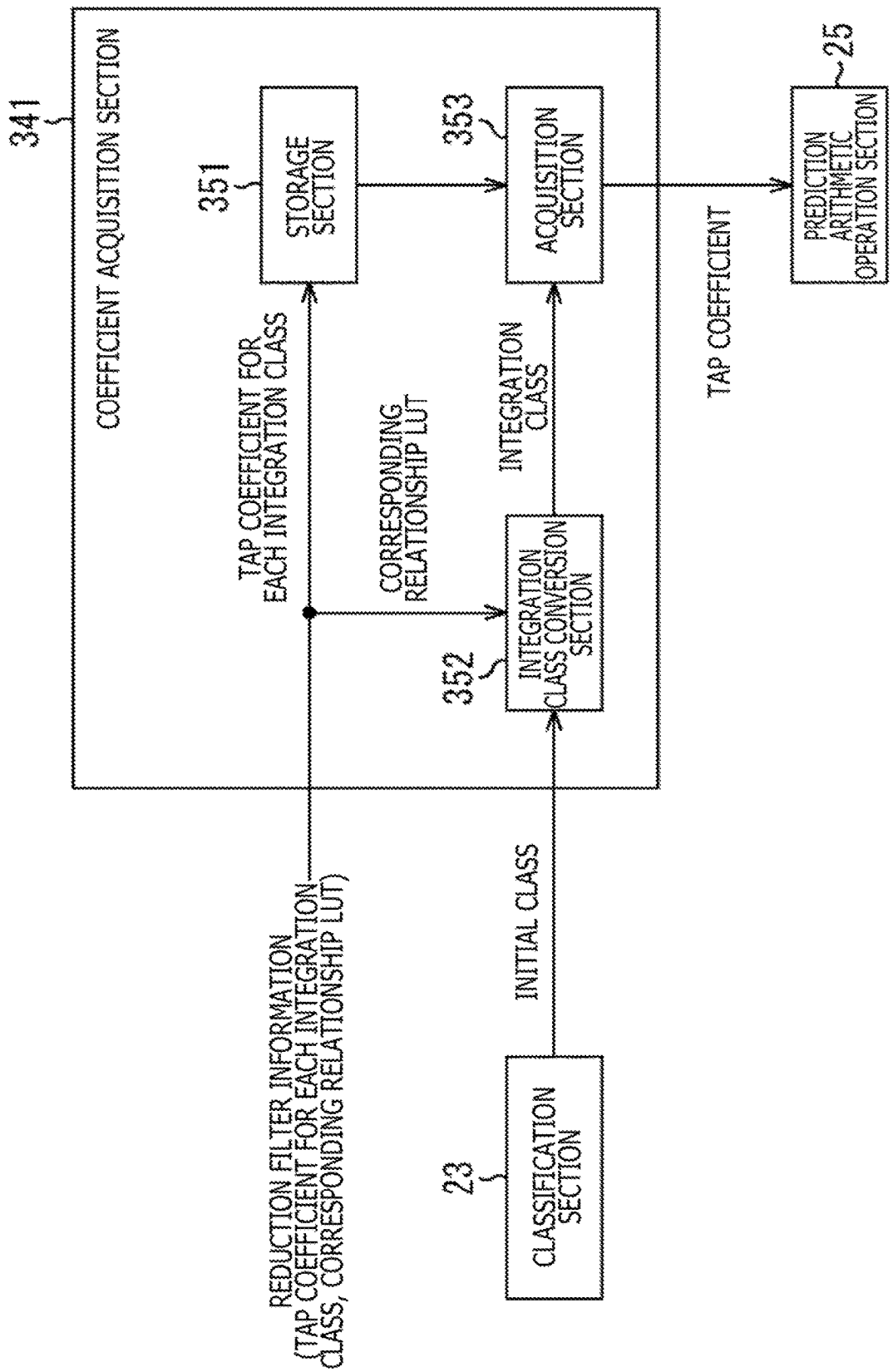
FIG. 32 is a block diagram depicting a configuration example of a coefficient acquisition section 341.

FIG. 32 is a block diagram depicting a configuration example of the coefficient acquisition section 341 of FIG. 31.

Referring to FIG. 32, the coefficient acquisition section 341 includes a storage section 351, an integration class conversion section 352 and an acquisition section 353.

To the storage section 351, tap coefficients for each integration class as reduction filter information are supplied from the reduction apparatus 321 (FIG. 30).

The storage section 351 has stored therein tap coefficients for the individual integration classes as the reduction filter information from the reduction apparatus 321.

To the integration class conversion section 352, an initial class as a classification result of a noticed pixel is supplied from the classification section 23. Further, to the integration class conversion section 352, a corresponding relationship LUT as reduction filter information is supplied from the reduction apparatus 321.

The integration class conversion section 352 converts the initial class of the noticed pixel into an integration class of the noticed pixel in accordance with the corresponding relationship LUT and supplies the integration class to the acquisition section 353.

The acquisition section 353 acquires the tap coefficient of the integration class of the noticed pixel from the integration class conversion section 352 from among the tap coefficients for the individual classes stored in the storage section 351 and supplies the acquired tap coefficient to the prediction arithmetic operation section 25.

<Encoding Process>

Figure 33:
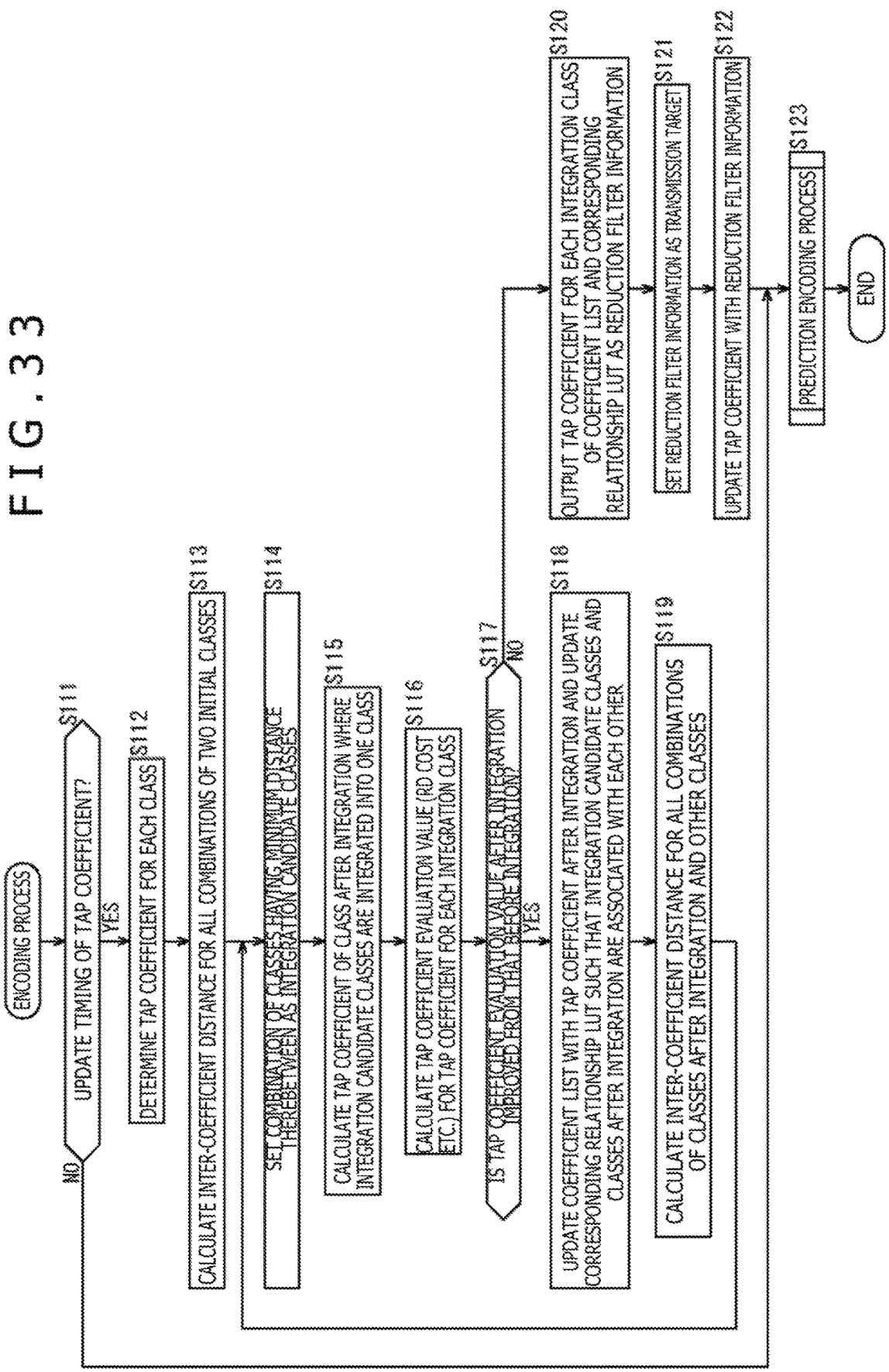
FIG. 33 is a flow chart illustrating an example of an encoding process of the encoding apparatus 11.

FIG. 33 is a flow chart illustrating an example of an encoding process of the encoding apparatus 11 of FIG. 27.

At step S111, the learning apparatus 131 (FIG. 28) of the classification adaptive filter 311 decides whether the timing at present is an update timing for tap coefficients similarly as at step S11 of FIG. 17.

In the case where it is decided at step S111 that the timing at present is not an update timing for tap coefficients, the processing advances to step S123 skipping steps S112 to S122.

On the other hand, in the case where it is decided at step S111 that the timing at present is an update timing for tap coefficients, the processing advances to step S112, at which the learning apparatus 131 performs tap coefficient learning similarly as at step S12 of FIG. 17.

Then, the learning apparatus 131 supplies tap coefficients for the individual classes (initial classes) obtained by the tap coefficient learning to the reduction apparatus 321, and the processing advances from step S112 to step S113.

At step S113, the class integration section 331 of the reduction apparatus 321 (FIG. 30) registers the tap coefficients for the individual initial classes whose tap coefficients are supplied from the learning apparatus 131 into the coefficient list of the storage section 332. Further, the class integration section 331 calculates an inter-coefficient distance in regard to all combinations of two classes from among the classes whose tap coefficient is registered in the coefficient list, and the processing advances from step S113 to step S114.

At step S114, the class integration section 331 selects two classes of a combination in which the inter-coefficient distance is smallest from among the combinations of two classes from among the classes whose tap coefficient is registered in the coefficient list of the storage section 332 (FIG. 30) as integration candidate classes, and the processing advances to step S115.

At step S115, the class integration section 331 calculates the tap coefficients of a class after integration in the case where the two integration candidate classes are integrated into one class, and the processing advances to step S116.

At step S116, the class integration section 331 calculates a tap coefficients evaluation value such as, for example, the RD cost in regard to tap coefficients for each integration class after the two integration candidate classes are integrated into one class at the immediately preceding step S115. Then, the processing advances to step S117.

Here, in the case where the step S116 is performed first after tap coefficients for each initial class are obtained, the learning apparatus 131 calculates a tap coefficient evaluation value in regard to the tap coefficients for each integration class after two integration candidate classes are integrated into one class, and calculates a tap coefficient evaluation value also in regard to the tap coefficients for each class before the integration, namely, in regard to the tap coefficients for each initial class.

At step S117, the class integration section 331 decides whether the tap coefficient evaluation value regarding tap coefficients for each integration class after two integration candidate classes are integrated into one class is improved from the tap coefficient evaluation value before the integration.

In the case where it is decided at step S117 that the tap coefficient evaluation value regarding tap coefficients for each integration class after two integration candidate classes are integrated into one class is improved, the processing advances to step S118.

At step S118, the class integration section 331 updates the coefficient list of the storage section 332 (FIG. 30) with the tap coefficients for the individual integration classes after two integration candidate classes are integrated into one class.

Further, the class integration section 331 supplies integration information representative of the two integration candidate classes integrated with each other and the class after the integration to the corresponding relationship detection section 333 (FIG. 30). The corresponding relationship detection section 333 updates the corresponding relationship LUT of the storage section 334 such that the two integration candidate classes integrated with each other and the class after the integration are associated with each other in accordance with the integration information supplied from the class integration section 331, and the processing advances from step S118 to step S119.

At step S119, the class integration section 331 calculates the inter-coefficient distance in regard to all of combinations of a class after integration (hereinafter referred to also as latest integration class) obtained by integration of two integration candidate classes performed immediately before then and a different class whose tap coefficient is registered in the coefficient list of the storage section 332.

Here, since the inter-coefficient distance in regard to the combination of two classes other than the latest integration class from among the classes whose tap coefficient is registered in the coefficient list of the storage section 332 has been calculated at step S113 or S119 performed in the past, later processing can be performed utilizing the inter-coefficient distance calculated already.

After the inter-coefficient distance is calculated at step S119, the processing returns to step S114, whereafter similar processes are repeated.

Then, in the case where it is decided at step S117 that the tap coefficient evaluation value in regard to the tap coefficients for each integration class after two integration candidate classes are integrated into one class is not improved, namely, in the case where, even if integration of the class is performed, the RD cost as the tap coefficient evaluation value does not improve any more, the processing advances to step S120.

At step S120, the reduction apparatus 321 outputs the tap coefficients for the individual classes (integration classes) registered in the coefficient list of the storage section 332 and the corresponding relationship LUT of the storage section 334 as reduction filter information to the reversible encoding section 106 (FIG. 27) and the image conversion apparatus 322 (FIG. 28), and the processing advances to step S121.

At step S121, the reversible encoding section 106 (FIG. 27) sets the reduction filter information from the reduction apparatus 321 as a transmission target, and the processing advances to step S122. The reduction filter information set as the transmission target is placed into and transmitted together with encoded data in the prediction encoding process to be performed at step S123 hereinafter described.

At step S122, in the image conversion apparatus 322 (FIG. 31), the storage section 351 of the coefficient acquisition section 341 (FIG. 32) updates the tap coefficients for the individual classes stored in the storage section 351 into the tap coefficients for the individual integration classes as the reduction filter information from the reduction apparatus 321 (stores the tap coefficients in the form that the tap coefficients for the individual integration classes as the reduction filter information are overwritten), and the processing advances to step S123.

At step S123, a prediction encoding process of the original image is performed, and the encoding process comes to an end.

Figure 34:
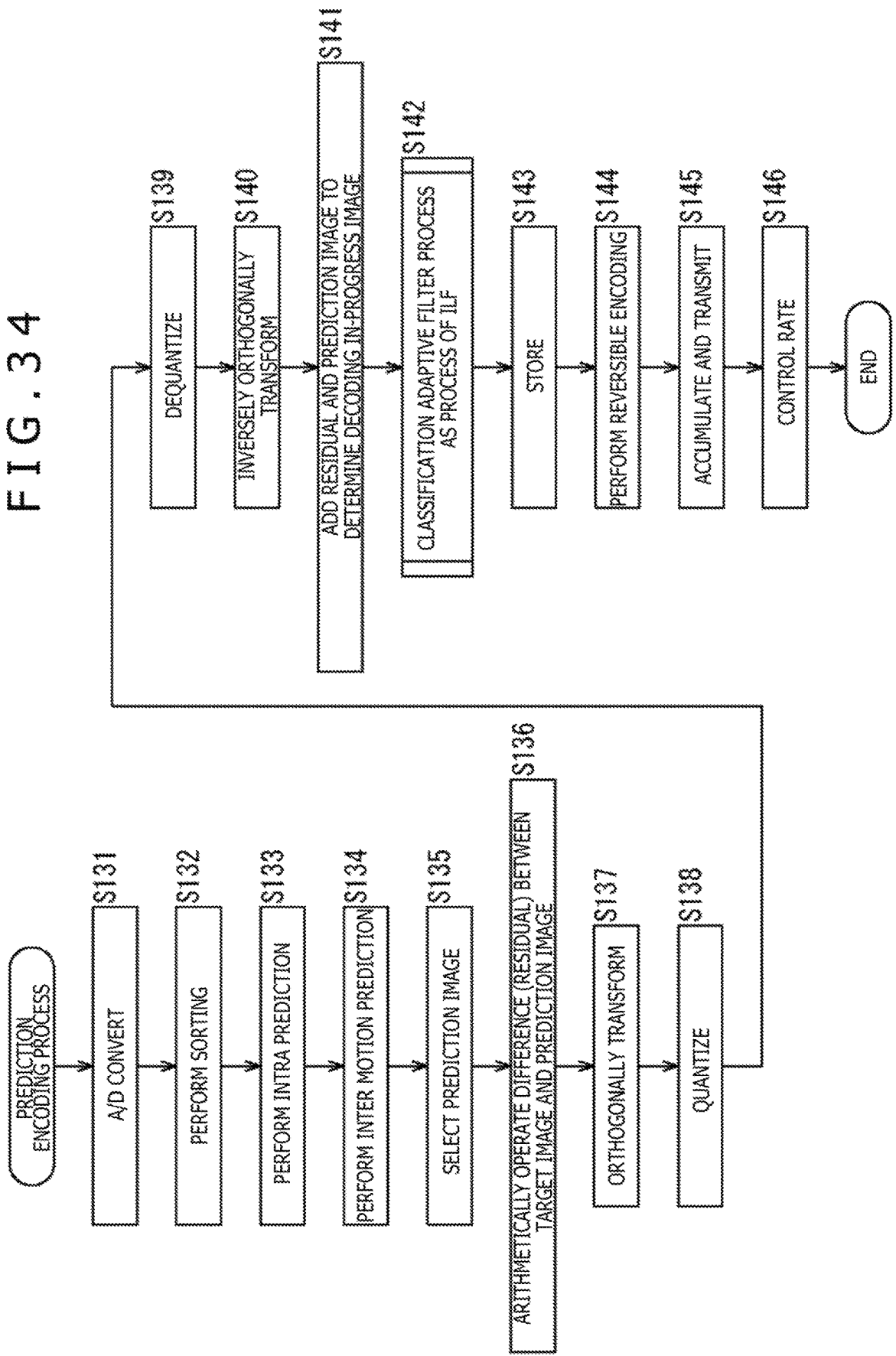
FIG. 34 is a flow chart illustrating an example of a prediction encoding process at step S123.

FIG. 34 is a flow chart illustrating an example of the prediction encoding process at step S123 of FIG. 33.

In the prediction encoding process, processes similar to those at steps S31 to S46 of FIG. 18 are performed at steps S131 to S146, respectively.

It is to be noted that, at step S142, the classification adaptive filter 311 performs a classification adaptive process as a process of an ILF for a decoding in-progress image from the arithmetic operation section 110 similarly as at step S42 of FIG. 18. However, in the classification adaptive process, tap coefficients for the individual integration classes and a corresponding relationship LUT as the reduction filter information to be outputted from the reduction apparatus 321 to the image conversion apparatus 322 are used at step S120 of FIG. 33.

Further, at step S144, the reversible encoding section 106 encodes the quantization coefficients, encoding information and reduction filter information similarly as at step S44 of FIG. 18. However, the reduction filter information includes the tap coefficients for the individual integration classes and the corresponding relationship LUT.

Accordingly, the encoded data obtained by the reversible encoding section 106 include the quantization coefficients, encoding information, and tap coefficients for the individual integration classes and corresponding relationship LUT as the reduction filter information. Then, such encoded data are read out from the accumulation buffer 107 and transmitted suitably as described in connection with step S45 of FIG. 18 at step S145.

Figure 35:
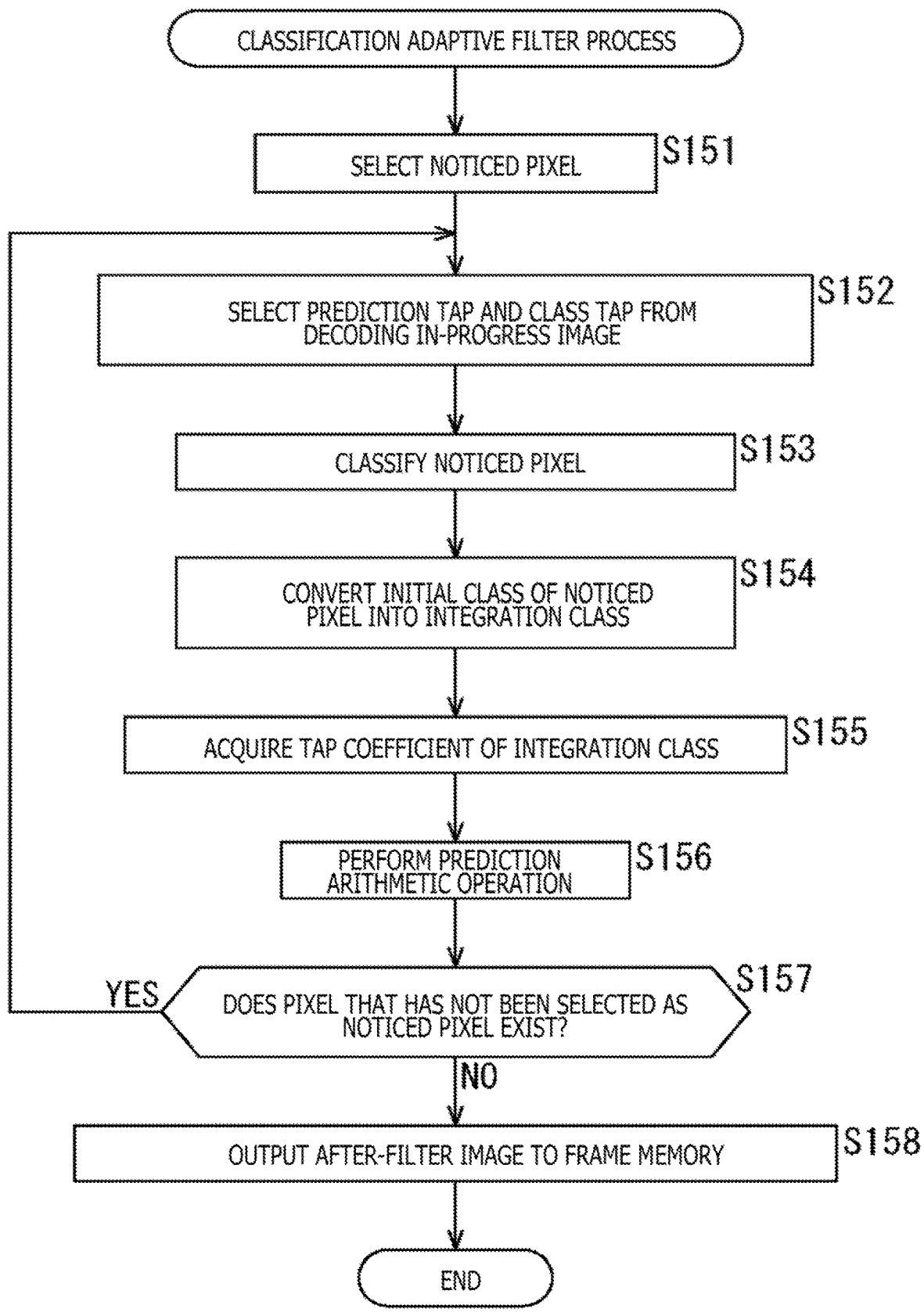
FIG. 35 is a flow chart illustrating an example of a classification adaptive process performed at step S142.

FIG. 35 is a flow chart illustrating an example of the classification adaptive process performed at step S142 of FIG. 34.

In the image conversion apparatus 322 (FIG. 31) of the classification adaptive filter 311, at step S151, the tap selection section 21 selects one of pixels that have not been selected as a noticed pixel as yet as a noticed pixel from within a decoding in-progress image supplied from the arithmetic operation section 110 similarly as at step S51 of FIG. 19, and the processing advances to step S152.

At step S152, the tap selection sections 21 and 22 select pixels to be made a prediction tap and a class tap regarding the noticed pixel from within the decoding in-progress image supplied from the arithmetic operation section 110 similarly as at step S52 of FIG. 19 and supply the selected pixels to the prediction arithmetic operation section 25 and the classification section 23, respectively.

Thereafter, the processing advances from step S152 to step S153, at which the classification section 23 performs classification of the noticed pixel using the class tap regarding the noticed pixel and the encoding information regarding the noticed pixel similarly as at step S53 of FIG. 19.

Then, the classification section 23 supplies an initial class of the noticed pixel obtained by classification of the noticed pixel to the coefficient acquisition section 341, and the processing advances from step S153 to step S154.

At step S154, the integration class conversion section 352 of the coefficient acquisition section 341 (FIG. 32) converts the initial class of the noticed pixel supplied from the classification section 23 into an integration class of the noticed pixel in accordance with the corresponding relationship LUT as the reduction filter information supplied from the reduction apparatus 321 at step S120 of FIG. 33. Then, the integration class conversion section 352 supplies the integration class of the noticed pixel to the acquisition section 353 (FIG. 32), and the processing advances from step S154 to step S155.

At step S155, the acquisition section 353 acquires the tap coefficients of the integration class of the noticed pixel from the integration class conversion section 352 from among the tap coefficients for the individual integration classes stored at step S122 of FIG. 33 into the storage section 351 and supplies the acquired tap coefficients to the prediction arithmetic operation section 25, and the processing advances to step S156.

At steps S156 to S158, processes similar to those at steps S55 to S57 of FIG. 19 are performed, respectively.

As described above, the encoding apparatus 11 of FIG. 27 transmits not the tap coefficients for the individual initial classes obtained by tap coefficient learning but the tap coefficients for the individual integration classes where the initial classes are integrated into the number of classes smaller than the number of the initial classes and the corresponding relationship LUT as the corresponding relationship information between the initial classes and the integration classes as reduction filter information.

Further, integration of the tap coefficients for the individual initial classes is performed in response to the RD costs as tap coefficient evaluation values each representative of appropriateness in use of the tap coefficients for each integration class in the classification adaptive process.

Accordingly, by integrating initial classes into a smaller number of integration classes, the compression efficiency and the S/N of the decoded image can be improved in comparison with those in an alternative case in which tap coefficients for individual initial classes are transmitted.

<Second Configuration Example of Decoding Apparatus 12>

Figure 36:
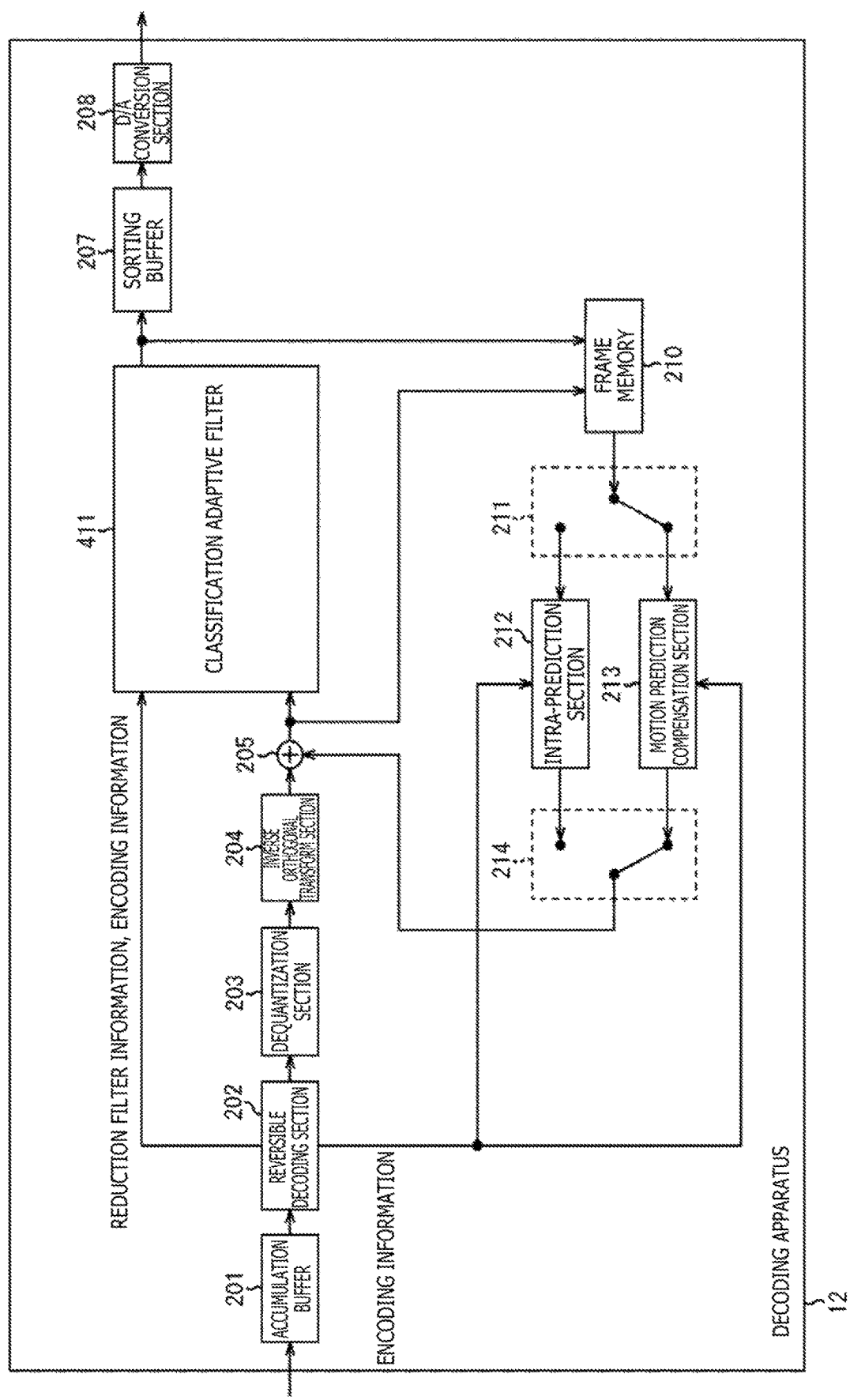
FIG. 36 is a block diagram depicting a second configuration example of the decoding apparatus 12.

FIG. 36 is a clock diagram depicting a second configuration example of the decoding apparatus 12 of FIG. 1.

It is to be noted that, in FIG. 36, elements corresponding to those of FIG. 20 are denoted by like reference numerals and description of them is hereinafter omitted suitably.

Referring to FIG. 36, the decoding apparatus 12 includes the components from the accumulation buffer 201 to the arithmetic operation section 205, the sorting buffer 207, the D/A conversion section 208, the components from the frame memory 210 to the selection section 214, and a classification adaptive filter 411.

Accordingly, the decoding apparatus 12 of FIG. 36 is common to that of FIG. 20 in that it includes the components from the accumulation buffer 201 to the arithmetic operation section 205, the sorting buffer 207, the D/A conversion section 208 and the components from the frame memory 210 to the selection section 214.

However, the decoding apparatus 12 of FIG. 36 is different from that of FIG. 20 in that it includes the classification adaptive filter 411 in place of the classification adaptive filter 206.

The decoding apparatus 12 of FIG. 36 decodes encoded data transmitted from the encoding apparatus 11 of FIG. 27.

Therefore, the reduction filter information supplied from the reversible decoding section 202 to the classification adaptive filter 411 includes tap coefficients for individual integration classes and a corresponding relationship LUT.

The classification adaptive filter 411 is a filter that functions as an ILF by performing a classification adaptive process and is common to the classification adaptive filter 206 of FIG. 20 in that it performs an ILF process by a classification adaptive process.

However, the classification adaptive filter 411 is different from the classification adaptive filter 206 in that it performs the classification adaptive process using the tap coefficients for the individual integration classes and the corresponding relationship LUT as the reduction filter information.

<Configuration Example of Classification Adaptive Filter 411>

Figure 37:
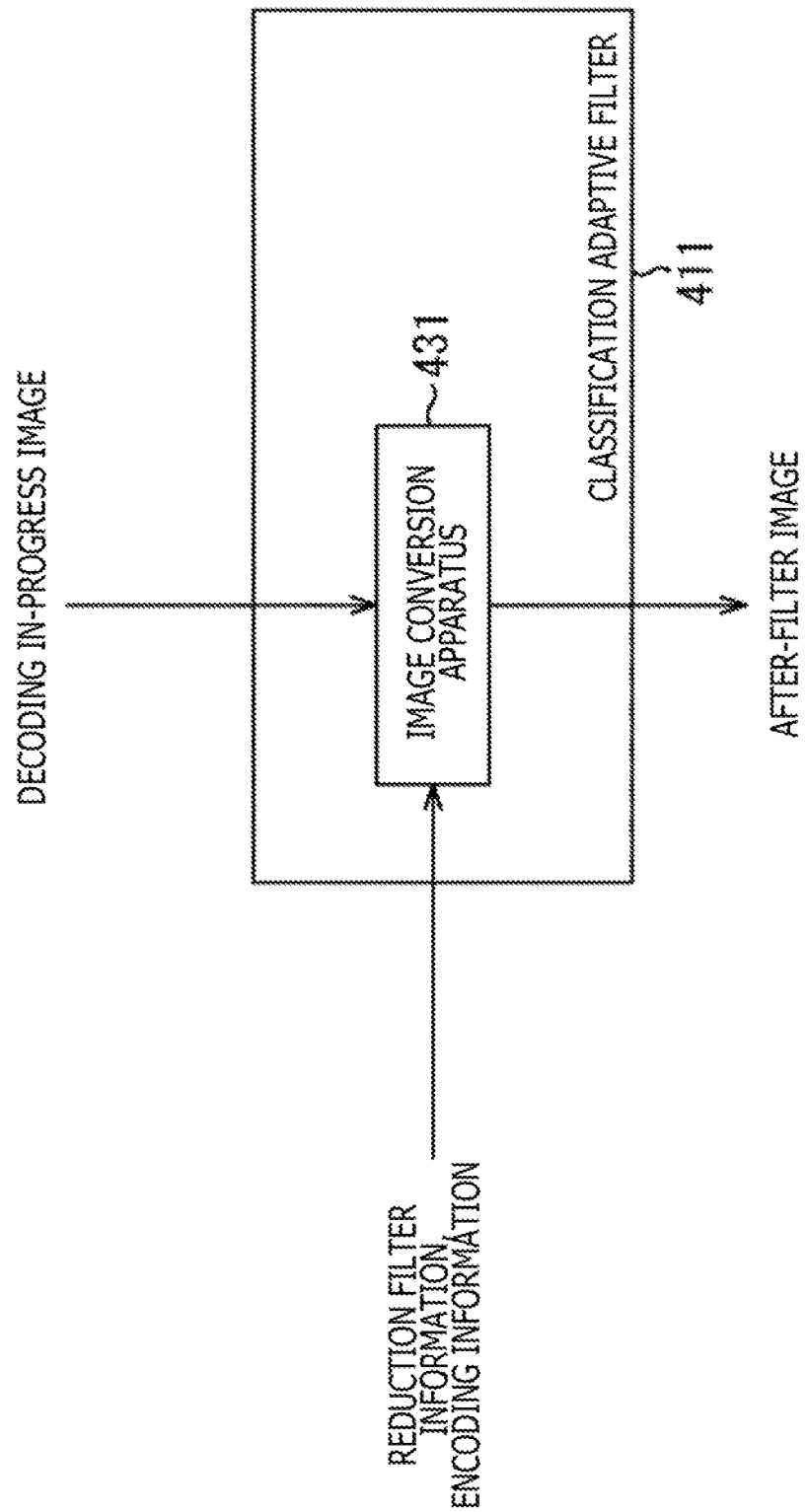
FIG. 37 is a block diagram depicting a configuration example of a classification adaptive filter 411.

FIG. 37 is a block diagram depicting a configuration example of the classification adaptive filter 411 of FIG. 36.

Referring to FIG. 37, the classification adaptive filter 411 includes an image conversion apparatus 431.

To the image conversion apparatus 431, a decoding in-progress image is supplied from the arithmetic operation section 205 (FIG. 36), and tap coefficients for individual integration classes and a corresponding relationship LUT as reduction filter information and encoding information are supplied from the reversible decoding section 202.

The image conversion apparatus 431 performs image conversion by a classification adaptive process using tap coefficients for individual integration classes (tap coefficients obtained using reduction filter information) and a corresponding relationship LUT as reduction filter information using a decoding in-progress image as a first image to convert the decoding in-progress image as the first information into an after-filter image as a second image equivalent to an original image (generates an after-filter image), and supplies the after-filter image to the sorting buffer 207 and the frame memory 210 (FIG. 36) similarly to the image conversion apparatus 322 of FIG. 28.

It is to be noted that the image conversion apparatus 431 performs, in the classification adaptive process, the classification using the encoding information as occasion demands similarly to the image conversion apparatus 322 of FIG. 28.

<Configuration Example of Image Conversion Apparatus 431>

Figure 38:
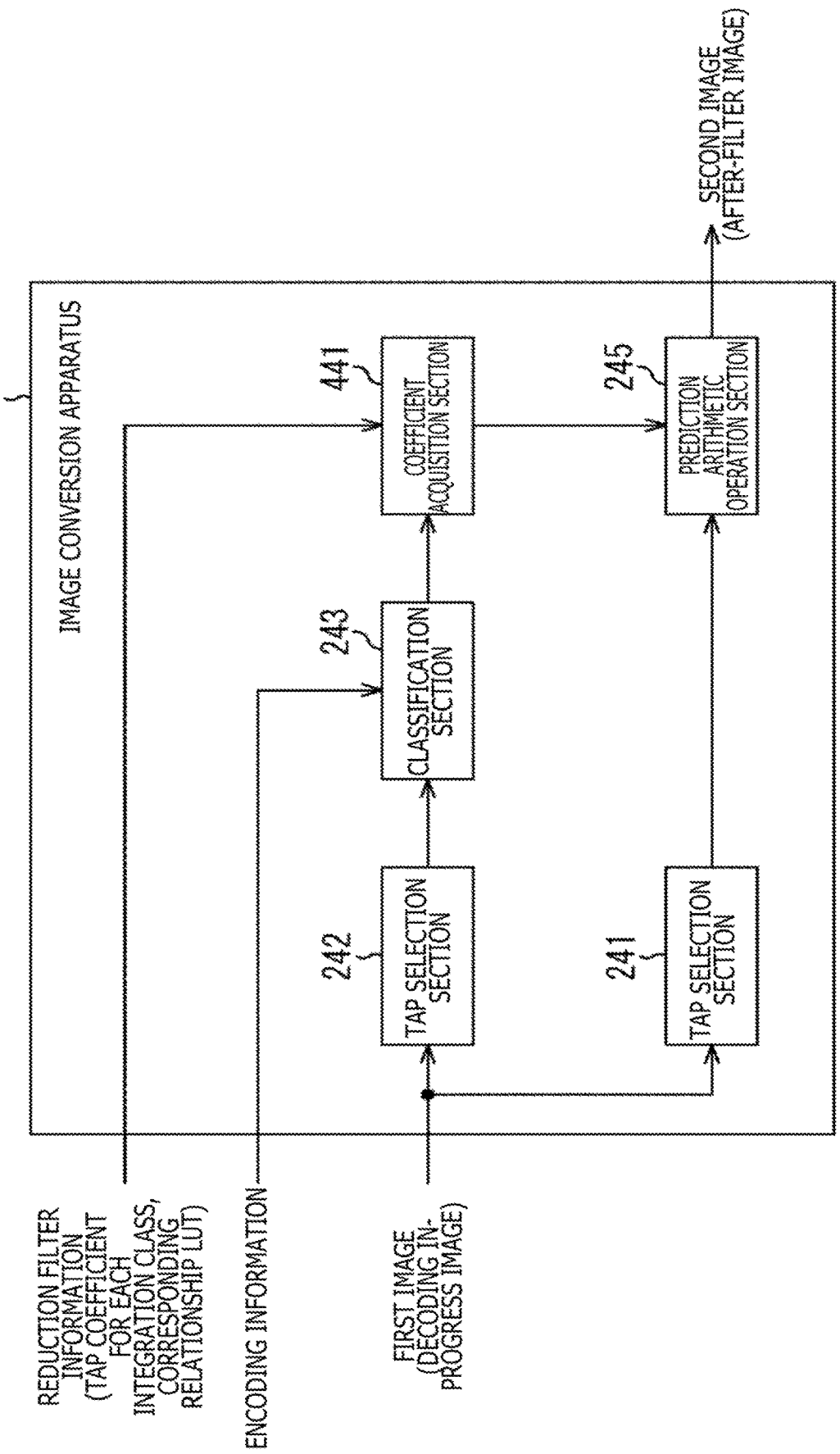
FIG. 38 is a block diagram depicting a configuration example of an image conversion apparatus 431.

FIG. 38 is a block diagram depicting a configuration example of the image conversion apparatus 431 of FIG. 37.

It is to be noted that, in FIG. 38, elements corresponding to those of the image conversion apparatus 231 of FIG. 22 are denoted by like reference numerals and description of them is hereinafter omitted suitably.

Referring to FIG. 38, the image conversion apparatus 431 includes the components from the tap selection section 241 to the classification section 243, the prediction arithmetic operation section 245 and a coefficient acquisition section 441.

Accordingly, the image conversion apparatus 431 of FIG. 38 is common to the image conversion apparatus 231 of FIG. 22 in that it includes the components from the tap selection section 241 to the classification section 243 and the prediction arithmetic operation section 245.

However, the image conversion apparatus 431 of FIG. 38 is different from the image conversion apparatus 231 of FIG. 22 in that it includes the coefficient acquisition section 441 in place of the coefficient acquisition section 244.

To the coefficient acquisition section 441, tap coefficients for individual integration classes as reduction filter information and a corresponding relationship LUT are supplied from the reversible decoding section 202 (FIG. 36).

The coefficient acquisition section 441 acquires, setting tap coefficients for individual integration classes as reduction filter information from the reversible decoding section 202 as tap coefficients for individual classes to be used in a classification adaptive process, tap coefficients of an integration class of a noticed pixel from the tap coefficients for the individual integration classes, and supplies the acquired tap coefficient to the prediction arithmetic operation section 245.

In particular, the coefficient acquisition section 441 converts a class (initial class) of the noticed pixel from the classification section 243 into an integration class in accordance with the corresponding relationship LUT as reduction filter information from the reversible decoding section 202. Further, the coefficient acquisition section 441 acquires tap coefficients of the integration class of the noticed pixel from the tap coefficients for the individual integration classes as the reduction filter information, and supplies the acquired tap coefficient to the prediction arithmetic operation section 245.

Figure 39:
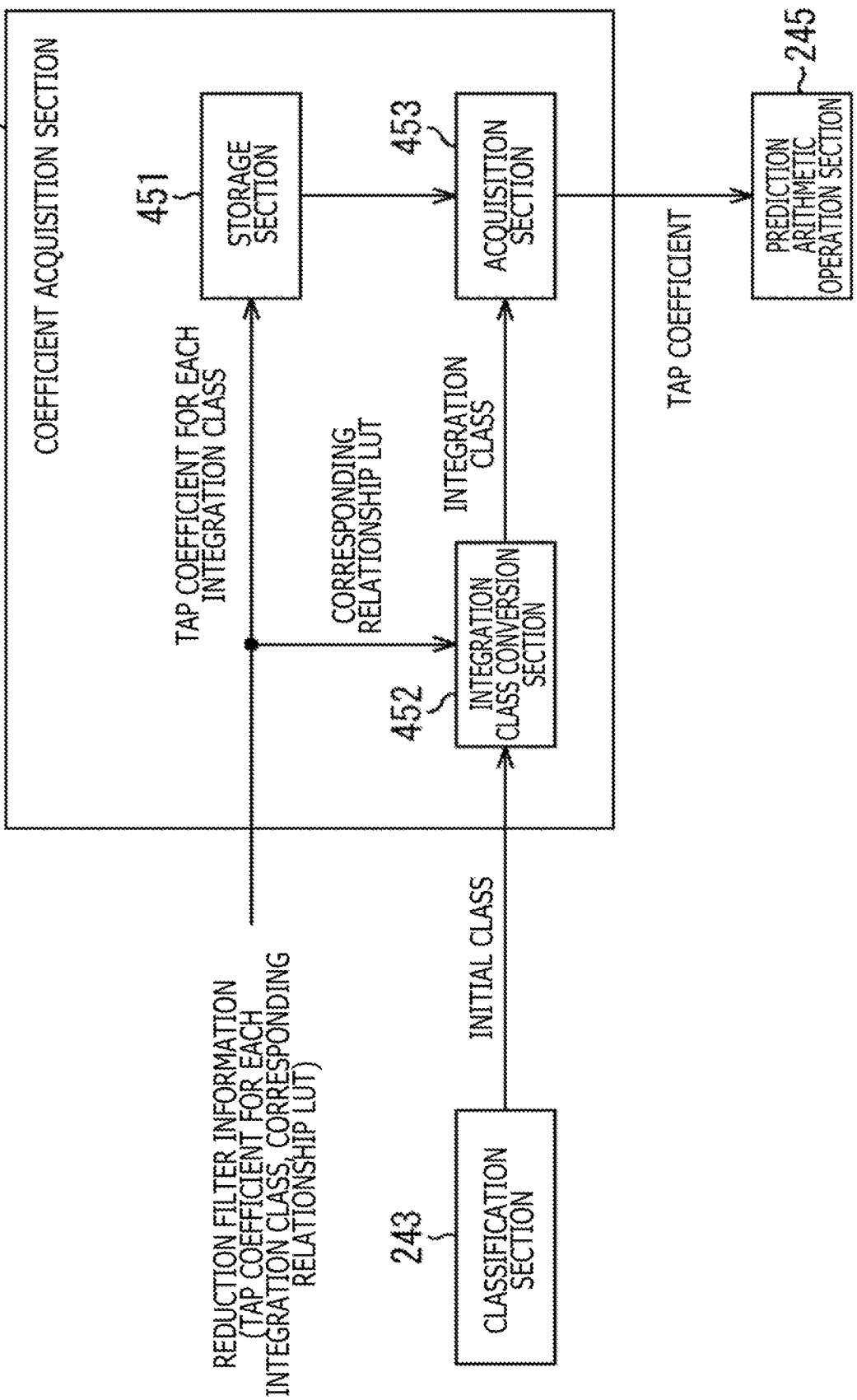
FIG. 39 is a block diagram depicting a configuration example of a coefficient acquisition section 441.

FIG. 39 is a block diagram depicting a configuration example of the coefficient acquisition section 441 of FIG. 38.

Referring to FIG. 39, the coefficient acquisition section 441 includes a storage section 451, an integration class conversion section 452 and an acquisition section 453. The storage section 45 to the acquisition section 453 are configured similarly to the components from the storage section 351 to the acquisition section 353 of FIG. 32, respectively.

In particular, to the storage section 451, tap coefficients for each integration class as reduction filter information are supplied from the reversible decoding section 202 (FIG. 36).

The storage section 451 stores the tap coefficients for individual integration classes as reduction filter information from the reversible decoding section 202.

To the integration class conversion section 452, an initial class as a classification result of classification of a noticed pixel is supplied from the classification section 243. Further, to the integration class conversion section 452, a corresponding relationship LUT as reduction filter information is supplied from the reversible decoding section 202.

The integration class conversion section 452 converts the initial class of the noticed pixel into an integration class of the noticed pixel in accordance with the corresponding relationship LUT and supplies the integration class to the acquisition section 453.

The acquisition section 453 acquires tap coefficients of the integration class of the noticed pixel from the integration class conversion section 452 from among the tap coefficients for the individual integration classes stored in the storage section 451, and then supplies the tap coefficient to the prediction arithmetic operation section 245.

<Decoding Process>

Figure 40:
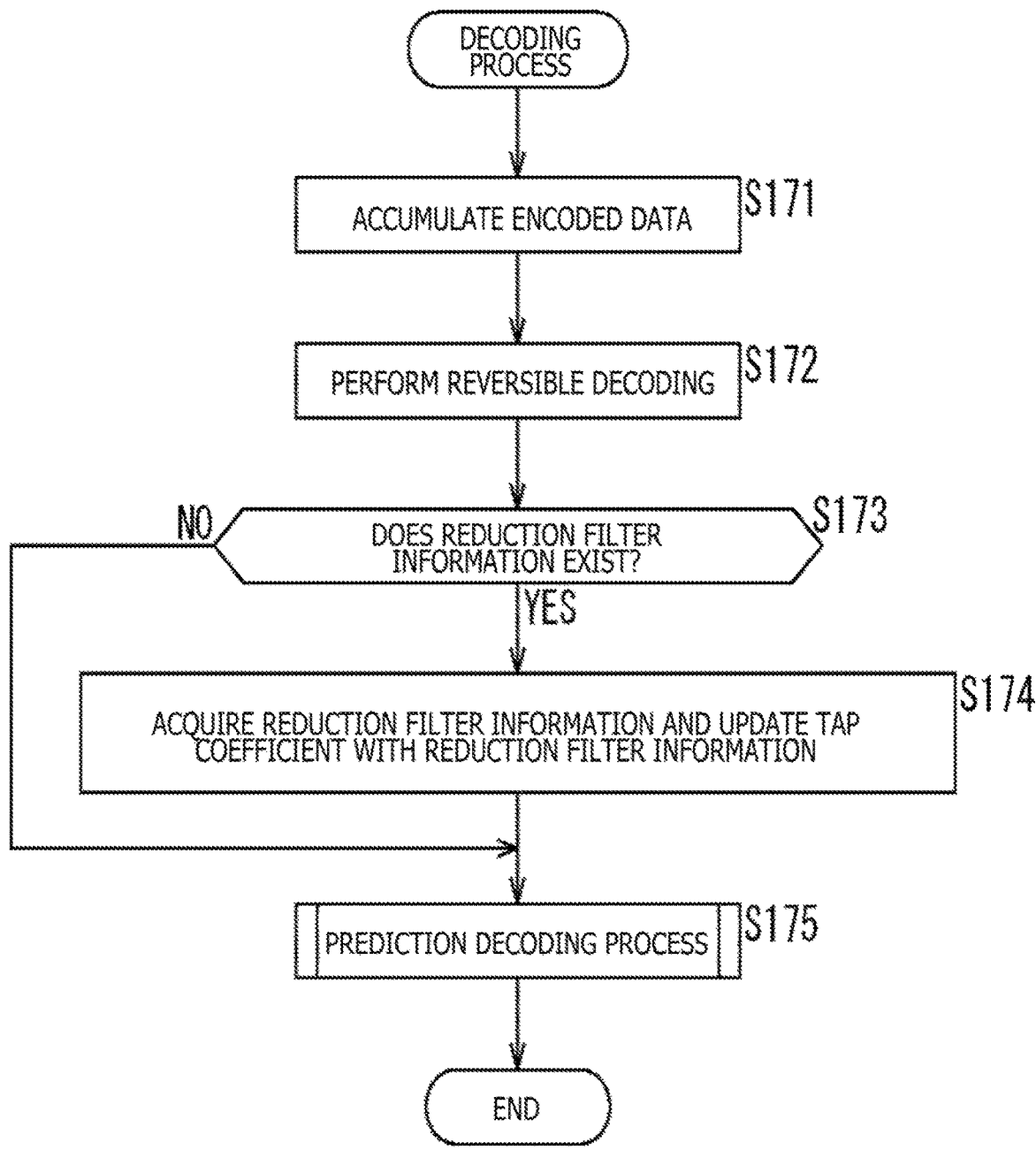
FIG. 40 is a flow chart illustrating an example of a decoding process of the decoding apparatus 12.

FIG. 40 is a flow chart illustrating an example of a decoding process of the decoding apparatus 12 of FIG. 36.

In the decoding process, at step S171, the accumulation buffer 201 temporarily accumulates encoded data transmitted thereto from the encoding apparatus 11 similarly as at step S71 of FIG. 24 and suitably supplies the encoded data to the reversible decoding section 202, and the processing advances to step S172.

At step S172, the reversible decoding section 202 receives and decodes the encoded data supplied from the accumulation buffer 201 similarly as at step S72 of FIG. 24, and supplies a quantization coefficient obtained by the decoding to the dequantization section 203.

Further, in the case where encoding information and reduction filter information are obtained by the decoding of the encoded data, the reversible decoding section 202 supplies necessary encoding information to the intra-prediction section 212, motion prediction compensation section 213 and other necessary blocks.

Further, the reversible decoding section 202 supplies the encoding information and the reduction filter information to the classification adaptive filter 411.

Thereafter, the processing advances from step S172 to step S173, at which the classification adaptive filter 411 decides whether reduction filter information is supplied from the reversible decoding section 202.

In the case where it is decided at step S173 that reduction filter information is not supplied, the processing advances to step S175 skipping step S174.

On the other hand, in the case where it is decided at step S173 that reduction filter information is supplied, the processing advances to step S174, at which the coefficient acquisition section 441 configuring the image conversion apparatus 431 (FIG. 38) of the classification adaptive filter 411 acquires the tap coefficients for individual integration classes as reduction filter information and a corresponding relationship LUT.

Further, in the coefficient acquisition section 441 (FIG. 39), the storage section 451 updates the tap coefficients for the individual classes stored in the storage section 451 into the tap coefficients for the individual integration classes as the reduction filter information (stores in such a form that the tap coefficients for the individual integration classes as the reduction filter information are overwritten).

Then, the processing advances from step S174 to step S175, at which a prediction decoding process is performed, and the decoding process is ended.

Figure 41:
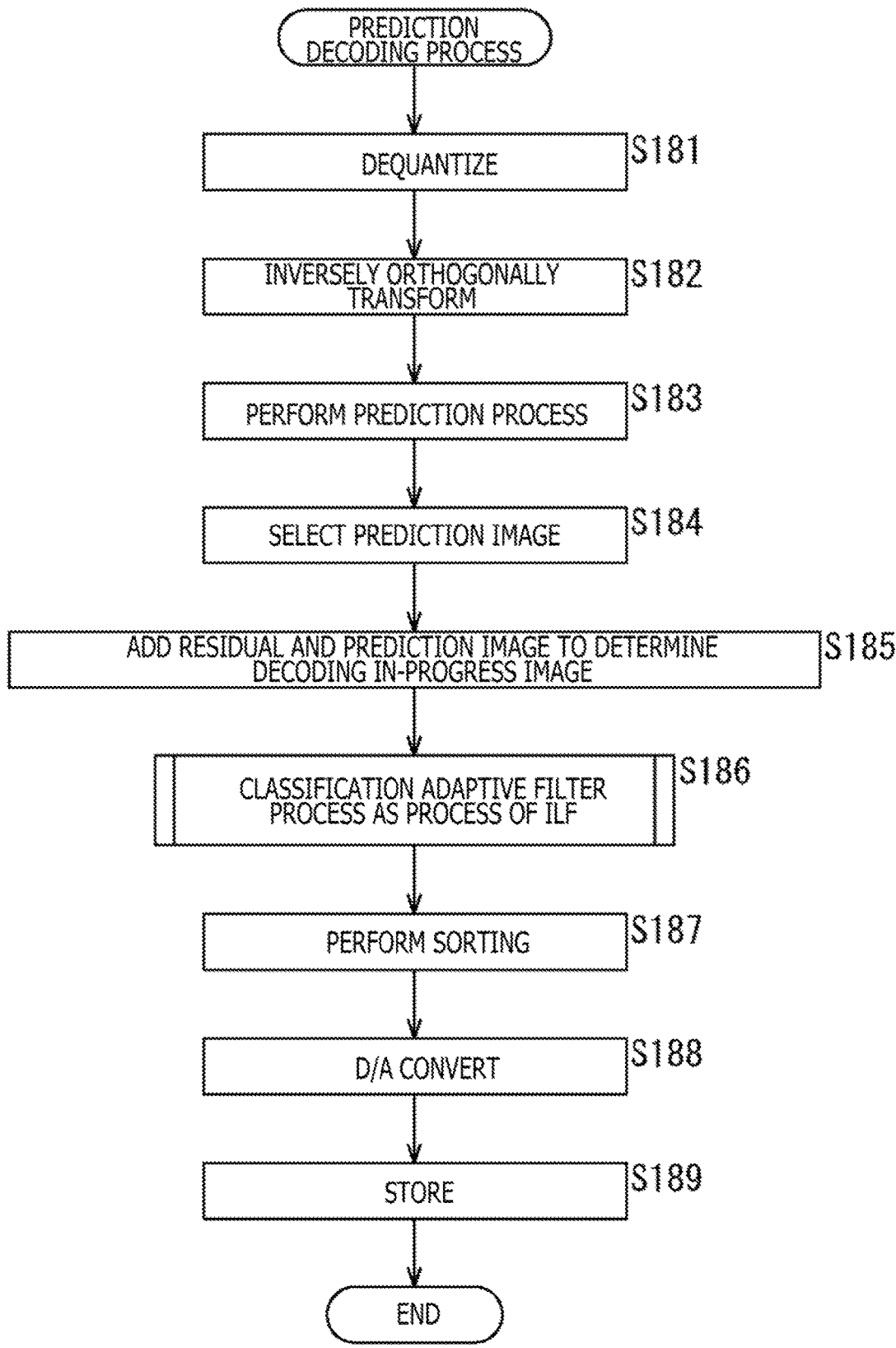
FIG. 41 is a flow chart illustrating an example of a prediction decoding process at step S175.

FIG. 41 is a flow chart illustrating an example of the prediction decoding process at step S175 of FIG. 40.

In the prediction decoding process, at steps S181 to S189, processes similar to those at steps S81 to S89 of FIG. 25 are performed, respectively.

It is to be noted that, although, at step S186, the classification adaptive filter 411 performs a classification adaptive process as a process of an ILF for a decoding in-progress image from the arithmetic operation section 205 similarly as at step S86 of FIG. 25, in the classification adaptive process, tap coefficients for individual integration classes and a corresponding relationship LUT as reduction filter information acquired by the coefficient acquisition section 441 at step S174 of FIG. 40 are used.

Figure 42:
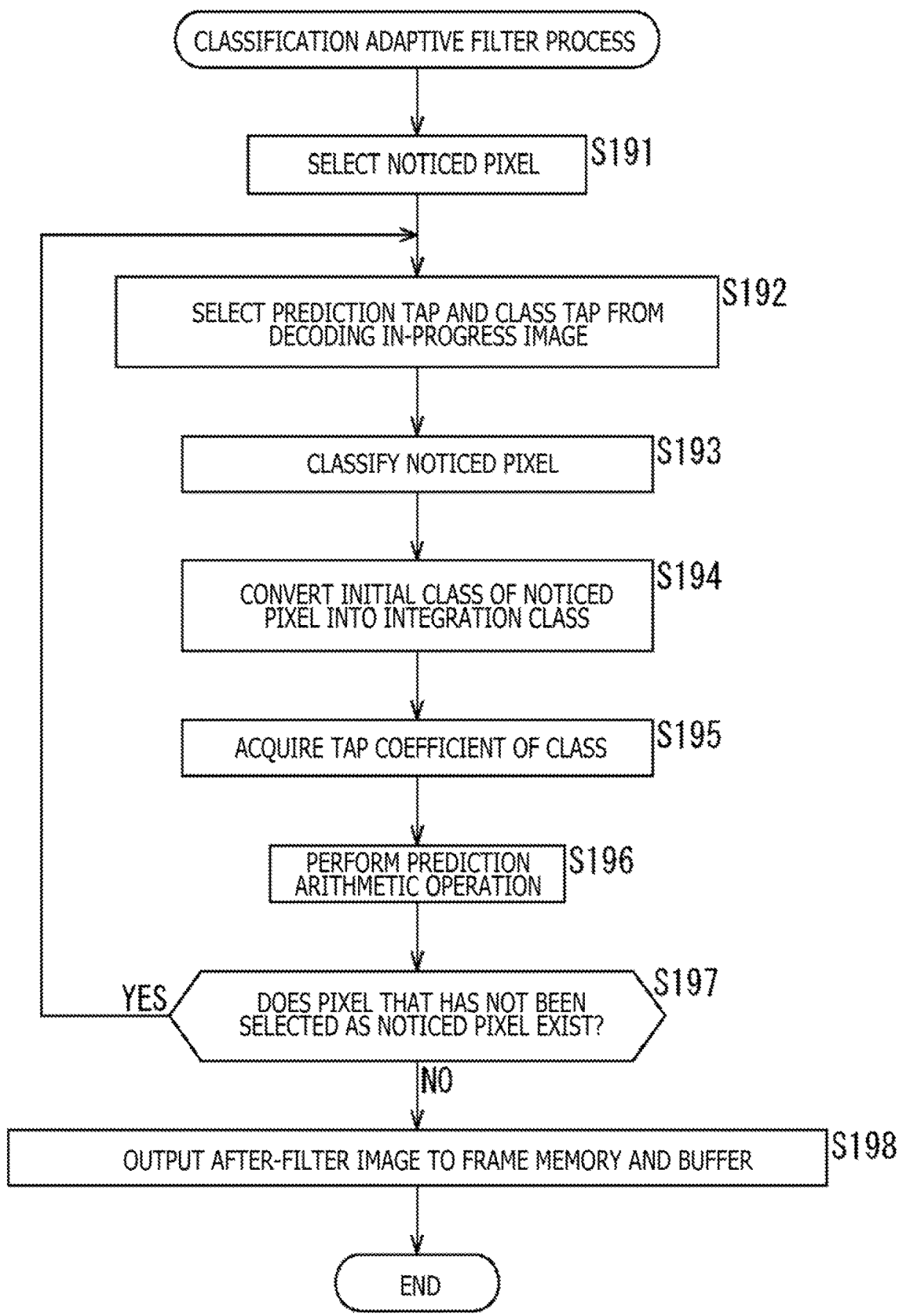
FIG. 42 is a flow chart illustrating an example of a classification adaptive process performed at step S186.

FIG. 42 is a flow chart illustrating an example of the classification adaptive process performed at step S186 of FIG. 41.

In the image conversion apparatus 431 (FIG. 38) of the classification adaptive filter 411, at step S191, the tap selection section 241 selects one of pixels that have not been made a noticed pixel as yet from within the decoding in-progress image supplied from the arithmetic operation section 205 similarly as at step S91 of FIG. 26, and the processing advances to step S192.

At step S192, the tap selection sections 241 and 242 select pixels to be made a prediction tap and a class tap regarding a noticed pixel from the decoding in-progress image supplied from the arithmetic operation section 205 similarly as at step S92 of FIG. 26 and supplies the pixels to the prediction arithmetic operation section 245 and the classification section 243, respectively.

Thereafter, the processing advances from step S192 to step S193, at which the classification section 243 performs classification of the noticed pixel using the class tap regarding the noticed pixel and the encoding information regarding the noticed pixel similarly as at step S93 of FIG. 26.

Then, the classification section 243 supplies an initial class of the noticed pixel obtained by classification of the noticed pixel to the coefficient acquisition section 441, and the processing advances from step S193 to step S194.

At step S194, the integration class conversion section 452 of the coefficient acquisition section 441 (FIG. 39) converts the initial class of the noticed pixel supplied from the classification section 243 into an integration class of the noticed pixel in accordance with the corresponding relationship LUT as the reduction filter information acquired by the coefficient acquisition section 441 at step S174 of FIG. 40. Then, the integration class conversion section 452 supplies the integration class of the noticed pixel to the acquisition section 453 (FIG. 39), and the processing advances from step S194 to step S195.

At step S195, the acquisition section 453 acquires tap coefficients of the integrated class of the noticed pixel from the integration class conversion section 452 from among the tap coefficients for the individual integration classes stored at step S174 of FIG. 40 into the storage section 451, and supplies the tap coefficients to the prediction arithmetic operation section 245. Then, the processing advances to step S196.

At steps S196 to S198, processes similar to those at steps S95 to S97 of FIG. 26 are performed, respectively.

Since the encoding apparatus 11 of FIG. 27 and the decoding apparatus 12 of FIG. 36 perform an ILF process by a classification adaptive process in such a manner as described above, an after-filter image closer to the original image than a process result of an ILF can be obtained. As a result, the S/N of the decoded image can be improved. Further, since an after-filter image close to the original image can be obtained, the residual becomes small, and therefore, the compression efficiency can be improved. Further, in the encoding apparatus 11, tap coefficients of initial classes are integrated such that the tap coefficient evaluation value is improved to generate reduction filter information in which tap coefficients for each class are reduced, and not tap coefficients for the individual initial classes but reduction filter information is transmitted to the decoding apparatus 12. Therefore, the compression efficiency can be improved further.

<Third Configuration Example of Encoding Apparatus 11>

Figure 43:
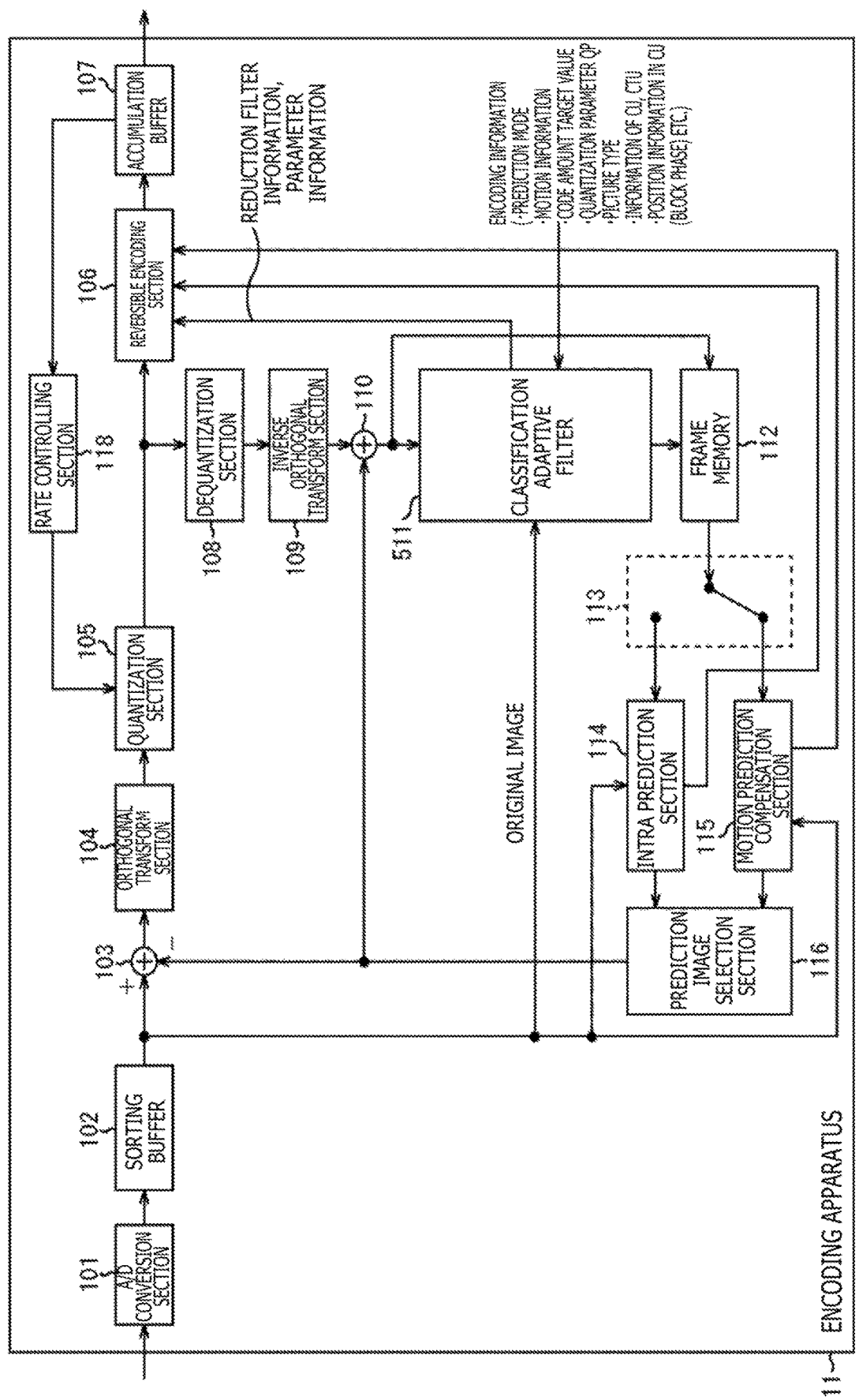
FIG. 43 is a block diagram depicting a third configuration example of the encoding apparatus 11.

FIG. 43 is a block diagram depicting a third configuration example of the encoding apparatus 11 of FIG. 1.

It is to be noted that, in FIG. 43, elements corresponding to those of FIG. 9 are denoted by like reference numerals and description of them is hereinafter omitted suitably.

Referring to FIG. 43, the encoding apparatus 11 includes the components from the A/D conversion section 101 to the arithmetic operation section 110 and from the frame memory 112 to the rate controlling section 117, and a classification adaptive filter 511.

Accordingly, the encoding apparatus 11 of FIG. 43 is common to that of FIG. 9 in that it includes the components from the A/D conversion section 101 to the arithmetic operation section 110 and from the frame memory 112 to the rate controlling section 117.

However, the encoding apparatus 11 of FIG. 43 is different from that of FIG. 9 in that it includes the classification adaptive filter 511 in place of the classification adaptive filter 111.

The classification adaptive filter 511 is a filter that functions as an ILF by executing a classification adaptive process, and is common to the classification adaptive filter 111 in that is performs an ILF process by the classification adaptive process.

However, the classification adaptive filter 511 is different from the classification adaptive filter 111 in that, in the classification adaptive filter 511, a seed coefficient for each class $((\beta_{m,n})$ of the expression (9)) is generated as reduction filter information in the reduction process for generating reduction filter information that reduces tap coefficients for each class.

Further, the classification adaptive filter 511 is different from the classification adaptive filter 111 in that it performs a classification adaptive process using tap coefficients for each class obtained using a seed coefficient for each class as reduction filter information.

In particular, the classification adaptive filter 511 is different from the classification adaptive filter 111 in that tap coefficients for each class is generated from a seed coefficient for each class as reduction filter information.

Further, the classification adaptive filter 511 is different from the classification adaptive filter 111 in that, in the classification adaptive filter 511, not only reduction filter information but also parameter information are supplied to the reversible encoding section 106 and transmitted.

In particular, as described hereinabove with reference to FIGS. 5 to 8, although, for example, a parameter z is necessitated to generate tap coefficients from a seed coefficient, the classification adaptive filter 511 supplies parameter information relating to the parameter z to be used to generate tap coefficients from a seed coefficient to the reversible encoding section 106.

Consequently, the parameter information is placed into and transmitted together with, for example, encoded data similarly to reduction filter information.

It is to be noted that, as described hereinabove with reference to FIGS. 5 to 8, as the parameter that is used when tap coefficients are generated from a seed coefficient, in addition to one (kind of) parameter z, a plurality of parameters such as two parameters $z_x$ and $z_y$ or three parameters $z_x$, $z_y$ and $z_t$. However, in the following description, in order to simplify description, it is assumed that one parameter z is adopted as the parameter to be used when tap coefficients are generated from a seed coefficient.

<Configuration Example of Classification Adaptive Filter 511>

Figure 44:
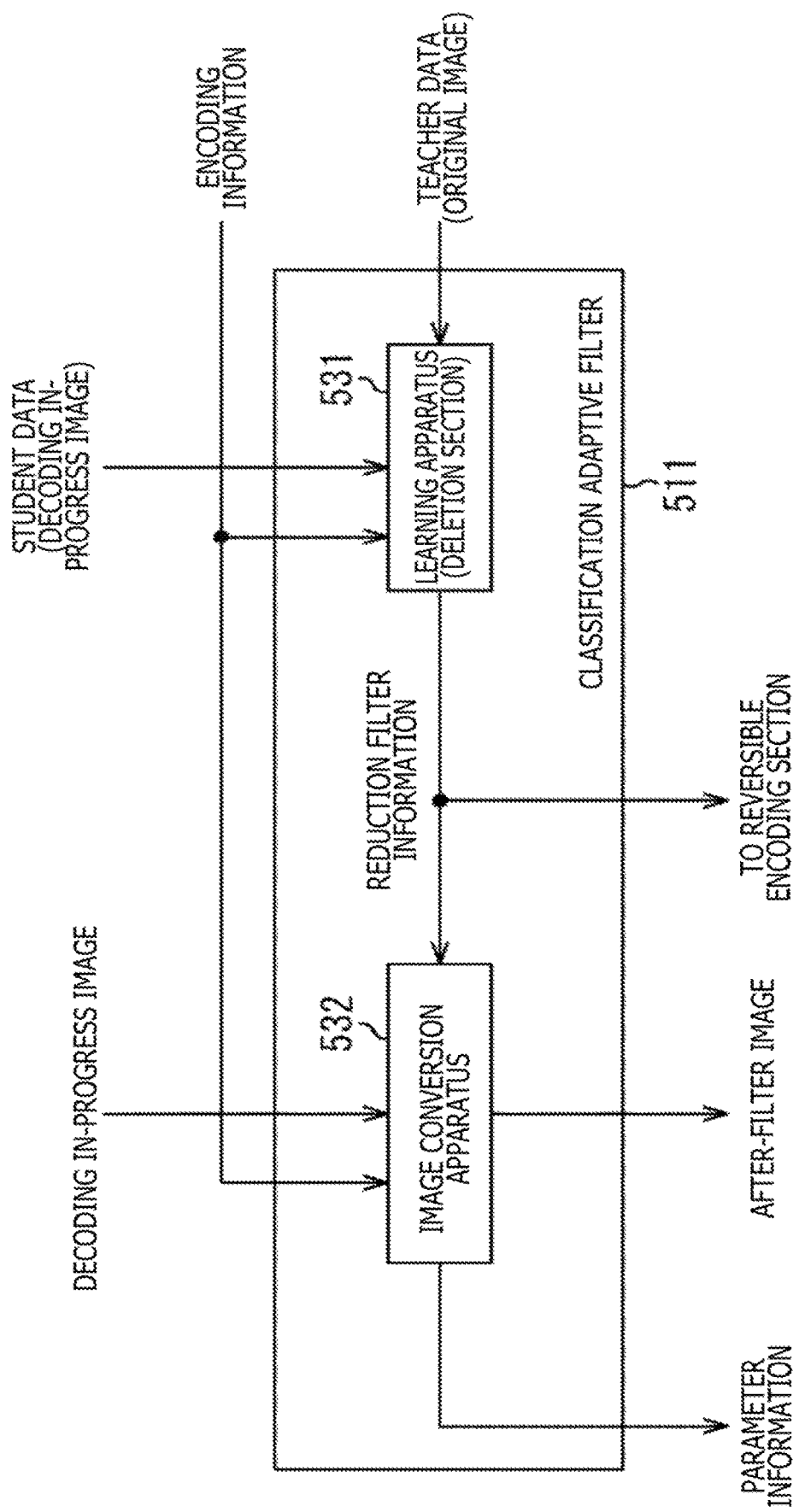
FIG. 44 is a block diagram depicting a configuration example of a classification adaptive filter 511.

FIG. 44 is a block diagram depicting a configuration example of the classification adaptive filter 511 of FIG. 43.

Referring to FIG. 44, the classification adaptive filter 511 includes a learning apparatus 531 and an image conversion apparatus 322.

To the learning apparatus 531, an original image is supplied from the sorting buffer 102 (FIG. 43) and a decoding in-progress image is supplied from the arithmetic operation section 110 (FIG. 43). Further, encoding information is supplied to the learning apparatus 531.

The learning apparatus 531 uses the decoding in-progress image as student data and uses the original image as teacher data to perform learning for determining a seed coefficient for each class (hereinafter referred to also as seed coefficient learning).

Further, the learning apparatus 531 supplies seed coefficients for individual classes obtained by seed coefficient learning as reduction filter information that reduces tap coefficients for the individual classes obtained by tap coefficient learning to the image conversion apparatus 532 and the reversible encoding section 106 (FIG. 43).

Here, according to the seed coefficient, since tap coefficients can be determined for the parameter z of various values can be determined in accordance with the expression (9), it can be considered that the seed coefficient is information that reduces the tap coefficients for the parameter z of the plurality of values (reduction filter information).

Accordingly, the learning apparatus 531 functions as a learning apparatus that determines seed coefficients for individual classes by seed coefficient learning and functions also as a reduction section that reduces reduction filter information that reduces tap coefficients for individual classes.

It is to be noted that the learning apparatus 531 performs, in the seed coefficient learning, classification using the encoding information as occasion demands.

To the image conversion apparatus 532, a decoding in-progress image is supplied from the arithmetic operation section 110 (FIG. 43) and reduction filter information is supplied from the learning apparatus 531. Further, encoding information is supplied to the image conversion apparatus 532.

The image conversion apparatus 532 determines tap coefficients for individual classes using seed coefficients for individual classes as reduction filter information of the learning apparatus 531. Further, the image conversion apparatus 532 performs, setting the decoding in-progress image as a first image, image conversion by a classification adaptive process in which the tap coefficients for the individual classes are used to convert the decoding in-progress image as the first image into an after-filter image as a second image equivalent to the original image (generates an after-filter image), and supplies the after-filter image to the frame memory 112 (FIG. 43).

Further, when to determine tap coefficients for the individual classes, the image conversion apparatus 532 uses the parameter z in addition to the seed coefficients for the individual classes as the reduction filter information, and supplies parameter information relating to the parameter z to the reversible encoding section 106 (FIG. 43).

It is to be noted that the image conversion apparatus 532 performs, in the classification adaptive process, classification using the encoding information as occasion demands.

<Configuration Example of Learning Apparatus 531>

Figure 45:
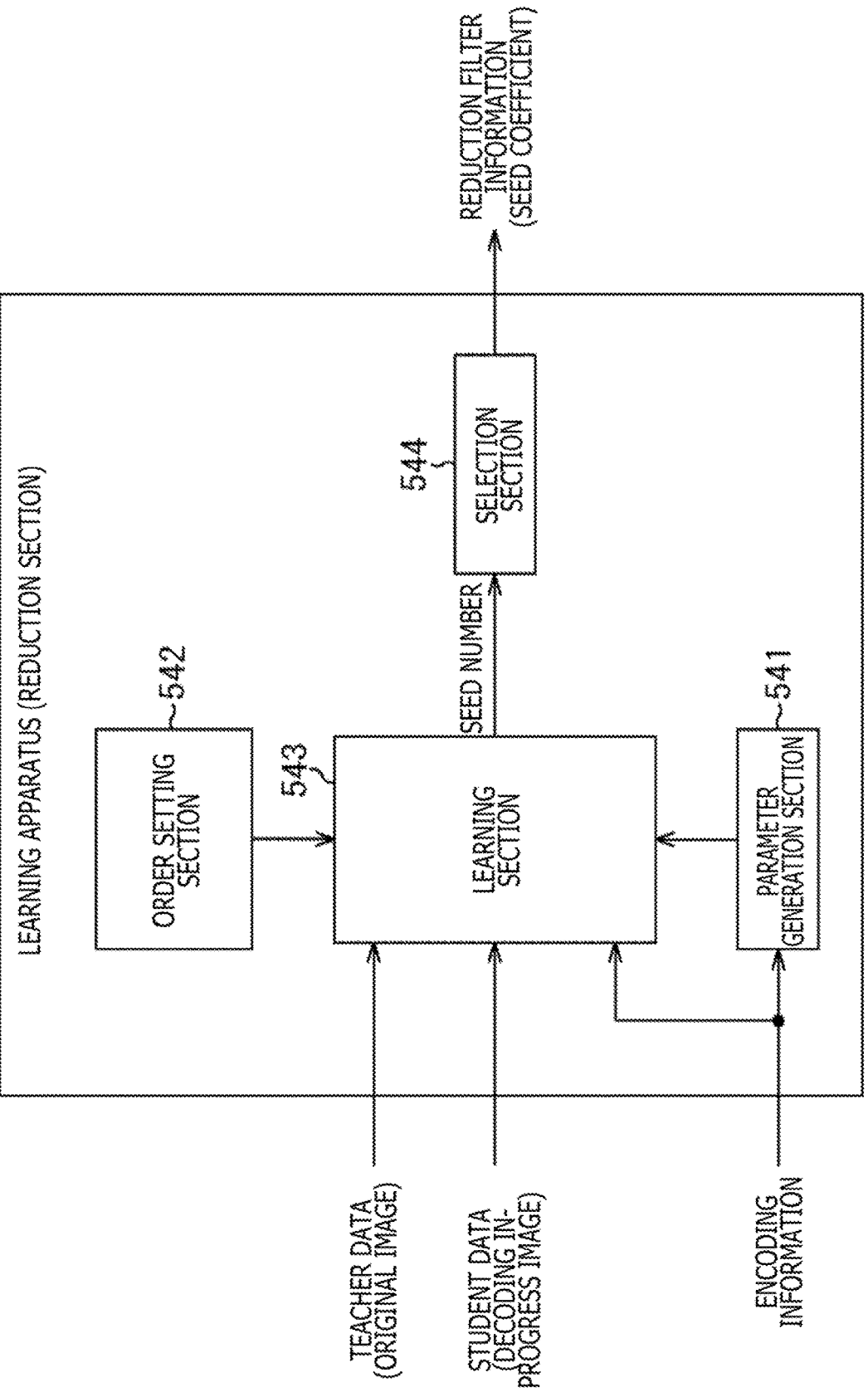
FIG. 45 is a block diagram depicting a configuration example of a learning apparatus 531.

FIG. 45 is a block diagram depicting a configuration example of the learning apparatus 531 of FIG. 44.

Referring to FIG. 45, the learning apparatus 531 includes a parameter generation section 541, an order setting section 542, a learning section 543 and a selection section 544.

To the parameter generation section 541, encoding information is supplied. The parameter generation section 541 generates a parameter z of a value, for example, according to encoding information of a noticed pixel (including encoding information of a block including the noticed pixel, encoding information of a frame (picture) including the noticed pixel and so forth) from within the encoding information supplied thereto, and supplies the parameter z to the learning section 543.

Here, as the encoding information of the noticed pixel to be used for generation of a parameter z, encoding information suitable for implementing an ILF upon encoding/decoding by a classification adaptive process such as, for example, a code amount target value (bitrate) when the noticed pixel is to be encoded, a quantization parameter QP or the like can be adopted.

In the case where a code amount target value or a quantization parameter QP is adopted as the encoding information to be used for generation of a parameter z, a parameter z of a value according to the code amount target value or the quantization parameter QP and eventually to the design (activity) of the original image is generated.

Here, the parameter generation section 541 not only can generate one parameter z in response to a single piece of encoding information from among a plurality of pieces of encoding information such as a code amount target value, a quantization parameter QP or the like but also can generate a plurality of parameters in response to individual ones of a plurality of pieces of encoding information such as a code amount target value, a quantization parameter QP and so forth. However, as described hereinabove with reference to FIG. 43, in the present embodiment, in order to simplify description, a single parameter z is adopted as the parameter to be used when tap coefficients are generated from a seed coefficient.

The order setting section 542 sets an order M of a seed coefficient to be determined by seed coefficient learning, namely, a number M of seed coefficients $\beta_{m,n}$ to be used when tap coefficients $w_n$ are determined in accordance with the expression (9) and supplies the number M to the learning section 543.

To the learning section 543, a parameter z is supplied from the parameter generation section 541 and an order M is supplied from the order setting section 542, and besides an original image is supplied from the sorting buffer 102 (FIG. 43) and a decoding in-progress image is supplied from the arithmetic operation section 110 (FIG. 43). Furthermore, to the learning section 543, encoding information is supplied.

The learning section 531 uses the decoding in-progress image as student data and uses the original image as teacher data, and uses the parameter z generated by the parameter generation section 541 to perform seed coefficient learning for determining a seed coefficient of the order M from the order setting section 542.

The learning section 531 determines seed coefficients of a plurality of orders M, for example, for each class by seed coefficient learning and supplies the seed coefficients to the selection section 544.

It is to be noted that the learning section 531 performs, in the seed coefficient learning, classification using the encoding information as occasion demands.

The selection section 544 selects, for each class, a seed coefficient of a predetermined order from among the seed coefficients of the plurality of orders M from the learning section 531 and supplies the selected seed coefficient as reduction filter information to the image conversion apparatus 532 (FIG. 44) and the reversible encoding section 106 (FIG. 43).

Figure 46:
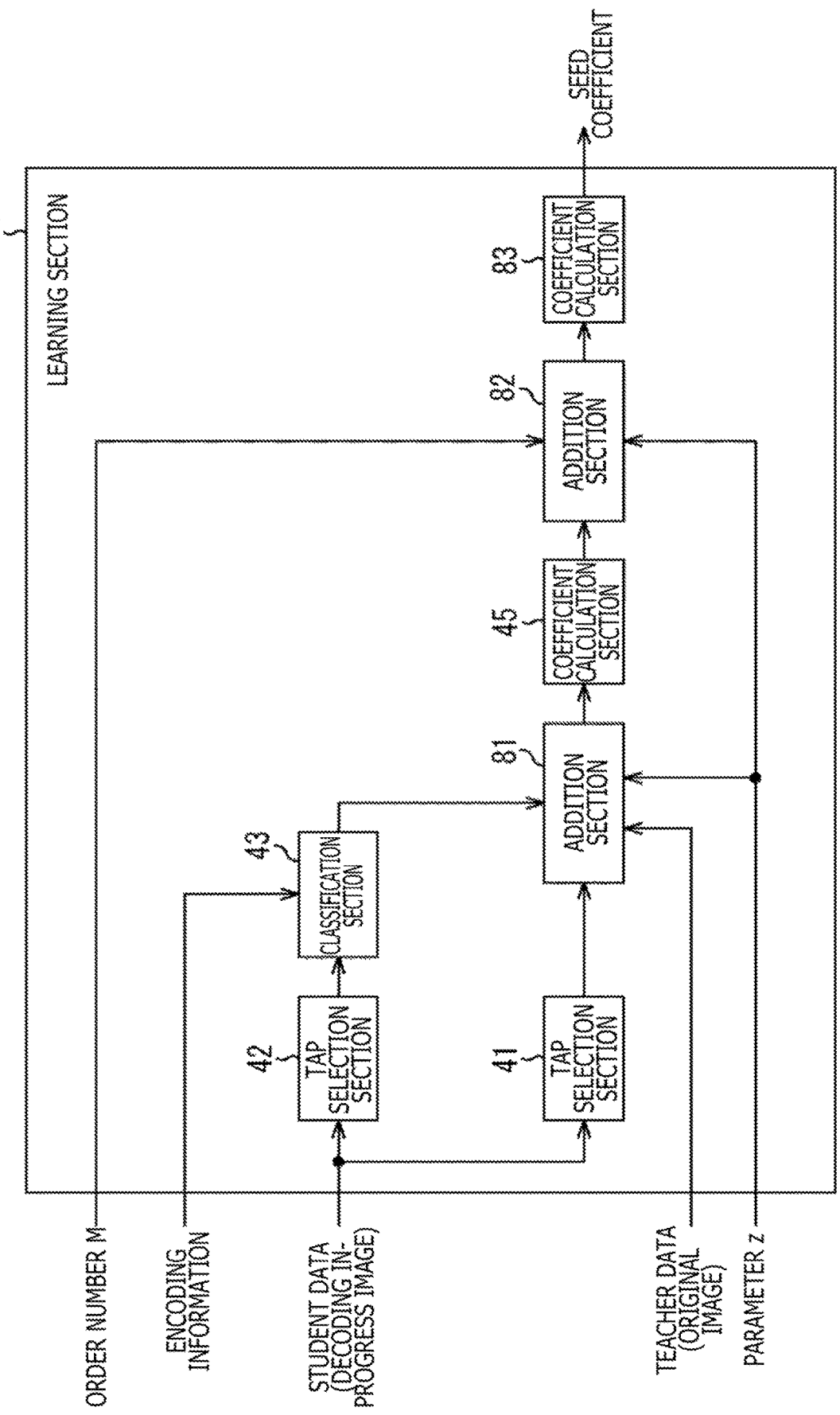
FIG. 46 is a block diagram depicting a configuration example of a learning section 543.

FIG. 46 is a block diagram depicting a configuration example of the learning section 543 of FIG. 45.

It is to be noted that, in FIG. 46, elements corresponding to those of the learning section 63 of FIG. 8 are denoted by like reference numerals and description of them is hereinafter omitted suitably.

Further, while, in FIG. 46, the learning section 543 is configured utilizing the learning section 63 of FIG. 8, the learning section 543 can otherwise be configured utilizing the learning section 63 of FIG. 7.

Referring to FIG. 46, the learning section 543 includes the components from the tap selection section 41 to the classification section 43, the coefficient calculation section 45 and the components from the addition section 81 to the coefficient calculation section 83.

Accordingly, the learning section 543 is configured similarly to the learning section 63 of FIG. 8.

However, in the learning section 543, the classification section 43 performs classification using a class tap or encoding information as occasion demands.

Further, in the learning section 543, a decoding in-progress image is used as student data and an original image corresponding to the decoding in-progress image is used as teacher data to perform seed coefficient learning, and seed coefficients for individual classes obtained by the seed coefficient learning are supplied from the coefficient calculation section 83 to the selection section 544 (FIG. 45).

Further, in the learning section 543, the addition section 82 performs, for each class, addition of (a variable $t_m$ corresponding to) a parameter z supplied from the parameter generation section 541 (FIG. 45) and an optimum tap coefficient $w_n$ supplied from the coefficient calculation section 45 similarly as in the case described hereinabove with reference to FIG. 8. However, the addition is performed for the plurality of orders M supplied from the order setting section 542. In particular, calculation of the expression (26) is performed for the plurality of orders M from the order setting section 542.

As a result, in the addition section 82, a normal equation of the expression (28) is determined for the plurality of orders M and is supplied to the coefficient calculation section 83. Accordingly, in the coefficient calculation section 83, a seed coefficient is determined in regard to the plurality of orders M for each class.

It is to be noted that seed coefficient learning by the learning apparatus 531 (FIG. 44) not only can be performed in parallel to encoding of an original image but also can be performed in advance irrespective of encoding of an original image similarly to the tap coefficient learning of the learning apparatus 131 of FIG. 10.

<Relationship Between Parameter z and Tap Coefficient>

Figure 47:
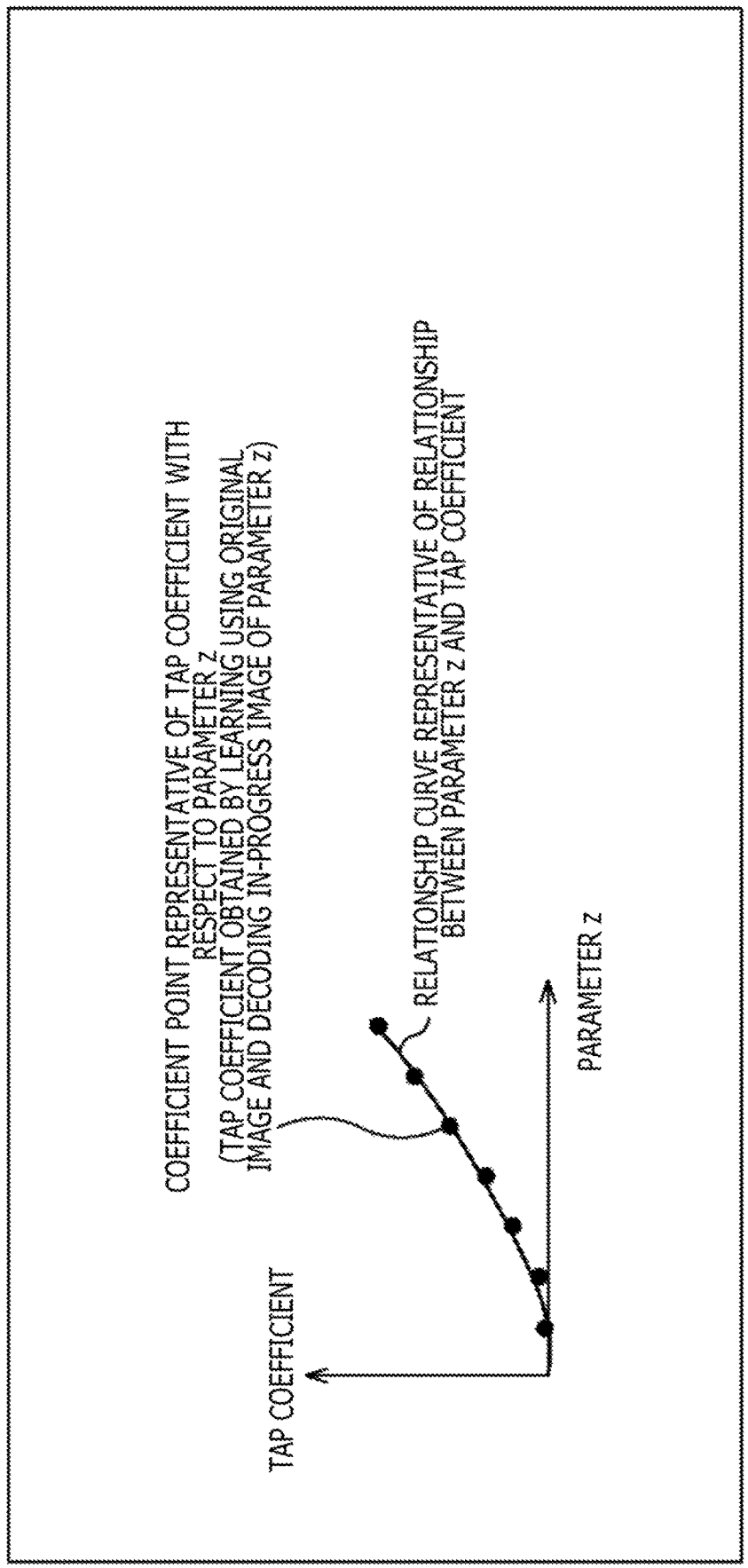
FIG. 47 is a view illustrating a relationship between a parameter z and a tap coefficient.

FIG. 47 is a view illustrating a relationship between a parameter z and tap coefficients.

In FIG. 47, on a two-dimensional image defined by the axis of abscissa indicating the parameter z and the axis of ordinate indicating the tap coefficient, coefficient points representative of tap coefficients with respect to the parameter z, namely, tap coefficients obtained by tap coefficient learning using an original image and a decoding in-progress image from which a parameter z is obtained are plotted.

Although, in FIG. 47, a plurality of coefficient points, namely, coefficient points of tap coefficients with respect to a plurality of values of the parameter z, are plotted, a curve representative of a relationship between the parameter z and the tap coefficients corresponding to the plurality of points is hereinafter referred to as relationship curve.

The relationship curve is represented by the expression (9) in which a seed coefficient is used, and accordingly, the seed coefficient prescribes (defines) the relationship curve.

For example, in the case where the parameter z has a value according to a design (activity) of an original image as described hereinabove with reference to FIG. 45, as the relationship curve defined by the seed coefficient fits more with the distribution of coefficient points, an image close to the original image (image having a high S/N) is obtained by the classification adaptive process in which tap coefficients obtained from the seed coefficient and the parameter z are used is obtained in regard to an image of a design according to the parameter z.

Figure 48:
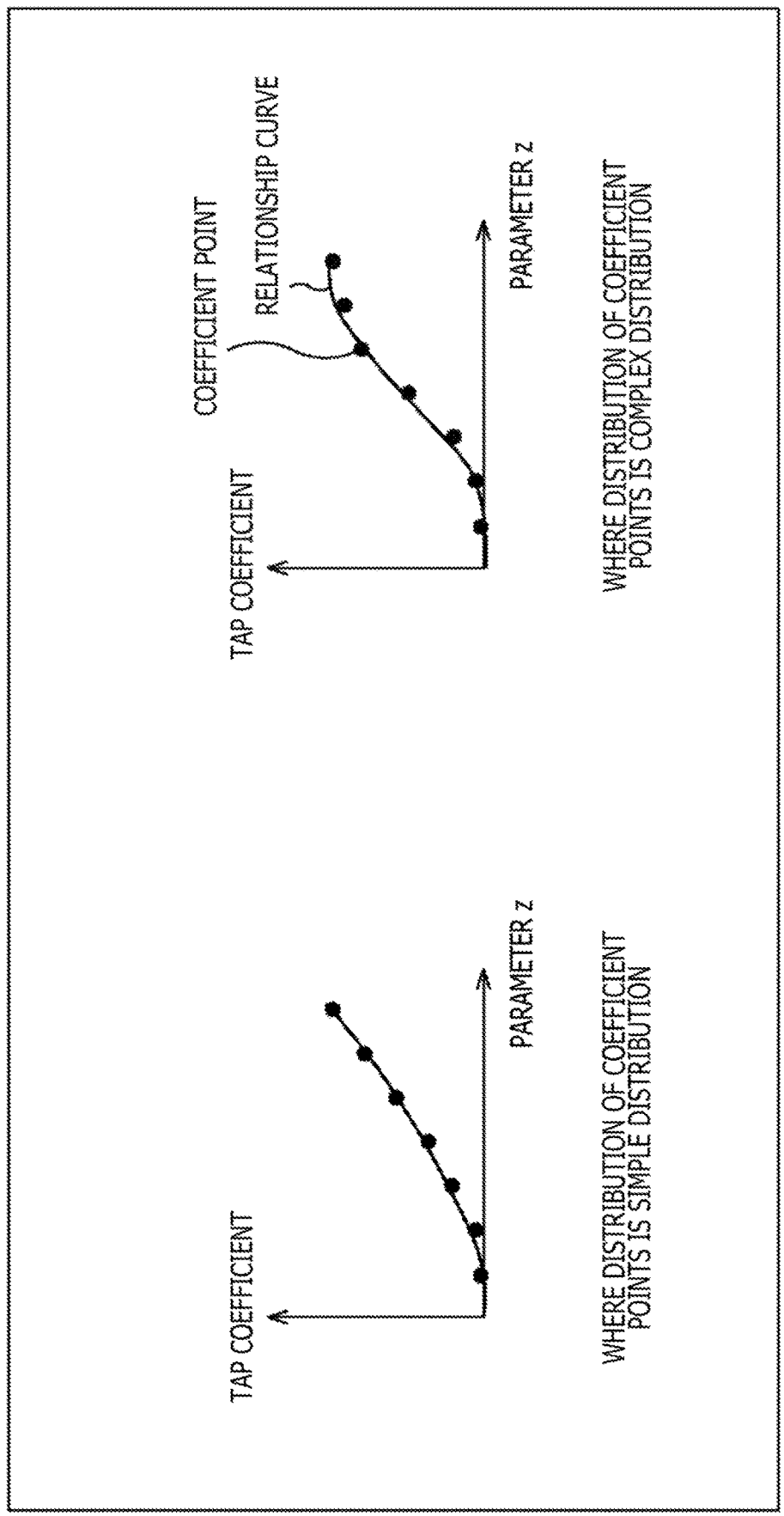
FIG. 48 is a view illustrating an example of a relationship between a distribution of coefficient points and an order of a seed coefficient that defines a relational curve that fits with the distribution of coefficient points.

FIG. 48 is a view illustrating an example of a relationship between the distribution of coefficient points and the order of the seed coefficient that defines a relationship curve that fits with the distribution of the coefficient points.

In the case where the distribution of coefficient points is a simple distribution close to a linear shape, the seed coefficient that defines a relationship curve that fits with the distribution of coefficient points may be a seed coefficient of a low order.

On the other hand, in the case where the distribution of coefficient points is complicated, the seed coefficient that defines a relationship curve that fits with a distribution of coefficient points is a seed coefficient of a great (high) order.

Figure 49:
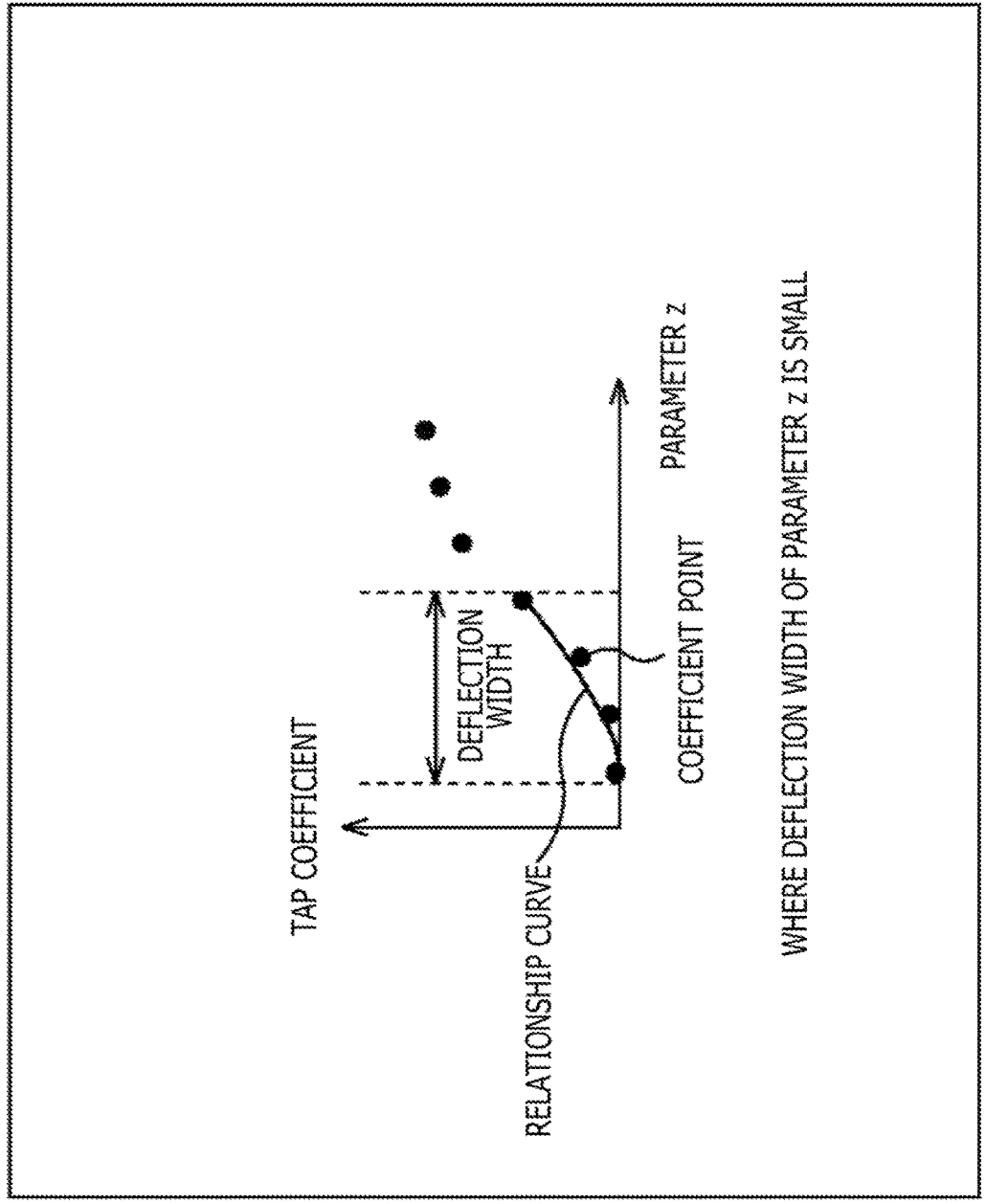
FIG. 49 is a view illustrating a different example of a relationship between a distribution of coefficient points and an order of a seed coefficient that defines a relational curve that fits with the distribution of coefficient points.

FIG. 49 is a view illustrating another example of a relationship between a distribution of coefficient points and an order of a seed coefficient that defines a relationship curve that fits with the distribution of coefficient points.

As described above with reference to FIG. 48, in the case where the distribution of coefficient points is complicated, the seed coefficient that defines a relationship curve that fits with the distribution of coefficient points is a seed coefficient of a high order.

However, within a certain interval D (in the time direction) of an original image, even in the case where the distribution of coefficients is complicated, the deflection width (fluctuation) of (encoding information whose generation is based on) the parameter z is sometimes smaller within some interval D' of the interval D.

In this case, although the order of a seed coefficient that defines a relationship curve that fits with the distribution of coefficient points of the tap coefficient in which the original image of the interval D becomes high, the order of the seed coefficient that defines the relationship curve that fits with the distribution of the coefficient points of the tap coefficient in which the original image of the interval D' can be made low.

Therefore, in the learning apparatus (FIG. 45), the selection section 544 selects a seed coefficient of an order that defines a relationship curve that fits with the distribution of coefficient points from among seed coefficients of a plurality of orders obtained by seed coefficient learning by the learning section 531 in response to a seed coefficient evaluation value representative of appropriateness in use of tap coefficients determined from a seed coefficient in (the prediction arithmetic operation of the expression (1) of) the classification adaptive process, and supplies the selected seed coefficients as reduction filter information to the image conversion apparatus 532 (FIG. 44) and the reversible encoding section 106 (FIG. 43).

Here, as the seed coefficient evaluation value, for example, a value corresponding to the RD cost when an original image to be used in seed coefficient learning is encoded can be adopted. For example, it is possible to obtain a seed coefficient of a low order that defines a relationship curve that fits with the distribution of coefficient points as reduction filter information by adopting the RD cost as the seed coefficient evaluation value and selecting a seed coefficient of an order whose RD cost is best from among seed coefficients of a plurality of orders obtained by seed coefficient learning as reduction filter information. As a result, the compression efficiency and the S/N of the decoded image can be improved.

Further, as the seed coefficient evaluation value, for example, a value corresponding to a design (activity) of an original image used in seed coefficient learning can be adopted. For example, by adopting a variation width of a design (for example, a variation amount of activity) within a predetermined interval of an original image as the seed coefficient evaluation value and selecting a seed coefficient of such an order that increases in proportion to the variation width of the design from among seed coefficients of a plurality of orders obtained by the seed coefficient learning, it is possible to obtain a seed coefficient of a lower order that defines a relationship curve that fits with the distribution of coefficient points of the tap coefficients appropriate for a classification adaptive process of a decoding in-progress image corresponding to an original image of various designs as reduction filter information. As a result, the compression efficiency and the S/N of the decoded image can be improved.

Furthermore, as the seed coefficient evaluation value, for example, a value corresponding to encoding information such as a code amount target value (bitrate), a quantization parameter QP or the like when an original image to be used in seed coefficient learning is to be encoded can be adopted. For example, by adopting a variation width of a code amount target value or a quantization parameter QP within a predetermined interval of an original image as the seed coefficient evaluation value and selecting a seed coefficient of such an order that increases in proportion to the variation width of the code amount target value or the quantization parameter QP from among seed coefficients of a plurality of orders obtained by the seed coefficient learning, it is possible to obtain a seed coefficient of a lower order that defines a relationship curve that fits with the distribution of coefficient points of the tap coefficients appropriate for a classification adaptive process of a decoding in-progress image corresponding to an original image of various code amount target values or quantization parameters QP as reduction filter information. As a result, the compression efficiency and the S/N of the decoded image can be improved.

Further, as the seed coefficient evaluation value, for example, a value corresponding to a parameter z generated for an original image used in seed coefficient learning can be adopted. For example, by adopting a variation width (deflection width) of the parameter z within an interval of an original image to be used in seed coefficient learning and selecting a seed coefficient of such an order that increases in proportion to the variation width of the parameter z among seed coefficients of a plurality of orders obtained by the seed coefficient learning as reduction filter information, it is possible to obtain a seed coefficient of a lower order that defines a relationship curve that fits with the distribution of coefficient points as reduction filter information. As a result, the compression efficiency and the S/N of the decoded image can be improved.

From the point of view of improvement of the compression efficiency and improvement of the S/N of the decoded image, it is desirable to adopt a value corresponding to the RD cost as the seed coefficient evaluation value. However, in the case where the RD cost is adopted as the seed coefficient evaluation value, a high calculation cost is required for calculation of the seed coefficient evaluation value. By adopting, as the seed coefficient evaluation value, a value corresponding, for example, to the design of the original image described hereinabove, to the encoding information or to the parameter z, the calculation cost required for calculation of the seed coefficient evaluation value can be reduced.

Here, in the case where the design of the original image and eventually the code amount target value or the quantization parameter QP, for example, upon encoding of the original image change temporally, in order to obtain an after-filter image closer to the original image by a classification adaptive process in regard to the original image after the change, it is desirable to perform tap coefficient learning using the original image after the change and perform a classification adaptive process using tap coefficients obtained by the tap coefficient learning.

However, even in the case where the design of the original image changes temporally, if, when the change is not a very great change, tap coefficient learning using the original image after the change is performed and tap coefficients obtained by the tap coefficient learning are transmitted from the encoding apparatus 11 to the decoding apparatus 12, then the compression efficiency degrades.

Further, in the case where the design of the original image changes by a great amount as a result of a scene change or the like, if tap coefficients obtained by tap coefficient learning using the original image before the change continues to be used in the classification adaptive process, then the S/N of the decoded image (after-filter image) degrades.

In contrast, with a seed coefficient obtained by seed coefficient learning using a parameter z generated in response to a code amount target value or a quantization parameter QP, it is possible to determine, using a parameter z generated in response to a code amount target value or a quantization parameter QP upon encoding of the original image, tap coefficients with which a decoded image (after-filter image) having a reduced error from the original image corresponding to the code amount target value or the quantization parameter QP can be obtained. Then, by performing a classification adaptive process using such tap coefficients as described above, degradation of the S/N of the decoded image can be prevented.

Further, with the seed coefficient, roughly it is possible to obtain a decoded image (after-filter image) of a high S/N in regard to an original image within a range of the code amount target value or the quantization parameter QP with which a parameter z used in seed coefficient learning for determining the seed coefficient is generated. In particular, in the case where the code amount target value or the quantization parameter QP upon encoding of the original image temporarily varies a little, even if the seed coefficient at present continues to be used in the classification adaptive process, a decoded image of a high S/N can be obtained. Accordingly, even if the code amount target value or the quantization parameter QP upon encoding of the original image temporarily varies a little, since there is no necessity to newly perform seed coefficient learning and transmit a new seed coefficient from the encoding apparatus 11 to the decoding apparatus 12, the compression efficiency can be improved.

As described above, with the seed coefficient, even if the design of the original image and eventually the code amount target value or the quantization parameter QP upon encoding of the original image temporally varies a little, since a decoded image of a high S/N can be obtained by a classification adaptive process in which tap coefficients obtained from the seed coefficient are used, it can be considered that the seed coefficient absorbs the design of the original image, namely, for example, a change in time of the code amount target value, the quantization parameter QP or the like upon encoding of the original image.

<Configuration Example of Image Conversion Apparatus 532>

Figure 50:
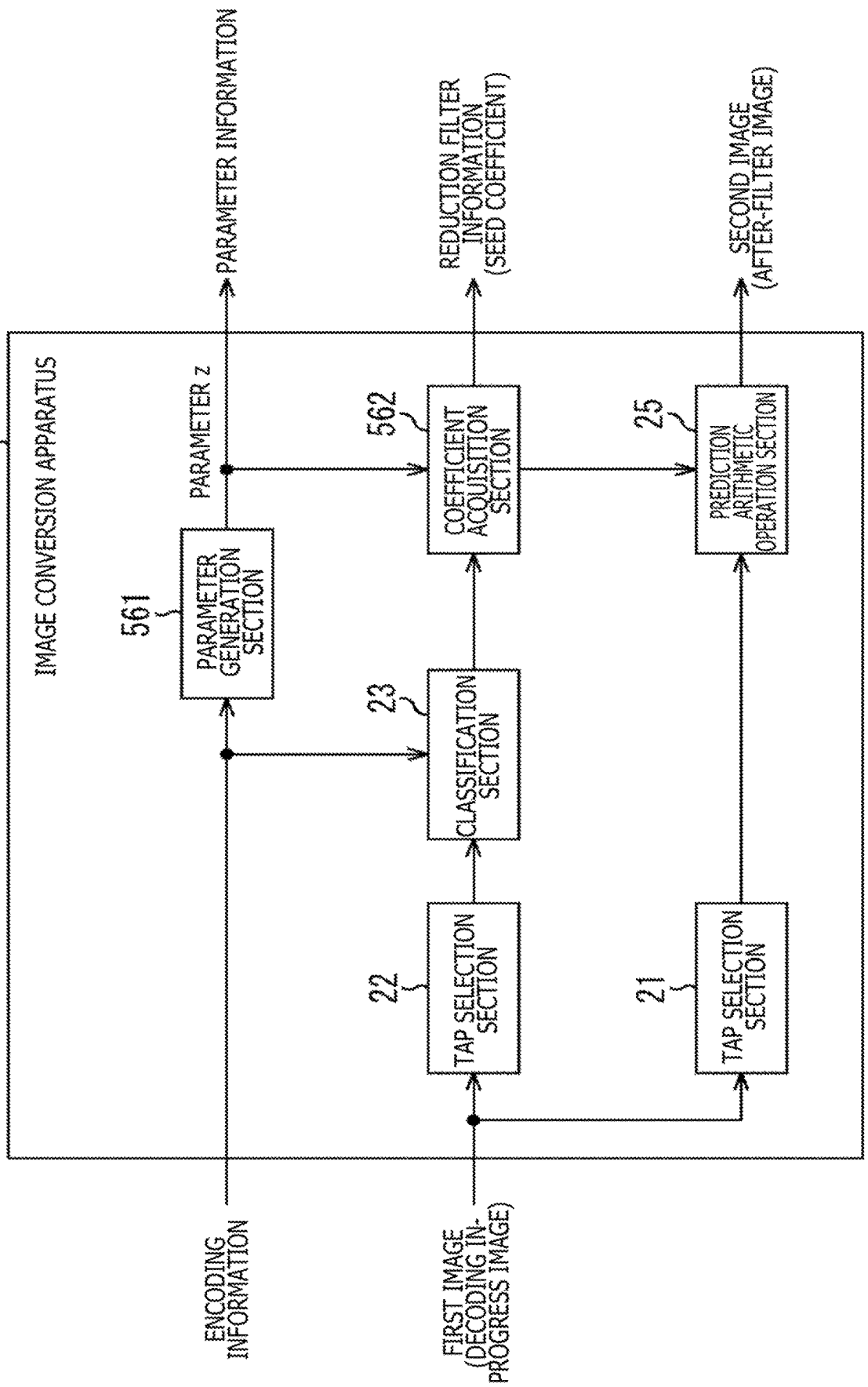
FIG. 50 is a block diagram depicting a configuration example of an image conversion apparatus 532.

FIG. 50 is a block diagram depicting a configuration example of the image conversion apparatus 532 of FIG. 44.

It is to be noted that, in FIG. 50, elements corresponding to those of the image conversion apparatus 133 of FIG. 15 are denoted by like reference numerals and description of them is omitted suitably.

Referring to FIG. 50, the image conversion apparatus 532 includes the components from the tap selection section 21 to the classification section 23, the prediction arithmetic operation section 25, a parameter generation section 561 and a coefficient acquisition section 562.

Accordingly, the image conversion apparatus 532 is configured similarly to the image conversion apparatus 133 of FIG. 15 in that it includes the components from the tap selection section 21 to the classification section 23 and the prediction arithmetic operation section 25.

However, the image conversion apparatus 532 is different from the image conversion apparatus 133 in that it additionally includes the parameter generation section 561. The image conversion apparatus 532 is further different from the image conversion apparatus 133 in that it includes the coefficient acquisition section 562 in place of the coefficient acquisition section 151.

To the parameter generation section 561, encoding information is supplied. The parameter generation section 561 generates a parameter z similar to that of the parameter generation section 541 of the learning apparatus 531 of FIG. 45 in response to a code amount target value of a noticed pixel, a quantization parameter QP or the like from within the encoding information supplied thereto, and supplies the parameter z to the coefficient acquisition section 562.

Further, the parameter generation section 561 supplies, for example, the parameter z as parameter information to the reversible encoding section 106 (FIG. 43).

Here, as the parameter information to be applied from the parameter generation section 561 to the reversible encoding section 106, not only the parameter z itself but also encoding information such as, for example, a code amount target value, a quantization parameter QP or the like used to generate the parameter z or the like can be adopted. In the case where the parameter generation section 561 generates the parameter z using the encoding information supplied to the reversible encoding section 106, the parameter information may not be supplied (transmitted) to the reversible encoding section 106.

To the coefficient acquisition section 562, not only the parameter z is supplied from the parameter generation section 561, but also a seed coefficient for each class as reduction filter information is supplied from the learning apparatus 531.

The coefficient acquisition section 562 generates tap coefficients for each class in accordance with the expression (9) using the seed coefficient for each class as the reduction filter information from the learning apparatus 531 and the parameter z from the parameter generation section 561. Then, the coefficient acquisition section 562 acquires the tap coefficient of the class of the noticed pixel supplied from the classification section 23 from among the tap coefficients for the individual classes and supplies the acquired tap coefficient to the prediction arithmetic operation section 25.

As an alternative, the coefficient acquisition section 562 uses a seed coefficient of a class of a noticed pixel supplied from the classification section 23 from among seed coefficients for individual classes as reduction filter information from the learning apparatus 531 and a parameter z from the parameter generation section 561 to acquire tap coefficients of the class of the noticed pixel by generation of the same, and supplies the tap coefficients to the prediction arithmetic operation section 25.

Figure 51:
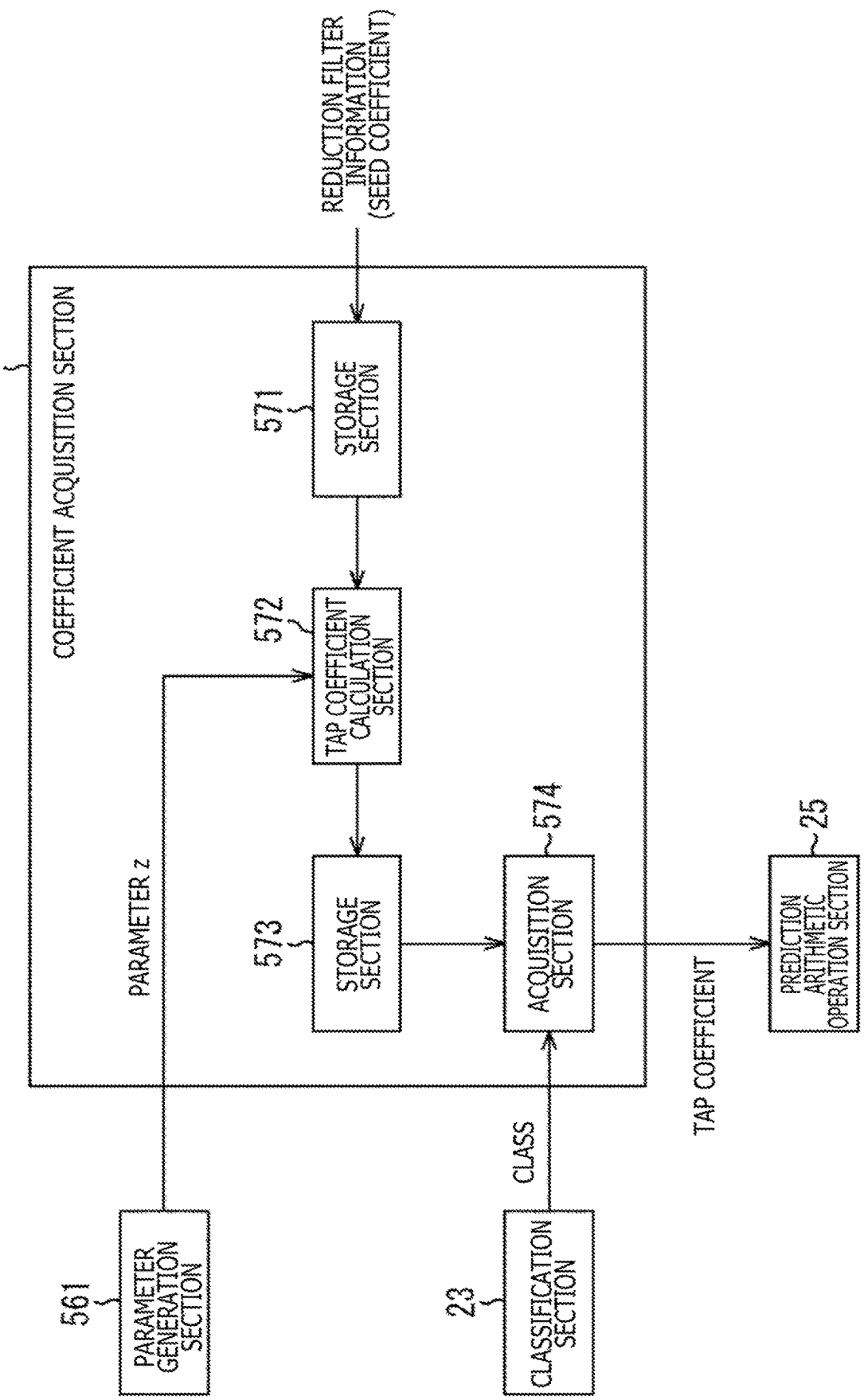
FIG. 51 is a block diagram depicting a configuration example of a coefficient acquisition section 562.

FIG. 51 is a block diagram depicting a configuration example of the coefficient acquisition section 562 of FIG. 50.

Referring to FIG. 51, the coefficient acquisition section 562 includes a storage section 571, a tap coefficient calculation section 572, another storage section 573 and an acquisition section 574.

To the storage section 571, a seed coefficient for each class as reduction filter information is supplied from the learning apparatus 531 (FIG. 44).

The storage section 571 stores the seed coefficient for each class as the reduction filter information from the learning apparatus 531.

To the tap coefficient calculation section 572, a parameter z generated for a noticed pixel is supplied from the parameter generation section 561. The tap coefficient calculation section 572 uses the seed coefficients for the individual classes stored in the storage section 571 and the parameter z from the parameter generation section 561 to calculate tap coefficients for each class in accordance with the expression (9), and supplies the calculated tap coefficients to the storage section 573.

The storage section 573 stores the tap coefficients for the individual classes from the tap coefficient calculation section 572.

To the acquisition section 574, a class of a noticed pixel is supplied from the classification section 23.

The acquisition section 574 acquires tap coefficients of a class of a noticed pixel from the classification section 23 from the tap coefficients for the individual classes stored in the storage section 571 and supplies the acquired tap coefficient to the prediction arithmetic operation section 25.

<Encoding Process>

Figure 52:
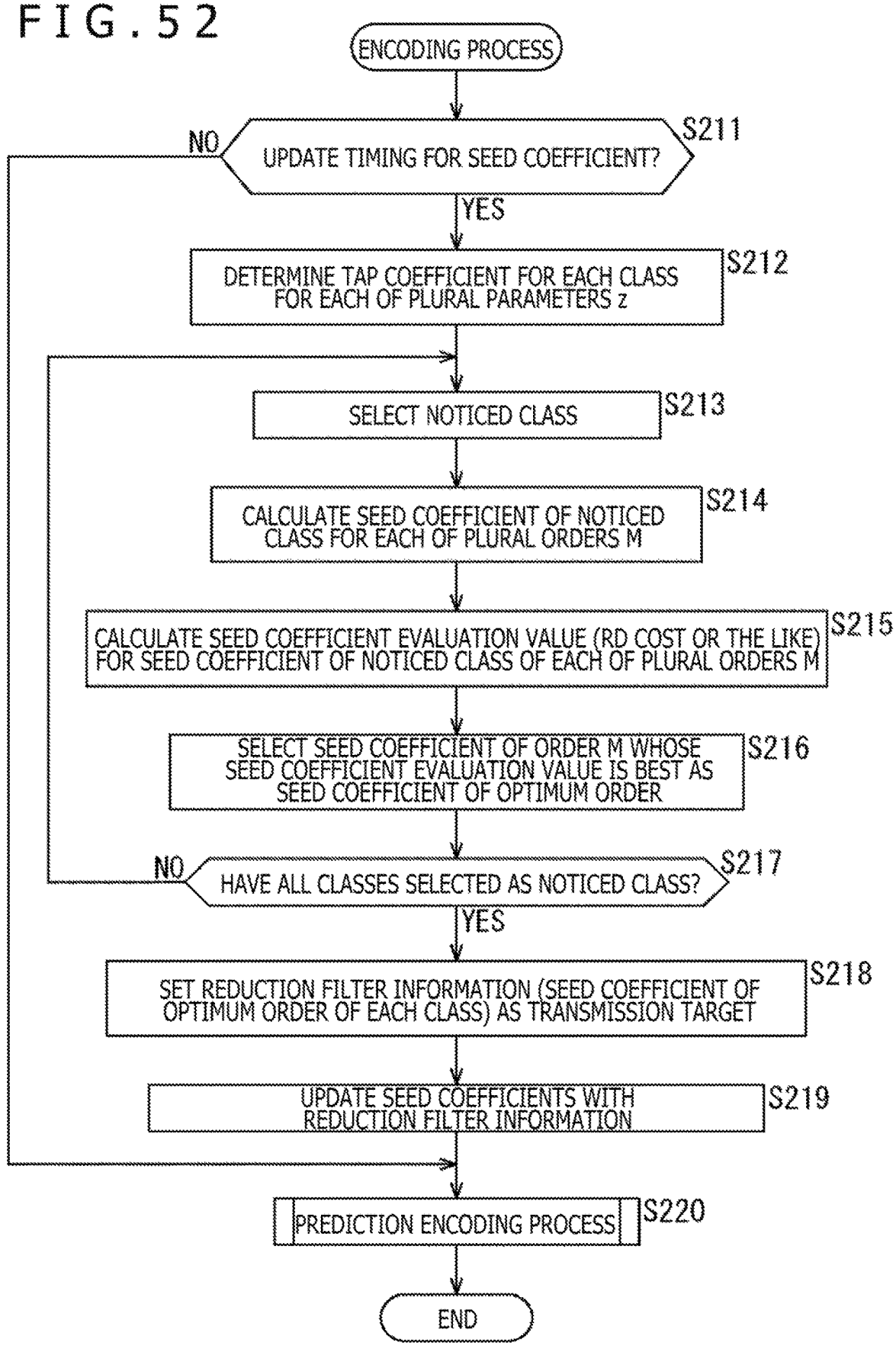
FIG. 52 is a flow chart illustrating an example of an encoding process of the encoding apparatus 11.

FIG. 52 is a flow chart illustrating an example of an encoding process of the encoding apparatus 11 of FIG. 43.

In the encoding apparatus 11, the learning apparatus 531 (FIG. 44) of the classification adaptive filter 511 temporarily stores a decoding in-progress image supplied thereto as student data and temporarily stores an original image corresponding to the decoding in-progress image as teacher data.

At step S211, the learning apparatus 531 (FIG. 44) of the classification adaptive filter 511 decides whether the timing at present is an update timing for a seed coefficient.

Here, the update timing for a seed coefficient can be determined in advance like, for example, after every one or more frames, after every one or more sequences, after every one or more slices, after one or more lines of a predetermined block such as a CTU or the like similarly to the update timing of tap coefficients described hereinabove with reference to FIG. 17.

Further, as the update timing for a seed coefficient, not only a periodical (fixed) timing such as a timing after every one or more frames but also a dynamic timing such as a timing at which the S/N of the after-filter image becomes equal to or lower than a threshold value or the like can be adopted similarly to the update timing of tap coefficients described hereinabove with reference to FIG. 17.

In the case where it is decided at step S211 that the timing at present is not an update timing for a seed coefficient, the processing advances to step S220 skipping steps S212 to S219.

On the other hand, in the case where it is decided at step S211 that the timing at present is an update timing for a seed coefficient, the processing advances to step S212, at which the learning apparatus 531 determines tap coefficients.

In particular, the learning apparatus 531 (FIG. 45) performs tap coefficient learning using, for example, a decoding in-progress image and an original image stored within a period from the update timing in the immediately preceding operation cycle to the update timing in the current operation cycle as student data and teacher data, respectively, and the coefficient calculation section 45 (FIG. 46) determines tap coefficients for each class in regard to each of a plurality of values of the parameter z generated from the decoding in-progress image from the encoding information of the decoding in-progress image and the original image that became the student data and the teacher data.

Then, in the learning section 543 (FIG. 46) of the learning apparatus 531, the coefficient calculation section 45 supplies the tap coefficients for the individual classes in regard to the plurality of values of the parameter z to the addition section 82, and the processing advances from step S212 to step S213.

At step S213, the learning section 543 selects one of classes that have not been selected as a noticed class as a noticed class from among all classes whose tap coefficient has been determined at step S212, and the processing advances to step S214.

At step S214, the addition section 82 and the coefficient calculation section 83 of the learning section 543 (FIG. 46) calculate a seed coefficient of the noticed class using the tap coefficients of the noticed class in regard to the plurality of values of the parameter z from among the tap coefficients for the individual classes regarding the plurality of values of the parameter z determined at step S212 and the plurality of values of the parameter z.

In calculation of a seed coefficient of the noticed class, in the learning apparatus 531 (FIG. 45), a plurality of orders M are supplied from the order setting section 542 to the learning section 543, and the addition section 82 and the coefficient calculation section 83 of the learning section 543 (FIG. 46) calculate a seed coefficient of the noticed class for each of the plurality of orders M.

In the learning apparatus 531 (FIG. 45), the learning section 543 supplies the seed coefficient of the noticed class in regard to each of the plurality of orders M to the selection section 544, and the processing advances from step S214 to step S215.

At step S215, the selection section 544 calculates, in regard to a seed coefficient of a noticed class in regard to each of the plurality of orders M from the learning section 543, for example, an RD cost or the like as a seed coefficient evaluation value representative of appropriateness in use of tap coefficients determined from the seed coefficient in a classification adaptive process. Then, the processing advances to step S216.

At step S216, the selection section 544 selects the seed coefficient of the noticed class of the order M in which the seed coefficient evaluation value is best from among the seed coefficients of the noticed class in each of the plurality of orders M as the seed coefficient of the optimum order M, and the processing advances to step S217.

At step S217, the learning section 543 (FIG. 45) decides whether all classes whose tap coefficient has been determined at step S212 have been made a noticed class.

In the case where it is decided at step S217 that all classes have not been made a noticed class as yet, the processing returns to step S213, and thereafter, similar processes are repeated.

On the other hand, in the case where it is decided at step S217 that all classes have been made a noticed class, the processing advances to step S218, at which the selection section 544 (FIG. 45) outputs the seed coefficient of the optimum order M selected in regard to each class at step S216 as reduction filter information to the reversible encoding section 106 (FIG. 43) and the image conversion apparatus 532 (FIG. 44).

Further, at step S218, the reversible encoding section 106 (FIG. 43) sets the reduction filter information from (the selection section 544 of) the learning apparatus 531 as a transmission target, and the processing advances to step S219. The reduction filter information set as a transmission target is included into and transmitted together with encoded data in a prediction encoding process to be performed at step S220 hereinafter described.

At step S219, in the image conversion apparatus 532 (FIG. 50), the storage section 571 of the coefficient acquisition section 562 (FIG. 51) updates the storage substance thereof to the seed coefficients of the optimum order M for each class as the reduction filter information from (the selection section 544 of) the learning apparatus 531 (stores the seed coefficients for the individual classes in an overlapping form), and the processing advances to step S220.

At step S220, a prediction encoding process of the original image is performed, and the encoding process ends therewith.

Figure 53:
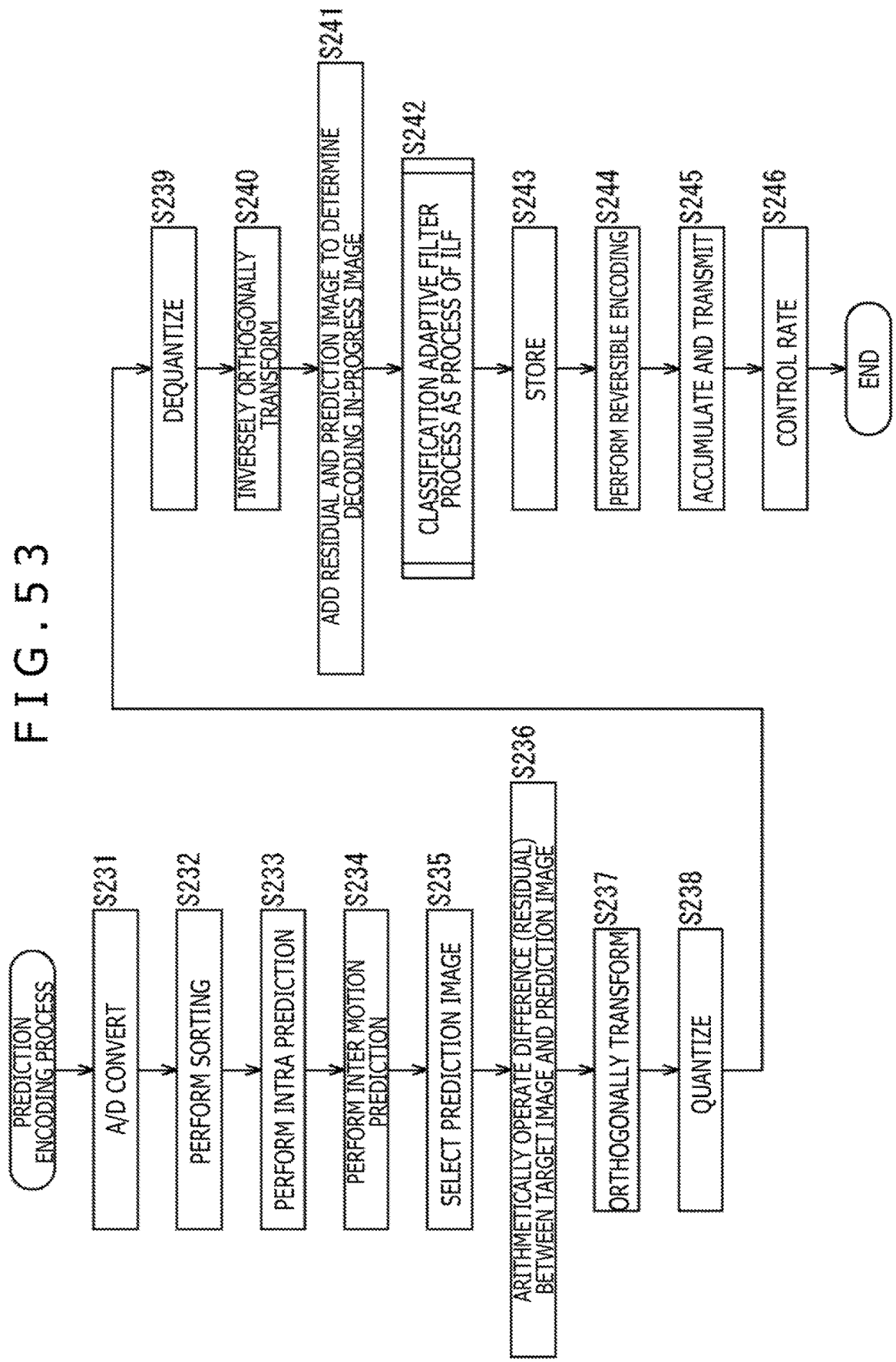
FIG. 53 is a flow chart illustrating an example of a prediction encoding process at step S220.

FIG. 53 is a flow chart illustrating an example of the prediction encoding process at step S220 of FIG. 52.

In the prediction encoding process, processes similar to those at steps S31 to S46 of FIG. 18 are performed at steps S231 to S246, respectively.

It is to be noted that, while, at step S242, the classification adaptive filter 511 performs a classification adaptive process as a process of an ILF for a decoding in-progress image from the arithmetic operation section 110 similarly as at step S42 of FIG. 18, in the classification adaptive process, tap coefficients for the individual classes obtained from the seed coefficients for the individual classes as reduction filter information stored in the storage section 571 of the coefficient acquisition section 562 (FIG. 51) at step S219 of FIG. 52 are used.

Further, in the classification adaptive process at step S242, parameter information of the parameter z generated from encoding information of a noticed pixel is supplied from the classification adaptive filter 511 to the reversible encoding section 106 as hereinafter described.

Further, although, at step S244, the reversible encoding section 106 encodes quantization coefficients, encoding information and reduction filter information similarly as at step S44 of FIG. 18, the reduction filter information includes seed coefficients for individual classes.

Further at step S244, the reversible encoding section 106 encodes parameter information supplied from the classification adaptive filter 511.

Accordingly, the encoded data obtained by the reversible encoding section 106 include quantization coefficients, encoding information, seed coefficients for individual classes as reduction filter information and parameter information. Thus, such encoded data are suitably read out, at step S245, from the accumulation buffer 107 and transmitted as described hereinabove in connection with step S45 of FIG. 18.

Figure 54:
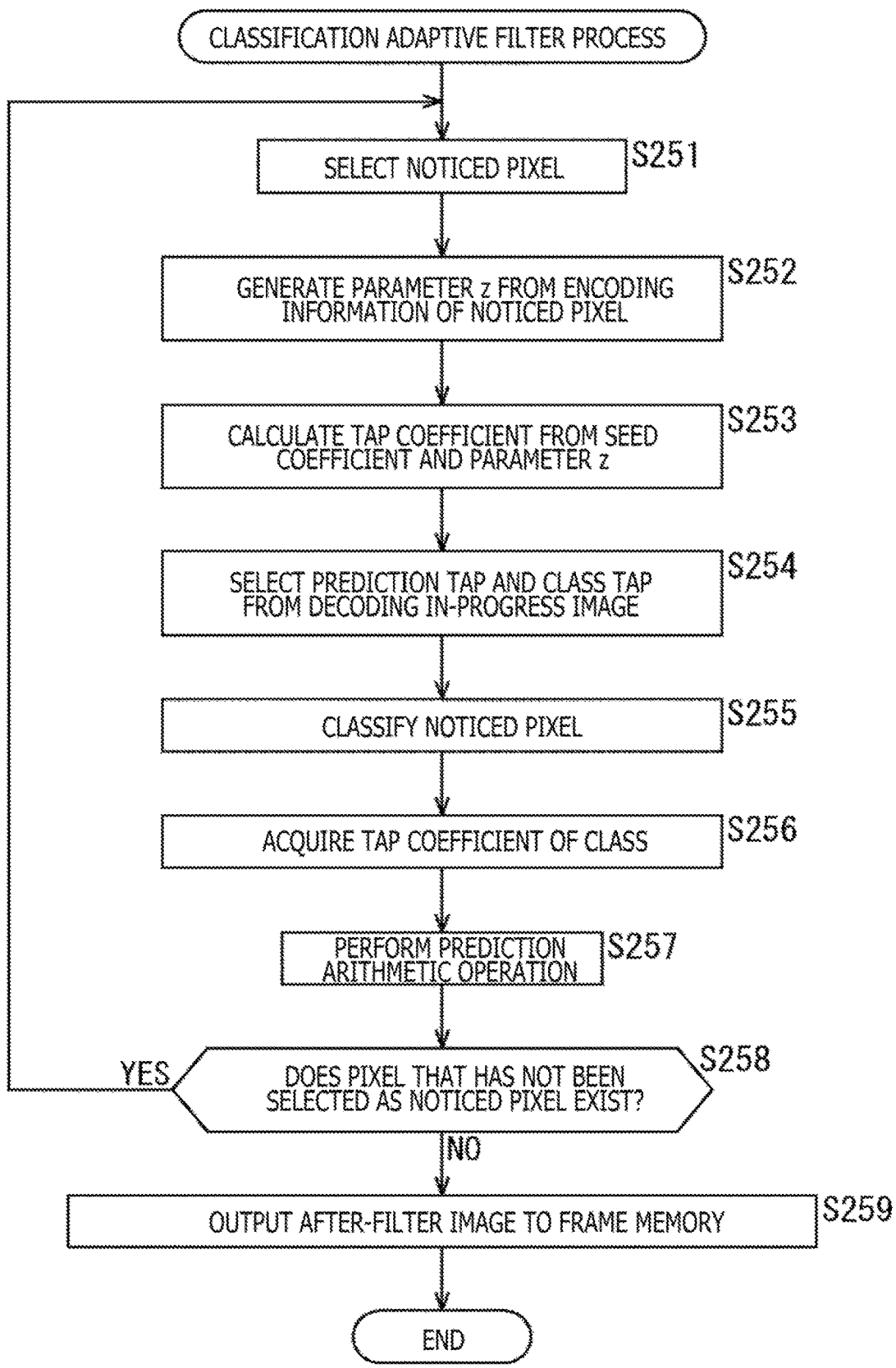
FIG. 54 is a flow chart illustrating an example of a classification adaptive process performed at step S242.

FIG. 54 is a flow chart illustrating an example of a classification adaptive process performed at step S242 of FIG. 53.

In the image conversion apparatus 532 (FIG. 50) of the classification adaptive filter 511, at step S251, the tap selection section 21 selects one of pixels that have not been selected as a noticed pixel as a noticed pixel from within the decoding in-progress image supplied from the arithmetic operation section 110 similarly as at step S51 of FIG. 19, and the processing advances to step S252.

At step S252, the parameter generation section 561 (FIG. 50) generates a parameter z from the encoding information of the noticed pixel and supplies the parameter z to the coefficient acquisition section 562. Further, the parameter generation section 561 supplies, as parameter information relating to the parameter z, for example, the parameter z itself to the reversible encoding section 106. The parameter information supplied to the reversible encoding section 106 is encoded at step S244 and transmitted at step S245 as described hereinabove with reference to FIG. 53.

After step S252, the processing advances to step S253, at which the tap coefficient calculation section 572 of the coefficient acquisition section 562 (FIG. 51) calculates tap coefficients for each class using the seed coefficients for the individual classes stored in the storage section 571 at step S219 of FIG. 52 and the parameter z supplied from the parameter generation section 561 at the immediately preceding step S252. Further, the tap coefficient calculation section 572 stores the tap coefficients for the individual classes into the storage section 573, and the processing advances from step S253 to step S254.

Here, the generation of a parameter z at step S252 and the calculation of tap coefficients at step S253 can be performed, for example, for each frame.

In particular, at step S252, encoding information of the frame of the noticed image is used to generate a parameter z common to the frame, namely, a parameter z in a unit of a frame, and at step S253, the parameter z in a unit of a frame can be used to calculate tap coefficients for each class in a unit of a frame.

Here, the generation of a parameter z and the calculation of tap coefficients using the parameter z can be performed in an arbitrary unit other than a unit of a frame such as, for example, a unit of a pixel, a unit of a block, a unit of a plurality of frames or the like.

However, if the generation of a parameter z and the calculation of tap coefficients are performed in an excessively fine unit, then the frequency in which parameter information of the parameter z is transmitted becomes high and the compression efficiency degrades. On the other hand, if the generation of a parameter z and the calculation of tap coefficients are performed in an excessively rough (great) unit, then there is the possibility that the S/N of the after-filter image obtained by the classification adaptive process that uses the tap coefficient may degrade.

Accordingly, the unit in which generation of a parameter z and calculation of tap coefficients are performed is preferably determined taking the compression efficiency and the S/N into consideration.

Further, supply of parameter information to the reversible encoding section 106, namely, transmission of parameter information, can be performed not only every time a parameter z is generated but also only when a parameter z different from that in the preceding operation cycle is generated (such transmission is not performed in the case where a parameter z same as that in the preceding operation cycle is generated).

By performing transmission of parameter information only in the case where a parameter z different from that in the preceding operation cycle is generated, degradation of the compression efficiency in the case where generation of a parameter z is performed in a fine unit can be suppressed.

Similarly, also calculation of tap coefficient using a parameter z can be performed only in the case where a parameter z different from that in the preceding operation cycle is generated. In this case, the arithmetic operation cost required for calculation of tap coefficients can be reduced.

At step S254, the tap selection sections 21 and 22 select pixels to be made a prediction tap and a class tap regarding a noticed image from within the decoding in-progress image supplied from the arithmetic operation section 110 similarly as at step S52 of FIG. 19 and supply the pixels to the prediction arithmetic operation section 25 and the classification section 23, respectively.

Thereafter, the processing advances from step S254 to step S255, at which the classification section 23 performs classification of the noticed pixel using the class tap regarding the noticed image and the encoding information regarding the noticed pixel similarly as at step S53 of FIG. 19.

Then, the classification section 23 supplies an initial class of the noticed pixel obtained by the classification of the noticed pixel to the coefficient acquisition section 562, and the processing advances from step S255 to step S256.

At step S256, the acquisition section 574 of the coefficient acquisition section 562 (FIG. 51) acquires tap coefficients of the class of the noticed pixel from among the tap coefficients for the individual classes stored in the storage section 573 at step S253 performed immediately previously and supplies the acquired tap coefficients to the prediction arithmetic operation section 25. Then, the processing advances to step S257.

At steps S257 to S259, processes similar to those at steps S55 to S57 of FIG. 19, respectively, are performed.

As described above, in the encoding apparatus 11 of FIG. 43, not tap coefficients for each class but a seed coefficient for each class obtained by seed coefficient learning is transmitted as the reduction filter information.

Further, the order of a seed coefficient for each class is selected such that the seed coefficient evaluation value such as the RD cost becomes best and has a lower value within a range within which a decoded image (after-filter image) of a high S/N is obtained.

Accordingly, the compression efficiency and the S/N of the decoded image can be improved.

<Third Configuration Example of Decoding Apparatus 12>

Figure 55:
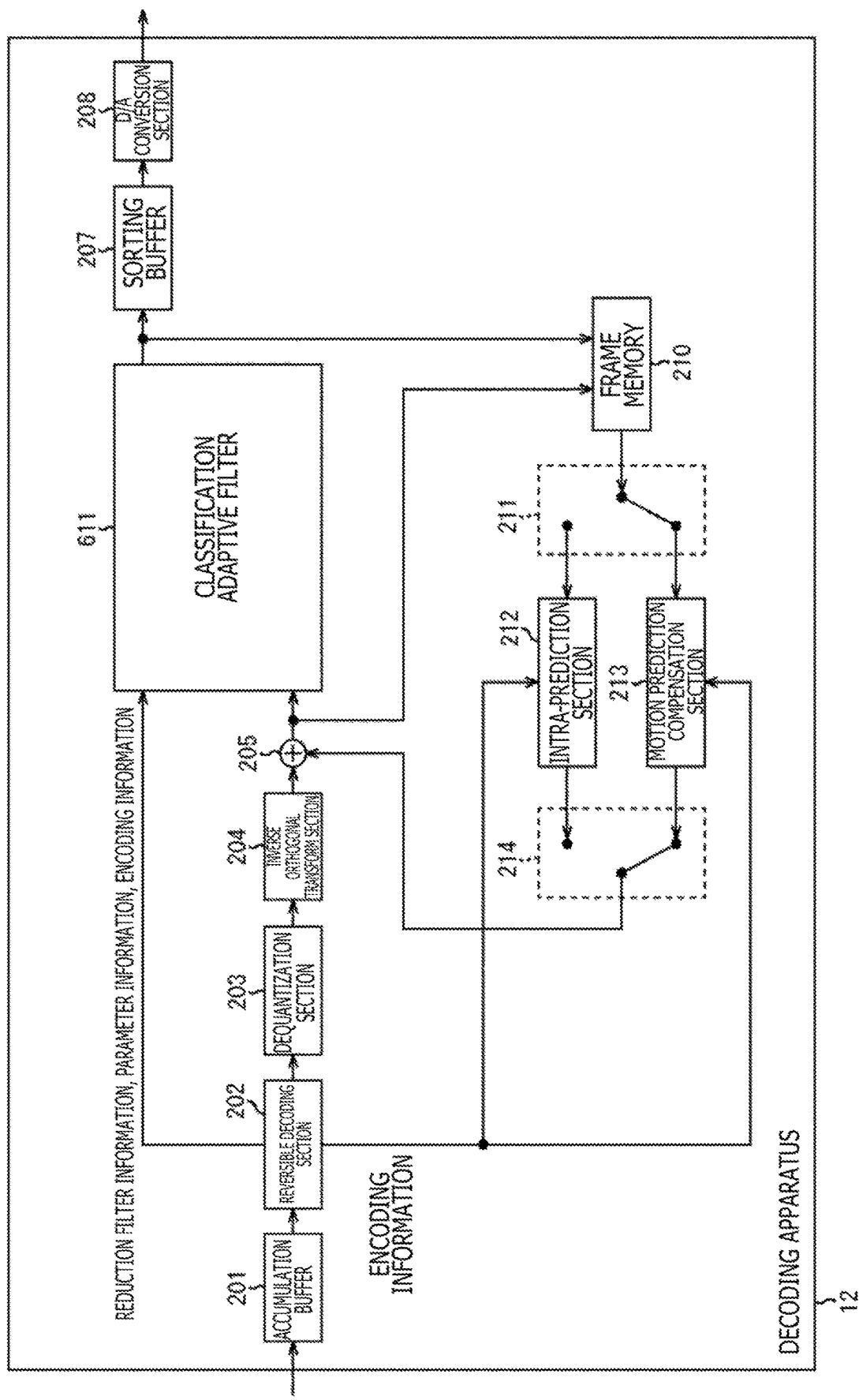
FIG. 55 is a block diagram depicting a third configuration example of the decoding apparatus 12.

FIG. 55 is a block diagram depicting a third configuration example of the decoding apparatus 12 of FIG. 1.

It is to be noted that, in FIG. 55, elements corresponding to those of FIG. 20 are denoted by like reference numerals and description of them is hereinafter omitted suitably.

Referring to FIG. 55, the decoding apparatus 12 includes the components from the accumulation buffer 201 to the arithmetic operation section 205, the sorting buffer 207, the D/A conversion section 208, the components from the frame memory 210 to the selection section 214, and a classification adaptive filter 611.

Accordingly, the decoding apparatus 12 of FIG. 55 is common to that of FIG. 20 in that it includes the components from the accumulation buffer 201 to the arithmetic operation section 205, sorting buffer 207, D/A conversion section 208 and components from the frame memory 210 to the selection section 214.

However, the decoding apparatus 12 of FIG. 55 is different from that of FIG. 20 in that it includes the classification adaptive filter 611 in place of the classification adaptive filter 206.

The decoding apparatus 12 FIG. 55 decodes encoded data transmitted from the encoding apparatus 11 of FIG. 43.

Therefore, reduction filter information supplied from the reversible decoding section 202 to the classification adaptive filter 611 includes a seed coefficient for each class.

Further, encoded data transmitted from the encoding apparatus 11 of FIG. 43 include parameter information. In the case where parameter information is obtained by decoding of encoded data by the reversible decoding section 202, the parameter information is supplied from the reversible decoding section 202 to the classification adaptive filter 611.

The classification adaptive filter 611 is a filter that functions as an ILF by performing a classification adaptive process and is common to the classification adaptive filter 206 of FIG. 20 in that it performs an ILF process by a classification adaptive process.

However, the classification adaptive filter 611 is different from the classification adaptive filter 206 in that it calculates tap coefficients for each class from a parameter z obtained from the parameter information and a seed coefficient for each class as reduction filter information and performs a classification adaptive process using the tap coefficients for the individual classes.

<Configuration Example of Classification Adaptive Filter 611>

Figure 56:
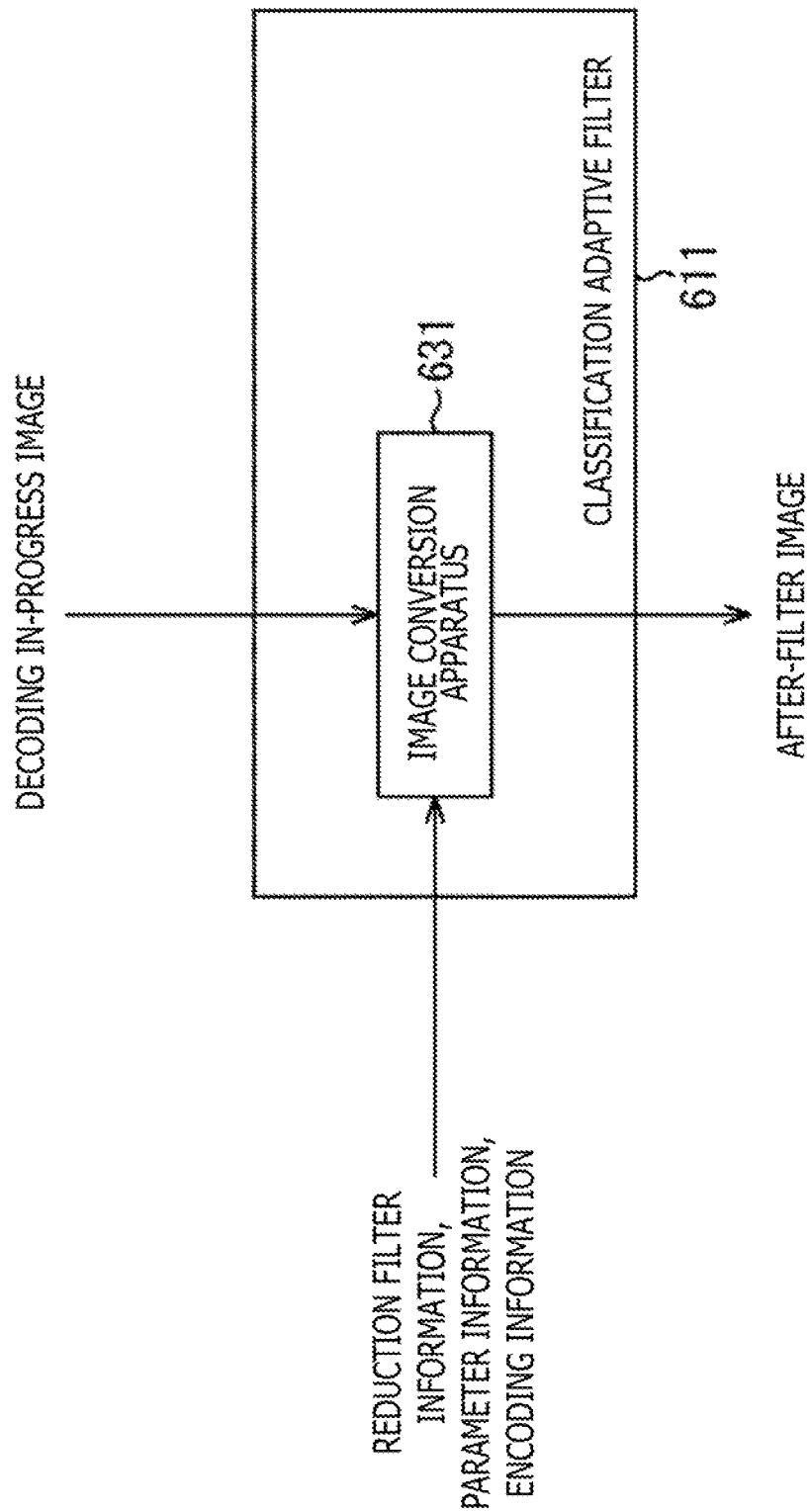
FIG. 56 is a block diagram depicting a configuration example of a classification adaptive filter 611.

FIG. 56 is a block diagram depicting a configuration example of the classification adaptive filter 611 of FIG. 55.

Referring to FIG. 56, the classification adaptive filter 611 includes an image conversion apparatus 631.

To the image conversion apparatus 631, a decoding in-progress image is supplied from the arithmetic operation section 205 (FIG. 55) and parameter information, a seed coefficient for each class as reduction filter information and encoding information are supplied from the reversible decoding section 202.

The image conversion apparatus 631 calculates tap coefficients for each class from the parameter z obtained from the parameter information and the seed coefficient for each class as the reduction filter information similarly to the image conversion apparatus 532 of FIG. 44, and performs image conversion by a classification adaptive process using the tap coefficients for each class using the decoding in-progress image as a first image to convert the decoding in-progress image as the first image into an after-filter image as a second image equivalent to an original image (generate an after-filter image) and supplies the after-filter image to the sorting buffer 207 and the frame memory 210 (FIG. 55).

It is to be noted that the image conversion apparatus 631 performs, in the classification adaptive process, classification using encoding information as occasion demands similarly to the image conversion apparatus 532 of FIG. 44.

<Configuration Example of Image Conversion Apparatus 631>

Figure 57:
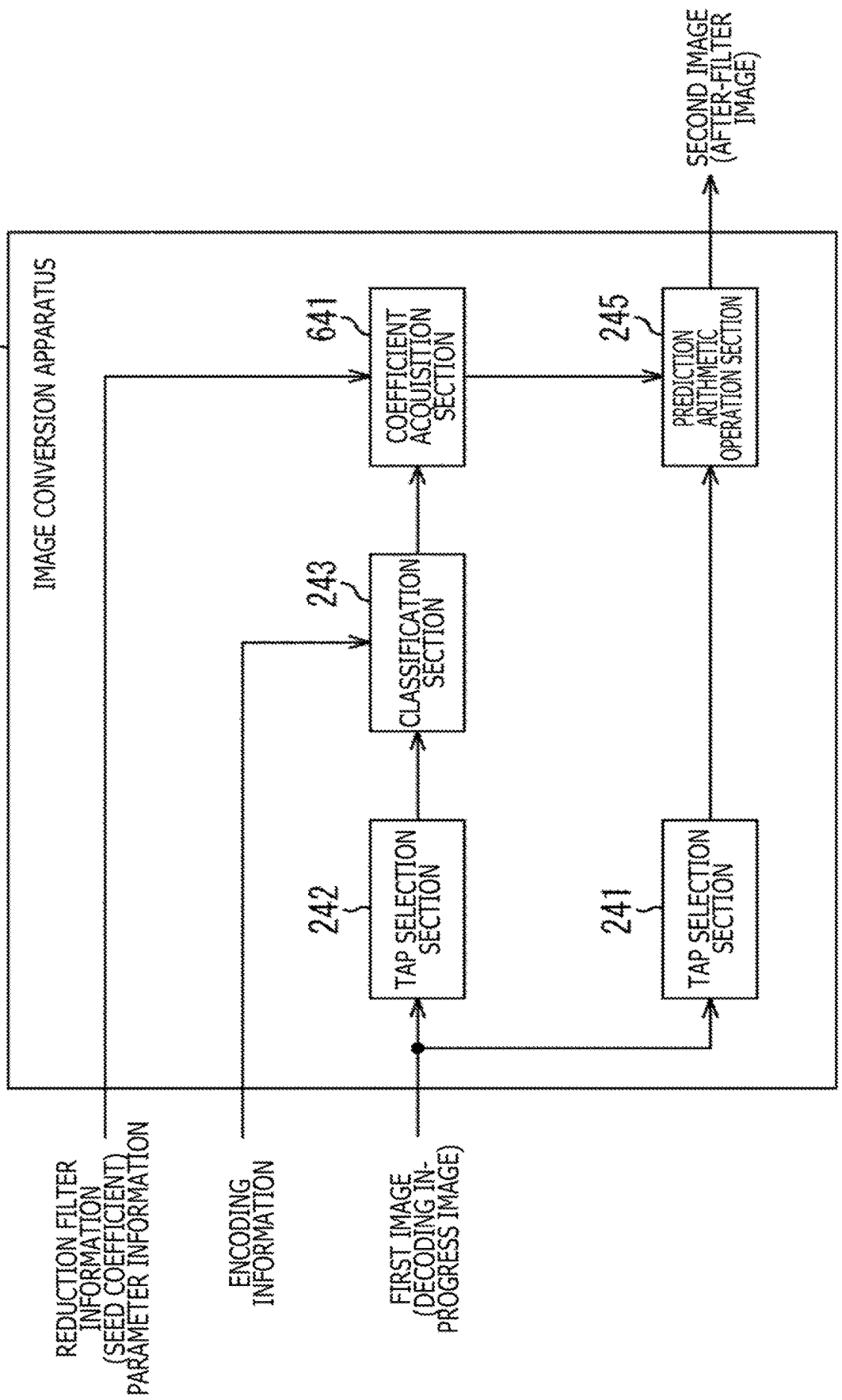
FIG. 57 is a block diagram depicting a configuration example of an image conversion apparatus 631.

FIG. 57 is a block diagram depicting a configuration example of the image conversion apparatus 631 of FIG. 56.

It is to be noted that, in FIG. 57, elements common to those of the image conversion apparatus 231 of FIG. 22 are denoted by like reference numerals and description of them is hereinafter omitted suitably.

Referring to FIG. 57, the image conversion apparatus 631 includes the components from the tap selection section 241 to the classification section 243, the prediction arithmetic operation section 245 and a coefficient acquisition section 641.

Accordingly, the image conversion apparatus 631 of FIG. 57 is common to the image conversion apparatus 231 of FIG. 22 in that it includes the components from the tap selection section 241 to the classification section 243 and the prediction arithmetic operation section 245.

However, the image conversion apparatus 631 of FIG. 57 is different from the image conversion apparatus 231 of FIG. 22 in that it includes the coefficient acquisition section 641 in place of the coefficient acquisition section 244.

To the coefficient acquisition section 641, parameter information and seed information for each class as reduction filter information are supplied from the reversible decoding section 202 (FIG. 55).

The coefficient acquisition section 641 generates tap coefficients for each class similarly to the coefficient acquisition section 562 of FIG. 50.

In particular, the coefficient acquisition section 641 generates tap coefficients for each class in accordance with the expression (9) using, for example, the seed coefficient for each class as the reduction filter information and the parameter z obtained from the parameter information. Then, the coefficient acquisition section 641 acquires the tap coefficients of the class of a noticed pixel supplied from the classification section 243 from among the tap coefficients for the individual classes and supplies the acquired tap coefficients to the prediction arithmetic operation section 245.

Figure 58:
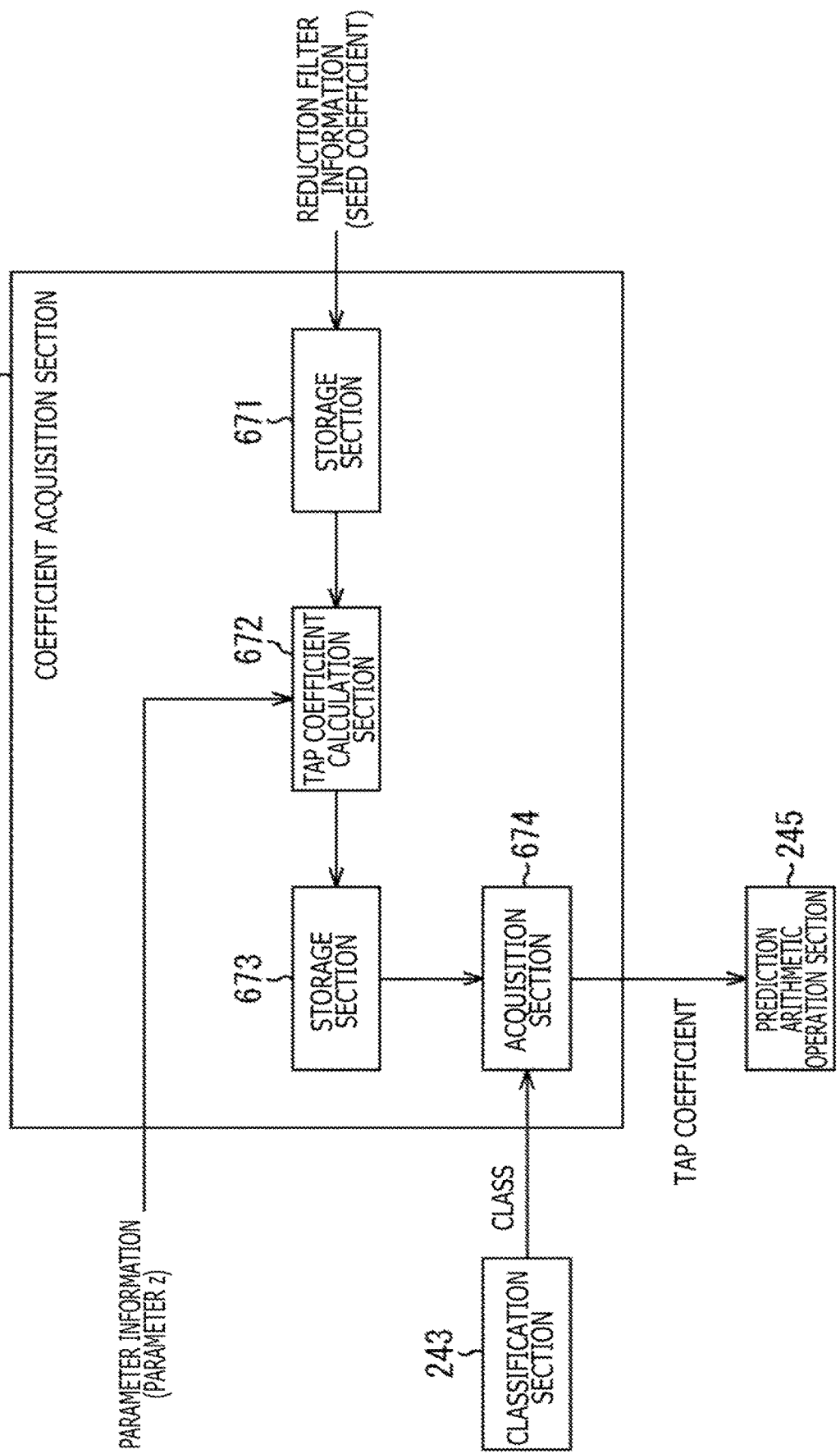
FIG. 58 is a block diagram depicting a configuration example of a coefficient acquisition section 641.

FIG. 58 is a block diagram depicting a configuration example of the coefficient acquisition section 641 of FIG. 57.

Referring to FIG. 58, the coefficient acquisition section 641 includes a storage section 671, a tap coefficient calculation section 672, another storage section 673 and an acquisition section 674.

To the storage section 671, a seed coefficient for each class as the reduction filter information is supplied from the reversible decoding section 202 (FIG. 55).

The storage section 671 stores the seed coefficients for the individual classes as the reduction filter information from the reversible decoding section 202.

To the tap coefficient calculation section 672, parameter information is supplied from the reversible decoding section 202. The tap coefficient calculation section 672 acquires a parameter z used in the encoding apparatus 11 (parameter z generated by the parameter generation section 561 of FIG. 50) from the parameter information, and uses the parameter z and the seed coefficients for the individual classes stored in the storage section 671 to calculate tap coefficients for each class in accordance with the expression (9) and supplies the tap coefficients to the storage section 673.

The storage section 673 stores the tap coefficients for each class from the tap coefficient calculation section 672.

To the acquisition section 674, a class of a noticed pixel is supplied from the classification section 243.

The acquisition section 674 acquires the tap coefficients of the class of the noticed pixel from the classification section 243 from among the tap coefficients for the individual classes stored in the storage section 673 and supplies the acquired tap coefficients to the prediction arithmetic operation section 245.

<Decoding Process>

Figure 59:
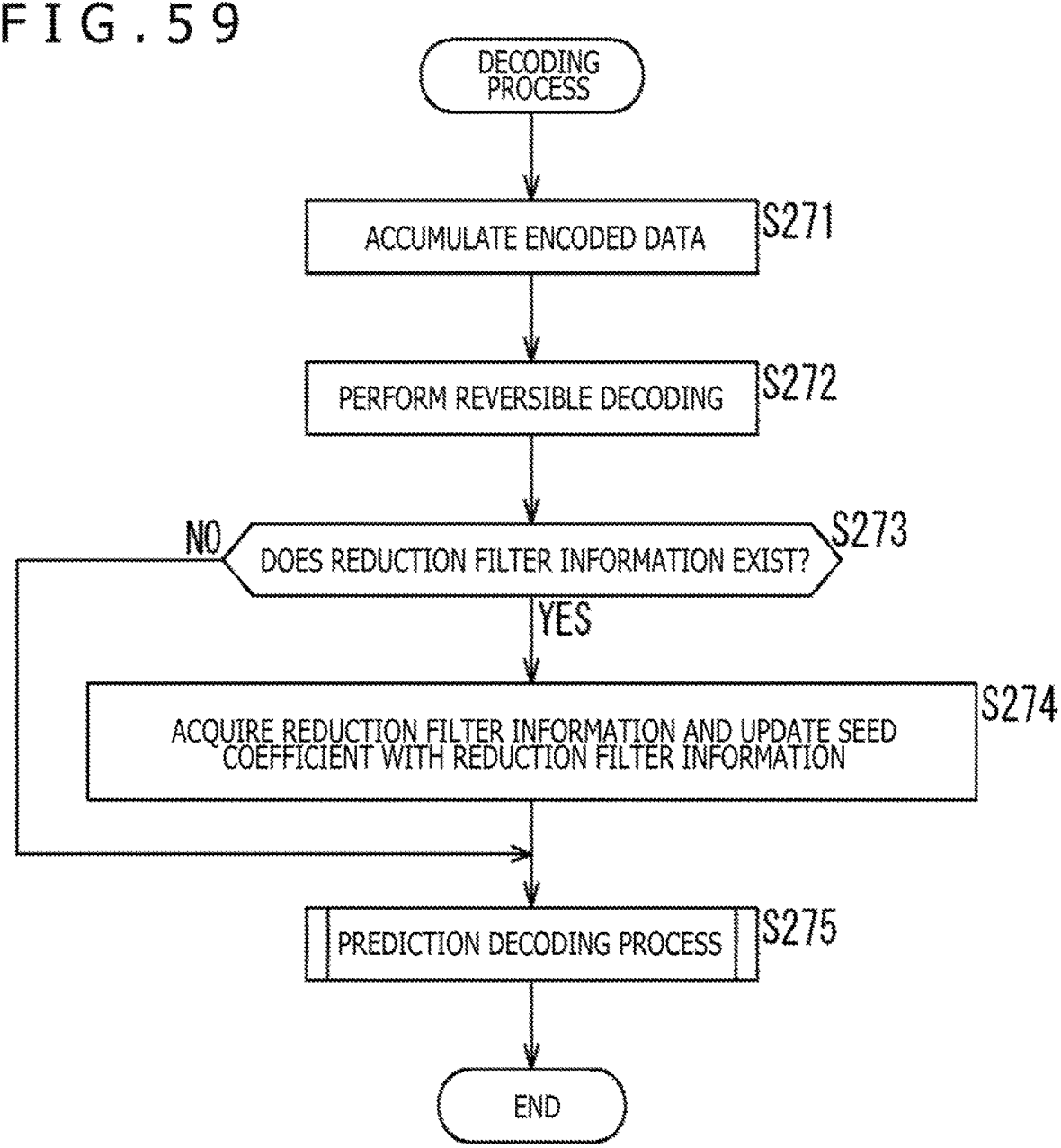
FIG. 59 is a flow chart illustrating an example of a decoding process of the decoding apparatus 12.

FIG. 59 is a flow chart illustrating an example of the decoding process of the decoding apparatus 12 of FIG. 55.

In the decoding process, at step S271, the accumulation buffer 201 temporarily accumulates encoded data transmitted from the encoding apparatus 11 similarly as at step S71 of FIG. 24 and suitably supplies the encoded data to the reversible decoding section 202, and thereafter, the processing advances to step S272.

At step S272, the reversible decoding section 202 receives and decodes the encoded data supplied from the accumulation buffer 201 similarly as at step S72 of FIG. 24 and supplies quantization coefficients obtained by the decoding to the dequantization section 203.

Further, in the case where encoding information, reduction filter information and parameter information are obtained by decoding of the encoded data, the reversible decoding section 202 supplies necessary encoding information to the intra-prediction section 212, motion prediction compensation section 213 and other necessary blocks.

Further, the reversible decoding section 202 supplies the encoding information, reduction filter information and parameter information to the classification adaptive filter 611.

Thereafter, the processing advances from step S272 to step S273, at which the classification adaptive filter 611 decides whether reduction file information is supplied from the reversible decoding section 202.

In the case where it is decided at step S273 that reduction filter information is not supplied, the processing advances to step S275 skipping step S274.

On the other hand, in the case where it is decided at step S273 that reduction filter information is supplied, the processing advances to step S274, at which the coefficient acquisition section 641 that configures the image conversion apparatus 631 (FIG. 57) of the classification adaptive filter 611 acquires a seed coefficient for each class as the reduction filter information.

Further, in the coefficient acquisition section 641 (FIG. 58), the storage section 671 updates the seed coefficients for the individual classes stored in the storage section 671 to the seed coefficients for the individual classes as the reduction filter information (stores the seed coefficients for the individual classes as the reduction filter information in an overwriting state).

Then, the processing advances from step S274 to step S275, at which a prediction decoding processing is performed, and the decoding process ends.

Figure 60:
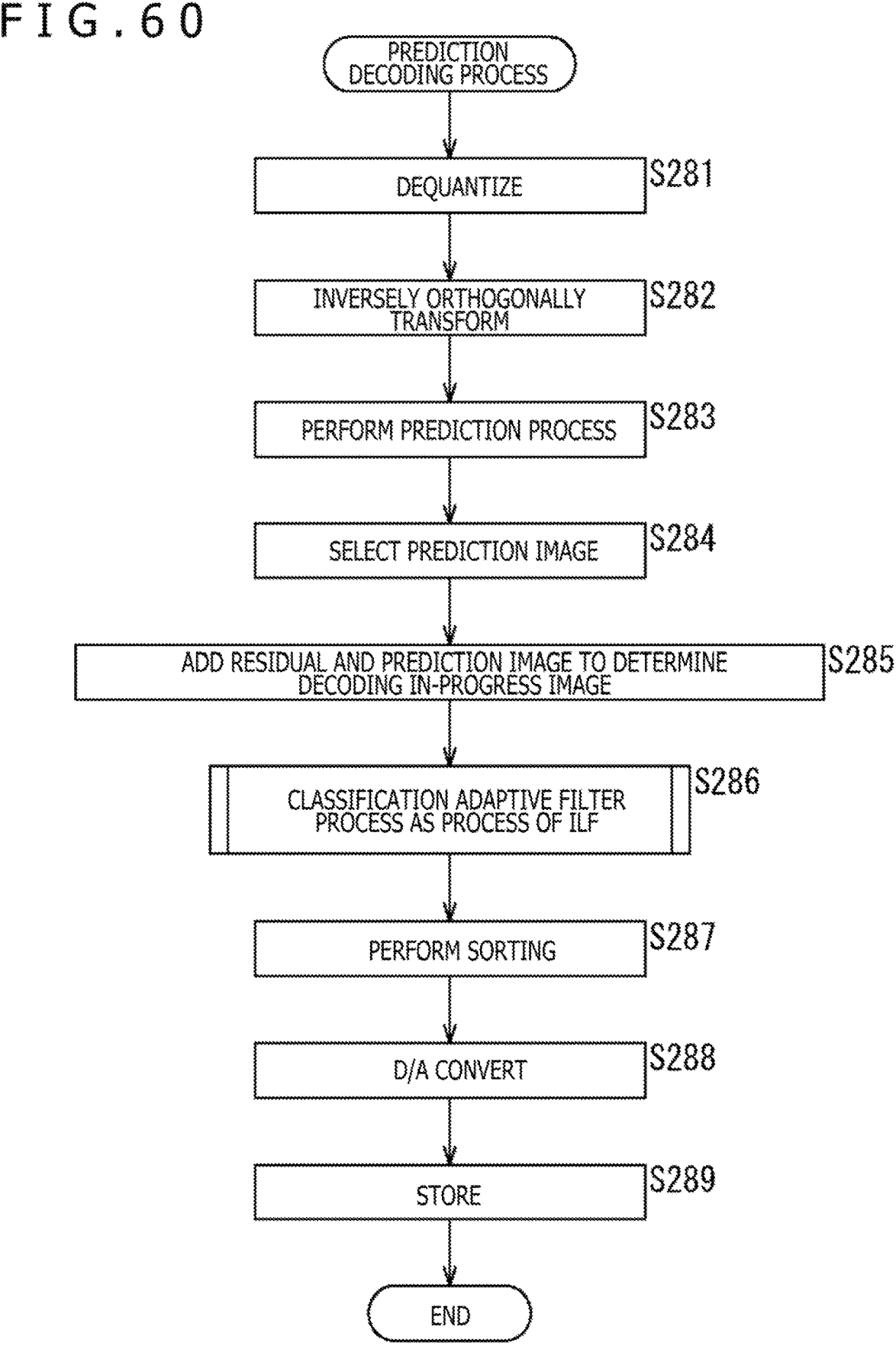
FIG. 60 is a flow chart illustrating an example of a prediction decoding process at step S275.

FIG. 60 is a flow chart illustrating an example of the prediction decoding process at step S275 of FIG. 59.

In the prediction decoding process, processes similar to those at steps S81 to S89 of FIG. 25 are performed at steps S281 to S289, respectively.

It is to be noted that, although, at step S286, the classification adaptive filter 611 performs a classification adaptive process as a process of an ILF for a decoding in-progress image from the arithmetic operation section 205 similarly as at step S86 of FIG. 25, in the classification adaptive process, tap coefficients for the individual classes generated from the seed coefficients for the individual classes as the reduction filter information acquired by the coefficient acquisition section 641 at step S274 of FIG. 59 are used.

Figure 61:
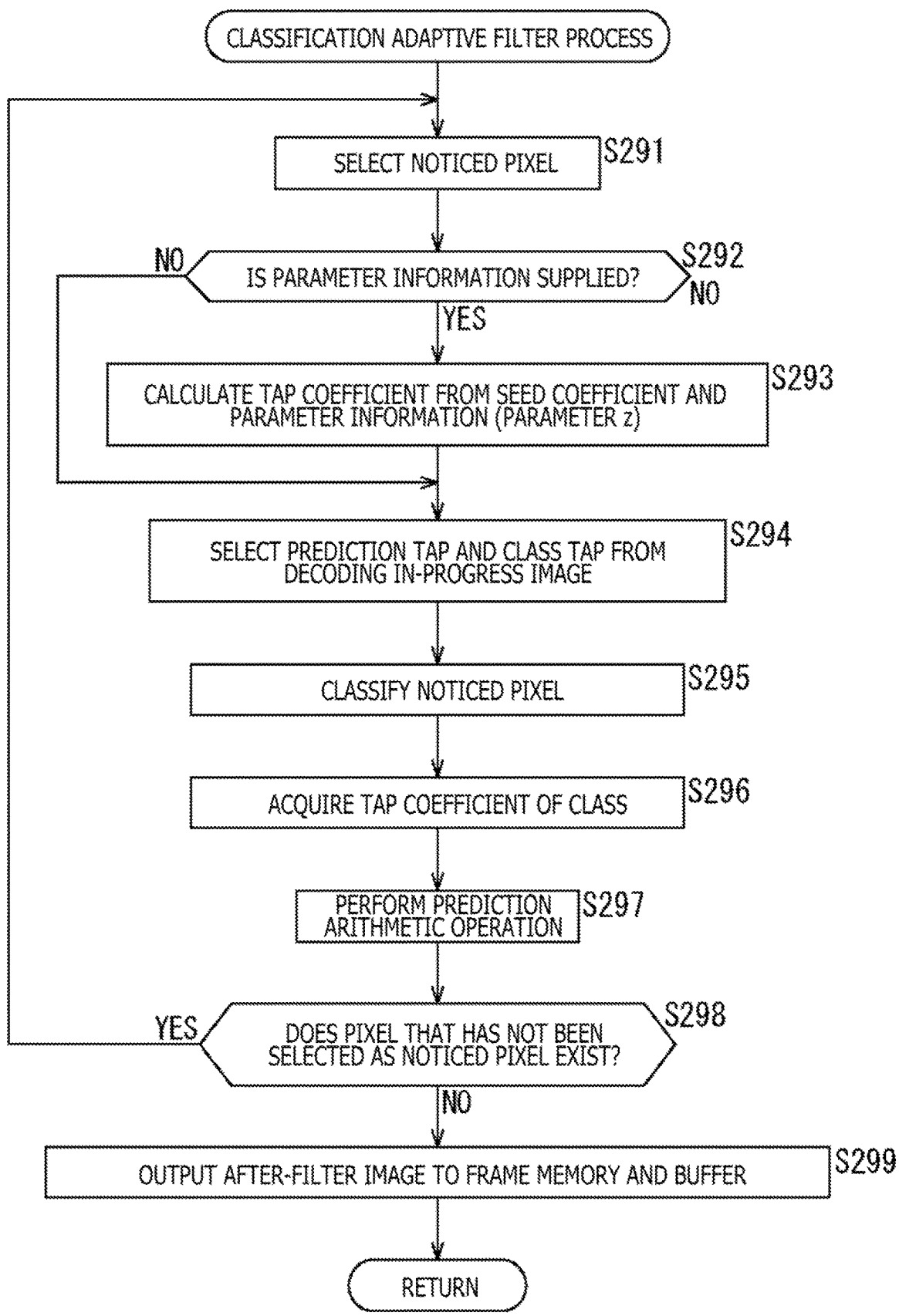
FIG. 61 is a flow chart illustrating an example of a classification adaptive process performed at step S286.

FIG. 61 is a flow chart illustrating an example of the classification adaptive process performed at step S286 of FIG. 60.

In the image conversion apparatus 631 (FIG. 57) of the classification adaptive filter 611, at step S291, the tap selection section 241 selects one of pixels that have not been selected as a notice pixel as yet as a noticed pixel from within the decoding in-progress image supplied from the arithmetic operation section 205 similarly as at step S91 of FIG. 26, and the processing advances to step S292.

At step S292, the coefficient acquisition section 641 of the image conversion apparatus 631 (FIG. 57) decides whether parameter information regarding a noticed image is supplied from the reversible decoding section 202 (FIG. 55).

In the case where it is decided at step S292 that parameter information regarding a noticed pixel is not supplied, the processing advances to step S294 skipping step S293.

In particular, in the case where the parameter information regarding the noticed pixel is same as parameter information of the pixel that have been selected as the noticed pixel in the preceding operation cycle and no parameter information is transmitted from the encoding apparatus 11, the processing advances from step S292 to step S294 skipping step S293. Thereafter, prediction arithmetic operation of the expression (1) for determining an after-filter image is performed using tap coefficients calculated using a parameter z obtained from parameter information most recently supplied to the classification adaptive filter 611 from the reversible decoding section 202 (FIG. 55).

On the other hand, in the case where it is decided at step S292 that parameter information regarding a noticed pixel is supplied from the reversible decoding section 202 (FIG. 55), the processing advances to step S293, at which new tap coefficients are calculated using a parameter z obtained from the parameter information.

In particular, at step S293, the tap coefficient calculation section 672 of the coefficient acquisition section 641 (FIG. 58) calculates tap coefficients for the individual classes using the seed coefficients for the individual classes as reduction filter information stored in the storage section 671 at step S274 of FIG. 59 and the parameter z obtained from the parameter information regarding the noticed pixel and supplied from the reversible decoding section 202 (FIG. 55).

Further, the tap coefficient calculation section 672 supplies the tap coefficients for the individual classes to the storage section 673 so as to be stored in an overwriting relationship, and the processing advances from step S293 to step S294.

At step S294, the tap selection sections 241 and 242 select a prediction tap and a class tap regarding the noticed pixel from within the decoding in-progress image supplied from the arithmetic operation section 205 similarly as at step S92 of FIG. 26 and supplies them to the prediction arithmetic operation section 245 and the classification section 243, respectively.

Thereafter, the processing advances from step S294 to step S295, at which the classification section 243 performs classification of the noticed pixel using the class taps regarding the noticed pixel and the encoding information regarding the noticed pixel similarly as at step S93 of FIG. 26.

Then, the classification section 243 supplies the class of the notice pixel obtained by the classification of the noticed pixel to the coefficient acquisition section 641, and the processing advances from step S295 to step S296.

At step S296, the acquisition section 674 of the coefficient acquisition section 641 (FIG. 58) acquires tap coefficients of the class of the noticed pixel from the classification section 243 from among the tap coefficients for the individual classes stored in the storage section 673 at step S293 immediately previously and supplies the acquired tap coefficients to the prediction arithmetic operation section 245, and the processing advances to step S297.

At steps S297 to S299, processes similar to those at steps S95 to S97 of FIG. 26 are performed, respectively.

As described above, in the encoding apparatus 11 of FIG. 43 and the decoding apparatus 12 of FIG. 55, since an ILF process is performed by a classification adaptive process, an after-filter image closer to an original image than a processing result of the ILF can be obtained. As a result, the S/N of the decoded image can be improved. Further, since an after-filter image closer to the original image can be obtained, the residual becomes small, and therefore, the compression efficiency can be improved. Further, in the encoding apparatus 11, since an order for a seed coefficient for each class is selected such that the seed coefficient evaluation value becomes best to generate a seed coefficient for each class as reduction filter information that reduces tap coefficients for each class and not the tap coefficients for the individual classes but the reduction filter information is transmitted to the decoding apparatus 12, the compression efficiency can be improved further.

<Different Example of Reduction Filter Information that Reduces Tap Coefficients>

FIG. 62 is a view illustrating a different example of reduction filter information that reduces tap coefficients for each class obtained by tap coefficient learning.

As the reduction filter information that reduces tap coefficients, arbitrary information that can be obtained by reducing tap coefficients for each class obtained by tap coefficient learning can be adopted in addition to tap coefficients of a class whose merit decision value is equal to or higher than a threshold value, tap coefficients and a corresponding relationship LUT for each integration class, and seed coefficients for each class.

Here, since the tap coefficients become an overhead of encoded data, as the data amount of the tap coefficients increases, the compression efficiency decreases. Further, if the number of tap coefficients of one class (N of the expression (1)) increases, the arithmetic operation cost for prediction arithmetic operation of the expression (1) increases.

By reducing tap coefficients for each class obtained by tap coefficient learning, it is possible to suppress decrease of the compression efficiency and increase of the arithmetic operation cost for prediction arithmetic operation.

Reduction of tap coefficients for each class obtained by tap coefficient learning can be performed, for example, by regeneration of classes of reducing the total number of classes or reduction of tap coefficients themselves.

For example, in the case where a class tap is configured from nine pixels of a cross shape centered at a noticed pixel as depicted in FIG. 62 and classification by a 1-bit ADRC process is performed, for example, by inverting the bits of an ADRC code whose most significant bit is 1, the class number can be degenerated from $512=2^9$ classes to $256=2^8$ classes. With 256 classes after degeneration of classes, the data amount of the tap coefficients is reduced to ½ in comparison with that in an alternative case in which an ADRC code (of a 1-bit ADR process) of a class tap of nine pixels is used as it is as a class code.

Further, by performing degeneration of classes for integrating classes between which ADRC results of pixels that are in a line symmetrical positional relationship in an upward and downward direction, in a leftward and rightward direction or in an oblique direction from among the cross-shaped nine pixels configuring the class tap are same as each other into one class, the class number can be reduced to 100 classes. In this case, the data amount of tap coefficients of 100 classes is approximately 39% of the data amount of tap coefficients of 256 classes.

Further, by performing, in addition to the foregoing, degeneration of classes of collecting classes between which ADRC results of pixels that are in a point symmetrical positional relationship from among the cross-shaped nine pixels configuring the class tap are same as each other into one class, the class number can be reduced to 55 classes. In this case, the data amount of tap coefficients of 55 classes is approximately 21% of the data amount of tap coefficients of 256 classes.

Reduction of tap coefficients not only can be performed by degeneration of classes as described above but also can be performed by reduction of tap coefficients themselves.

In particular, for example, in the case where a prediction tap and a block (encoding block) are configured from same pixels, tap coefficients themselves can be reduced on the basis of a block phase.

For example, in the case where a prediction tap and a block are configured from 4×4 pixels, as tap coefficients of right upper 2×2 pixels having a positionally line symmetrical relationship in the left-right direction with left upper 2×2 pixels of the prediction tap, left lower 2×2 pixels having a positionally line symmetrical relationship in the up-down direction and right lower 2×2 pixels having a positional relationship of point symmetry, tap coefficients obtained by re-arranging the tap coefficients of the left upper 2×2 pixels in accordance with the positional relationship can be adopted. In this case, the 16 tap coefficients for the 4×4 pixels configuring the prediction tap can be reduced to four tap coefficients for the left upper 2×2 pixels.

Further, it is possible to adopt, as tap coefficients of 4×2 pixels in a lower half of the prediction tap having a positionally line symmetrical relationship in the up-down direction with 4×2 pixels in an upper half of the prediction tap, tap coefficients obtained by re-arranging the tap coefficients of the 4×2 pixels in the upper half in accordance with the positional relationship can be adopted. In this case, the 16 tap coefficients for the 4×4 pixels configuring the prediction tap can be reduced to eight tap coefficients for the 4×2 pixels in the upper half.

Further, by adopting same tap coefficients as tap coefficients for pixels having a positionally line symmetrical relationship in the left-right direction of the prediction tap or tap coefficients for pixels having a positionally line symmetrical relationship in an oblique direction, tap coefficients can be reduced.

It is to be noted that, if such reduction of tap coefficients based on a block phase as described above is performed bluntly, then the S/N of an after-filter image obtained with the tap coefficients after the reduction degrades (errors with respect to an original image increase).

Therefore, reduction of tap coefficients based on a block phase is performed such that, for example, a waveform pattern of pixels configuring a prediction tap is analyzed depending upon an ADRC code used in classification and, in the case were the waveform pattern has spatial symmetry, a same tap coefficient can be adopted for pixels of a prediction tap having a positionally symmetrical relationship.

In particular, for example, in the case where a class tap is configured from 2×2 pixels and an ADRC code where ADRC results of the pixels of the class tap are lined up in a raster scan order is 1001, considering that the class tap has a positional relationship of point symmetry, a same tap coefficient can be adopted for tap coefficients of pixels of the pixel tap that has the positional relationship of line symmetry.

As described above, various methods can be adopted as the tap coefficient reduction method for reducing tap coefficients.

In particular, as described hereinabove with reference to FIG. 62, a class code utilization method of reducing (the number of) classes to reduce tap coefficients by operating a class code obtained for a class tap such as, for example, to perform inversion of bits of an ADRC code whose most significant bit is 1, which is obtained for a class tap, to degenerate the class number to ½ or to integrate classes, in which ADRC results of pixels having a positional relationship of line symmetry or point symmetry in a class tap are same as each other, into one class can be adopted as the tap coefficient reduction method.

Further, a positional relationship utilization method of reducing tap coefficients of each class by adopting, for pixels configuring a prediction tap, (tap coefficients same as) tap coefficients for pixels having a predetermined positional relationship such as line symmetry, point symmetry or the like with the pixels as described hereinabove, for example, with reference to FIG. 62 can be adopted as the tap coefficient reduction method.

Furthermore, a coefficient selection method of reducing tap coefficients by selecting, from among the latest coefficients determined by the latest tap coefficient learning, only the latest coefficients of a class with regard to which the merit decision value is equal to or higher than a threshold value as described hereinabove, for example, in connection with the first configuration example of the encoding apparatus 11 and the decoding apparatus 12 of FIGS. 9 to 26 can be adopted as the tap coefficient reduction method.

Further, an inter-coefficient distance utilization method of reducing tap coefficients by integrating a plurality of classes such as two classes of a combination in which the inter-coefficient distance is smallest such that the tap coefficient evaluation value (RD cost or the like) as described hereinabove is improved, for example, in connection with the second configuration example of the encoding apparatus 11 and the decoding apparatus 12 of FIGS. 27 to 42 can be adopted as the tap coefficient reduction method.

Furthermore, a seed coefficient utilization method of reducing tap coefficients by determining a seed coefficient that defines a relationship curve that fits with tap coefficients for a plurality of values of the parameter z as described hereinabove, for example, in connection with the third configuration example of the encoding apparatus 11 and the decoding apparatus 12 of FIGS. 43 to 61 can be adopted as the tap coefficient reduction method.

It is to be noted that the tap coefficient reduction method is not limited to any of the class code utilization method, positional relationship utilization method, coefficient selection method, inter-coefficient distance utilization method and seed coefficient utilization method described above, but an arbitrary method that reduces tap coefficients can be adopted.

In particular, as the tap coefficient reduction method, for example, a method for compressing tap coefficients by a reversible compression method, a class evaluation value utilization method for reducing tap coefficients by deleting, on the basis of a class evaluation value for evaluating a performance of tap coefficients for each class, a class other than a class whose class performance evaluation value is equal to or higher than a threshold value and so forth are additionally available.

Here, as a class evaluation value that evaluates a performance of tap coefficients of a certain noticed class, for example, an RD cost in the case where encoding is performed using an after-filter image obtained by performing predictive arithmetic operation using tap coefficients of the noticed class, a PSNR (Peak signal-to-noise ratio), AMSE that is the difference (first MSE-second MSE) between a first MSE (Mean Squared Error) between an image and an original image obtained by performing a filter process of a general ILF that does not use a classification adaptive process and a second MSE between an after-filter image and an original image obtained by performing prediction arithmetic operation using tap coefficients of a noticed class, and so forth can be adopted.

Figure 63:
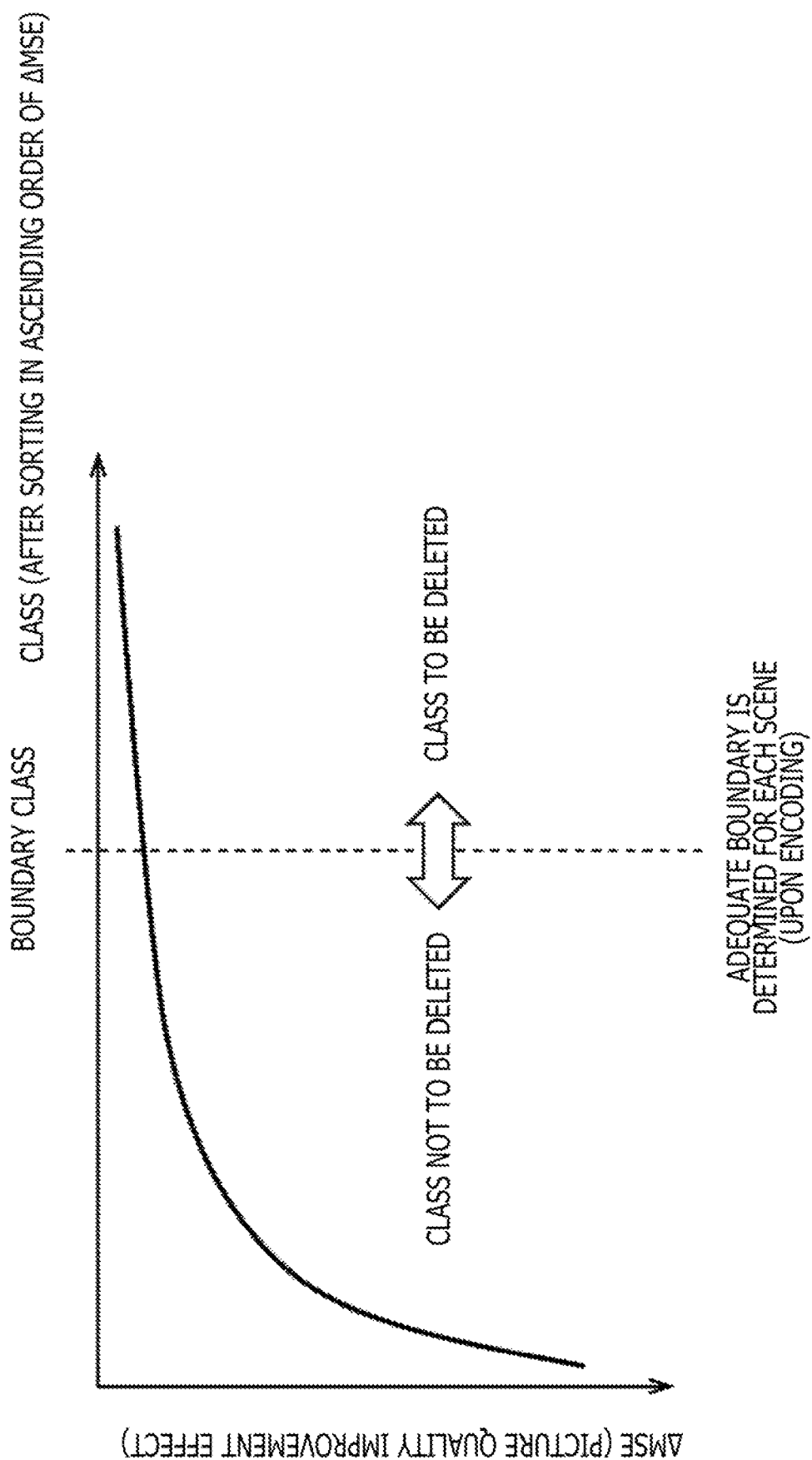
FIG. 63 is a view illustrating an example of reduction of tap coefficients by a class evaluation value utilization method.

FIG. 63 is a view illustrating an example of reduction of tap coefficients by the class evaluation value utilization method.

FIG. 63 depicts an example of a class evaluation value (of tap coefficients) of initial classes obtained by tap coefficient learning when the initial classes are lined up in an ascending order of AMSE as a class evaluation value of tap coefficients for each initial class.

Referring to FIG. 63, the axis of abscissa represents initial classes lined up in the ascending order of the class evaluation value, and the axis of ordinate represents class evaluation values of the initial classes.

Here, AMSE as the class evaluation value of a certain initial class represents a picture quality improvement effect regarding by what degree the picture quality of an after-filter image obtained by prediction arithmetic operation using tap coefficients of the initial class is improved in comparison with the picture quality of an image obtained by performing a filter process of an ILF that does not use the classification adaptive process.

In reduction of tap coefficients by the class evaluation value utilization method, one initial class from among initial classes liked up in an ascending order of the class evaluation value is set as a boundary class. Then, an initial class whose rank of the class evaluation value is lower than that of the boundary class is deleted as a class of a target of deletion.

As the boundary class, for example, an initial class whose class evaluation value is in the minimum from among initial classes whose class evaluation value is equal to or higher than a threshold value or an initial class whose class evaluation value is in the maximum from among initial classes whose class evaluation value is equal to or lower than the threshold value, an initial value whose rank of the class evaluation value is a rank determined in advance, and so forth can be adopted.

<Fourth Configuration Example of Encoding Apparatus 11>

Figure 64:
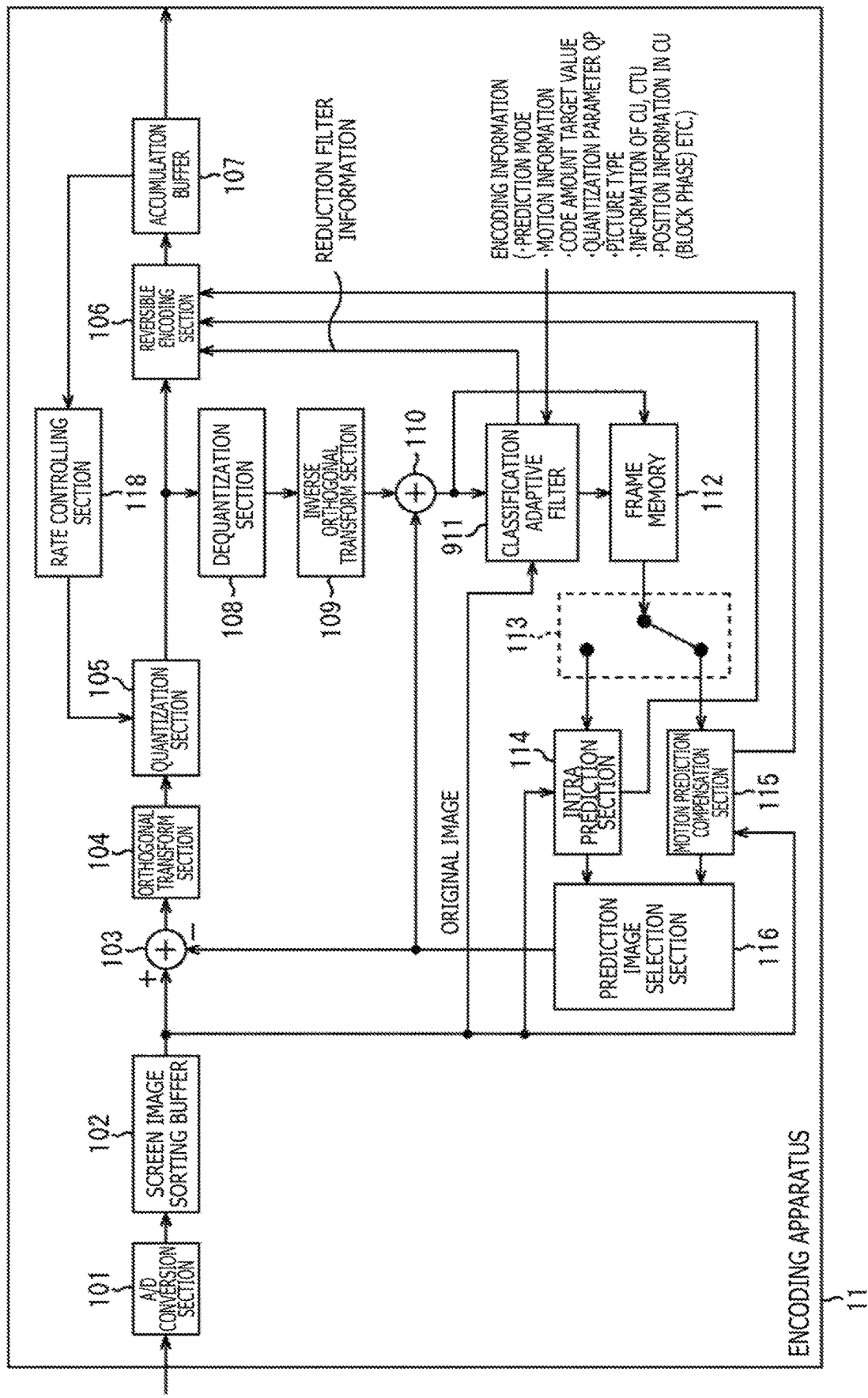
FIG. 64 is a block diagram depicting a fourth configuration example of the encoding apparatus 11.

FIG. 64 is a block diagram depicting a fourth configuration example of the encoding apparatus 11 of FIG. 1.

It is to be noted that, in FIG. 64, elements corresponding to those of FIG. 9 are denoted by like reference numerals and description of them is hereinafter omitted suitably.

Referring to FIG. 64, the encoding apparatus 11 includes the components from the A/D conversion section 101 to the arithmetic operation section 110 and from the frame memory 112 to the rate controlling section 117 and a classification adaptive filter 911.

Accordingly, the encoding apparatus 11 of FIG. 64 is common to that of FIG. 9 in that it includes the components from the A/D conversion section 101 to the arithmetic operation section 110 and from the frame memory 112 to the rate controlling section 117.

However, the encoding apparatus 11 of FIG. 64 is different from that of FIG. 9 in that it includes the classification adaptive filter 911 in place of the classification adaptive filter 111.

The classification adaptive filter 911 is a filter that functions as an ILF by performing a classification adaptive process and is common to the classification adaptive filter 111 in that it performs an ILF process by a classification adaptive process.

However, the classification adaptive filter 911 is different from the classification adaptive filter 111 in that, in the classification adaptive filter 911, since tap coefficients of a plurality of initial classes determined by tap coefficient learning are reduced by a reduction process, tap coefficients degenerated to a data amount smaller than that of the tap coefficients of the plurality of initial classes are generated as reduction filter information.

Further, the classification adaptive filter 911 is different from the classification adaptive filter 111 in that, while, in the classification adaptive filter 911, degeneration for converting tap coefficients of initial classes into tap coefficients of a smaller data amount is performed by a degeneration method selected from among a plurality of degeneration methods, degeneration information representative of the degeneration method is generated as reduction filter information.

Furthermore, the classification adaptive filter 911 is different from the classification adaptive filter 111 in that it performs a classification adaptive process using tap coefficients after degeneration as reduction filter information and degeneration information.

<Configuration Example of Classification Adaptive Filter 911>

Figure 65:
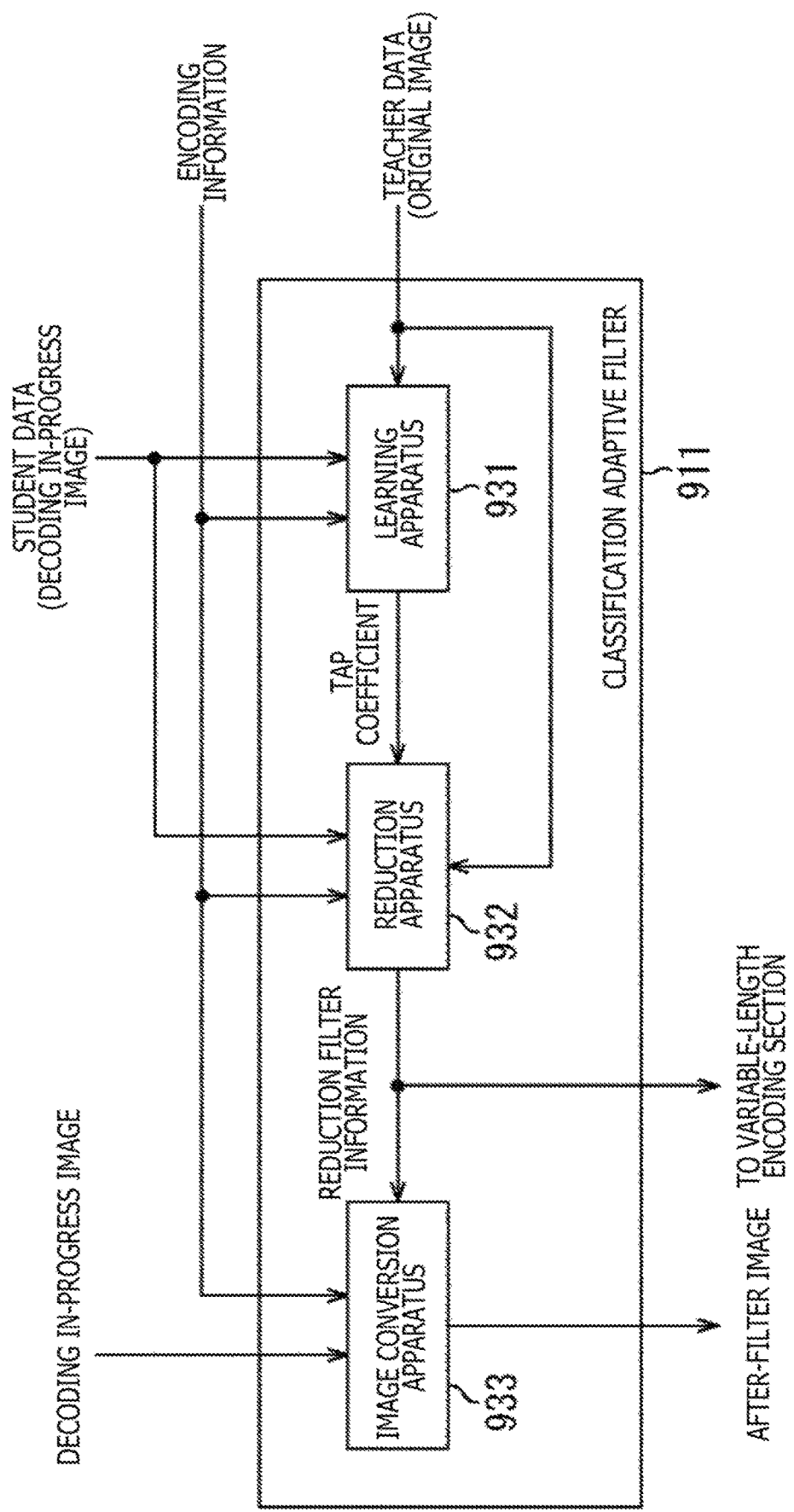
FIG. 65 is a block diagram depicting a configuration example of a classification adaptive filter 911.

FIG. 65 is a block diagram depicting a configuration example of the classification adaptive filter 911 of FIG. 64.

Referring to FIG. 65, the classification adaptive filter 911 includes a learning apparatus 931, a reduction apparatus (reduction section) 932, and an image conversion apparatus 933.

To the learning apparatus 931, an original image is supplied from the sorting buffer 102 (FIG. 64) and a decoding in-progress image is supplied from the arithmetic operation section 110 (FIG. 64). Furthermore, encoding information is supplied to the learning apparatus 931.

The learning apparatus 931 performs tap coefficient learning for determining tap coefficients for each initial class using the decoding in-progress image as student data and using the original data as teacher data.

Further, the learning apparatus 931 supplies tap coefficients for the individual initial classes obtained by the tap coefficient learning to the reduction apparatus 932.

It is to be noted that the learning apparatus 931 performs classification in tap coefficient learning using encoding information as occasion demands.

Further, the learning apparatus 931 performs, in the tap coefficient learning, classification of a noticed pixel using a plurality of kinds of pixel-related information relating to the noticed pixel.

The pixel-related information is roughly divided into an image characteristic amount such as an ADRC code or the like and encoding information such as a quantization parameter QP or the like. As the plurality of kinds of pixel-related information, a combination of one or more kinds of image characteristic amounts and one or more kinds of encoding information, a combination of a plurality of kinds of image characteristic amounts and 0 or more kinds of encoding information and a combination of 0 or more kinds of image characteristic amounts and a plurality of kinds of encoding information can be adopted.

To the reduction apparatus 932, tap coefficients of initial classes obtained by tap coefficient learning are supplied from the learning apparatus 931 as described hereinabove. Further, to the reduction apparatus 932, an original image that becomes teacher data, a decoding in-progress image that becomes student data and encoding information are supplied similarly to the learning apparatus 931.

The reduction apparatus 932 performs a reduction process for degenerating tap coefficients for individual initial classes from the learning apparatus 931 to tap coefficients of a data amount smaller than that of the tap coefficients.

It is to be noted that the degeneration of tap coefficients is roughly divided into degeneration that decreases tap coefficients themselves of each class and degeneration of classes for reducing classes. Although the reduction apparatus 932 can perform one or both of the degeneration of reducing tap coefficients themselves of each class and the degeneration of classes for reducing classes, in the following, description is given assuming that at least degeneration of classes is performed as the degeneration of tap coefficients by the reduction apparatus 932.

The reduction apparatus 932 performs degeneration of tap coefficients for individual initial classes and determines tap coefficients for individual degeneration classes of a class number smaller than the class number of initial classes from the tap coefficients for the individual initial classes by the degeneration.

The reduction apparatus 932 performs degeneration for obtaining tap coefficients for individual degeneration classes from tap coefficients for individual initial classes by a degeneration method selected from among a plurality of degeneration methods.

In the reduction apparatus 932, selection of a degeneration method to be used to obtain tap coefficients for individual degeneration classes is performed using an original image as teacher data, a decoding in-progress image as student data and encoding information.

The reduction apparatus 932 generates tap coefficients for individual degeneration classes obtained by degeneration in the reduction method and degeneration information representative of a degeneration method used to obtain the tap coefficients for the individual degeneration classes as reduction filter information and supplies the reduction filter information to the image conversion apparatus 933 and the reversible encoding section 106 (FIG. 64).

To the image conversion apparatus 933, a decoding in-progress image is supplied from the arithmetic operation section 110 (FIG. 64) and reduction filter information is supplied from the reduction apparatus 932. Further, encoding information is supplied to the image conversion apparatus 933.

The image conversion apparatus 933 performs, using the decoding in-progress image as a first image, image conversion by a classification adaptive process in which tap coefficients for the individual degeneration classes and the degeneration information included in the reduction filter information from the reduction apparatus 932 to convert the decoding in-progress image as the first image into an after-filter image as a second image equivalent g to the original image (to generate an after-filter image), and supplies the after-filter image to the frame memory 112 (FIG. 64).

It is to be noted that the image conversion apparatus 933 performs classification in the classification adaptive process using the encoding information as occasion demands.

<Configuration Example of Learning Apparatus 931>

Figure 66:
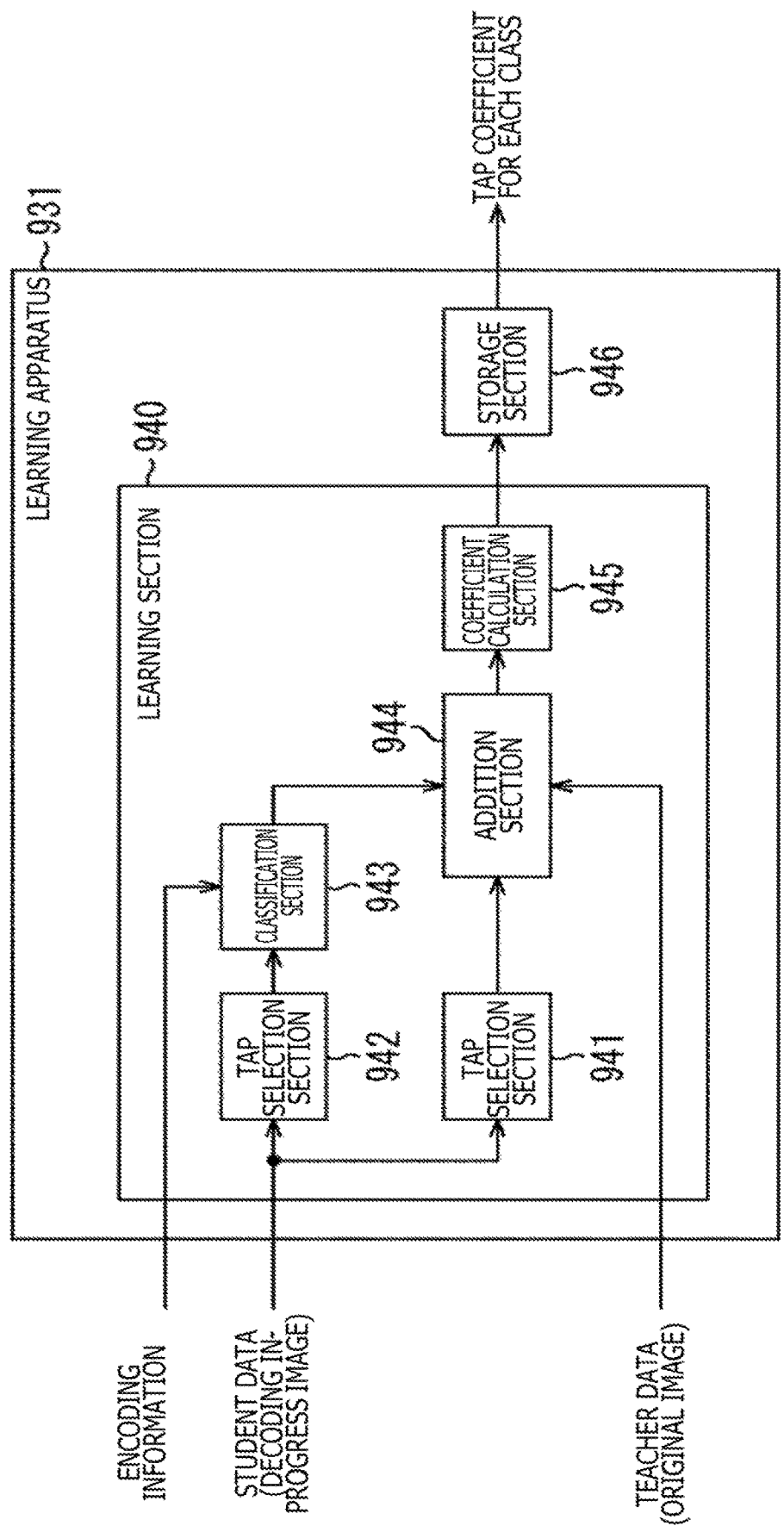
FIG. 66 is a block diagram depicting a configuration example of a learning apparatus 931.

FIG. 66 is a block diagram depicting a configuration example of the learning apparatus 931 of FIG. 65.

Referring to FIG. 66, the learning apparatus 931 includes a learning section 940 and a storage section 946. The learning section 940 includes tap selection sections 941 and 942, a classification section 943, an addition section 944 and a coefficient calculation section 945.

The learning section 940 is common to the learning section 33 of FIG. 13 in that it determines tap coefficients for each class by tap coefficient learning.

However, the learning section 940 is different from the learning section 33 of FIG. 13 in that classification is performed substantially by various classification methods and tap coefficients for several thousand to several ten thousand individual initial classes are determined while, in the learning section 33, tap coefficients of the number of classes sufficiently smaller than such a huge number as mentioned above are determined.

The tap selection section 941 successively selects pixels configuring a decoding in-progress image as student data as a noticed pixel similarly to the tap selection section 41 of FIG. 13 and supplies information representative of the noticed pixel to necessary blocks.

Further, the tap selection section 941 selects, in regard to the noticed pixel, one or more pixels that become a prediction tap from among pixels that configure a decoding in-progress image as student data and supplies the prediction tap configured from one or more pixels to the addition section 44.

The tap selection section 942 selects, in regard to the noticed pixel, one or more pixels that become a class tap from among pixels that configure a decoding in-progress image as student data and supplies the class tap configured from one or more pixels to the classification section 943.

It is to be noted that the tap selection section 942 configures, in regard to the noticed pixel, a plurality of class taps to be used to detect image characteristic amounts as a plurality of kinds of pixel-related information.

The classification section 943 performs, in regard to the noticed pixel, classification using image characteristic amounts and encoding information detected from a plurality of class taps from the tap selection section 942, namely, using a plurality of kinds of pixel-related information, and outputs a class code corresponding to a class of the noticed pixel obtained as a result of the classification to the addition section 944.

Since the classification section 943 performs classification using a plurality of kinds of pixel-related information in such a manner as described above, a noticed pixel is classified to one of, for example, several thousand to several ten thousand or more classes.

Classes obtained by the classification section 943 are initial classes, and accordingly, the class number of initial classes is equal to a class number of classes that can be classified by the classification section 943.

The addition section 944 acquires, similarly to the addition section 44 of FIG. 13, (a pixel value of) a corresponding pixel corresponding to the noticed pixel from among pixels configuring the original image as teacher data and performs addition of the corresponding pixel and (pixel values of) pixels in the decoding in-progress image as student data configuring a prediction tap of the noticed pixel supplied from the tap selection section 941 for each (of class codes) of the initial codes supplied from the classification section 943.

Then, the addition section 944 sets up the normal equation indicated by the expression (8) for each initial class by performing the addition and supplies the normal equations to the coefficient calculation section 945.

The coefficient calculation section 945 solves the normal equation for each initial class supplied from the addition section 944 to determine tap coefficients ($w_n$) for each of the class number of initial classes that can be classified by the classification section 943 similarly to the coefficient calculation section 45 of FIG. 13, and stores the tan coefficients ($w_n$) into the storage section 946.

The storage section 946 stores the tap coefficients for the individual initial classes from the coefficient calculation section 945.

FIG. 67 is a block diagram depicting a configuration example of the tap selection section 42 and the classification section 943 of FIG. 66.

Referring to FIG. 67, the tap selection section 942 includes one or more selection sections $951_1$, $951_2$, . . . , $951_{H-1}$. Meanwhile, the classification section 943 includes a plurality of, H, information detection sections $952_1$, $952_2$, . . . , $952_H$, a plurality of, H, subclass classification sections $953_1$, $953_2$, . . . , $953_E$ and a class configuration section 954.

To a selection section $951_h$, a decoding in-progress image as student data is supplied. The selection section 951 selects pixels, which become an hth class tap to be used for detection of the hth image characteristic amount from within the decoding in-progress image and configures the hth class tap from the pixels, and supplies the hth class tap to the information detection section $952_h$.

Here, the hth class tap configured from a certain selection section $951_h$ and the h'th class tap configured from a different selection section $951_{h'}$ may have a same tap structure or may have tap structures different from each other.

The information detection section $952_h$ detects an hth image characteristic amount from pixels configuring the hth class tap from the selection section $951_h$ and supplies the hth image characteristic amount as hth pixel-related information to the subclass classification section $953_h$.

The information detection section $952_h$ can detect an image characteristic amount such as, for example, an ADRC code obtained by an 1-bit ADRC process of the hth class tap, a DR (Dynamic Range) of pixel values of pixels configuring the hth class tap or the like.

It is to be noted that, to the information detection section $952_H$ from among the information detection sections $952_1$ to $952_H$, encoding information of a noticed pixel is supplied. The information detection section $952_H$ detects necessary information from the encoding information of the notice pixel, and processes the information further as occasion demands, and then supplies the processed information as Hth pixel-related information to the subclass classification section $953_H$.

The subclass classification section $953_h$ subclass-classifies a noticed pixel to an hth subclass as a subset of an (final) initial class of the noticed pixel using the hth image-related information supplied from the information detection section $952_h$ and supplies the hth subclass of the noticed pixel obtained as a result of the subclass classification to the class configuration section 954.

As a method for the subclass classification by the subclass classification section $953_h$, for example, a method of performing a threshold process of comparing the hth pixel-related information with one or a plurality of threshold values and outputting a value representative of a result of the comparison between the hth pixel-related information and the threshold value or values as a subclass (code), a method of outputting, in the case where the hth pixel-related information is a bit string such as, for example, an ADRC code, the bit string as it is as a subclass, and so forth are available.

It is to be noted that, in the case where a threshold value process of pixel-correlated information is performed to perform subclass classification, even if pixel-related information is pixel-related information of a same type, subclasses that are different from each other in threshold value to be used for a threshold value process of the pixel-related information are subclasses different (in method) from each other.

Meanwhile, in the case where the hth class tap and the h'th class tap have tap structures different from each other, even if the information detection sections $952_h$ and $952_{h'}$ detect pixel-related information of a same type from the hth class tap and the h'th class tap, respectively, the subclass that uses the pixel-related information detected from the hth class tap and the subclass that uses the pixel-related information detected from the h'th class tap are subclasses of different methods from each other.

The class configuration section 954 configures an initial class of a noticed pixel from a combination of H subclasses from the first to the Hth subclasses supplied from the subclass classification section $953_1$ to $953_H$, and supplies the initial class to the addition section 944 (FIG. 66).

The classification performed by the classification section 943 is classification of various methods depending upon the tap structure of a class tap configured by the selection section $951_h$, the type of image-related information detected by the information detection section $952_h$ and a method of subclass classification (subclass classification method) performed by the subclass classification section $953_h$.

Further, it can be considered that the classification performed by the classification section 943 includes classification of various methods (classification methods).

It is to be noted that, while, in FIG. 67, the number of information detection sections $952_h$ and the number of subclass classification sections $953_h$ are made equal to each other in order to simplify description, the number of information detection sections $952_h$ and the number of subclass classification sections $953_h$ may not be equal to each other.

Further, (hth) pixel-related information detected by a certain information detection section $952_h$ is supplied to the subclass classification section $953_h$ or is not supplied to the subclass classification sections $953_h$ but supplied to a different subclass classification sections $953_{h''}$.

Furthermore, the subclass classification sections $953_{h'}$ performs subclass classification using (the h'th) pixel-related information supplied from the information detection sections $952_{h'}$, or can perform subclass classification using pixel-related information supplied from the information detection sections $952_h$ or using both of pixel-related information supplied from the information detection sections $952_h$ and $952_{h''}$.

Further, in the classification section 943, the class configuration section 954 not only can perform classification for configuring an initial class using a combination of H subclasses supplied from the subclass classification sections $953_1$ to $953_H$ but also can perform classification for configuring an initial class using a combination of H1, H2, . . . subclasses smaller than H from among the H subclasses.

It can be considered that classification for configuring an initial class using a certain combination from among combinations of one or a plurality of subclasses equal to or smaller than H and classification for configuring an initial class using a different combination are classification of different methods from each other.

The classification section 943 not only can perform classification of one method but also can perform classification of a plurality of methods (a plurality of kinds of classification methods).

Thus, the classification section 943 can select, in the case where classification is performed by a plurality of kinds of classification methods, a classification method by which the picture quality of a decoded image and the encoding efficiency are best among the plurality of kinds of classification methods, namely, a classification method that is best, for example, in RD cost or the k, as an optimum classification method. Further, the classification section 943 can output an initial class obtained by the classification performed by the optimum classification method as the class of the noticed pixel. Further, the encoding apparatus 11 can place and transmit information representative of the optimum classification method into and together with reduction filter information to the decoding apparatus 12, and the decoding apparatus 12 can perform classification by the optimum classification method.

<Example of Image Characteristic Amount that Becomes Pixel-Related Information>

FIG. 68 is a view depicting examples of an image characteristic amount that becomes pixel-related information.

As the image characteristic amount that becomes pixel-related information, for example, an ADRC code, a DR, DiffMax, constancy, activity, a secondary differential sum, a maximum direction difference, a filter bank output and so forth can be adopted.

The ADRC code can be determined in such a manner as described hereinabove with reference to FIG. 2 and so forth. In particular, for example, a 1-bit ADRC code can be determined by dividing a pixel value such as a luminance or the like of a pixel configuring a class into two values with a threshold value and lining up such pixel values as binary values.

According to the (subclass) classification using an ADRC code, a waveform pattern (edge, texture (including a direction) and so forth) of (a pixel group configuring) a class tap is classified exhaustively, and in a classification adaptive process, an optimum restoration effect of an image can be obtained for each waveform pattern of a class tap in a classification adaptive process.

The DR is a difference between a maximum value and a minimum value of a pixel value such as the luminance or the like of pixels configuring the class tap. In the case where the DR is low, the classification that uses the DR contributes to reduction of noise and so forth of a flattened portion, and in the case where the DR is high, the classification contributes to restoration of an edge.

DiffMax is a maximum value of difference absolute values of pixel values of pixels adjacent each other in horizontal, vertical and oblique directions in a class tap. Classification that uses DiffMax contributes, in the case where DiffMax is small in a classification adaptive process, to reduction of a false contour of gradation, but contributes, in the case where DiffMax is great, to restoration of a steep edge (offset).

It is to be noted that the combination of DR and DiffMax, in particular, for example, DiffMax/DR or a biaxial direction of DiffMax and DR (DiffMax, DR) can be made, as an image characteristic amount different from mere DR or mere DiffMax, an index to what number of pixels are required to climb up the amplitude of the DR in a class tap.

The constancy can be represented by a value that represents, for example, in a class tap, a difference between the difference absolute value sums in a direction in which the difference absolute value sum of pixel values of pixels adjacent each other in each direction is in the maximum and in another direction in which the difference absolute value sum is in the minimum. The classification that uses the constancy contributes, in the case where the constancy is small in a classification adaptive process, to restoration of (a fine design such as) a texture (or noise), but contributes, in the case where the constancy is high, to restoration of an edge (structural line).

The activity can be represented, for example, by a difference absolute value sum of pixel values of pixels adjacent each other in the horizontal and vertical directions in a class tap. The classification that uses the activity contributes, in the case where the activity is small, to restoration of a step edge (simple pattern), but contributes, in the case where the activity is great, to restoration of a texture (complicated pattern).

The secondary differential sum is, for example, an absolute value sum of secondary differential of pixel values of pixels adjacent each other in the horizontal and vertical directions in a class tap. The classification that uses the secondary differential sum contributes, in the case where the secondary differential sum is small, to restoration of a step edge, but contributes, in the case where the secondary differential sum is great, to restoration of a texture.

The maximum direction difference is a value representative of a direction in which the difference absolute sum of pixel values of pixels adjacent each other in the horizontal, vertical and oblique directions in a class tap is in the maximum. The classification that uses the maximum direction difference classifies the direction of an amplitude, a gradient, a structure or the like of a periphery of a noticed pixel, and consequently, in a classification adaptive process, an optimum restoration effect of an image can be obtained for each direction of the amplitude, gradient, structure or the like of the periphery of the noticed pixel.

The filter bank output is a value obtained by inputting pixel values of pixels configuring a class tap to a plurality of directional band pass filters. Although the classification that uses the filter bank output requires a high calculation cost, it is high in classification accuracy in comparison with classification that uses the maximum direction difference.

As the image characteristic amount to be detected by the information detection sections $952_h$, an arbitrary image characteristic amount can be adopted in addition to such an ADRC code, DR, DiffMax, constancy, activity, secondary differential sum, maximum direction difference and filter bank output as described above.

<Example of Configuration of Class>

FIG. 69 is a view depicting an example of a method by which the class configuration section 954 of FIG. 67 configures an initial class from first to Hth subclasses supplied from the subclass classification sections $953_1$ to $953_H$.

A of FIG. 69 is a view illustrating a first method of configuring an initial class from first to Hth subclasses.

The class configuration section 954 can determine the product of the first to Hth subclasses and can determine the product as an initial class. In particular, the class configuration section 954 can configure a new bit string in which H bit strings representative of the first to Hth subclasses are lined up, and can output the new bit string as a bit string representative of the initial class.

B of FIG. 69 is a view illustrating a second method for configuring an initial class from first to Hth subclasses.

The class configuration section 954 plots, in a subclass space (pixel-related information space) having axes of the first to Hth subclasses (pixel-related information), for example, points corresponding to first to Hth subclasses (pixel-related information) obtained for individual pixels of a decoding in-progress image as student data from within a set (hereinafter referred to as learning sample) of an original image as teacher data and a decoding in-progress image as student data to be used for tap coefficient learning by the learning apparatus 931.

Further, the class configuration section 954 applies the k-means method or the like to points corresponding to the first to Hth subclasses obtained for the learning samples plotted in the subclass space to cluster the subclass space into a plurality of clusters.

Then, the class configuration section 954 outputs a value corresponding to the cluster to which the points corresponding to the first to Hth subclasses of the noticed pixel are clustered as an initial class of the noticed pixel.

<Example of Combination of Plural Kinds of Pixel-Related Information that Uses Classification>

Figure 70:
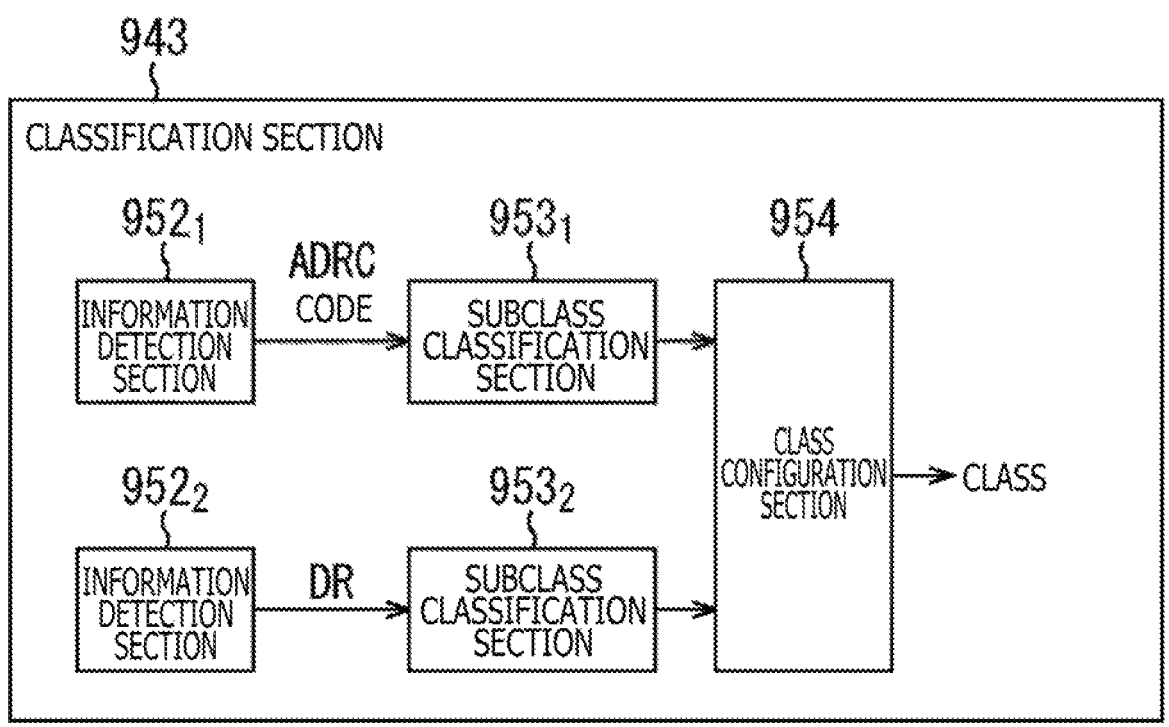
FIG. 70 is a view depicting a first example of a combination of a plurality of kinds of pixel-related information to be used for classification of a noticed pixel.

FIG. 70 is a view depicting a first example of a combination of a plurality of kinds of pixel-related information used for classification of a notice pixel.

As the combination of a plurality of kinds of pixel-related information to be used for classification of a noticed pixel, for example, the combination of the ADRC code and the DR can be used.

According to subclass classification that uses the ADRC code, waveform pattern classification is performed by which a noticed pixel is classified by a waveform pattern of a periphery of the noticed pixel. Meanwhile, according to subclass classification that uses the DR, amplitude classification is performed by which a notice pixel is classified by the amplitude of a periphery of the noticed pixel.

As a result, according to the classification that uses the combination of the ADRC code and the DR, namely, according to that classification that uses, for example, a result of subclass classification that uses the ADRC code and a result of subclass classification that uses the DR, the noticed pixel is classified by an edge and a texture of a periphery of the notice pixel.

Figure 71:
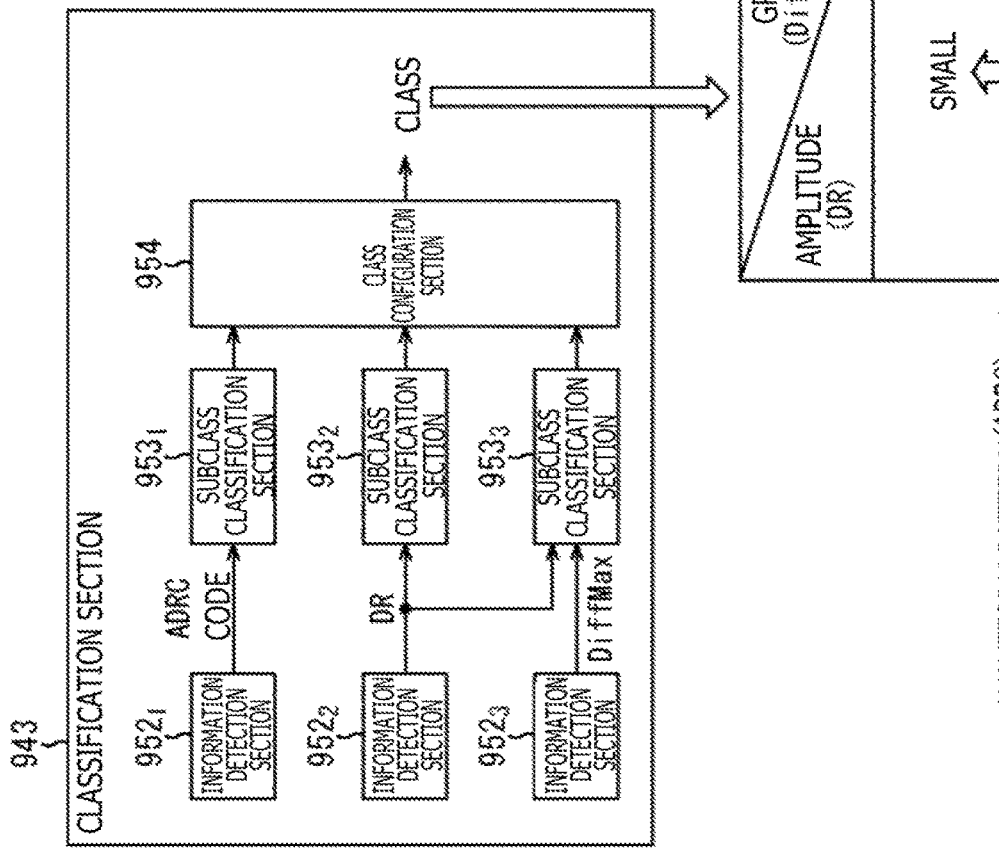
FIG. 71 is a view depicting a second example of a combination of a plurality of kinds of pixel-related information to be used for classification of a noticed pixel.

FIG. 71 is a view depicting a second example of a combination of a plurality of kinds of pixel-related information to be used for classification of a noticed pixel.

As the combination of a plurality of n of pixel-related information to be used for classification of a noticed pixel, for example, a combination of the ADRC code, DR and DiffMax/DR can be used.

According to the subclass classification that uses DiffMax/DR, gradient classification is performed by which a noticed pixel is classified by the gradient of a periphery of the noticed pixel.

The combination of the ADRC code, DR and DiffMax/DR is a combination in which DiffMax/DR is added to the combination of the ADRC code and the DR of FIG. 70. Accordingly, according to that classification that uses the ADRC code, DR and DiffMax/DR, a noticed pixel is classified by an edge, a gradation and a texture of a periphery of the noticed pixel.

Here, the ADRC code is a comparison result of a pixel value such as a luminance or the like of each pixel configuring a class tap and a threshold value and includes information of a direction of change of the pixel value of a periphery of the noticed pixel, and according to (subclass) classification that uses such an ADRC code as just described, a waveform pattern of a periphery of the noticed pixel can be classified exhaustively.

However, since the ADRC code does not include information of the amplitude or gradient of a waveform pattern of a periphery of a noticed pixel, with classification that uses the ADRC code, it is sometimes difficult to classify with a higher degree of accuracy and reduce such a failure as noise of a flat portion or a false contour of a gradation portion or to distinguish a large edge and a small edge to perform restoration in accordance with the strength of the edge.

Thus, by combining the DR and DiffMax/DR with the ADRC code and performing classification using the combination of the ADRC code, DR and DiffMax/DR, it is possible to perform restoration suitable for an image of a local region of a periphery of the noticed pixel.

In particular, according to the classification that uses the combination of the DR and DiffMax/DR with the ADRC code, waveform patterns of a periphery of the noticed pixel can be classified exhaustively. Further, by the DR and DiffMax/DR, it is possible to classify with a high degree of accuracy and reduce a failure like noise of a flat portion or a false contour of a gradation portion or to distinguish a great edge and a small edge from each other to perform restoration in accordance with the strength of the edge.

For example, in the case where both the DR and DiffMax/DR are small, false contours and so forth at flat portions or gradation portions can be classified and reduced. Further, for example, in the case where the DR is small and DiffMax/DR is great, it is possible to classify and reduce noise such as block noise or the like at flat portions. Furthermore, for example, in the case where the DR is great and DiffMax/DR is small, it is possible to classify edges of gentle gradients such that such an edge may not be emphasized excessively. Further, for example, in the case where both the DR and DiffMax/DR are great, it is possible to classify steep edges and restore such edges in an appropriately emphasized state.

Figure 72:
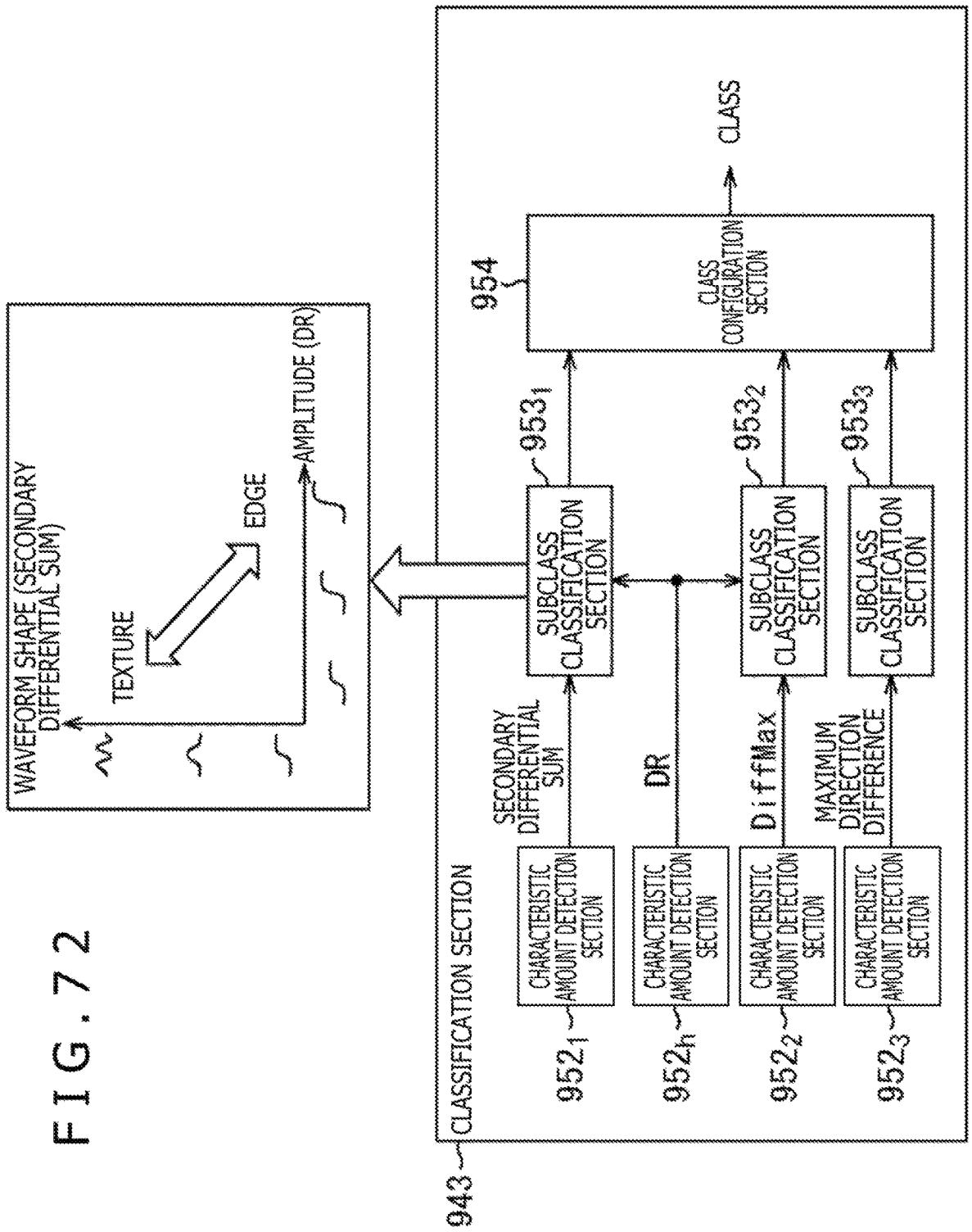
FIG. 72 is a view depicting a third example of a combination of a plurality of kinds of pixel-related information to be used for classification of a noticed pixel.

FIG. 72 depicts a third example of a combination of a plurality of kinds of pixel-related information to be used for classification of a noticed pixel.

As the combination of a plurality of kinds of pixel-related information to be used for classification of a noticed pixel, for example, a combination of a set (combination) of the secondary differential sum and the DR, a set of DiffMax and the DR and a maximum direction difference can be used.

It is to be noted that, in regard to the set of the secondary differential sum and the DR, constancy or activity can be used in place of the secondary differential sum. Further, in regard to the maximum direction difference, the filter bank output can be used in place of the maximum direction difference.

According to the classification that uses a combination of a set (combination) of the secondary differential sum and the DR, a set of DiffMax and the DR and a maximum direction difference, for example, an edge and a texture can be classified by the set of a secondary differential sum and a DR. Further, for example, by the set of DiffMax and the DR (for example, DiffMax/DR), the gradient of an edge and so forth can be classified, and by the maximum direction difference, the direction of an edge can be classified.

As a result, according to the combination of the set of the secondary differential sum and the DR, set of DiffMax and the DR and maximum direction difference, an edge, a texture and a gradation (including a direction of the gradation) can be classified.

<Configuration Example of Deletion Apparatus 932>

Figure 73:
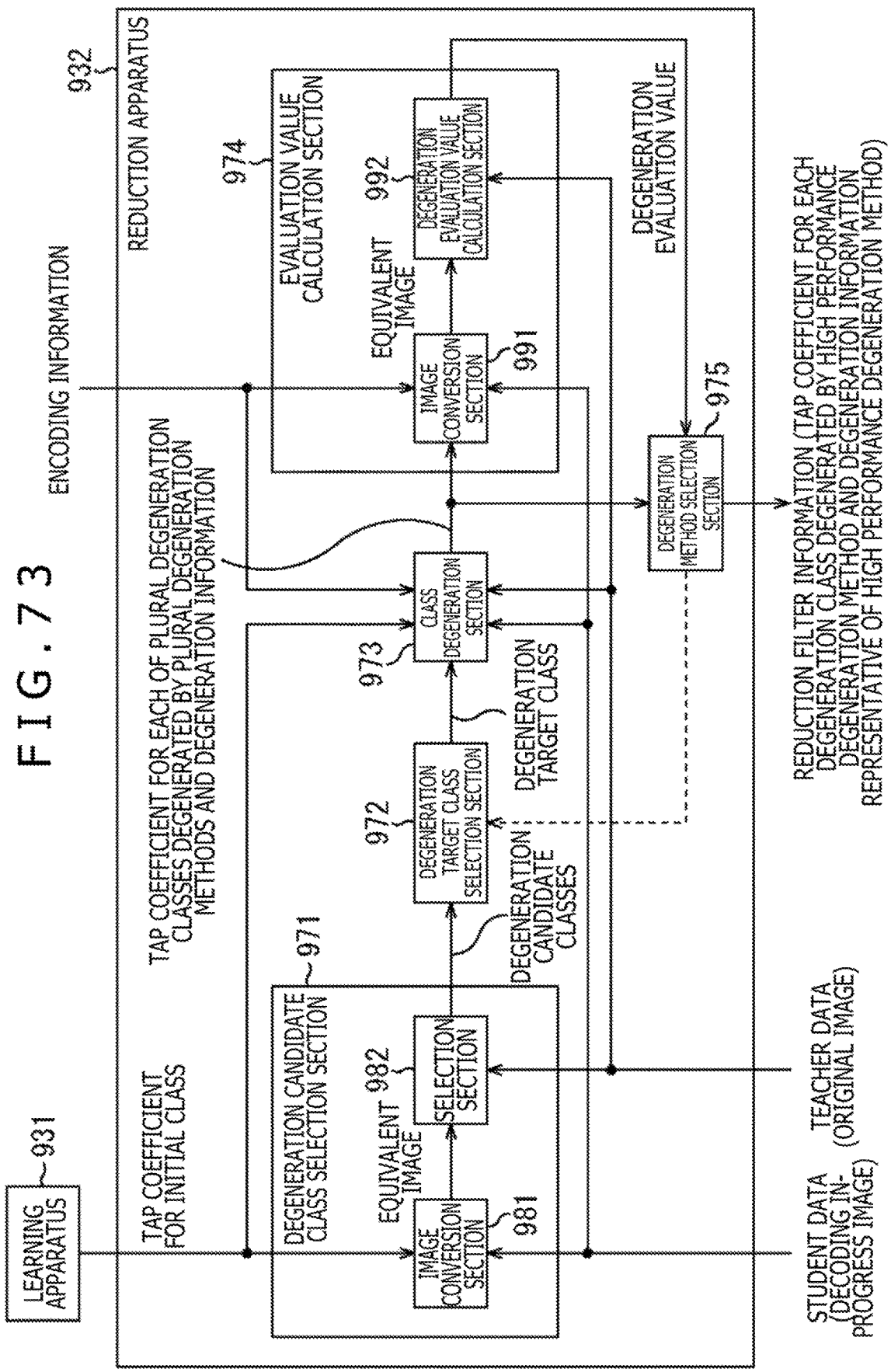
FIG. 73 is a block diagram depicting a configuration example of a deletion apparatus 932.

FIG. 73 is a block diagram depicting a configuration example of the deletion apparatus 932 of FIG. 65.

Referring to FIG. 73, the deletion apparatus 932 includes a degeneration candidate class selection section 971, a degeneration target class selection section 972, a class degeneration section 973, an evaluation value calculation section 974 and a degeneration method selection section 975.

To the degeneration candidate class selection section 971, tap coefficients for each initial class are supplied from the learning apparatus 931 (FIG. 65). Further, to the degeneration candidate class selection section 971, for example, student data (decoding in-progress image) and teacher data (original image) as learning samples similar to those supplied to the learning apparatus 931 are supplied.

The degeneration candidate class selection section 971 uses the tap coefficients for the individual initial classes from the learning apparatus 931 and converts, using the student data (decoding in-progress image) as a first image, the first image into an equivalent image equivalent to the teacher data (original image). Further, the degeneration candidate class selection section 971 uses the equivalent image and the teacher data to determine a class evaluation value, which represents a performance of a tap coefficient for each initial class, for each initial class, selects degeneration candidate classes, which become candidates as a target of degeneration, from among the initial classes in response to the class evaluation values, and supplies (information representative of) the degeneration candidate classes to the degeneration target class selection section 972.

The degeneration candidate class selection section 971 includes an image conversion section 981 and a selection section 982.

The image conversion section 981 performs, for each initial class, prediction arithmetic operation using tap coefficients of the initial class and a decoding in-progress image as student data to perform image conversion for converting the decoding in-progress image as student data into an equivalent image equivalent to the original image as the teacher data. Then, the image conversion section 981 supplies the equivalent image obtained for each initial class to the selection section 982.

The selection section 982 determines a class evaluation value for each initial class using the equivalent images for the individual initial classes from the image conversion section 981 and the original image as the teacher data. As the class evaluation value, for example, the RD cost, S/N or the like can be adopted.

The selection section 982 uses the class evaluation values of the individual classes to determine a boundary class as described hereinabove, for example, with reference to FIG. 63, selects initial classes whose rank of the class valuation value is lower than that of the boundary class as degeneration candidate classes and supplies the degeneration candidate classes to the degeneration target class selection section 972.

The degeneration target class selection section 972 selects one class that has not been selected as a degeneration target class as yet or all classes from among the degeneration candidate classes from the degeneration candidate class selection section 971 as a degeneration target class or classes that become a target of degeneration, and supplies (information representative of) the degeneration target class or classes to the class degeneration section 973.

It is assumed here that, in order to simplify description, the degeneration target class selection section 972 selects all of the degeneration candidate classes from the degeneration candidate class selection section 971 as degeneration target classes.

To the class degeneration section 973, degeneration target glasses are supplied from the degeneration target class selection section 972 and tap coefficients for each class are supplied from the learning apparatus 931 (FIG. 65). Further, to the class degeneration section 973, for example, student data (decoding in-progress image) and teacher data (original image) as learning samples similar to those supplied to the learning apparatus 931 as well as encoding information are supplied.

The class degeneration section 973 performs degeneration of classes such that degeneration target classes are removed from the initial classes. In particular, for example, for example, the degeneration target classes are integrated into other classes that are not degeneration target classes. In this case, pixels to be classified into a degradation target class are classified, where a different class after integration is set as a class after degeneration, into the class after degeneration. In the class degeneration section 973, degeneration of a class is performed by each of a plurality of kinds of degeneration methods.

Further, the class degeneration section 973 determines (re-determines) tap coefficients for each degeneration class degenerated from initial classes for each of the plurality of kinds of degeneration methods using the student data and teacher data as learning samples and encoding information.

Then, the class degeneration section 973 supplies the tap coefficients for the individual degeneration classes regarding individual ones of the plurality of kinds of degeneration methods and degeneration information representative of the degeneration methods to the evaluation value calculation section 974 and the degeneration method selection section 975.

Here, as the method for degeneration by the class degeneration section 973, a tap coefficient reduction method such as, for example, the class code utilization method, positional relationship utilization method, coefficient selection method, inter-coefficient distance utilization method, seed coefficient utilization method and class evaluation value utilization method described hereinabove with reference to FIGS. 62 and 63 and so forth or any other arbitrary method can be adopted.

To the evaluation value calculation section 974, tap coefficients for individual ones of the plurality of kinds of degeneration classes (of individual ones of the plurality of kinds of degeneration methods) are supplied from the class degeneration section 973, and further, for example, student data (decoding in-progress image) and teacher data (original image) as learning samples similar to those supplied to the learning apparatus 931 as well as encoding information are supplied.

The evaluation value calculation section 974 determines, for each of the tap coefficients for individual ones of the plurality of kinds of regeneration classes from the class degeneration section 973, a degeneration evaluation value representative of appropriateness of use of tap coefficients for each degeneration class in prediction arithmetic operation.

The degeneration evaluation value of (the degeneration methods used to obtain) the tap coefficients for each degeneration class is determined using, for example, the student data and the teacher data as learning samples as well as encoding information.

In particular, the evaluation value calculation section 974 includes an image conversion section 991 and a degeneration evaluation value calculation section 992.

The image conversion section 991 performs, for each of the tap coefficients for each of the plurality of kinds of degeneration classes from the class degeneration section 973, image conversion for converting a decoding in-progress image as the student data into an equivalent image equivalent to the original image as the teacher data by a classification adaptive process in which the tap coefficients for each degeneration class are used, and supplies an equivalent image obtained by the image conversion to the degeneration evaluation value calculation section 992.

The degeneration evaluation value calculation section 992 determines, for example, an RD cost, an S/N or the like as a degeneration evaluation value for each of the tap coefficients for each of the plurality of kinds of degeneration classes using the equivalent image obtained for each of the tap coefficients for each of the plurality of kinds of regeneration classes and the original image as the teacher data, both supplied from the image conversion section 991.

Then, the degeneration evaluation value calculation section 992 supplies the degeneration evaluation values for the individual ones of the tap coefficients for the individual ones of the plurality of kinds of degeneration classes to the degeneration method selection section 975.

The degeneration method selection section 975 selects, from among the tap coefficients and the degeneration information for the individual degeneration classes regarding individual ones of the plurality of kinds of degeneration methods from the class degeneration section 973, the tap coefficients and the degeneration information for individual ones of the degeneration classes regarding the degeneration method whose degeneration value from the evaluation value calculation section 774 is best as tap coefficients for the individual degeneration classes degenerated by a degeneration method of a high performance (high performance degeneration method) and degeneration information representative of the high performance degeneration method, respectively, and supplies the selected tap coefficients and high performance degeneration method as reduction filter information to the image conversion apparatus 933 (FIG. 65) and the reversible encoding section 106 (FIG. 64).

It is to be noted that, while it is described here that the degeneration target class selection section 972 selects all of the degeneration candidate classes as degeneration target classes and the class degeneration section 973 performs degeneration of removing all of the degeneration candidate classes as the degeneration target classes, the degeneration target class selection section 972 can select the class to be made a degeneration target class one by one from among the degeneration target classes.

In this case, the class degeneration section 973 performs degeneration of removing one degeneration target class selected by the degeneration target class selection section 972, and a degeneration evaluation value regarding tap coefficients for each class after the degeneration is determined by the evaluation value calculation section 974.

In the case where the degeneration evaluation value regarding tap coefficients for each class after the degeneration demonstrates improvement from that in the preceding operation cycle, the degeneration method selection section 975 causes the degeneration target class selection section 972 to newly select one class to be made a generation target class from among the degeneration target classes as indicated by a broken line arrow mark in FIG. 73 such that similar processes can be repeated thereafter.

On the other hand, in the case where the degeneration evaluation value regarding tap coefficients for each class after the degeneration does not demonstrate improvement from that in the preceding operation cycle, the degeneration method selection section 975 can determine the tap coefficients for each class after the degeneration obtained at the point of time of the preceding operation cycle as a final degeneration result by the degeneration method.

In this case, the class number of classes after degeneration can be optimized.

Further, while it is described that, in FIG. 73, degeneration information is included in the reduction filter information, a corresponding relationship LUT that is a table indicative of a corresponding relationship between initial classes and degeneration classes may be included in place of the degeneration information in the reduction filter information.

According to the degeneration information, a degeneration class can be determined by degenerating initial classes by a degeneration method represented by the degeneration information. Accordingly, while it can be considered that the corresponding relationship LUT is information that directly represents a corresponding relationship between the initial classes and the degeneration classes, it can be considered that the degeneration method is information that indirectly represents the corresponding relationship between the initial classes and the degeneration methods.

It is to be noted that the process by the reduction apparatus 932 of selecting a degeneration method whose degeneration evaluation value is best and tap coefficients for individual degeneration classes degenerated by the degeneration method can be performed not only for tap coefficients for individual initial classes for which classification is performed by one classification method but also for tap coefficients for individual ones of a plurality of kinds of initial classes for which classification is performed by individual ones of the plurality of kinds of classification methods.

In the case where the process for selecting a degeneration method whose degeneration evaluation value is best and tap coefficients for individual ones of degeneration classes degenerated by the degeneration method is performed for tap coefficients for individual ones of the plurality of kinds of initial classes for which classification is performed by individual ones of the plurality of classification methods, a combination of a classification method and a degeneration method whose degeneration evaluation method such as the RD cost or the like is best can be selected from among combinations of individual ones of plurality of kinds of classification methods and individual ones of the plurality of kinds of degeneration methods.

<Configuration Example of Image Conversion Section 981>

Figure 74:
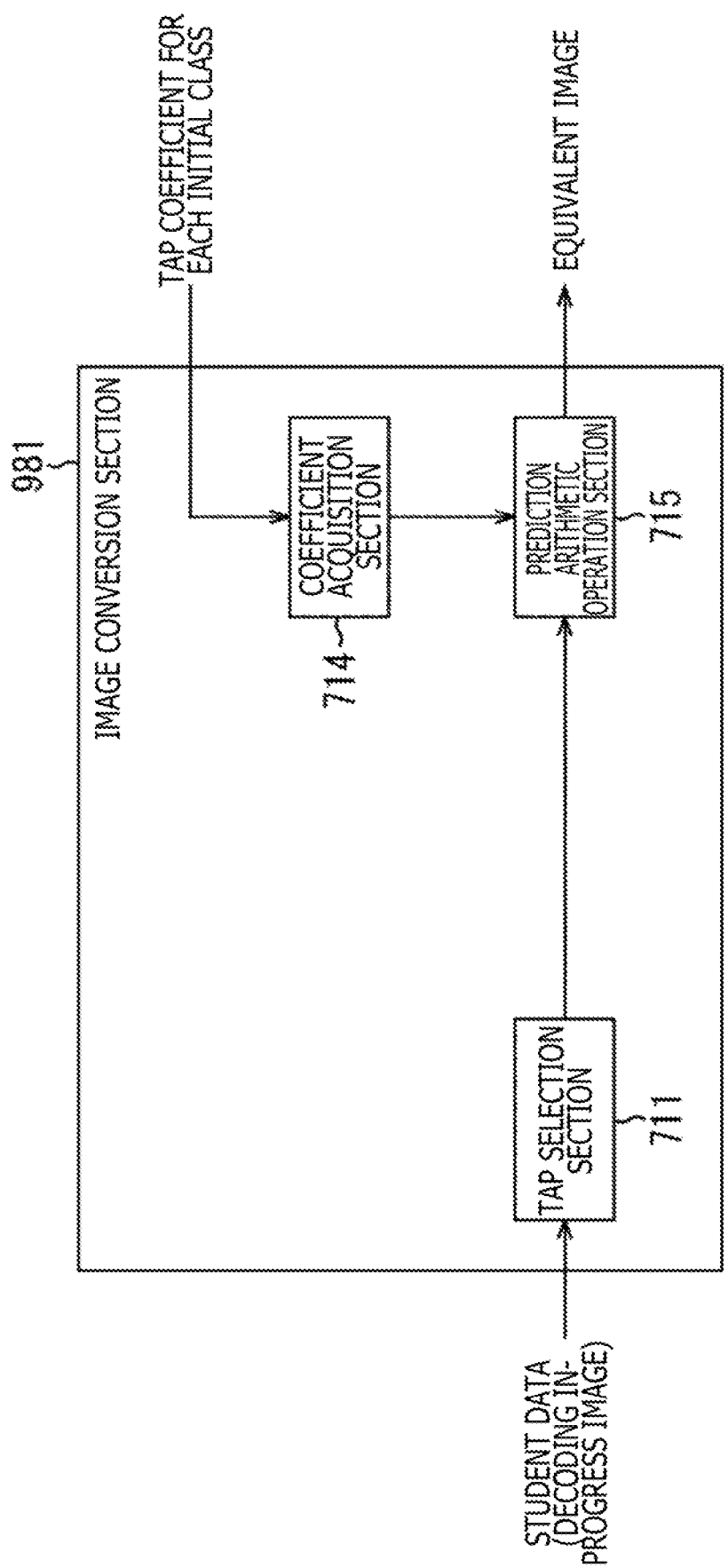
FIG. 74 is a block diagram depicting a configuration example of an image conversion section 981.

FIG. 74 is a block diagram depicting a configuration example of the image conversion section 981 of FIG. 73.

Referring to FIG. 74, the image conversion section 981 includes a tap selection section 711, a coefficient acquisition section 714 and a prediction arithmetic operation section 715.

To the tap selection section 711, a decoding in-progress image as student data is supplied.

The tap selection section 711 successively sets pixels of the decoding in-progress image as student data to a noticed pixel, configures a prediction tap similar to that, for example, by the tap selection section 941 of FIG. 66 in regard to the noticed pixel and supplies the prediction tap to the prediction arithmetic operation section 715.

To a coefficient acquisition section 714, tap coefficients for each initial class from the learning apparatus 931 (FIG. 65) are supplied.

The coefficient acquisition section 714 successively selects the classes as the initial classes as a noticed class, and acquires tap coefficients of the noticed class from among the tap coefficients for the individual initial classes from the learning apparatus 931 (FIG. 65) and supplies the acquired tap coefficients to the prediction arithmetic operation section 715.

The prediction arithmetic operation section 715 performs prediction arithmetic operation using the prediction taps from the tap selection section 711 and the tap coefficients of the noticed class from the coefficient acquisition section 714 similarly to the prediction arithmetic operation section 25 of FIG. 31 to generate an equivalent image equivalent to the original image as the teacher data for each initial class, and supplies the equivalent images to the selection section 982 (FIG. 73).

<Configuration Example of Image Conversion Section 991>

Figure 75:
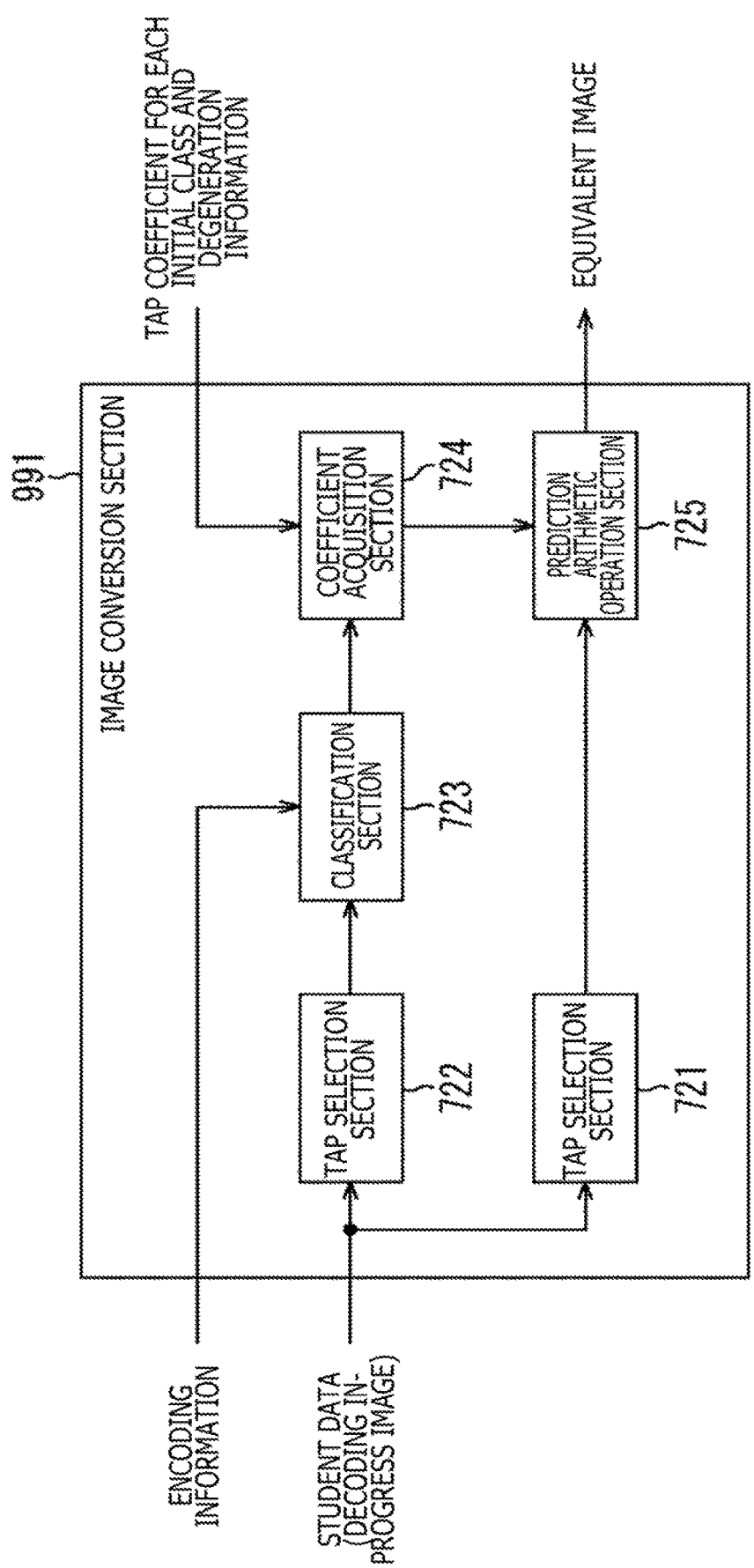
FIG. 75 is a block diagram depicting a configuration example of an image conversion section 991.

FIG. 75 is a block diagram depicting a configuration example of the image conversion section 991 of FIG. 73.

Referring to FIG. 75, the image conversion section 991 includes tap selection sections 721 and 722, a classification section 723, a coefficient acquisition section 724 and a prediction arithmetic operation section 725.

To the tap selection sections 721 and 722, a decoding in-progress image decoding in-progress image as student data is supplied.

The tap selection section 721 successively sets pixels of the decoding in-progress image as the student data as a noticed pixel, and configures a prediction tap, for example, similar to that by the tap selection section 941 of FIG. 66 in regard to the noticed pixel and supplies the prediction tap to the prediction arithmetic operation section 725.

The tap selection section 722 configures a class tap similar to that by the tap selection section 942 of FIG. 66 in regard to the noticed pixel and supplies the class tap to the classification section 723.

The classification section 723 performs, similarly to the classification section 943 of FIG. 66, in regard to the noticed pixel, classification of the noticed pixel using a plurality of kinds of pixel-related information, namely, using image characteristic amounts and encoding information detected from the class tap from the tap selection section 722 and supplies an initial class of the noticed pixel obtained as a result of the classification to the coefficient acquisition section 724.

To the coefficient acquisition section 724, the initial class of the noticed pixel is supplied from the classification section 723, and also degeneration information from the class degeneration section 973 (FIG. 73) and tap coefficients for the individual degeneration classes degenerated by the degeneration methods represented by the degeneration information are supplied.

The coefficient acquisition section 724 converts the initial class of the noticed pixel from the classification section 723 into a degeneration class on the basis of the degeneration information from the class degeneration section 973. Further, the coefficient acquisition section 724 acquires tap coefficients of the degeneration class of the noticed pixel from the tap coefficients for the individual degeneration classes from the class degeneration section 973 and supplies the tap coefficients to the prediction arithmetic operation section 725.

The prediction arithmetic operation section 725 performs prediction arithmetic operation using the prediction tap from the tap selection section 721 and the tap coefficients of the degeneration class of the noticed pixel from the coefficient acquisition section 724, for example, similarly to the prediction arithmetic operation section 25 of FIG. 31 to finally generate an equivalent image equivalent to the original image as the teacher data, and supplies the equivalent image to the degeneration evaluation value calculation section 992 (FIG. 73).

<Configuration Example of Coefficient Acquisition Section 724>

Figure 76:
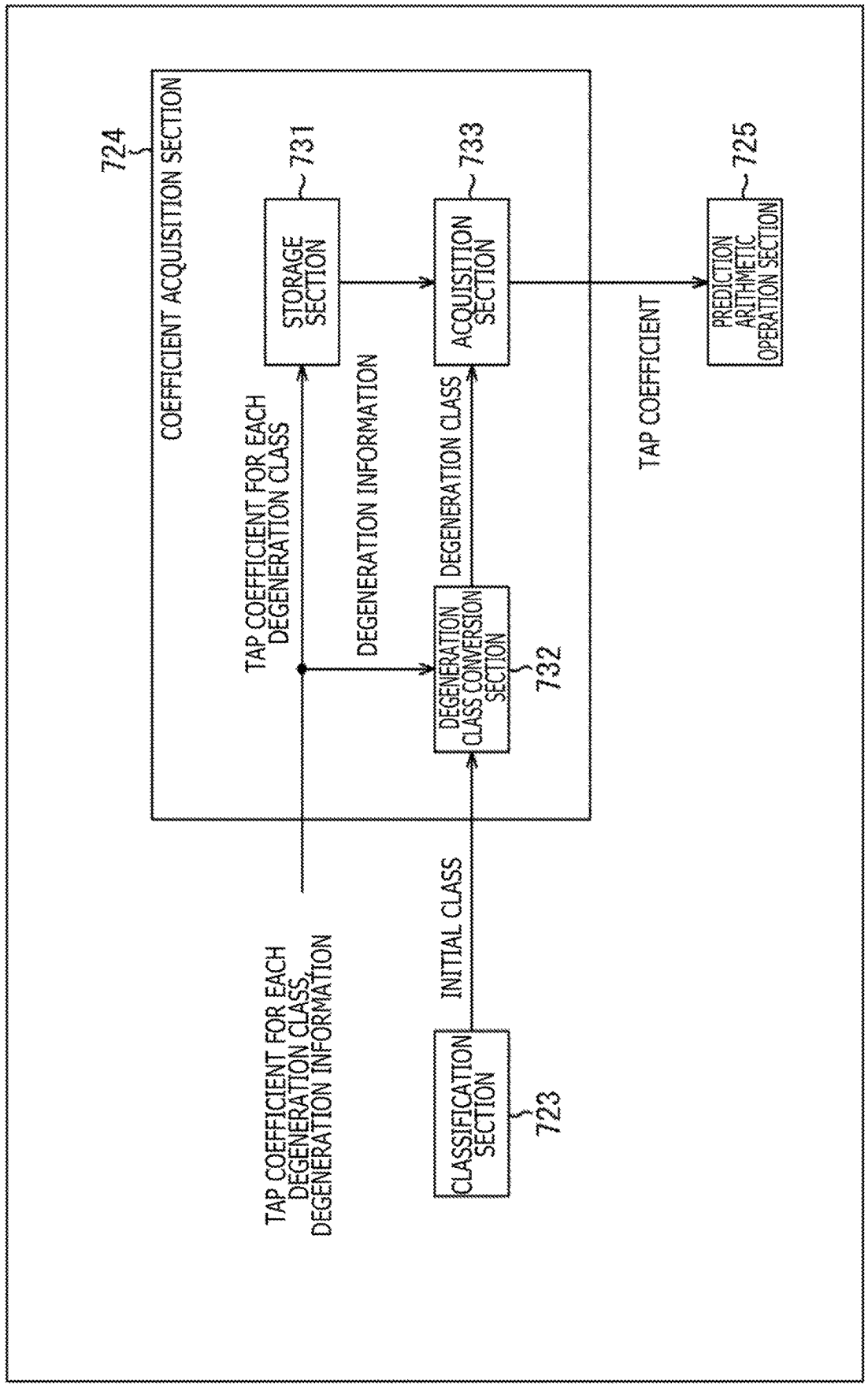
FIG. 76 is a block diagram depicting a configuration example of a coefficient acquisition section 724.

FIG. 76 is a block diagram depicting a configuration example of the coefficient acquisition section 724 of FIG. 75.

Referring to FIG. 76, the coefficient acquisition section 724 includes a storage section 731, a degeneration class conversion section 732 and an acquisition section 733.

To the storage section 731, a tap coefficient for each degeneration class is supplied from the class degeneration section 973 (FIG. 73).

The storage section 731 stores tap coefficients for the individual degeneration classes from the class degeneration section 973.

To the degeneration class conversion section 732, an initial class as a classification result of a noticed pixel is supplied from the classification section 723 (FIG. 75). Further, to the degeneration class conversion section 732, degeneration information is supplied from the class degeneration section 973 (FIG. 73).

The degeneration class conversion section 732 converts the initial class of the notice pixel into a degeneration class of the noticed pixel in accordance with the degeneration information and supplies the degeneration class to the acquisition section 733.

The acquisition section 733 acquires tap coefficients of the degeneration class of the noticed pixel from the degeneration class conversion section 732 from the tap coefficients for the individual degeneration classes stored in the storage section 731 and supplies the acquired coefficients to the prediction arithmetic operation section 725 (FIG. 75).

<Configuration Example of Class Degeneration Section 973>

Figure 77:
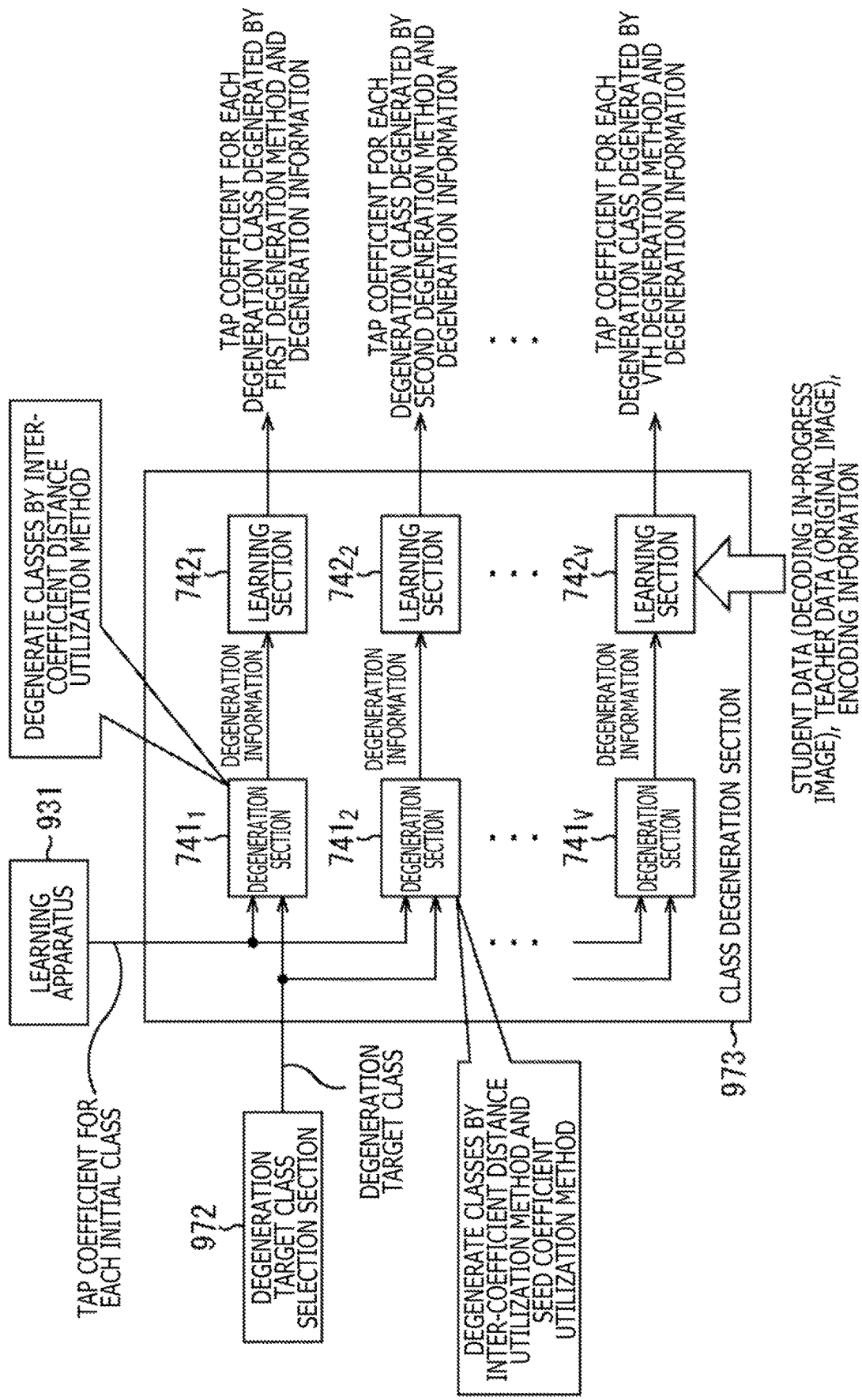
FIG. 77 is a block diagram depicting a configuration example of a class degeneration section 973.

FIG. 77 is a block diagram depicting a configuration example of the class degeneration section 973 of FIG. 73.

Referring to FIG. 77, the class degeneration section 973 includes V, which is a plural number, degeneration sections $741_1$, $741_2$, ..., $741_V$ and V learning sections $742_1$, $742_2$, ..., $742_V$ and performs degeneration of tap coefficients for individual initial classes of the learning apparatus 931 by V kinds of degeneration methods. Further, the class degeneration section 973 performs tap coefficient learning for individual degeneration classes degenerated by individual ones of the V degeneration methods to re-determine tap coefficients for the individual degeneration classes, into which the initial classes are degenerated, in regard to individual ones of the plurality of kinds of degeneration methods.

To a degeneration section $741_v$, tap coefficients for each initial class are supplied from the learning apparatus 931 (FIG. 65) and degeneration target classes are supplied from the degeneration target class selection section 972 (FIG. 73).

The degeneration section $741_v$ performs degeneration of classes by the vth degeneration method such that the degeneration target classes are removed from the degeneration target class selection section 972 from the initial classes whose tap coefficients are supplied from the learning apparatus 931. Then, the degeneration section $741_v$ supplies degeneration information representative of the vth degeneration method to a learning section $742_v$.

To the learning section $742_v$, not only the degeneration information is supplied from the degeneration section $741_v$, but also student data (decoding in-progress image) and teacher data (original image) as learning samples, for example, similar to those supplied to the learning apparatus 931 and encoding information are supplied.

The learning section $742_v$ uses the student data and the teacher data as learning samples and the encoding information to perform tap coefficient learning to determine (re-determine) tap coefficients for the individual degradation classes degenerated from the initial classes.

In particular, the learning section $742_v$ converts, in the tap coefficient learning, the initial class that is a result of classification of the noticed pixel into degeneration classes in response to the vth degeneration method represented by the degeneration information from the degeneration section $741_v$ and determines tap coefficients for the individual degeneration classes (hereinafter referred to also as tap coefficients for the individual degeneration classes degenerated by the vth degeneration method).

Then, the learning section $742_v$ supplies the tap coefficients for the individual degeneration classes degenerated by the vth degeneration method and the degeneration information representative of the vth degeneration method to the evaluation value calculation section 974 and the degeneration method selection section 975 (FIG. 73).

As the vth degeneration method, one of, for example, as described hereinabove with reference to FIGS. 62 and 63, the class code utilization method, positional relationship utilization method, coefficient selection method, inter-coefficient distance utilization method and seed coefficient utilization method described above, tap coefficient reduction method such as the class evaluation value utilization method or the like and other arbitrary methods can be adopted solely.

Further, as the vth degeneration method, for example, a combination of a plurality of methods such as a combination of the inter-coefficient distance utilization method and the seed coefficient utilization method, a combination of the class code utilization method and the inter-coefficient distance utilization method or the like can be adopted.

For example, in the case where the ADRC code is used in classification to initial classes, a degeneration method of a combination of the inter-coefficient distance utilization method and the class code utilization method can be adopted. In this case, degeneration of tap coefficients to each initial class can be performed such that the degradation evaluation value becomes better and besides the data amount decreases in comparison with those in an alternative case in which only the inter-coefficient distance utilization method or only class code utilization method is adopted.

Further, for example, in the case where a (significant) physical quantity that changes continuously such as a DR, DiffMax or the like is used as an image characteristic amount in classification into an initial class, at least the seed coefficient utilization method that uses one of or both the DR and DiffMax as a parameter can be adopted as the degeneration method of tap coefficients for each initial class. By degeneration according to the seed coefficient utilization method, the PSNR that has a tradeoff relationship with the compression efficiency can improved.

Furthermore, for degeneration of tap coefficients for each initial class, for example, a degeneration method that is a combination of the inter-coefficient distance utilization method and the seed coefficient utilization method can be adopted. Even if a certain initial class c and a different initial class c' have a small inter-coefficient distance, an image characteristic amount classified into the initial class c and an image characteristic amount classified into the initial class c' sometimes differ significantly from each other. In this case, it is sometimes possible to increase the picture quality improvement effect or improve the compression efficiency (encoding efficiency) by degenerating tap coefficients of the initial class c and tap coefficients of the initial class c' by the seed coefficient utilization method in which the image characteristic amount is a parameter rather than that by degenerating the initial classes c and c' into one class (degeneration class) by the inter-coefficient distance utilization method.

It is to be noted that, in the case where at least the ADRC code is used for classification, especially the class code utilization method is useful for degeneration of tap coefficients for each initial class.

Further, in the case where at least the ADRC, the DR or DiffMax is used for classification, especially the class evaluation value utilization method sometimes is effective for degeneration of tap coefficients for each initial class.

Furthermore, in the case where the DR or DiffMax is used for classification, especially the seed-coefficient utilization method sometimes is effective for degeneration of tap coefficients for each initial class.

Figure 78:
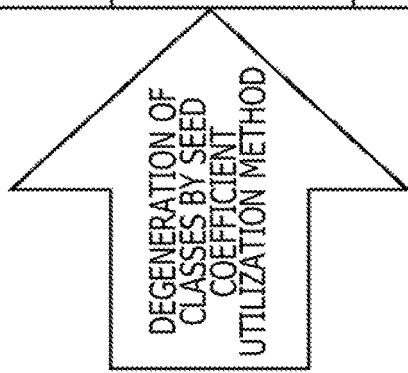
FIG. 78 is a view illustrating an example of degeneration of tap coefficients for individual initial classes by a seed coefficient utilization method.

FIG. 78 is a view illustrating an example of degeneration of tap coefficients for each initial class by the seed coefficient utilization method.

In FIG. 78, an initial class is configured from an ADRC subclass obtained by subclass classification using the ADRC code and a DR subclass obtained by subclass classification using the DR.

Further, in FIG. 78, both the ADRC subclass and the DR subclass are represented by 2 bits, and the initial class is represented by 4 bits lining up the ADRC subclass of 2 bits and the DR subclass of 2 bits.

Accordingly, the class number of initial classes is 16 (=$2^4$) classes.

By degenerating tap coefficients tc # i for individual ones of such 16 initial classes as described above by the seed coefficient utilization method in which the DR is made a parameter, a seed coefficient sc # j for each degeneration class configured rom an ADRC subclass of 2 bits is obtained.

In FIG. 78, for example, tap coefficients tc #0, tc #1, tc #2 and tc #3 of four initial classes whose ADRC subclass is 00 and whose DR subclass is 00, 01, 10 and 11, respectively, are degenerated into a seed coefficient sc #0 of a degeneration class whose ADRC subclass is 00. This similarly applies also to the tap coefficients of the other initial classes.

From the seed coefficient sc # j for each degeneration class, using the DR as a parameter z, tap coefficients for each degeneration class can be generated for various values of the DR in accordance with the expression (9).

It is to be noted that, in the case where degeneration of tap coefficients for each initial class is performed by the seed coefficient utilization method, the degeneration information representative of the seed coefficient utilization method as the degeneration method can include information representative of (the kind of) the image characteristic amount used as a parameter. In this case, the decoding apparatus 12 can recognize the parameter from the information included in the degeneration information and determine tap coefficients from the seed coefficient using the parameter.

Figure 79:
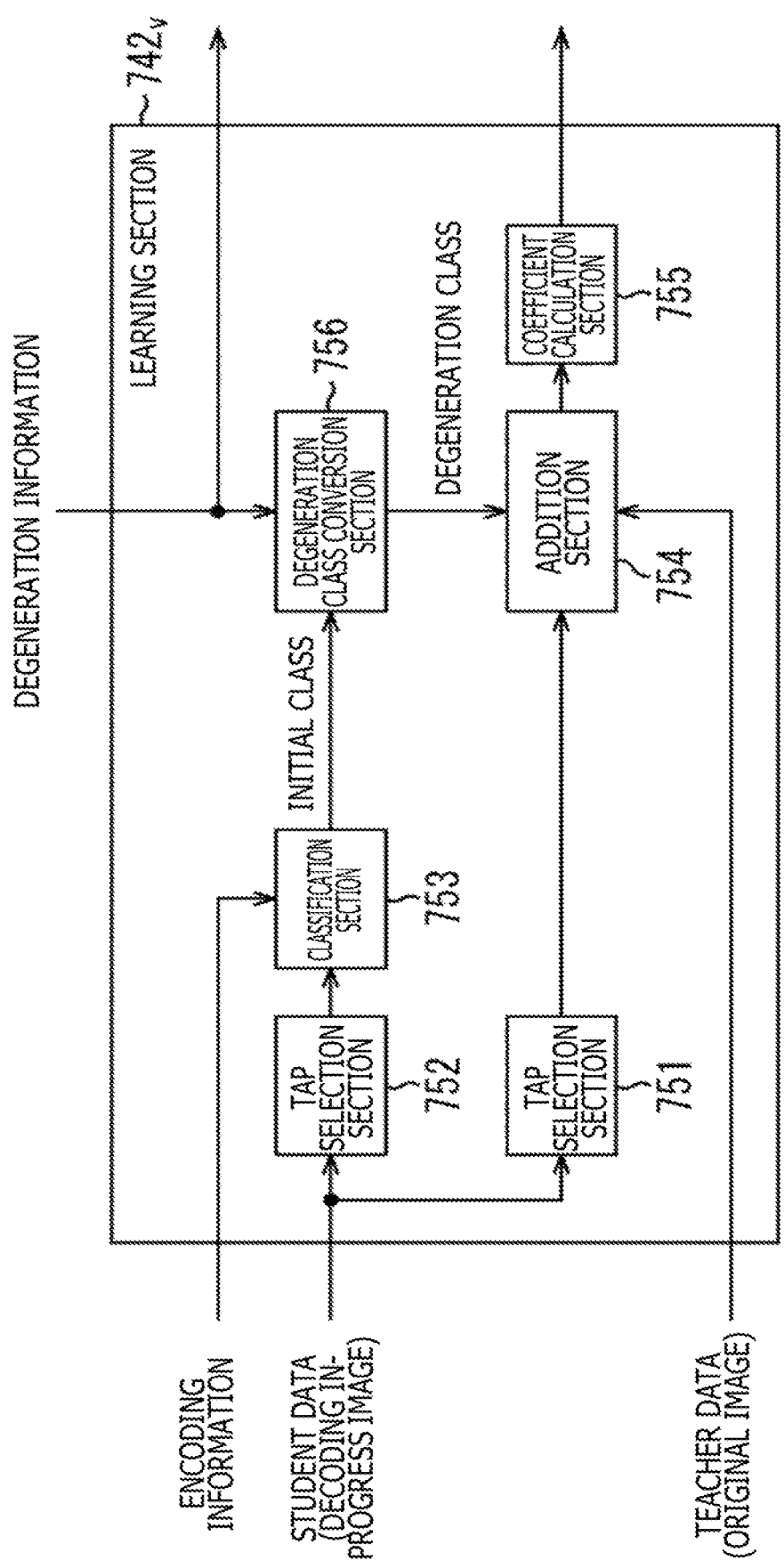
FIG. 79 is a block diagram depicting a configuration example of a learning section $742_v$.

FIG. 79 is a block diagram depicting a configuration example of the learning section $742_v$ of FIG. 77.

Referring to FIG. 79, the learning section $742_v$ includes tap selection sections 751 and 752, a classification section 753, an addition section 754, a coefficient calculation section 755 and a degeneration class conversion section 756.

The tap selection sections 751 and 752 and the classification section 753 perform processes similar to those of the tap selection sections 941 and 942 and the classification section 752 of the learning apparatus 931 of FIG. 66, respectively.

Consequently, to the addition section 754, a prediction tap of a noticed pixel selected from a decoding in-progress result image as student data is supplied from the tap selection section 751, and to the degeneration class conversion section 756, initial classes are supplied from the classification section 753.

To the degeneration class conversion section 756, the initial classes are supplied from the classification section 753, and further, degeneration information representative of the vth degeneration method is supplied from the degeneration section $741_v$ (FIG. 77).

The degeneration class conversion section 756 converts the initial class of the noticed pixel in accordance with the degeneration method from the degeneration section $741_v$ into a degeneration class degenerated by the vth degeneration method represented by the degeneration information, and supplies the degeneration class to the addition section 754.

The addition section 754 acquires (a pixel value of) a corresponding pixel corresponding to the noticed pixel from among pixels configuring the original image as teacher data similarly to the addition section 944 of FIG. 66, and performs addition of targets of the corresponding pixel and (the pixel value of) the pixels of the decoding in-progress image as the student data configuring the prediction tap regarding the noticed pixel supplied from the tap selection section 941.

However, the addition section 754 performs the addition not for each initial class but for (the class code of) each degeneration class supplied from the degeneration class conversion section 756.

Then, the addition section 754 sets up a normal equation indicated by the expression (8) for each degradation class by performing the addition and supplies the normal equations to the coefficient calculation section 755.

The coefficient calculation section 755 solves the normal equation for each degeneration class supplied from the addition section 754 to determine (re-determine) a tap coefficient ($w_n$) for each degeneration class degenerated by the vth degeneration method from the number of initial classes that can be classified by the classification section 953 similarly to the coefficient calculation section 45 of FIG. 13, and supplies the tap coefficient ($w_n$) to the evaluation value calculation section 974 and the degeneration method selection section 975 (FIG. 73) together with the degeneration information representative of the vth degeneration method from the degeneration section $741_v$ (FIG. 77).

<Configuration Example of Image Conversion Apparatus 933>

Figure 80:
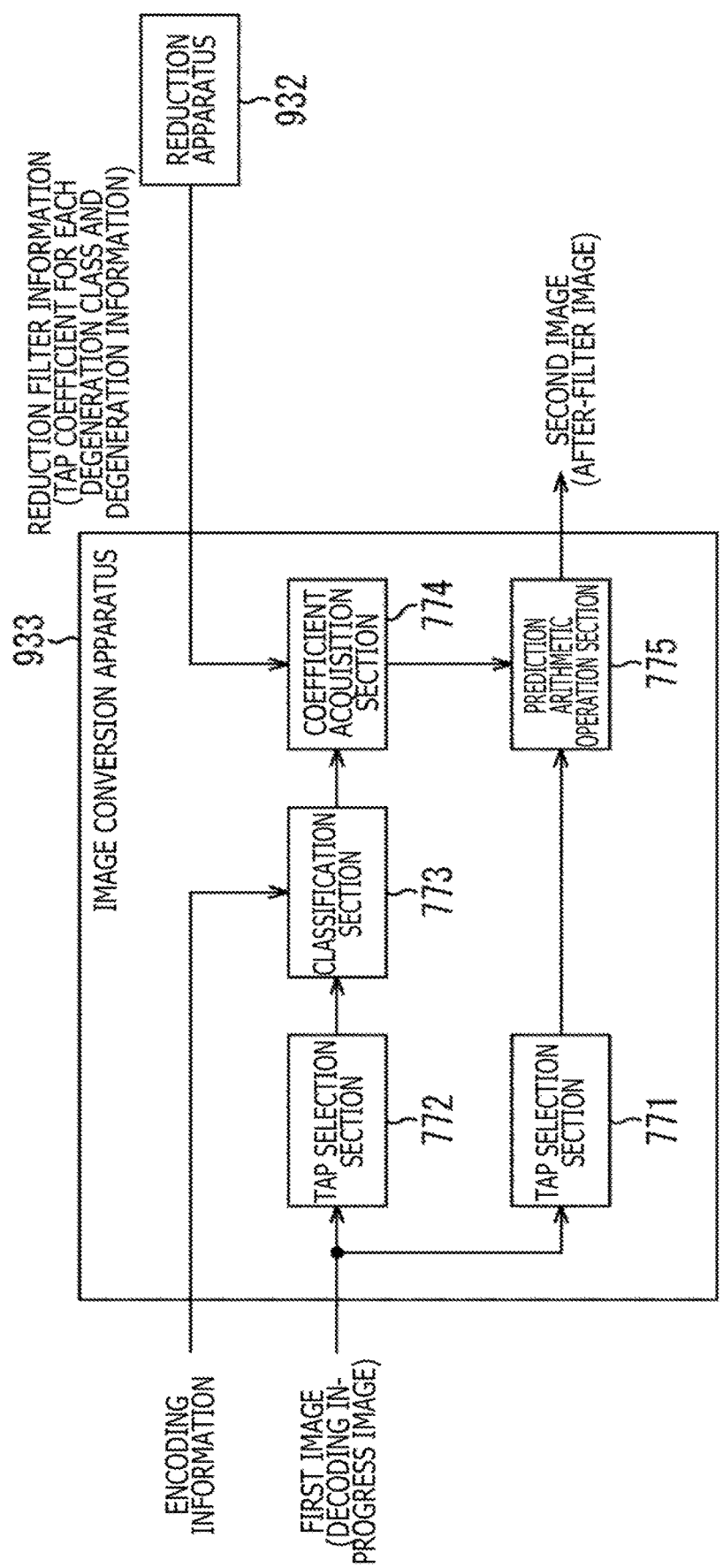
FIG. 80 is a block diagram depicting a configuration example of an image conversion apparatus 933.

FIG. 80 is a block diagram depicting a configuration example of the image conversion apparatus 933 of FIG. 65.

Referring to FIG. 80, the image conversion apparatus 933 includes tap selection sections 771 and 772, a classification section 773, a coefficient acquisition section 774 and a prediction arithmetic operation section 775.

The components from the tap selection section 771 to the prediction arithmetic operation section 775 are configured similarly to those from the tap selection section 721 to the prediction arithmetic operation section 725 of FIG. 75, respectively.

To the tap selection sections 771 and 772, a decoding in-progress image as a first image is supplied.

The tap selection section 771 successively sets pixels of the decoding in-progress image as the first image as a notice pixel and configures a prediction tap, for example, similar to that by the tap selection section 941 of FIG. 66 in regard to the noticed pixel, and supplies the configured prediction tap to the prediction arithmetic operation section 775.

The tap selection section 772 configures a class tap similar to that by the tap selection section 942 of FIG. 66 in regard to the noticed pixel and supplies the class tap to the classification section 773.

The classification section 773 performs, similarly to the classification section 943 of FIG. 66, in regard to a noticed pixel, classification using a plurality of kinds of pixel-related information, namely, using image characteristic amounts detected from the class tap from the tap selection section 772 and encoding information, and supplies an initial class of the noticed pixel obtained as a result of the classification to the coefficient acquisition section 774.

To the coefficient acquisition section 774, not only the initial class of the noticed pixel is supplied from the classification section 773 but also reduction filter information is supplied from the reduction apparatus 932 (FIG. 65) (FIG. 73).

Here, the reduction filter information supplied from the reduction apparatus 932 to the coefficient acquisition section 774 is reduction filter information outputted from the degeneration method selection section 975 (FIG. 73) of the reduction apparatus 943 and includes degeneration information representative of a high performance degeneration method whose degeneration evaluation value is best from among the first to vth degeneration methods and tap coefficients for each degeneration class degenerated from tap coefficients for each initial class by the high performance degeneration method.

The coefficient acquisition section 774 converts the initial class of the noticed pixel from the classification section 773 into a degeneration class based on the degeneration information included in the reduction filter information from the reduction apparatus 932 by the degeneration method represented by the degeneration information. Further, the coefficient acquisition section 774 acquires tap coefficients of the degeneration class of the noticed pixel from among the tap coefficients for the individual degeneration classes included in the reduction filter information from the reduction apparatus 932, and supplies the tap coefficients to the prediction arithmetic operation section 775.

The prediction arithmetic operation section 775 performs prediction arithmetic operation using the prediction tap from the tap selection section 771 and the tap coefficients of the degeneration class of the noticed pixel from the coefficient acquisition section 774, for example, similarly to the prediction arithmetic operation section 25 of FIG. 31 and finally generates an after-filter image as a second image equivalent to the original image and then supplies the decoding in-progress image to the frame memory 112 (FIG. 64).

<Configuration Example of Coefficient Acquisition Section 774>

Figure 81:
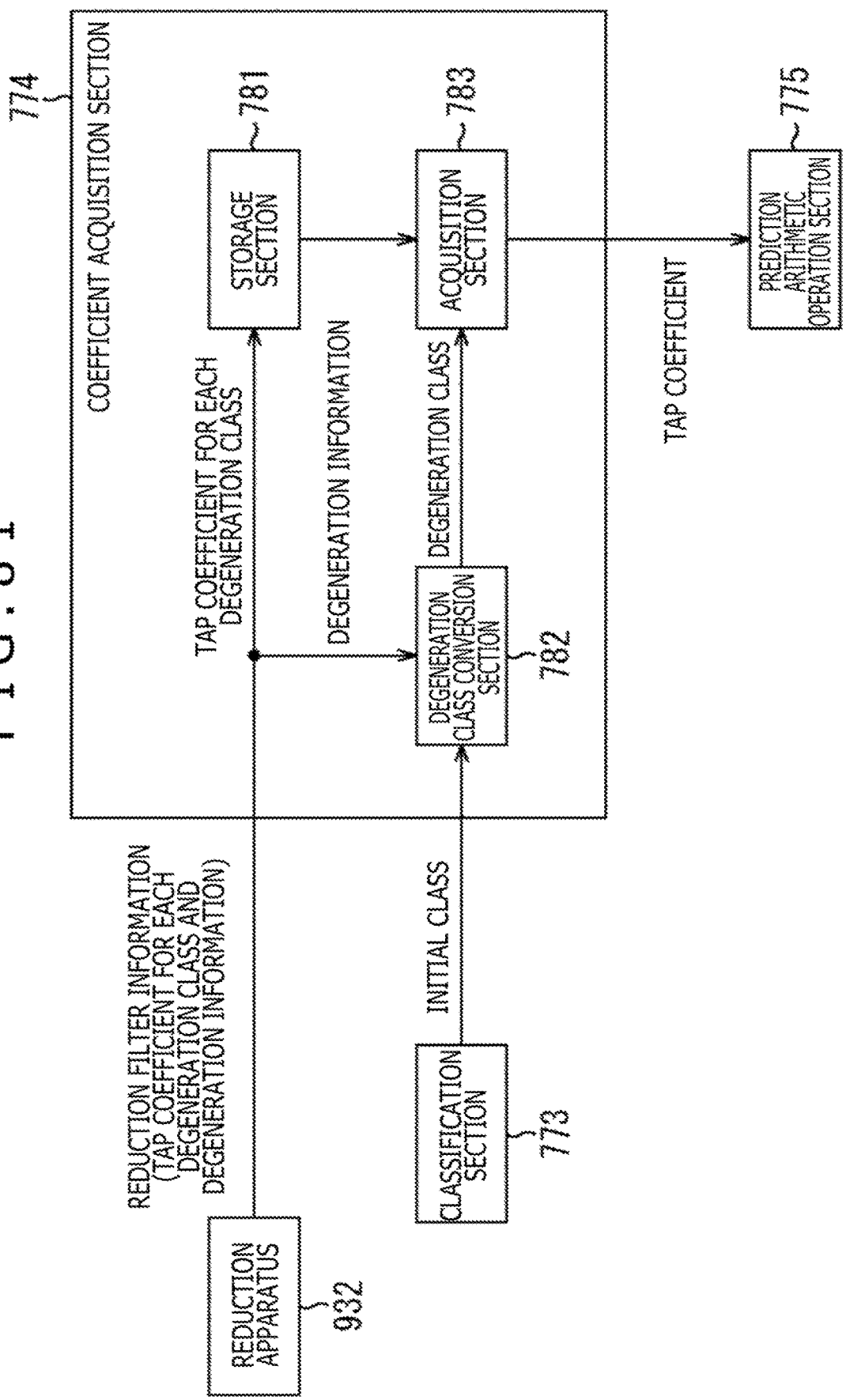
FIG. 81 is a block diagram depicting a configuration example of a coefficient acquisition section 774.

FIG. 81 is a block diagram depicting a configuration example of the coefficient acquisition section 774 of FIG. 80.

Referring to FIG. 81, the coefficient acquisition section 774 includes a storage section 781, a degeneration class conversion section 782 and an acquisition section 783.

The components from the storage section 781 to the acquisition section 783 are configured similarly to those from the storage section 731 to the acquisition section 733 of FIG. 76, respectively.

To the storage section 781, reduction filter information is supplied from the reduction apparatus 932 (FIG. 65) (FIG. 73).

The storage section 781 stores tap coefficients for the individual degeneration classes included in the reduction filter information from the reduction apparatus 932.

To the degeneration class conversion section 782, an initial class as a classification result of a noticed pixel is supplied from the acquisition section 773 (FIG. 80). Further, to the degeneration class conversion section 782, reduction filter information is supplied from the reduction apparatus 932.

The degeneration class conversion section 782 converts the initial class of the noticed class into a degeneration class of the noticed pixel in accordance with the degeneration information included in the reduction filter information and supplies the degeneration class to the acquisition section 783.

The acquisition section 783 acquires tap coefficients of the degeneration class of the noticed pixel from the degeneration class conversion section 782 from among the tap coefficients for the individual degeneration classes stored in the storage section 781 and supplies the acquired tap coefficients to the prediction arithmetic operation section 775 (FIG. 80).

<Encoding Process>

Figure 82:
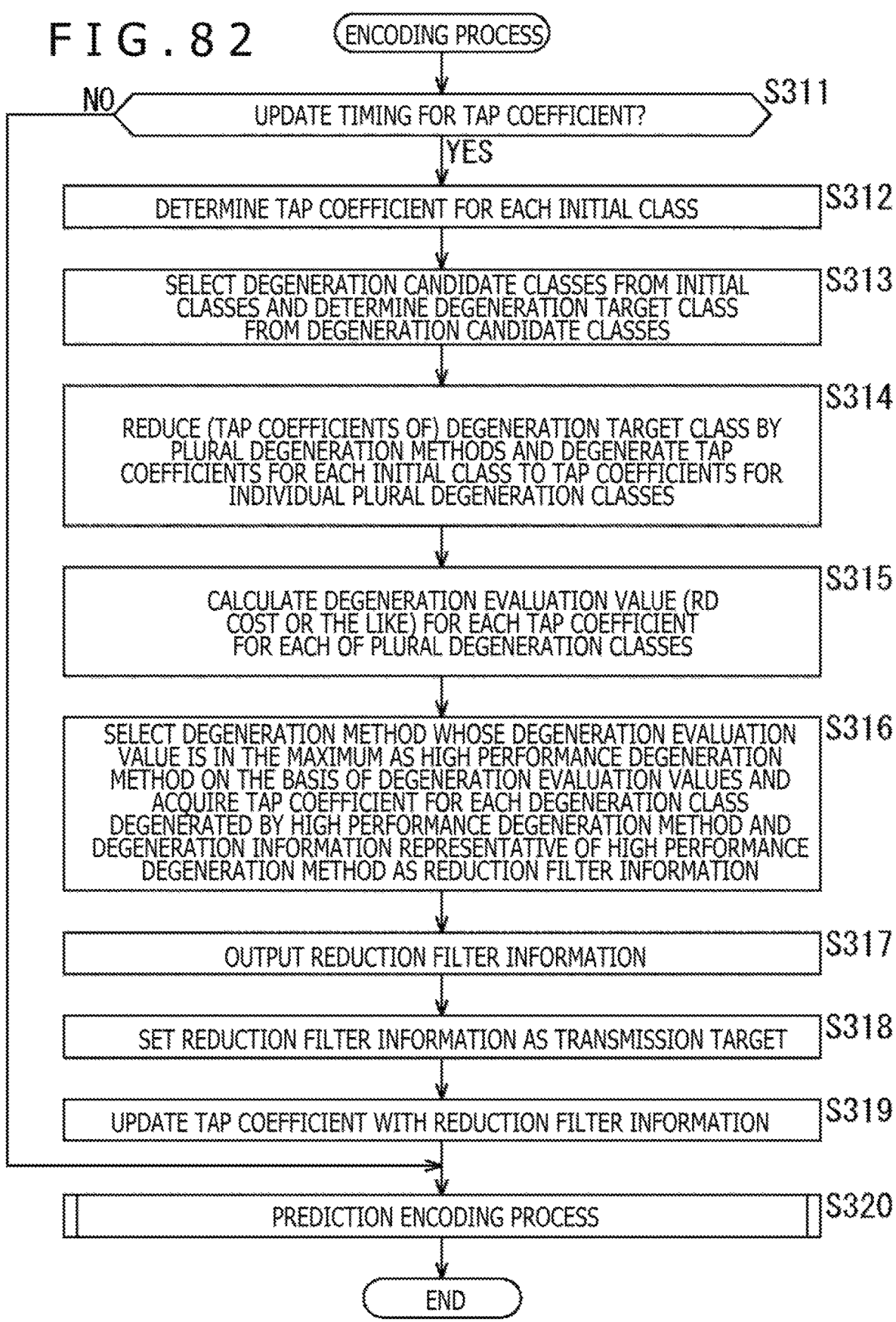
FIG. 82 is a flow chart illustrating an example of the encoding process of the encoding apparatus 11.

FIG. 82 is a flow chart illustrating an example of an encoding process of the encoding apparatus 11 of FIG. 64.

At step S311, the learning apparatus 931 (FIG. 65) of the classification adaptive filter 911 decides whether the timing at present is an update timing for a tap coefficient similarly as at step S11 of FIG. 17.

In the case where it is decided at step S311 that the timing at present is not an update timing for a tap coefficient, the processing advances to step S320 skipping steps S312 to S319.

On the other hand, in the case where it is decided at step S311 that the timing at present is an update timing for a tap coefficient, the processing advances to step S312, at which the learning apparatus 931 performs classification using a plurality of pieces of pixel-related information to perform tap coefficient learning for determining tap coefficients for each initial class.

Then, the learning apparatus 931 supplies the tap coefficients for the individual initial classes obtained by the tap coefficient learning to the reduction apparatus 932, and the processing advances from step S312 to step S313.

At step S313, the degeneration candidate class selection section 971 (FIG. 73) of the reduction apparatus 932 selects degeneration candidate classes from among the initial classes whose tap coefficients are supplied from the learning apparatus 931 and supplies the selected degeneration candidate classes to the degeneration target class selection section 972 (FIG. 73).

The degeneration target class selection section 972 selects a degeneration target class from among the degeneration candidate classes from the degeneration candidate class selection section 971 and supplies the selected degeneration target class to the class degeneration section 973 (FIG. 73), and the processing advances from step S313 to step S314.

At step S314, the class degeneration section 973 degenerates the tap coefficients for the individual initial classes from the learning apparatus 931 to tap coefficients for individual degeneration classes obtained by removing the degeneration target class (from the degeneration target class selection section 972) from the initial classes.

The class degeneration section 973 performs degeneration for the tap coefficients for the individual initial classes by a plurality of kinds of degeneration methods thereby to determine tap coefficients for each of the plurality of kinds of degeneration classes.

Then, the class degeneration section 973 supplies, in regard to each of the plurality of kinds of degeneration methods, degeneration information representative of the degeneration method and the tap coefficients for the individual degeneration classes degenerated by the degeneration method to the evaluation value calculation section 974 and the degeneration method selection section 975 (FIG. 73), and the processing advances from step S314 to step S315.

At step S315, the evaluation value calculation section 974 determines, in regard to each of the tap coefficients for individual ones of the plurality of kinds of degeneration classes from the class degeneration section 973, a degeneration evaluation value representative of appropriateness of use of the tap coefficients for the individual degeneration classes in prediction arithmetic operation. The evaluation value calculation section 974 supplies the degeneration evaluation values regarding individual ones of the tap coefficients for individual ones of the plurality of kinds of degeneration classes to the degeneration method selection section 975 (FIG. 73), and the processing advances from step S315 to step S316.

At step S316, the degeneration method selection section 975 selects, from among the tap coefficients and the degeneration information for the individual degeneration classes in regard to individual ones of the plurality of kinds of degeneration methods from the class degeneration section 973, tap coefficients for the individual degeneration classes degenerated by a high performance degeneration method, and degeneration information representative of the high performance degeneration method, namely, the tap coefficients (including seed coefficients as occasion demands) for the individual degeneration classes regarding the degeneration method whose degeneration evaluation value is best from the evaluation value calculation section 774 and the degeneration information, and acquires them as reduction filter information.

At step S317, the degeneration method selection section 975 of the reduction apparatus 932 outputs the reduction filter information to the reversible encoding section 106 (FIG. 64) and the image conversion apparatus 933 (FIG. 65), and the processing advances to step S318.

At step S318, the reversible encoding section 106 (FIG. 64) sets the reduction filter information from the reduction apparatus 932 as a transmission target, and the processing advances to step S319. The reduction filter information set as the transmission target is placed into and transmitted together with encoded data in a prediction encoding process performed at step S320 hereinafter described.

At step S319, in the image conversion apparatus 933 (FIG. 80), the storage section 781 of the coefficient acquisition section 774 (FIG. 81) updates the tap coefficients for the individual degeneration classes stored in the storage section 781 to the tap coefficients for the individual degeneration classes included in the reduction filter information from the reduction apparatus 932 (stores the tap coefficients for the individual degeneration classes included in the degeneration filter information in an overwriting state). Then, the processing advances to step S320.

At step S320, a prediction encoding process of the original image is performed, and the encoding process ends.

Figure 83:
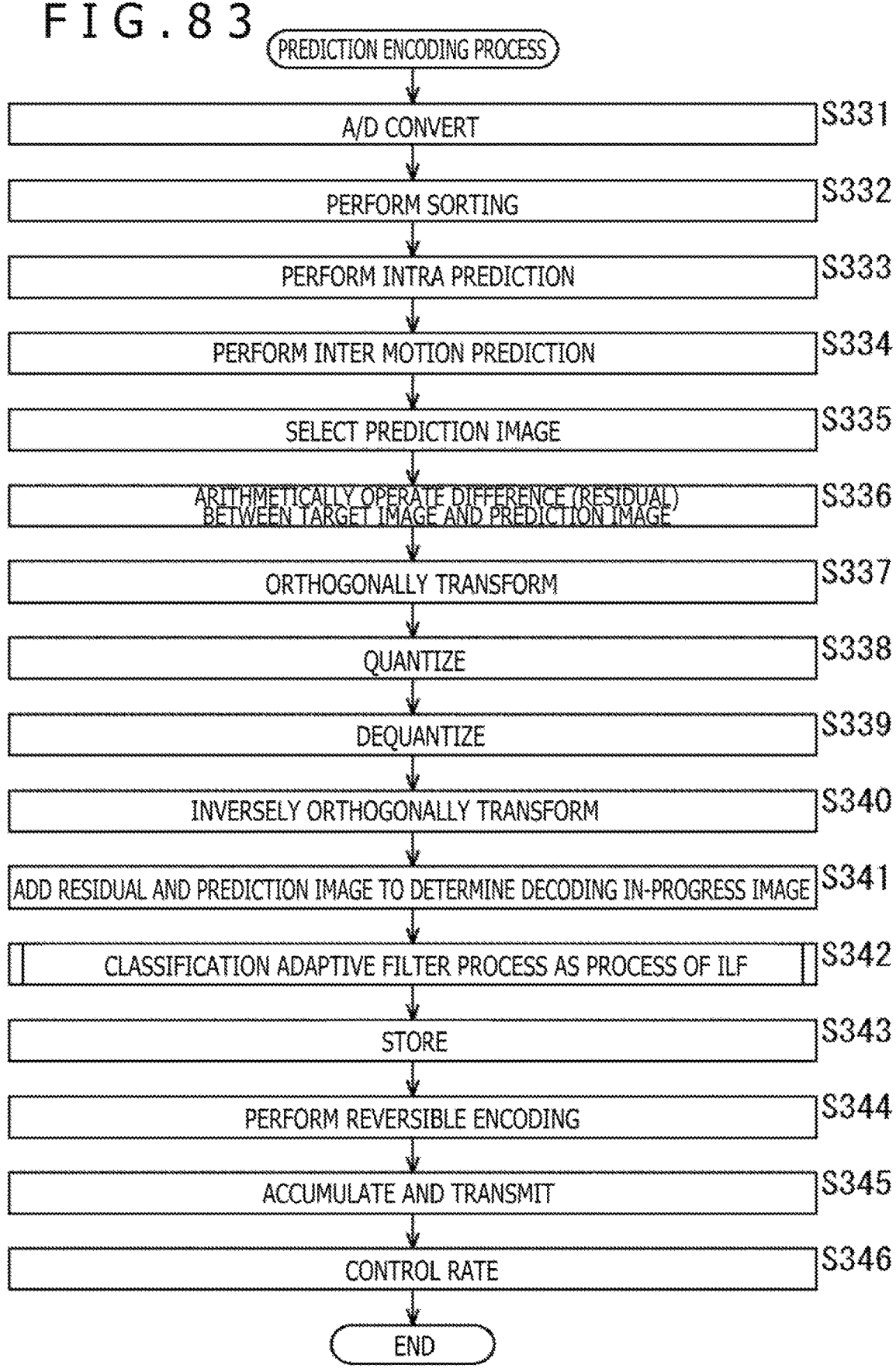
FIG. 83 is a flow chart illustrating an example of a prediction encoding process at step S320.

FIG. 83 is a flow chart illustrating an example of the prediction encoding process at step S320 of FIG. 82.

In the predicting encoding process, at steps S331 to S346, processes similar to those at steps S31 to S46 of FIG. 18 are performed, respectively.

It is to be noted that, although the classification adaptive filter 911 performs, at step S342, a classification adaptive process as a process of an ILF for a decoding in-progress image from the arithmetic operation section 110 similarly as at step S42 of FIG. 18, in this classification adaptive process, at step S317 of FIG. 82, tap coefficients for individual degeneration classes included in reduction filter process to be outputted from the reduction apparatus 932 to the image conversion apparatus 933 and degeneration information are used.

Further, while, at step S344, the reversible encoding section 106 encodes quantization coefficients, encoding information and reduction filter information similarly as at step S44 of FIG. 18, the reduction filter information includes tap coefficients for the individual degeneration classes and the regeneration information.

Accordingly, the encoded data obtained by the reversible encoding section 106 include the quantization coefficients, encoding information, tap coefficients for the individual degeneration classes as reduction filter information and degeneration information. Then, such encoded data are suitably read out from the accumulation buffer 107 and transmitted at step S345 as described hereinabove in connection with step S45 of FIG. 18.

Figure 84:
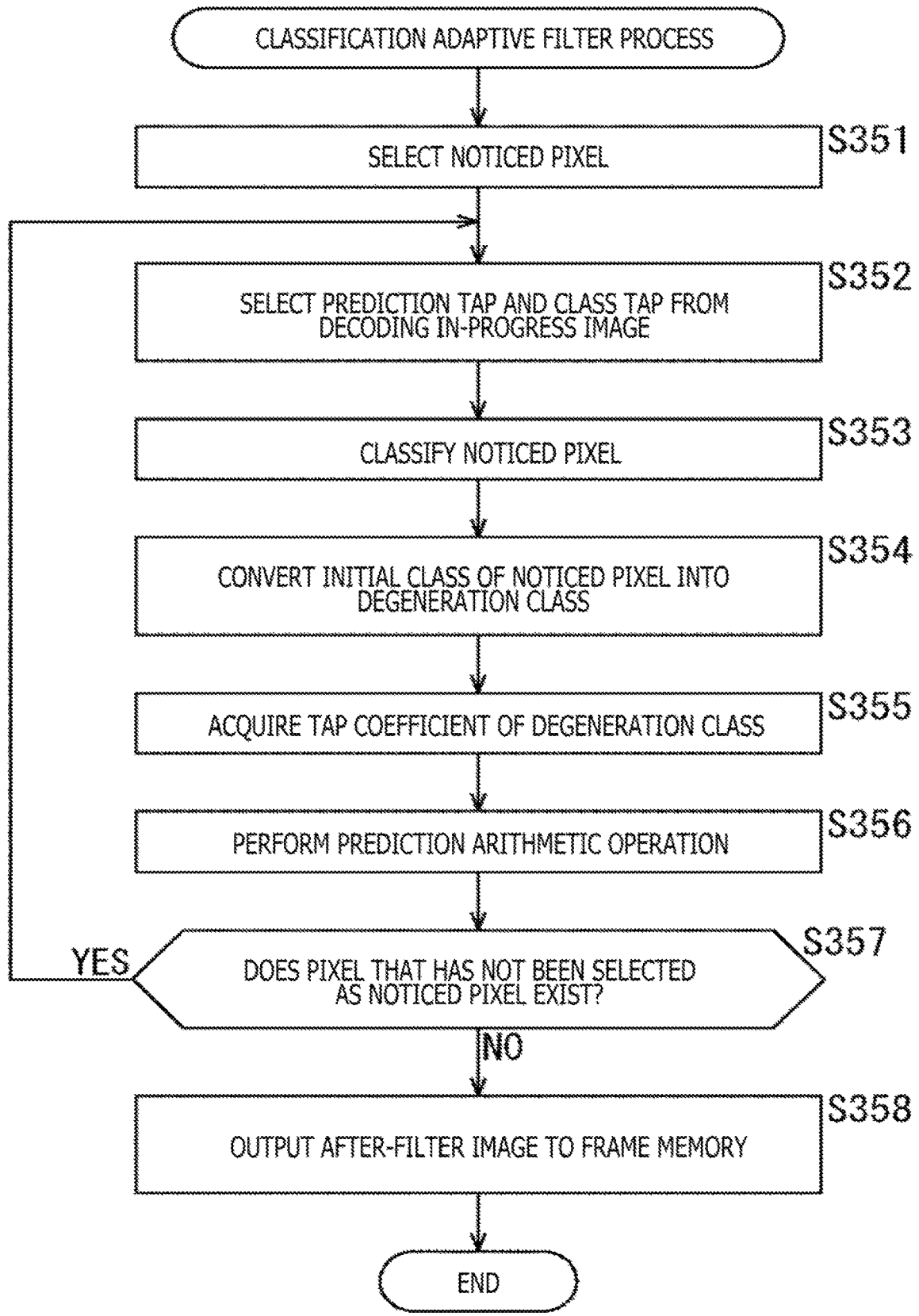
FIG. 84 is a flow chart illustrating an example of a classification adaptive process performed at step S342.

FIG. 84 is a flow chart illustrating an example of the classification adaptive process performed at step S342 of FIG. 83.

In the image conversion apparatus 933 (FIG. 80) of the classification adaptive filter 911, at step S351, the tap selection section 771 selects one of pixels that have not been selected as a noticed pixel as yet as a noticed pixel from within the decoding in-progress image supplied from the arithmetic operation section 110 similarly as at step S51 of FIG. 19, and the processing advances to step S352.

At step S352, the tap selection sections 771 and 772 select pixels to be made a prediction tap and a class tap regarding a noticed pixel from within the decoding in-progress image supplied from the arithmetic operation section 110 and supply the selected pixels to the prediction arithmetic operation section 775 and the classification section 773, respectively.

Thereafter, the processing advances from step S352 to step S353, at which the classification section 773 performs classification of the noticed pixel using a plurality of kinds of pixel-related information regarding the noticed pixel such as pixel characteristic amounts detected from the class tap regarding the noticed pixel, encoding information regarding the noticed pixel and so forth.

Then, the classification section 773 supplies an initial class of the noticed pixel obtained by the classification of the noticed pixel to the coefficient acquisition section 774, and the processing advances from step S353 to step S354.

At step S354, the degeneration class conversion section 782 of the coefficient acquisition section 774 (FIG. 81) converts the initial class of the noticed pixel supplied from the classification section 773 into a degeneration class of the noticed pixel in accordance with a degeneration method represented by the degeneration information as the reduction filter information supplied from the reduction apparatus 932 at step S317 of FIG. 82. Then, the degeneration class conversion section 782 supplies the degeneration class of the noticed pixel to the acquisition section 783 (FIG. 81), and the processing advances from step S354 to step S355.

At step S355, the acquisition section 783 acquires tap coefficients of the degeneration class of the noticed pixel from the degeneration class conversion section 782 from among the tap coefficients for the individual degeneration classes stored in the storage section 781 at step S319 of FIG. 82 and supplies the acquired tap coefficients to the prediction arithmetic operation section 775, and the processing advances to step S356.

At steps S356 to S358, processes similar to those at steps S55 to S57 of FIG. 19 are performed, respectively.

In the encoding apparatus 11 of FIG. 64, classification of a noticed pixel is performed using a plurality of pieces of pixel-related information in such a manner as described above, and tap coefficients for individual ones of a large number of initial classes are determined. Further, the tap coefficients for each initial class are degenerated by a degeneration method selected from among a plurality of kinds of degeneration methods, namely, by a degeneration method, for example, whose degeneration evaluation value is best, and tap coefficients for the individual degeneration classes obtained as a result of the degeneration and degeneration information representing the degeneration method used to obtain the tap coefficients for each degeneration class are transmitted as reduction filter process.

Accordingly, it is possible to improve the compression efficiency and the S/N of a decoded image.

<Fourth Configuration Example of Decoding Apparatus 12>

Figure 85:
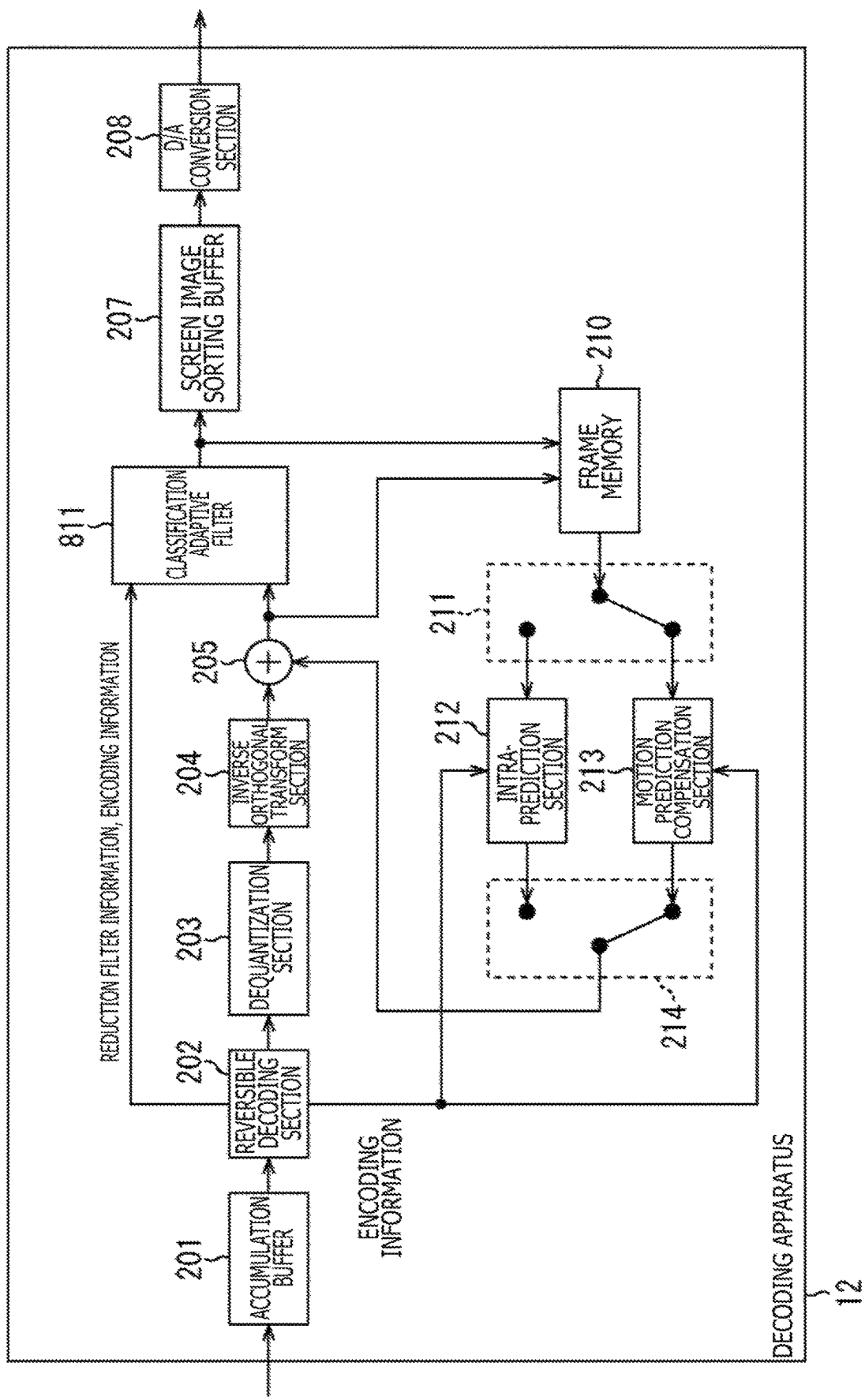
FIG. 85 is a block diagram depicting a fourth configuration example of the decoding apparatus 12.

FIG. 85 is a block diagram depicting a fourth configuration example of the decoding apparatus 12 of FIG. 1.

It is to be noted that, in FIG. 85, elements corresponding to those of FIG. 20 are denoted by like reference numerals and description of them is hereinafter omitted suitably.

Referring to FIG. 85, the decoding apparatus 12 includes the components from the accumulation buffer 201 to the arithmetic operation section 205, the sorting buffer 207, the D/A conversion section 208, the components from the frame memory 210 to the selection section 214 and a classification adaptive filter 811.

Accordingly, the decoding apparatus 12 of FIG. 85 is common to that of FIG. 20 in that it includes the components from the accumulation buffer 201 to the arithmetic operation section 205, sorting buffer 207, D/A conversion section 208 and components from the frame memory 210 to the selection section 214.

However, the decoding apparatus 12 of FIG. 85 is different from that of FIG. 20 that it includes the classification adaptive filter 811 in place of the classification adaptive filter 206.

The decoding apparatus 12 of FIG. 85 decodes encoded data transmitted from the encoding apparatus 11 of FIG. 64.

Therefore, reduction filter information supplied from the reversible decoding section 202 to the classification adaptive filter 811 includes tap coefficients for individual degeneration classes and degeneration information.

The classification adaptive filter 811 is a filter that functions as an ILF by performing a classification adaptive process and is common to the classification adaptive filter 206 of FIG. 20 in that it performs an ILF process by a classification adaptive process.

However, the classification adaptive filter 811 is different from the classification adaptive filter 206 in that it performs a classification adaptive process using tap coefficients for individual degeneration classes as reduction filter information and degeneration information.

<Configuration Example of Classification Adaptive Filter 811>

Figure 86:
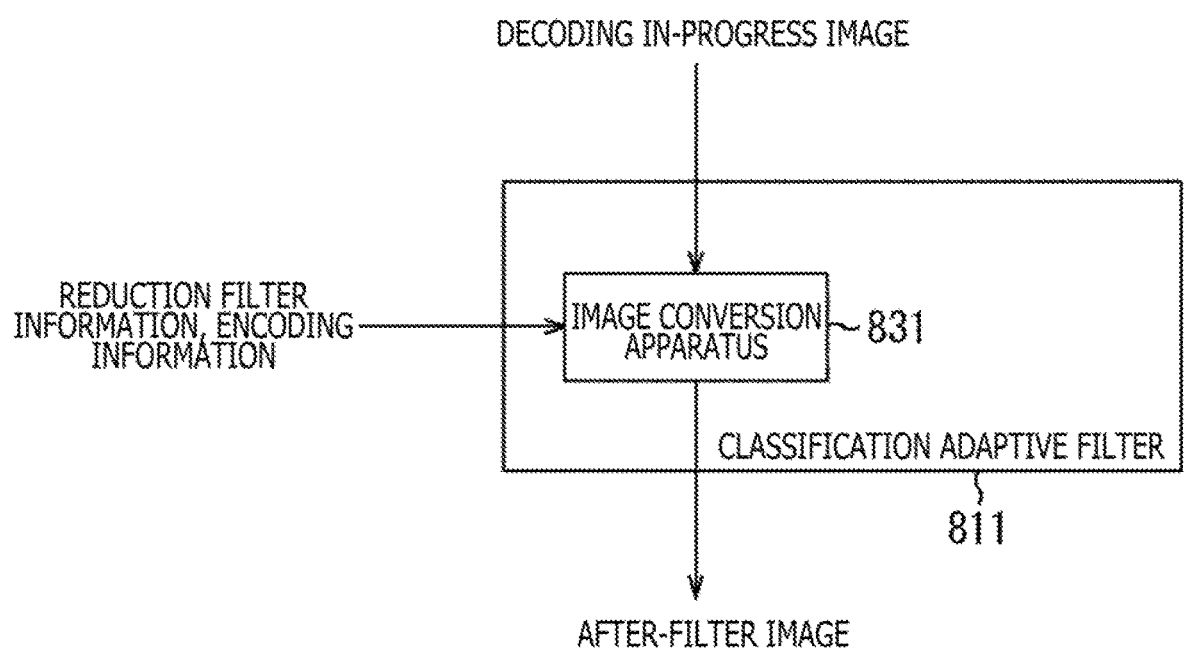
FIG. 86 is a block diagram depicting a configuration example of a classification adaptive filter 811.

FIG. 86 is a block diagram depicting a configuration example of the classification adaptive filter 811 of FIG. 85.

Referring to FIG. 86, the classification adaptive filter 811 includes an image conversion apparatus 831.

To the image conversion apparatus 831, a decoding in-progress image is supplied from the arithmetic operation section 205 (FIG. 85) and tap coefficients and degeneration information for individual degeneration classes as reduction filter information and encoding information are supplied from the reversible decoding section 202.

The image conversion apparatus 831 uses, similarly to the image conversion apparatus 933 of FIG. 65, a decoding in-progress image as the first image and performs image conversion by a classification adaptive process using the tap coefficients for the individual degeneration classes included in the reduction filter information (filter coefficients obtained using the reduction filter information) and the degeneration information to convert the decoding in-progress image as the first image into an after-filter image as a second image equivalent to the original image (to generate an after-filter image), and supplies the after-filter image to the sorting buffer 207 and the frame memory 210 (FIG. 85).

It is to be noted that the image conversion apparatus 831 performs classification using the encoding information as occasion demands in a classification adaptive process similarly to the image conversion apparatus 933 of FIG. 65.

<Configuration Example of Image Conversion Apparatus 831>

Figure 87:
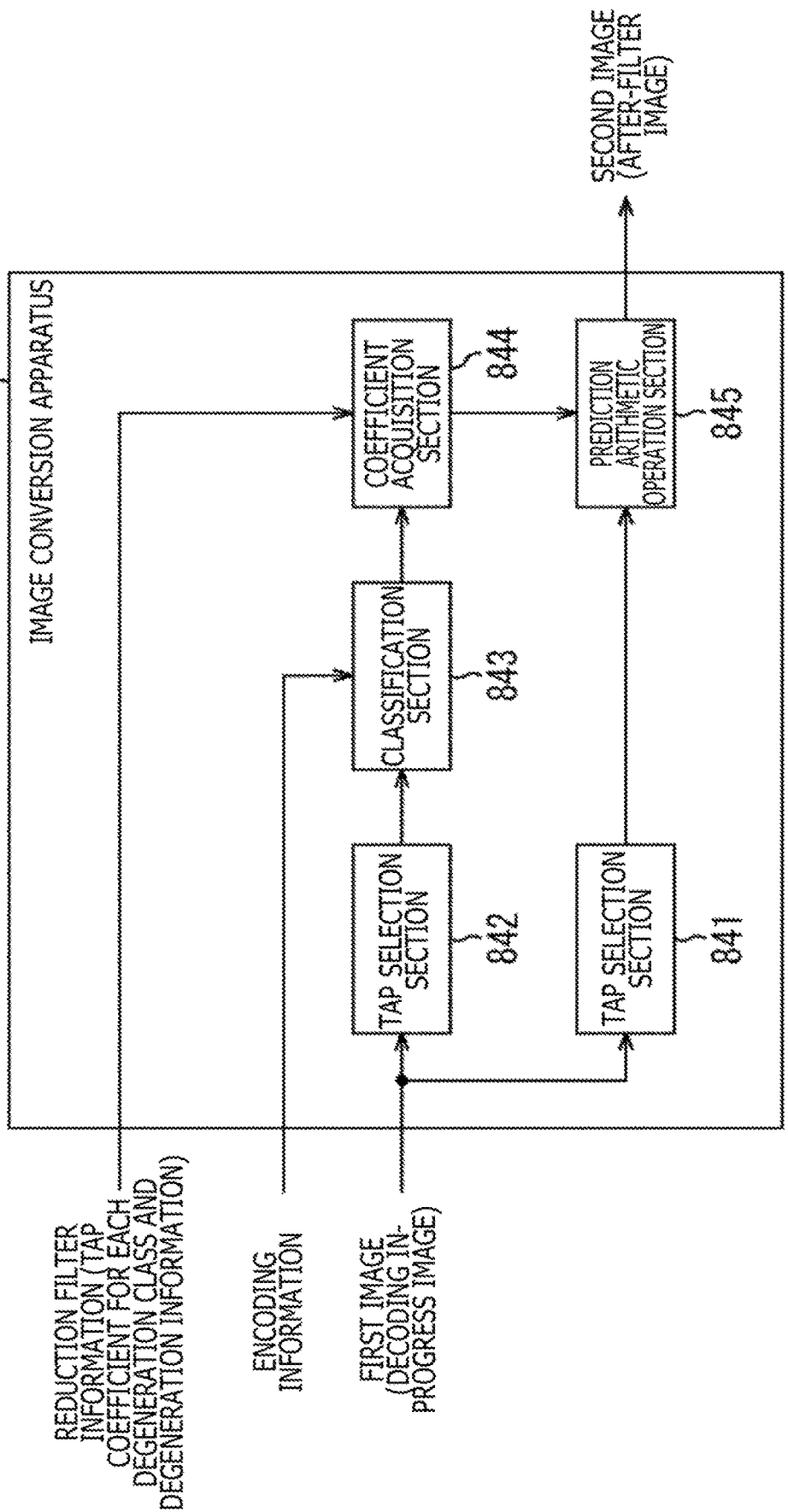
FIG. 87 is a block diagram depicting a configuration example of an image conversion apparatus 831.

FIG. 87 is a block diagram depicting a configuration example of the image conversion apparatus 831 of FIG. 86.

Referring to FIG. 87, the image conversion apparatus 831 includes tap selection sections 841 and 842, a classification section 843, a coefficient acquisition section 844 and a prediction arithmetic operation section 845.

To the tap selection sections 841 and 842, a decoding in-progress image as a first image is supplied from the arithmetic operation section 205 (FIG. 85). Further, to the classification section 843, encoding information is supplied from the reversible decoding section 202 (FIG. 85). Furthermore, to the coefficient acquisition section 844, reduction filter information is supplied from the reversible decoding section 202.

In the image conversion apparatus 831, the components from the tap selection section 841 to the prediction arithmetic operation section 845 perform processing similar to that of the image conversion apparatus 933 (FIG. 65) (FIG. 80). Consequently, the decoding in-progress image as the first image from the arithmetic operation section 205 (FIG. 85) is converted into an after-filter image as a second image.

In particular, the tap selection section 841 successively sets pixels of the decoding in-progress image as the first image from the arithmetic operation section 205 as a noticed image and configures, in regard to the noticed pixel, a prediction tap, for example, similar to that by the tap selection section 771 of FIG. 80, and supplies the prediction tap to the prediction arithmetic operation section 845.

The tap selection section 842 configures, in regard to the noticed pixel, a class tap similar to that by the tap selection section 772 of FIG. 80 and supplies the class tap to the classification section 843.

The classification section 843 performs, similarly to the classification section 773 of FIG. 80, in regard to the noticed pixel, classification using a plurality of kinds of pixel-related information, namely, using image characteristic amounts and encoding information detected from the class tap from the tap selection section 842 and supplies an initial class of the noticed pixel obtained as a result of the classification to the coefficient acquisition section 844.

The coefficient acquisition section 844 converts, on the basis of the degeneration information included in the reduction filter information from the reversible decoding section 202, the initial class of the notice pixel from the classification section 843 into a degeneration class by a degeneration method represented by the degeneration information. Further, the coefficient acquisition section 844 acquires the tap coefficients of the degeneration class of the noticed pixel from among the tap coefficients for the individual degeneration classes included in the reduction filter information from the reversible decoding section 202 and supplies the acquired tap coefficients to the prediction arithmetic operation section 845.

The prediction arithmetic operation section 845 performs prediction arithmetic operation using the prediction taps from the tap selection section 841 and the tap coefficients of the degeneration class of the noticed pixel from the coefficient acquisition section 844, for example, similarly to the prediction arithmetic operation section 25 of FIG. 31 to finally generate an after-filter image as a second image equivalent to the original image, and supplies the generated after-filter image to the sorting buffer 207 and the frame memory 210 (FIG. 85).

It is to be noted that, as described hereinabove with reference to FIG. 67, in the classification adaptive filter 911 of the encoding apparatus 11, a classification method whose RD cost or the like is best is selected as an optimum classification method from among a plurality of kinds of classification methods, and classification to an initial class can be performed by the optimum classification method. Further, the encoding apparatus 11 can place and transmit information representative of the optimum classification method into and together with the reduction filter information to the decoding apparatus 12.

In the decoding apparatus 12, in the case where information representative of the optimum classification method is included in the reduction filter information, classification to an initial class is performed by the optimum classification method represented by the information.

In particular, in the case where information representative of the optimum classification method is included in the reduction filter information, the classification section 843 configuring the image conversion apparatus 831 performs classification to an initial class by the optimum classification method represented by the information included in the reduction filter information.

Figure 88:
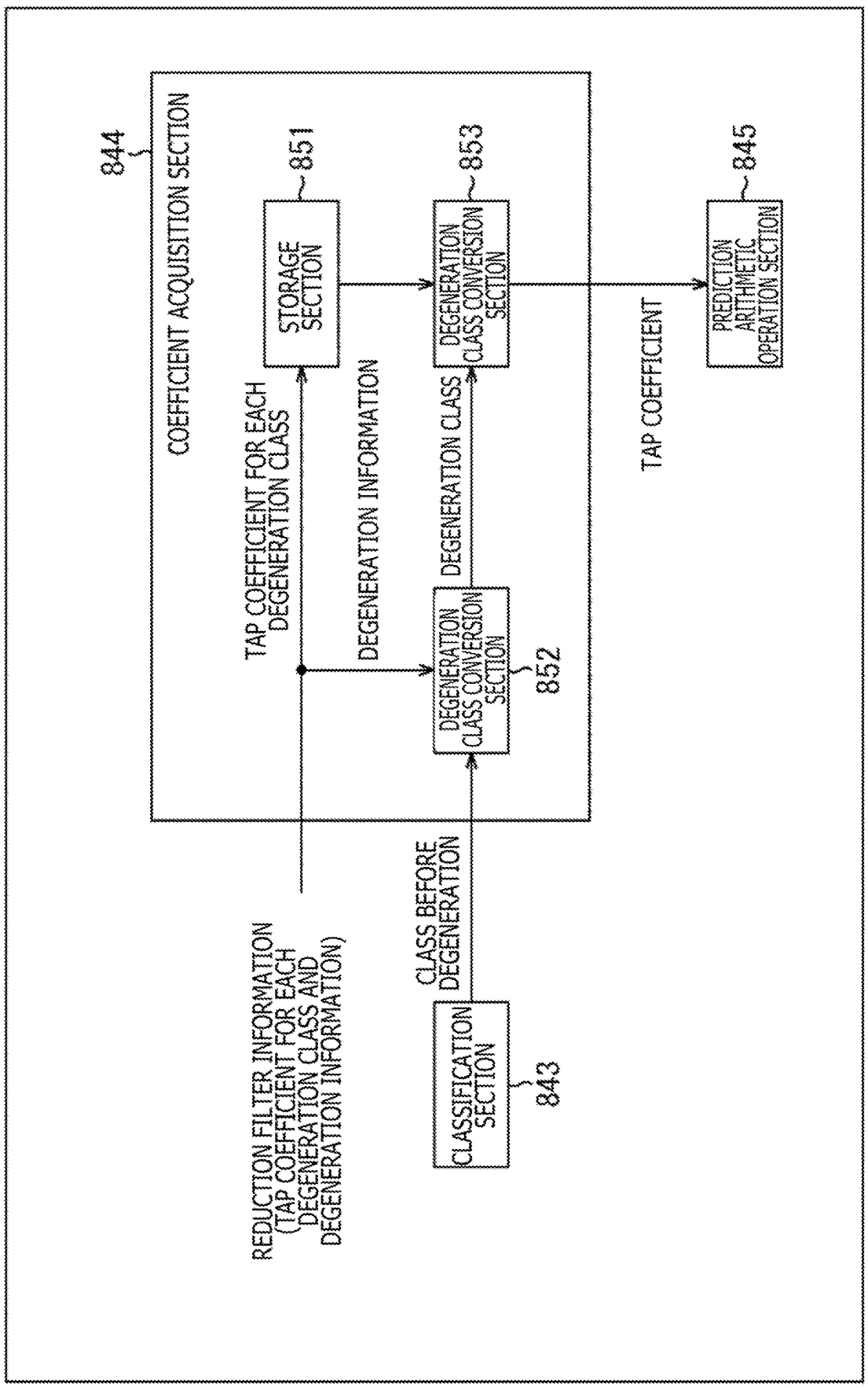
FIG. 88 is a block diagram depicting a configuration example of a coefficient acquisition section 844.

FIG. 88 is a block diagram depicting a configuration example of the coefficient acquisition section 844 of FIG. 87.

Referring to FIG. 88, the coefficient acquisition section 844 includes a storage section 851, a degeneration class conversion section 852 and an acquisition section 853. The components from the storage section 851 to the acquisition section 853 are configured similarly to the components from the storage section 781 to the acquisition section 783 of FIG. 81, respectively.

To the storage section 851, tap coefficients for individual regeneration classes included in reduction filter information are supplied from the reversible decoding section 202 (FIG. 85).

The storage section 851 stores tap coefficients for the individual degeneration classes included in the reduction filter information from the reversible decoding section 202.

To the degeneration class conversion section 852, an initial class as a classification result of a noticed pixel is supplied from the classification section 843. Further, to the degeneration class conversion section 852, degeneration information included in the reduction filter information is supplied from the reversible decoding section 202.

The degeneration class conversion section 852 converts the initial class of the noticed pixel into a degeneration class of the noticed pixel in accordance with the degeneration information included in the reduction filter information, and supplies the degeneration class to the acquisition section 853.

The acquisition section 853 acquires tap coefficients of the degeneration class of the noticed pixel from the degeneration class conversion section 852 from among the tap coefficients for the individual degeneration classes stored in the storage section 851, and supplies the acquired tap coefficients to the prediction arithmetic operation section 845.

<Decoding Process>

Figure 89:
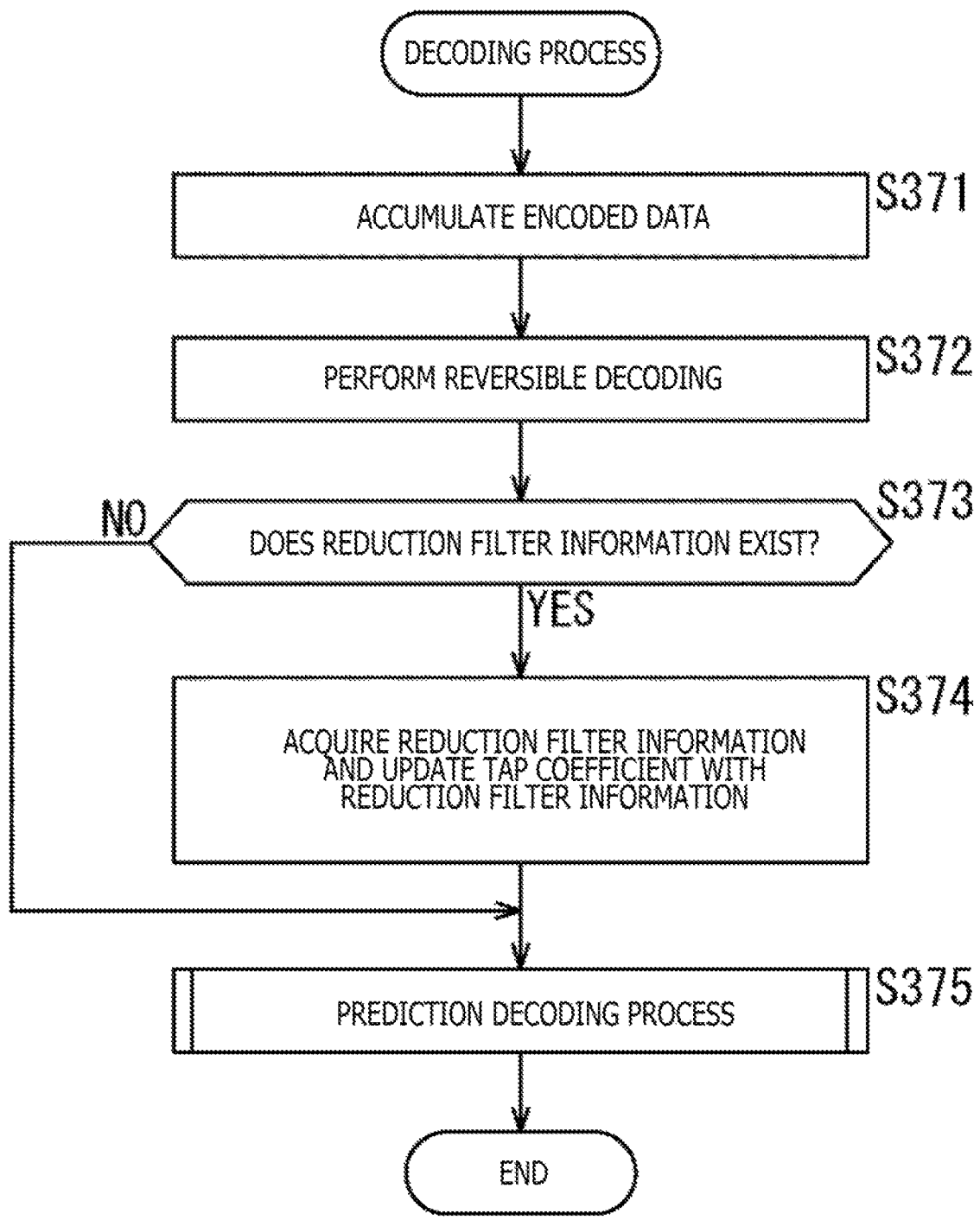
FIG. 89 is a flow chart illustrating an example of the decoding process of the decoding apparatus 12.

FIG. 89 is a flow chart illustrating an example of the decoding process of the decoding apparatus 12 of FIG. 85.

In the decoding process, at step S371, the accumulation buffer 201 temporarily accumulates encoded data transmitted thereto from the encoding apparatus 11 similarly as at step S71 of FIG. 24 and suitably supplies the encoded data to the reversible decoding section 202, and the processing advances to step S372.

At step S372, the reversible decoding section 202 receives and decodes the encoded data supplied from the accumulation buffer 201 similarly as at step S72 of FIG. 24, and supplies quantization coefficients obtained by the decoding to the dequantization section 203.

Further, in the case where encoding information or reduction filter information is obtained by decoding of the encoded data, the reversible decoding section 202 supplies necessary encoding information to the intra-prediction section 212, motion prediction compensation section 213 and other necessary blocks.

Furthermore, the reversible decoding section 202 supplies the encoding information and the reduction filter information to the classification adaptive filter 811.

Thereafter, the processing advances from step S372 to step S373, at which the classification adaptive filter 811 decides whether reduction filter information is supplied from the reversible decoding section 202.

In the case where it is decided at step S373 that reduction filter information is not supplied, the processing advances to step S375 skipping step S374.

On the other hand, in the case where it is decided at step S373 that reduction filter information is supplied, the processing advances to step S374, at which the coefficient acquisition section 844 configuring the image conversion apparatus 831 (FIG. 87) of the classification adaptive filter 811 acquires tap coefficients (including seed coefficients as occasion demands) for the individual degeneration classes included in the reduction filter information and the degeneration information.

Further, in the coefficient acquisition section 844 (FIG. 88), the storage section 851 updates the tap coefficients for the individual degeneration classes stored in the storage section 851 to the tap coefficients for the individual degeneration classes included in the reduction filter information (stores the tap coefficients for the individual degeneration classes included in the reduction filter information in an overwriting state).

Then, the processing advances from step S374 to step S375, at which a prediction decoding process is performed, and the decoding process ends.

Figure 90:
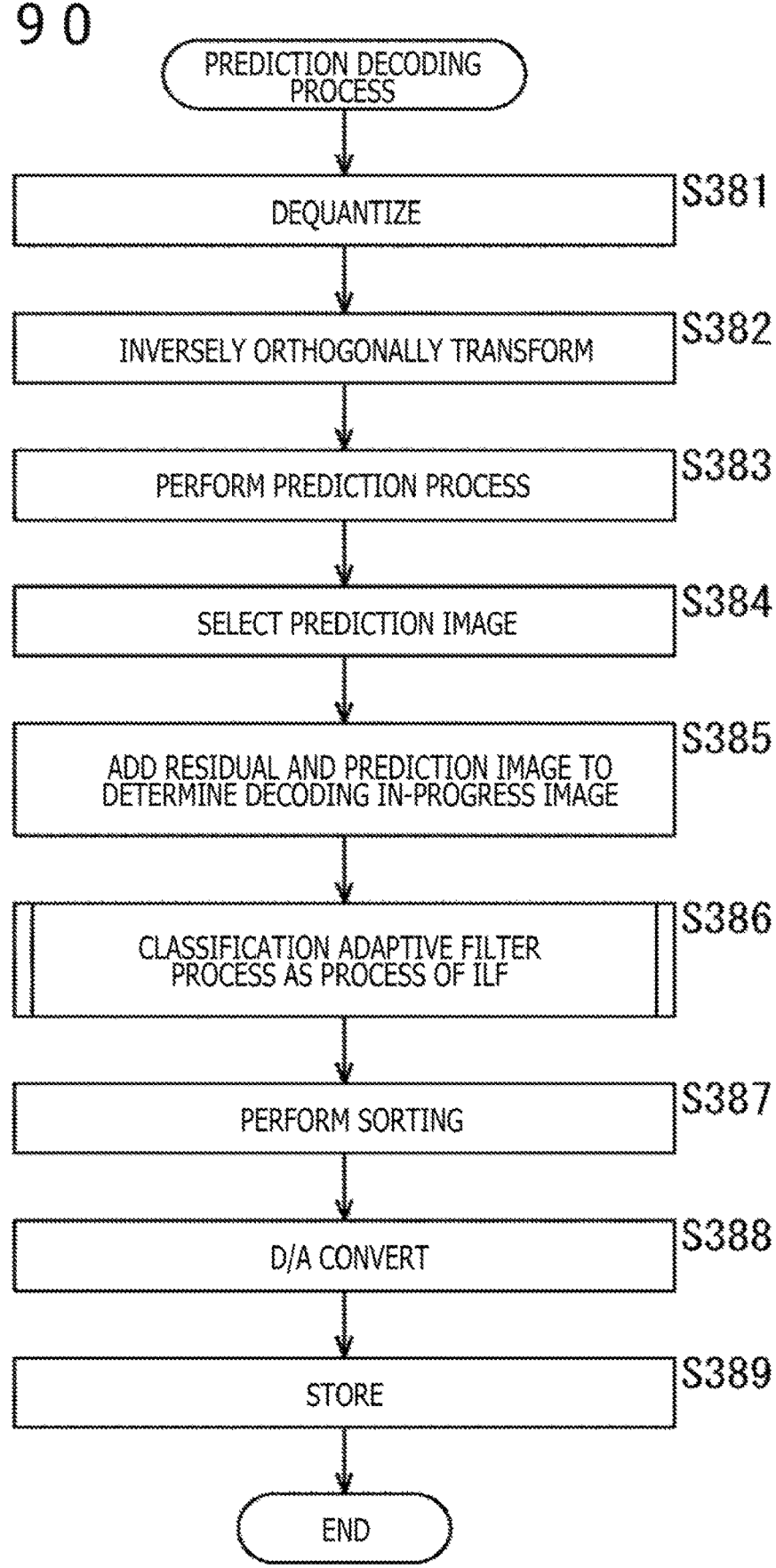
FIG. 90 is a flow chart illustrating an example of a prediction decoding process at step S375.

FIG. 90 is a flow chart illustrating an example of the prediction decoding process at step S375 of FIG. 89.

In the prediction decoding process, at steps S381 to S389, processes similar to those at steps S81 to S89 of FIG. 25 are performed, respectively.

It is to be noted that, although, at step S386, the classification adaptive filter 811 performs a classification adaptive process as a process of an ILF for a decoding in-progress image from the arithmetic operation section 205 similarly as at step S86 of FIG. 25, in the classification adaptive process, the tap coefficients for the individual degeneration classes included in the reduction filter information acquired by the coefficient acquisition section 844 and the degeneration information are used at step S374 of FIG. 89.

Figure 91:
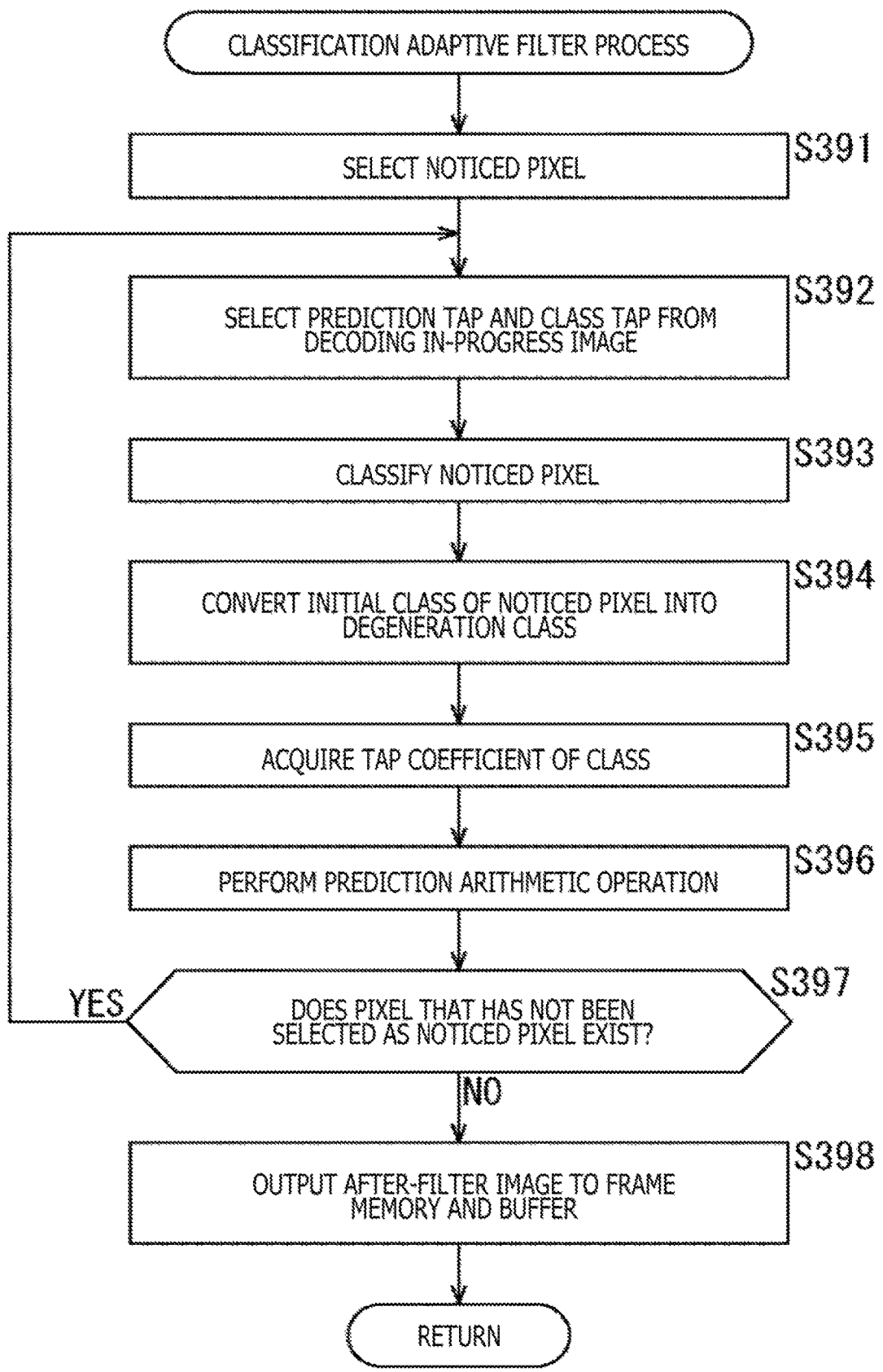
FIG. 91 is a flow chart illustrating an example of a classification adaptive process performed at step S386.

FIG. 91 is a flow chart illustrating an example of the classification adaptive process performed at step S386 of FIG. 90.

In the image conversion apparatus 831 (FIG. 87) of the classification adaptive filter 811, at step S391, the tap selection section 841 selects one of pixels that have not been selected as a noticed pixel as yet as a noticed pixel from within the decoding in-progress image supplied from the arithmetic operation section 205, and the processing advances to step S392.

At step S392, the tap selection sections 841 and 842 select pixels to be made a prediction tap and a class tap regarding a noticed pixel from within the decoding in-progress image supplied from the arithmetic operation section 205 similarly to the tap selection sections 771 and 772 of the image conversion apparatus 933 (FIG. 80) and supply the selected pixels to the classification section 843 and the prediction arithmetic operation section 845, respectively.

Thereafter, the processing advances from step S392 to step S393, at which the classification section 843 performs classification of the noticed pixel using the class tap regarding the noticed pixel and the encoding information regarding the noticed pixel, namely, using the plurality of pieces of pixel-related information of the noticed pixel, similarly to the classification section 773 of the image conversion apparatus 933 (FIG. 80).

Then, the classification section 843 supplies the initial class of the noticed pixel obtained by the classification of the notice pixel to the coefficient acquisition section 844, and the processing advances from step S393 to step S394.

At step S394, the degeneration class conversion section 852 of the coefficient acquisition section 844 (FIG. 88) converts the initial class of the noticed pixel supplied from the classification section 843 into a degeneration class of the notice pixel in accordance with the degeneration information included in the reduction filter information acquired by the coefficient acquisition section 844 at step S374 of FIG. 89. Then, the degeneration class conversion section 852 supplies the degeneration class of the noticed pixel to the acquisition section 853 (FIG. 88), and the processing advances from step S394 to step S395.

At step S395, the acquisition section 853 acquires tap coefficients of the degeneration class of the noticed pixel from the degeneration class conversion section 852 from among the tap coefficients for the individual degeneration classes stored in the storage section 851 at step S374 of FIG. 89 and supplies the acquired tap coefficients to the prediction arithmetic operation section 845. Then, the processing advances to step S396.

At steps S396 to S398, processes similar to those at steps S95 to S97 of FIG. 26 are performed, respectively.

In the encoding apparatus 11 of FIG. 64 and the decoding apparatus 12 of FIG. 85, since an ILF process is performed by a classification adaptive process as described above, an after-filter image closer to an original image than that of a processing result of the ILF can be obtained. As a result, the S/N of the decoded image can be improved. Further, since an after-filter image close to the original image can be obtained, the residual becomes small, and therefore, the compression efficiency can be improved.

Further, in the encoding apparatus 11, classification to a large number of initial classes is performed using various pieces of pixel-related information, and then reduction filter information including tap coefficients for individual degeneration classes degenerated from tap coefficients for the individual initial classes by a degeneration method whose degeneration evaluation value is best from among a plurality of kinds of degeneration methods and degeneration information representative of the degeneration method is transmitted to the decoding apparatus 12. Therefore, the compression efficiency can be improved further.

It is to be noted that, since, in general ALFs, a classification method or the number of classes obtained by classification is fixed, it has sometimes occurred that a pixel of a decoding in-progress image is classified into a class that does not appropriately represent a feature of the pixel.

On the other hand, in the classification adaptive filters 911 and 811 (FIGS. 64 and 85), since classification of a pixel in a decoding in-progress image is performed using two kinds, three kinds or more of pixel-related information and classes in the decoding in-progress image are classified into a large number of classes such as 1000 or more or 10000 or more, a pixel can be suppressed from being classified into a class that does not represent a feature of the pixel appropriately. As a result, the picture quality of an after-filter image obtained from a decoding in-progress image can be improved.

Furthermore, in the classification adaptive filters 911 and 811, since, using initial classes whose picture quality improvement effect such as AMSE or the like is low from among initial classes obtained by classification performed using two, three or more kinds of pixel-related information as degradation target classes, the initial classes are degenerated to degeneration classes from which (tap coefficients of) the degeneration target classes are removed, the data amount of the tap coefficients that become an overhead can be reduced. As a result, while the degree of improvement of the picture quality of the after-filter image is (substantially) maintained, the encoding efficiency (compression efficiency) can be improved.

<Application to Multi-View Image Encoding and Decoding System>

The series of processes described above can be applied to a multi-view image encoding and decoding system.

Figure 92:
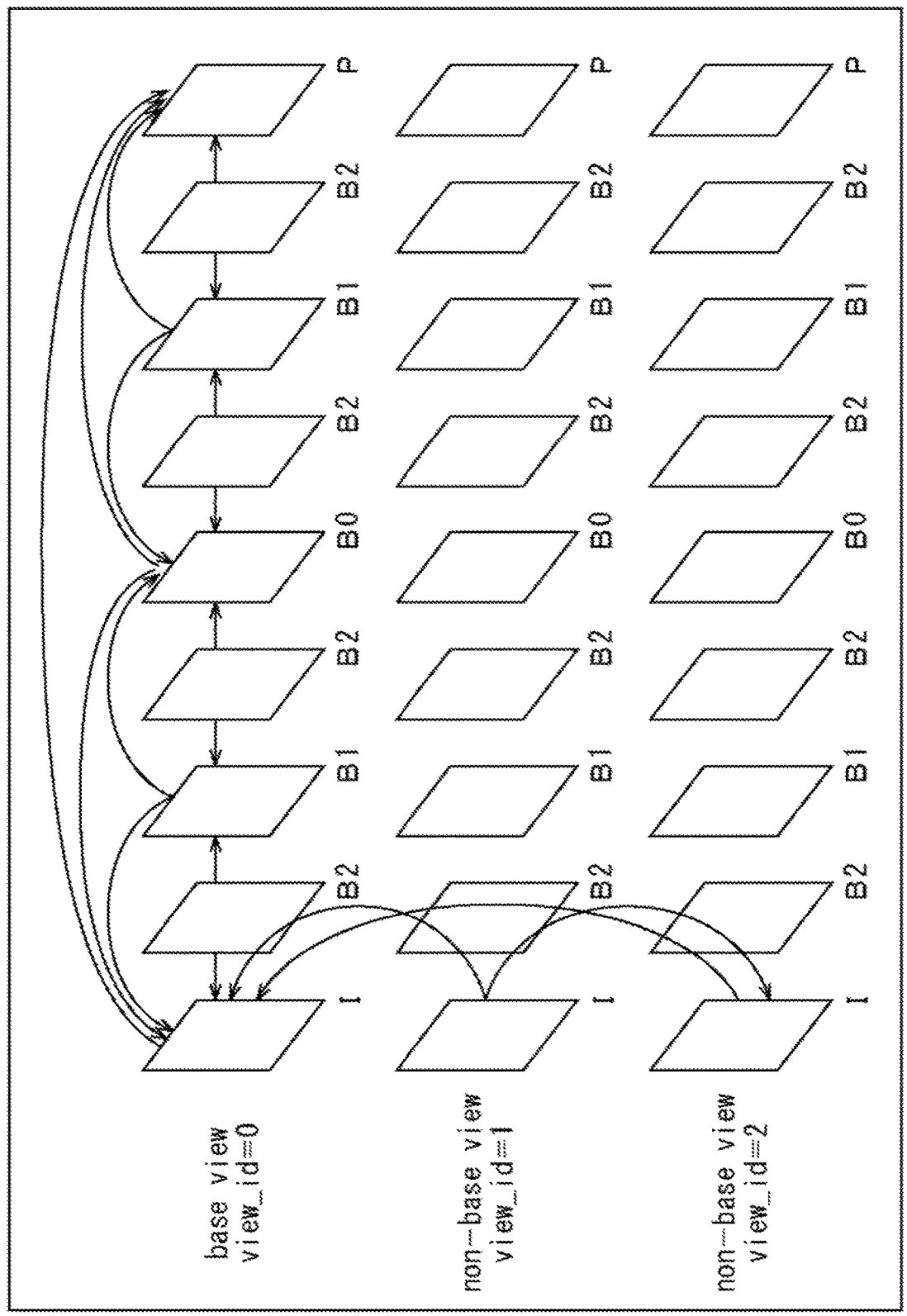
FIG. 92 is a view depicting an example of a multi-view image encoding method.

FIG. 92 is a view depicting an example of a multi-view image encoding method.

As depicted in FIG. 92, a multi-view image includes images of a plurality of viewpoints (views (view)). A plurality of views of the multi-view image include a base view whose encoding and decoding are performed using only an image of the own view without using information of any other view and a non-base view whose encoding and decoding are performed using information of some other view. Encoding and decoding of a non-base view may be performed using information of a base view or may be performed using information of a different non-base view.

In the case where a multi-view image as in the example of FIG. 92 is to be encoded and decoded, the multi-view image is encoded for each viewpoint. Then, in the case where encoded data obtained in this manner are to be decoded, encoded data of each viewpoint are individually decoded (namely, for each viewpoint). To such encoding and decoding of each viewpoint, the methods described hereinabove in the foregoing description of the embodiment may be applied. By such application, the S/N and the compression efficiency can be improved. In short, also in the case of a multi-view image, the S/N and the compression efficiency can be improved.

<Multi-View Image Encoding and Decoding System>

Figure 93:
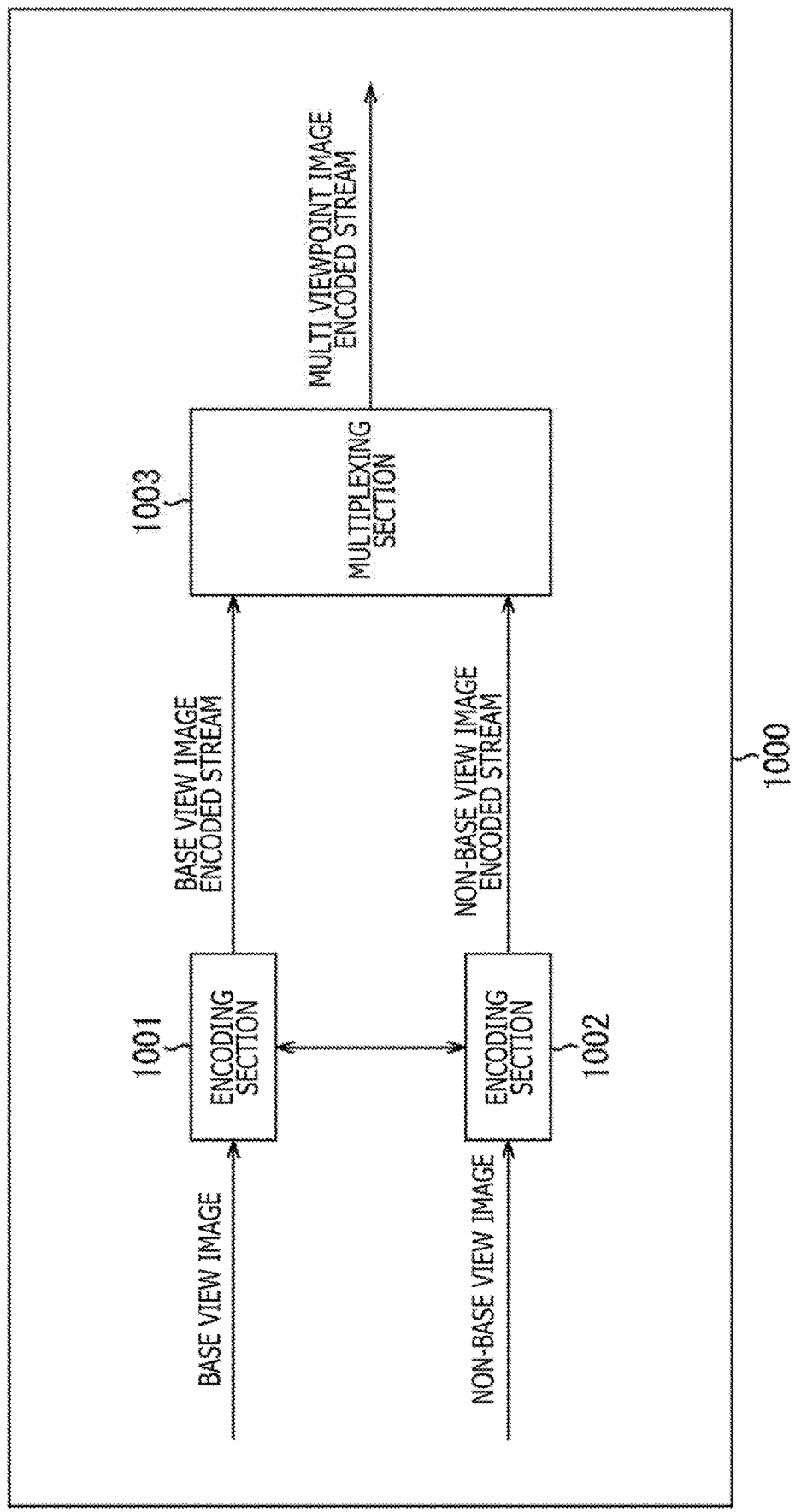
FIG. 93 is a view depicting a principal configuration example of a multi-view image encoding apparatus to which the present technology is applied.

FIG. 93 is a view depicting a multi-view image encoding apparatus of a multi-view image encoding and decoding system that performs multi-view image encoding and decoding described hereinabove.

As depicted in FIG. 93, the multi-view image encoding apparatus 1000 includes an encoding section 1001, another encoding section 1002 and a multiplexing section 1003.

The encoding section 1001 encodes a base view image to generate a base view image encoded stream. The encoding section 1002 encodes a non-base view image to generate a non-base view image encoded stream. The multiplexing section 1003 multiplexes the base view image encoded stream generated by the encoding section 1001 and the non-base view image encoded stream generated by the encoding section 1002 to generate a multi-view image encoded stream.

Figure 94:
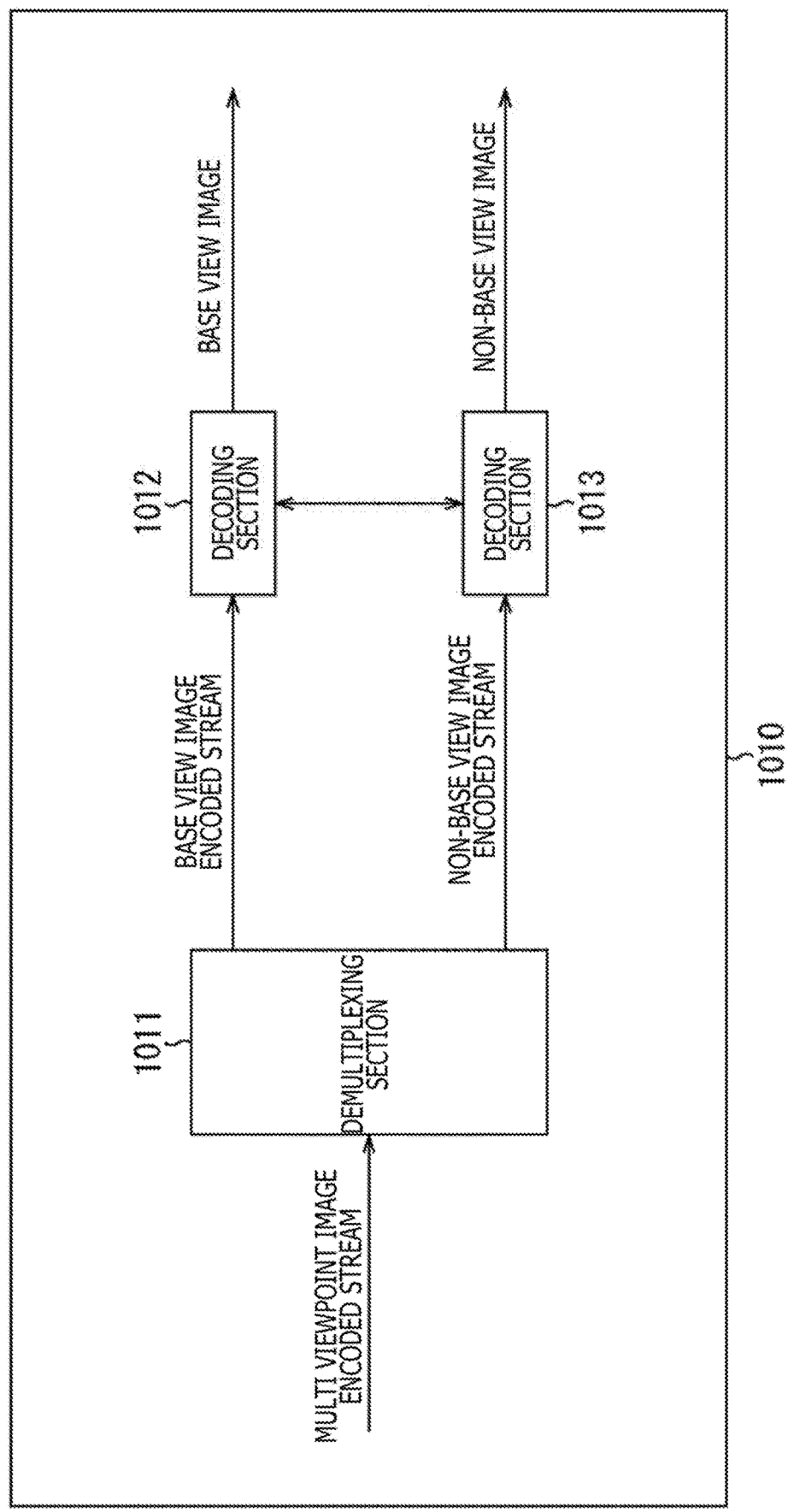
FIG. 94 is a view depicting a principal configuration example of a multi-view image decoding apparatus to which the present technology is applied.

FIG. 94 is a view depicting a multi-view image decoding apparatus that performs multi-view image decoding described hereinabove.

As depicted in FIG. 94, the multi-view image decoding apparatus 1010 includes a demultiplexing section 1011, a decoding section 1012 and another decoding section 1013.

The demultiplexing section 1011 demultiplexes a multi-view image encoded stream in which a base view image encoded stream and a non-base view image encoded stream are multiplexed to extract the base view image encoded stream and the non-base view image encoded stream. The decoding section 1012 decodes the base view image encoded stream extracted by the demultiplexing section 1011 to obtain a base view image. The decoding section 1013 decodes the non-base view image encoded stream extracted by the demultiplexing section 1011 to obtain a non-base view image.

For example, in such a multi-view image encoding and decoding system as described above, the encoding apparatus 11 described hereinabove in the foregoing description of the embodiment may be applied as the encoding section 1001 and the encoding section 1002 of the multi-view image encoding apparatus 1000. By this application, also in encoding of a multi-view image, the methods described in the foregoing description of the embodiment can be applied. In other words, it is possible to improve the S/N and the compression efficiency. Further, for example, as the decoding section 1012 and the decoding section 1013 of the multi-view image decoding apparatus 1010, the decoding apparatus 12 described in the foregoing description of the embodiment may be applied. By this application, also in decoding of encoded data of a multi-view image, the methods described in the foregoing description of the embodiment can be applied. In other words, it is possible to improve the S/N and the compression efficiency.

<Application to Hierarchical Image Encoding and Decoding System>

Further, the series of processes described above can be applied to a hierarchical image encoding (scalable encoding) and decoding system.

Figure 95:
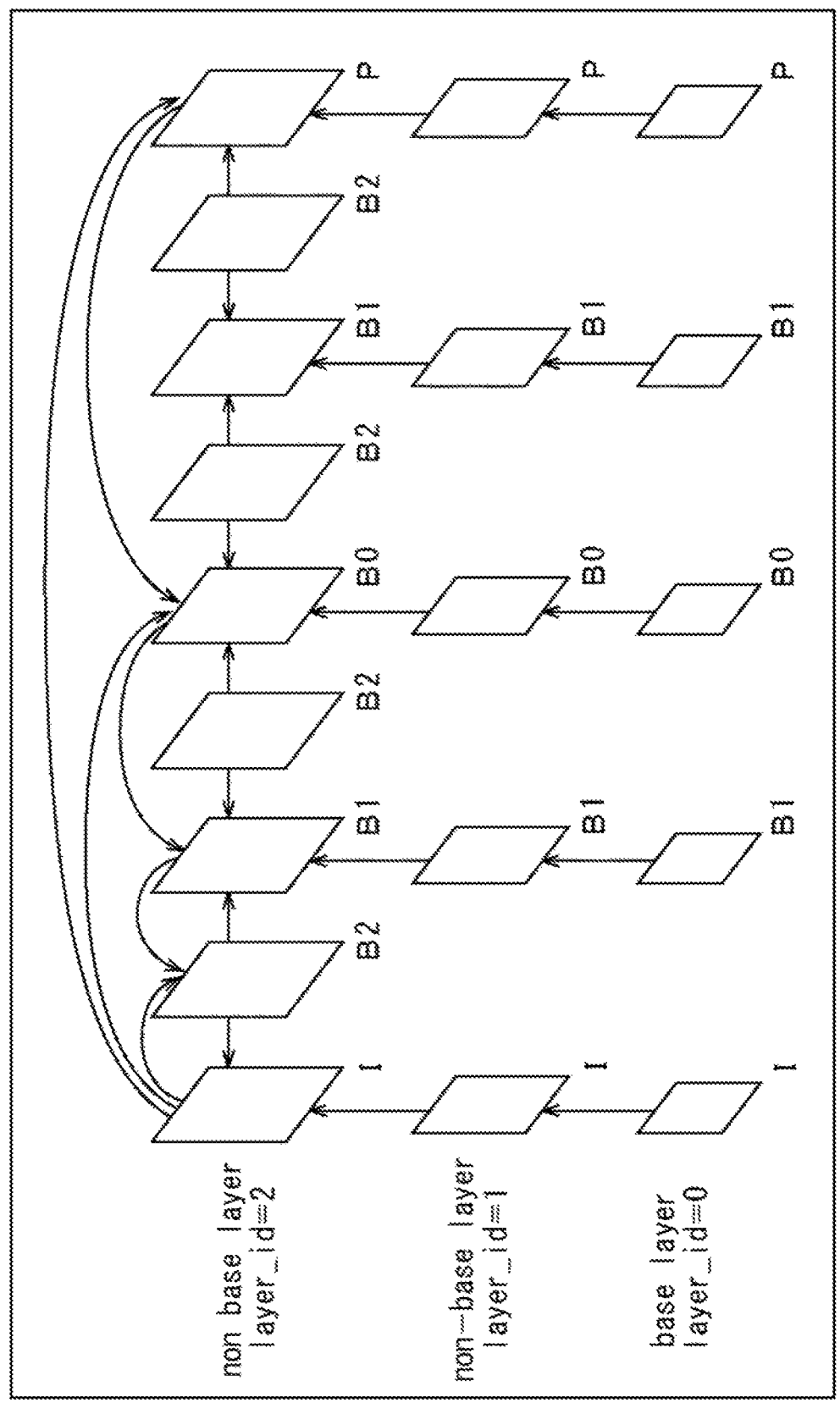
FIG. 95 is a view depicting an example of a hierarchical image encoding method.

FIG. 95 is a view depicting an example of a hierarchical image encoding method.

Hierarchical image encoding (scalable encoding) converts image data into a plurality of layers (hierarchies) of images so as to have a scalability (scalability) function in regard to a predetermined parameter and encodes the image data for each layer. Hierarchical image decoding (scalable decoding) is decoding corresponding to the hierarchical image encoding.

As depicted in FIG. 95, in hierarchization of an image, one image is divided into a plurality of images (layers) with reference to a predetermined parameter having a scalability function. In short, a hierarchized image (hierarchical image) includes a plurality of images of different hierarchies (layers) among which the value of the predetermined parameter is different. The plurality of layers of the hierarchical image include a base layer that allows encoding and decoding using only an image of its own layer without utilizing an image of any other layer and a non-base layer (referred to also as enhancement layer) that allows encoding and decoding using an image of a different layer. The non-base layer may utilize an image of the base layer or may utilize a different image of the non-base layer.

Generally, a non-base layer is configured from data of a difference image (difference data) between an own image of the non-base layer and an image of a different layer such that the redundancy may be reduced. For example, in the case where one image is hierarchized into two layers of a base layer and a non-base layer (also called enhancement layer), an image of lower quality than that of the original image is obtained from only data of the base layer, and by synthesizing data of the base layer and data of the non-base layer, the original image (namely, the image of high quality) is obtained.

By hierarchizing an image in this manner, images of various qualities can be obtained readily according to the situation. For example, to a terminal having a low processing capacity like a portable telephone set, image compression information only of the base layer (base layer) is transmitted, and a moving image that has a low space time resolution or is not high in picture quality is reproduced. However, to a terminal having a high processing capacity like a television set or a personal computer, image compression information of the enhancement layer (enhancement layer) is transmitted in addition to the base layer (base layer), and a moving image that has a high space time resolution or is high in picture quality is reproduced. In this manner, image compression information according to the capacity of a terminal or network can be transmitted from a server without performing a transcode process.

In the case where such a hierarchical image as in the example of FIG. 95 is encoded and decoded, the hierarchical image is encoded for each layer. Then, when the encoded data obtained in this manner are to be decoded, the encoded data of each other is individually decoded (namely, for each layer). To such encoding and decoding of each layer, the methods described in the above-described embodiment may be applied. By such application, the S/N and the compression efficiency can be improved. In short, also in the case of a hierarchical image, the S/N and the compression efficiency can be improved similarly.

<Scalable Parameter>

In such hierarchical image encoding and hierarchical image decoding (scalable encoding and scalable decoding), a parameter having the scalability (scalability) function is arbitrary. For example, a space resolution may be made the parameter (spatial scalability). In the case of this spatial scalability (spatial scalability), the resolution of an image differs for each layer.

Further, as a parameter that has such a scalability property as described above, for example, a time resolution may be applied (temporal scalability). In the case of this temporal scalability (temporal scalability), the frame rate differs for each layer.

Further, as a parameter that has such a scalability property as described above, for example, a signal to noise ratio (SNR (Signal to Noise ratio)) may be applied (SNR scalability). In the case of this SNR scalability (SNR scalability), the SN ratio differs for each layer.

The parameter that has such a scalability property may naturally be other than the examples described above. For example, bit depth scalability (bit-depth scalability) is available in which the base layer (base layer) is configured from an 8-bit (bit) image and a 10-bit (bit) image is obtained by adding an enhancement layer (enhancement layer) to the 8-bit (bit) image.

Further, chroma scalability (chroma scalability) is available in which the base layer (base layer) is configured from a component image of the 4:2:0 format and a component image of the 4:2:2 format is obtained by adding an enhancement layer (enhancement layer) to the component image.

<Hierarchical Image Encoding and Decoding System>

Figure 96:
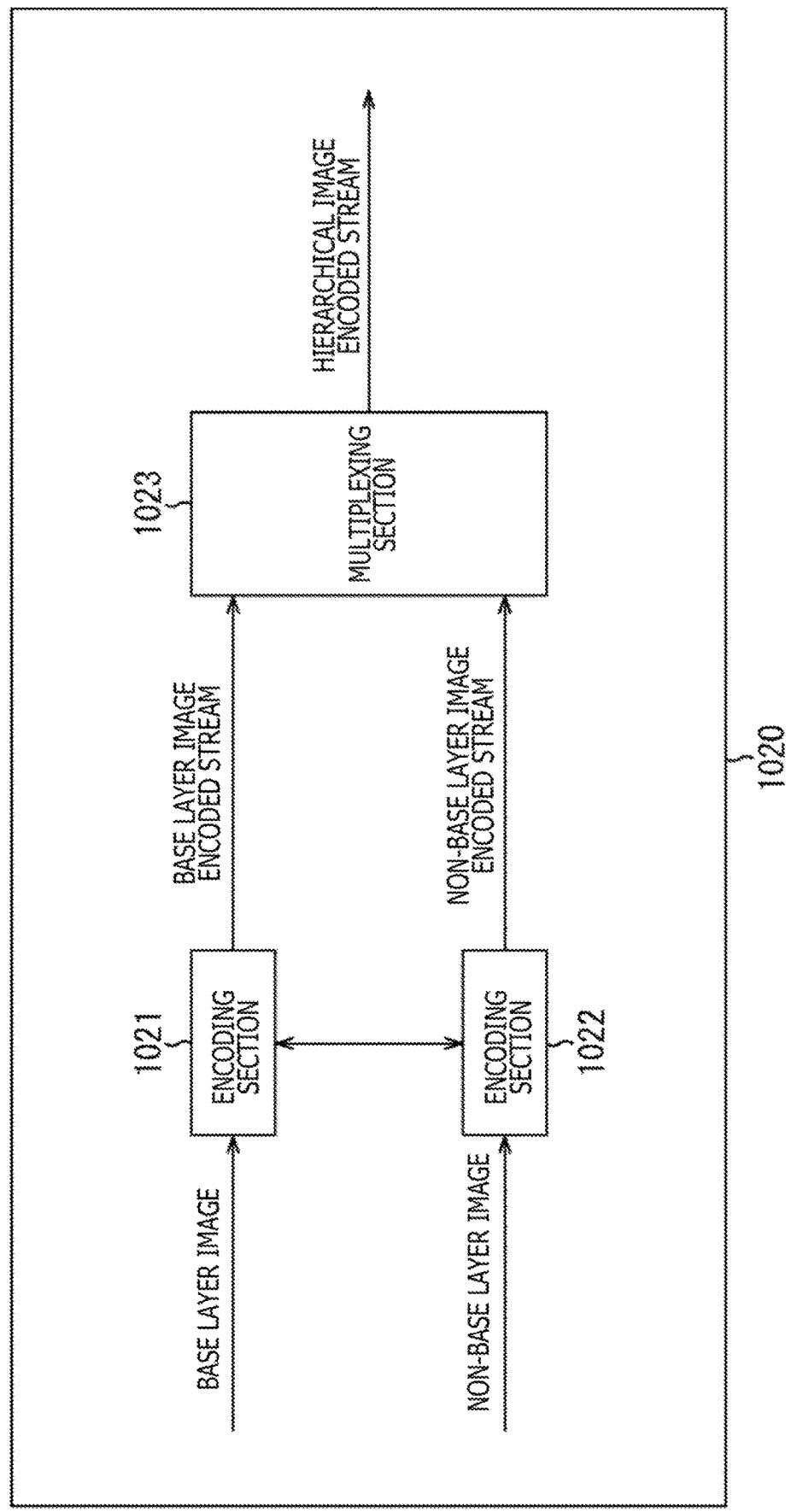
FIG. 96 is a view depicting a principal configuration example of a hierarchical image encoding apparatus to which the present technology is applied.

FIG. 96 is a view depicting a hierarchical image encoding apparatus of a hierarchical image encoding and decoding system that performs the hierarchical image encoding and decoding described above.

As depicted in FIG. 96, the hierarchical image encoding apparatus 1020 includes an encoding section 1021, another encoding section 1022 and a multiplexing section 1023.

The encoding section 1021 encodes a base layer image to generate a base layer image encoded stream. The encoding section 1022 encodes a non-base image to generate a non-base layer image encoded stream. The multiplexing section 1023 multiplexes the base layer image encoded stream generated by the encoding section 1021 and the non-base layer image encoded stream generated by the encoding section 1022 to generate a hierarchical image encoded stream.

Figure 97:
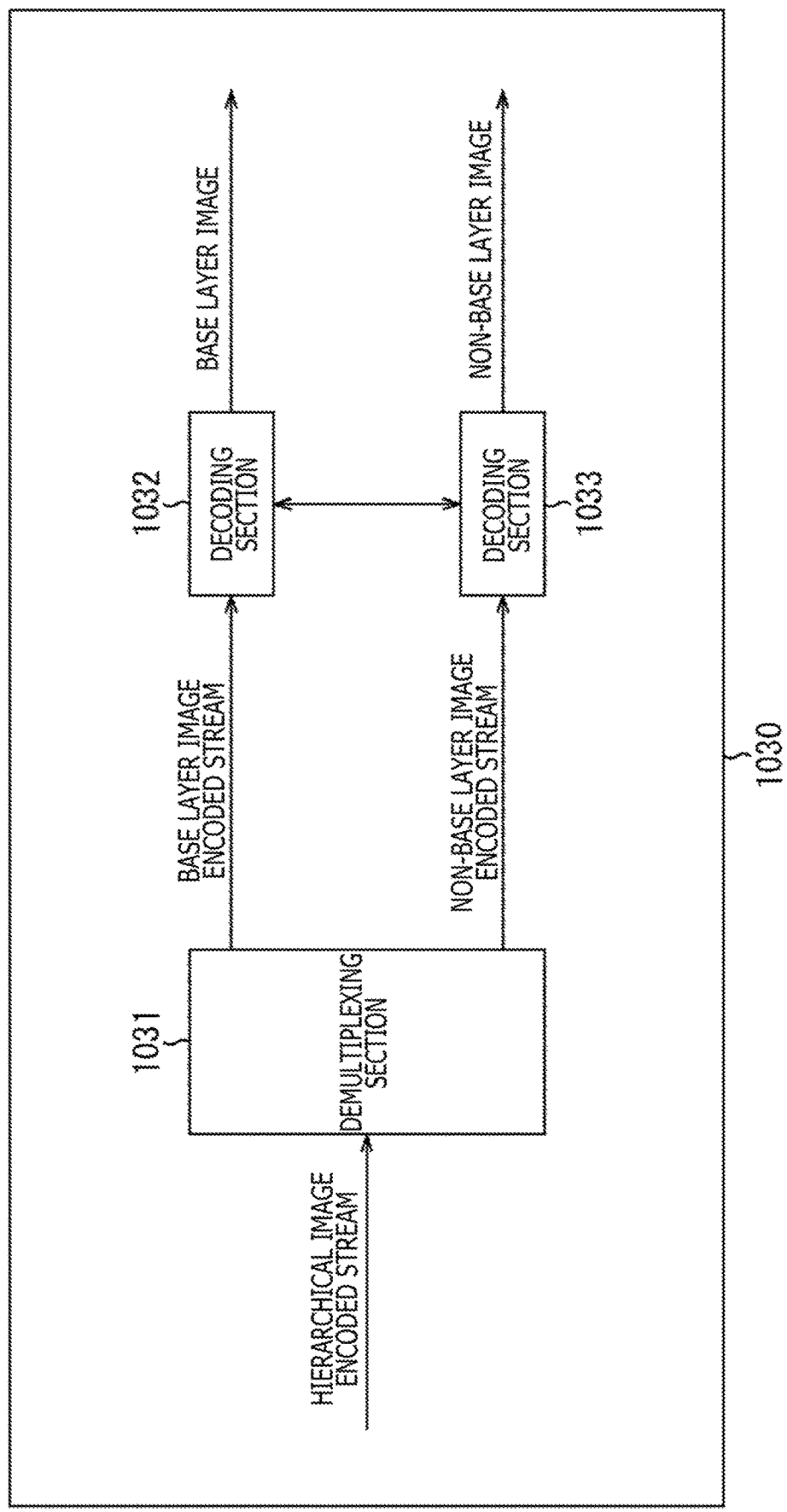
FIG. 97 is a view depicting a principal configuration example of a hierarchical image decoding apparatus to which the present technology is applied.

FIG. 97 is a view depicting a hierarchical image decoding apparatus that performs the hierarchical image decoding described hereinabove.

As depicted in FIG. 97, the hierarchical image decoding apparatus 1030 includes a demultiplexing section 1031, a decoding section 1032 and another decoding section 1033.

The demultiplexing section 1031 demultiplexes a hierarchical image encoded stream in which a base layer image encoded stream and a non-base layer image encoded stream are multiplexed to extract the base layer image encoded stream and the non-base layer image encoded stream. The decoding section 1032 decodes the base layer image encoded stream extracted by the demultiplexing section 1031 to obtain a base layer image. The decoding section 1033 decodes the non-base layer image encoded stream extracted by the demultiplexing section 1031 to obtain a non-base layer image.

For example, in such a hierarchical image encoding and decoding system as described above, the encoding apparatus 11 described hereinabove in the foregoing description of the embodiment may be applied as the encoding section 1021 and the encoding section 1022 of the hierarchical image encoding apparatus 1020. By this application, also in encoding of a hierarchical image, the methods described in the foregoing description of the embodiment can be applied. In other words, it is possible to improve the S/N and the compression efficiency. Further, for example, as the decoding section 1032 and the decoding section 1033 of the hierarchical image decoding apparatus 1030, the decoding apparatus 12 described in the foregoing description of the embodiment may be applied. By this application, also in decoding of encoded data of a hierarchical image, the methods described in the foregoing description of the embodiment can be applied. In other words, it is possible to improve the S/N and the compression efficiency.

<Computer>

While the series of processes described above can be executed by hardware, it may otherwise be executed by software. Where the series of processes is executed by software, a program that constructs the software is installed into a computer. Here, the computer includes a computer incorporated in hardware for exclusive use, a personal computer, for example, for universal use that can execute various functions by installing various programs, and so forth.

Figure 98:
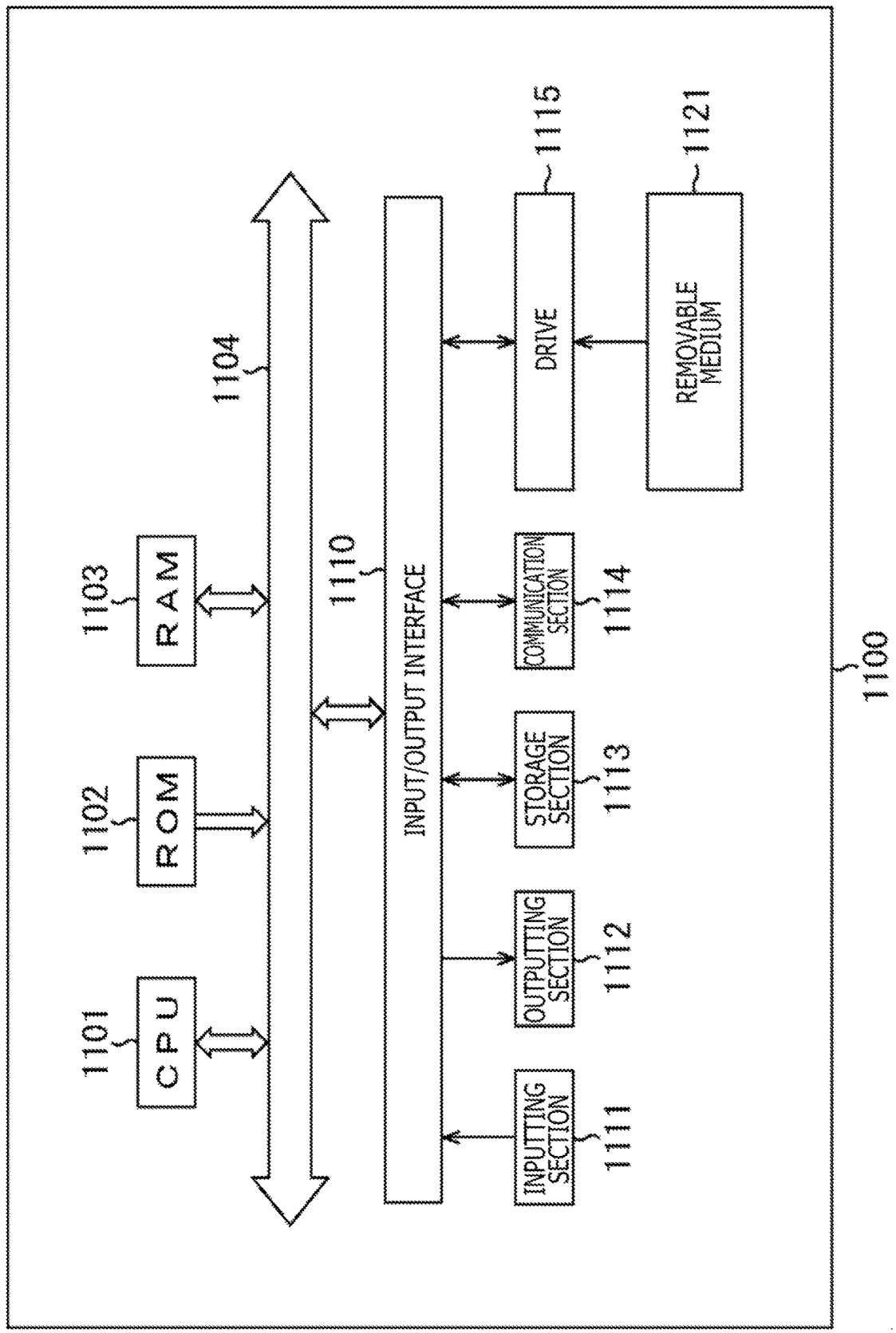
FIG. 98 is a block diagram depicting a principal configuration example of a computer.

FIG. 98 is a block diagram depicting an example of a configuration of hardware of a computer that executes the series of processes described above in accordance with a program.

In the computer 1100 depicted in FIG. 98, a CPU (Central Processing Unit) 1101, a ROM (Read Only Memory) 1102 and a RAM (Random Access Memory) 1103 are connected to each other by a bus 1104.

To the bus 1104, also an input/output interface 1110 is connected. To the input/output interface 1110, an inputting section 1111, an outputting section 1112, a storage section 1113, a communication section 1114 and a drive 1115 are connected.

The inputting section 1111 is configured, for example, from a keyboard, a mouse, a microphone, a touch panel, an input terminal and so forth. The outputting section 1112 is configured from a display, a speaker, an output terminal and so forth. The storage section 1113 is configured, for example, from a hard disk, a RAM disk, a nonvolatile memory and so forth. The communication section 1114 is configured, for example, from a network interface. The drive 1115 drives a removable medium 821 such as a magnetic disk, an optical disk, a magneto-optical disk, a semiconductor memory or the like.

In the computer configured in such a manner as described above, the CPU 1101 loads a program stored, for example, in the storage section 1113 into the RAM 1103 through the input/output interface 1110 and the bus 1104 and executes the program to perform the series of processes described above. Into the RAM 1103, also data and so forth necessary upon execution of various processes by the CPU 1101 are suitably stored.

The program executed by the computer (CPU 1101) can be recorded, for example, into the removable medium 821 as a package medium or the like and applied. In this case, the program can be installed into the storage section 1113 through the input/output interface 1110 by mounting the removable medium 821 on the drive 1115.

Further, this program can be provided through a wired or wireless transmission medium such as a local area network, the Internet or a digital satellite broadcast. In this case, the program can be received by the communication section 1114 and installed into the storage section 1113.

Also it is possible to install this program in advance into the ROM 1102 or the storage section 1113.

<Application of Present Technology>

The encoding apparatus 11 or the decoding apparatus 12 according to the embodiment described hereinabove can be applied to various electronic apparatus such as transmitters or receivers, for example, for distribution by a satellite broadcast, a wired broadcast such as a cable TV or the Internet, distribution to a terminal by cellular communication and so forth, or recording apparatus that record an image on a medium such as an optical disk, a magnetic disk, a flash memory or the like, reproduction apparatus for reproducing an image from such storage media as described above and so forth. In the following, four examples of application are described.

First Application Example: Television Receiver

Figure 99:
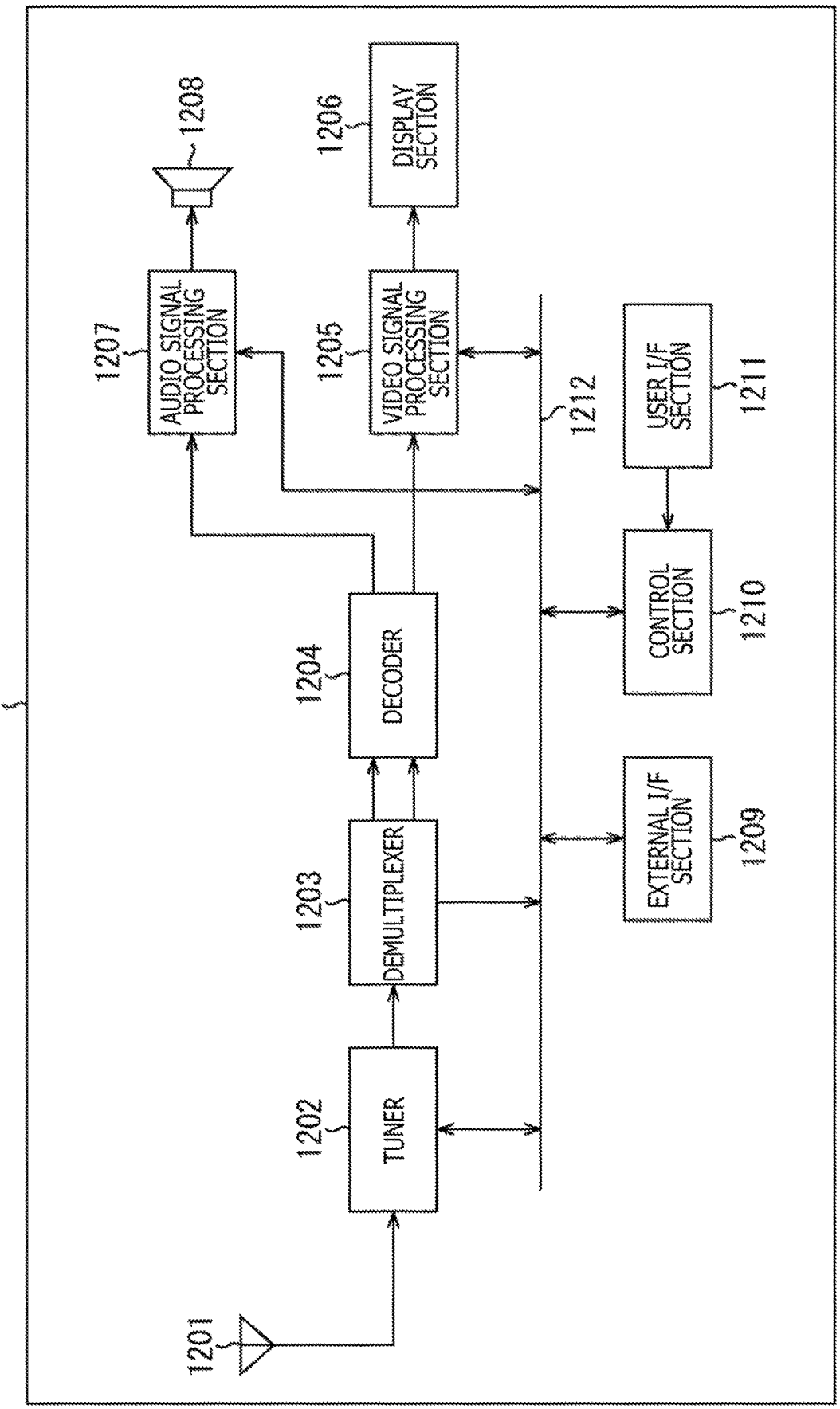
FIG. 99 is a block diagram depicting an example of a schematic configuration of a television apparatus.

FIG. 99 is a view depicting an example of a schematic configuration of a television apparatus to which the embodiment described hereinabove is applied.

The television apparatus 1200 includes an antenna 1201, a tuner 1202, a demultiplexer 1203, a decoder 1204, a video signal processing section 1205, a display section 1206, an audio signal processing section 1207, a speaker 1208, an external interface (I/F) section 1209, a control section 1210, a user interface (I/F) section 1211 and a bus 1212.

The tuner 1202 extracts a signal of a desired channel from broadcasting signals received through the antenna 1201 and demodulates the extracted signal. Then, the tuner 1202 outputs an encoded bit stream obtained by the demodulation to the demultiplexer 1203. In particular, the tuner 1202 has a role as a transmission section in the television apparatus 1200, which receives an encoded stream in which an image is encoded.

The demultiplexer 1203 demultiplexes a video stream and an audio stream of a broadcasting program of a viewing target from an encoded bit stream and outputs the demultiplexed streams to the decoder 1204. Further, the demultiplexer 1203 extracts auxiliary data such as an EPG (Electronic Program Guide) or the like from the encoded bit stream and supplies the extracted data to the control section 1210. It is to be noted that the demultiplexer 1203 may perform descramble in the case where the encoded bit stream is in a scrambled state.

The decoder 1204 decodes the video stream and the audio stream inputted from the demultiplexer 1203. Then, the decoder 1204 outputs video data generated by the decoding process to the video signal processing section 1205. Further, the decoder 1204 outputs audio data generated by the decoding process to the audio signal processing section 1207.

The video signal processing section 1205 reproduces video data inputted from the decoder 1204 and causes the display section 1206 to display a video. Further, the video signal processing section 1205 may cause the display section 1206 to display an application screen image supplied through the network. Further, the video signal processing section 1205 may perform additional processes such as, for example, noise removal and so forth for video data in accordance with a setting. Furthermore, the video signal processing section 1205 may generate an image of a GUI (Graphical User Interface) such as, for example, a menu, a button, a cursor or the like and cause the generated image to be superimposed on an output image.

The display section 1206 is driven by a drive signal supplied from the video signal processing section 1205 and displays a video or an image on a video face of a display device (for example, a liquid crystal display, a plasma display, an OELD (Organic ElectroLuminescence Display) (organic EL display) or the like).

The audio signal processing section 1207 performs a reproduction process such as D/A conversion, amplification and so forth for audio data inputted from the decoder 1204 and causes sound to be outputted from the speaker 1208. Further, the audio signal processing section 1207 may perform additional processes such as noise removal or the like for the audio data.

The external interface section 1209 is an interface for connecting the television apparatus 1200 and an external apparatus or a network to each other. For example, a video stream or an audio stream received through the external interface section 1209 may be decoded by the decoder 1204. In particular, also the external interface section 1209 has a role as a transmission section in the television apparatus 1200, which receives an encoded stream in which images are encoded.

The control section 1210 includes a processor such as a CPU, and a memory such as a RAM, a ROM and so forth. The memory stores a program to be executed by the CPU, program data, EPG data, data acquired through a network and so forth. The program stored in the memory is read into and executed by the CPU, for example, upon activation of the television apparatus 1200. The CPU executes the program to control operation of the television apparatus 1200 in response to an operation signal inputted, for example, from the user interface section 1211.

The user interface section 1211 is connected to the control section 1210. The user interface section 1211 includes a button and a switch for allowing, for example, a user to operate the television apparatus 1200, a reception section for a remote controlling signal and so forth. The user interface section 1211 detects an operation by the user through the components mentioned and generates an operation signal, and outputs the generated operation signal to the control section 1210.

The bus 1212 connects the tuner 1202, demultiplexer 1203, decoder 1204, video signal processing section 1205, audio signal processing section 1207, external interface section 1209 and control section 1210 to each other.

In the television apparatus 1200 configured in such a manner as described above, the decoder 1204 may have a function of the decoding apparatus 12 described hereinabove. In particular, the decoder 1204 may decode encoded data by a method described hereinabove in connection with the foregoing embodiment. By such decoding, the television apparatus 1200 can improve the S/N and the compression efficiency.

Further, in the television apparatus 1200 configured in such a manner as described above, the video signal processing section 1205 may be configured, for example, so as to encode image data supplied from the decoder 1204 and output the obtained encoded data to the outside of the television apparatus 1200 through the external interface section 1209. Further, the video signal processing section 1205 may have the function of the encoding apparatus 11 described hereinabove. In short, the video signal processing section 1205 may encode image data supplied from the decoder 1204 by the methods described hereinabove in connection with the embodiment. By such encoding, the television apparatus 1200 can improve the S/N and the compression efficiency.

Second Application Example: Portable Telephone Set

Figure 100:
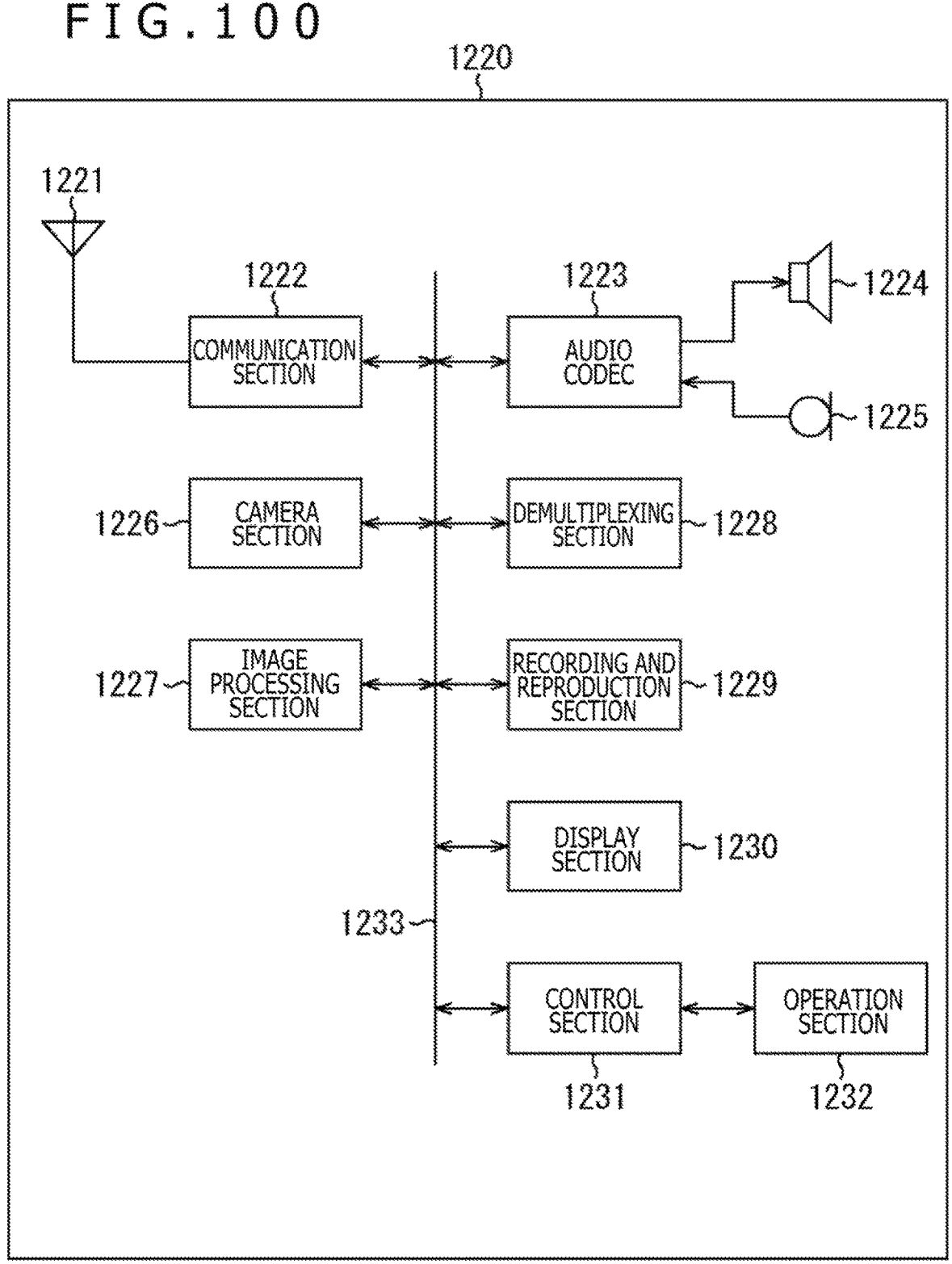
FIG. 100 is a block diagram depicting an example of a schematic configuration of a portable telephone set.

FIG. 100 is a view depicting an example of a schematic configuration of a portable telephone set to which the embodiment described hereinabove is applied.

The portable telephone set 1220 includes an antenna 1221, a communication section 1222, an audio codec 1223, a speaker 1224, a microphone 1225, a camera section 1226, an image processing section 1227, a demultiplexing section 1228, a recording and reproduction section 1229, a display section 1230, a control section 1231, an operation section 1232 and a bus 1233.

The antenna 1221 is connected to the communication section 1222. The speaker 1224 and the microphone 1225 are connected to the audio codec 1223. The operation section 1232 is connected to the control section 1231. The bus 1233 connects the communication section 1222, audio codec 1223, camera section 1226, image processing section 1227, demultiplexing section 1228, recording and reproduction section 1229, display section 1230 and control section 1231 to each other.

The portable telephone set 1220 performs such operations as transmission and reception of a voice signal, transmission and reception of an electronic mail or image data, pickup of an image, recording of data and so forth in various operation modes including a voice speech mode, a data communication mode, an image pickup mode and a videophone mode.

In the voice speech mode, an analog speech signal generated by the microphone 1225 is supplied to the audio codec 1223. The audio codec 1223 converts the analog speech signal into speech data and A/D converts and compresses the speech data after the conversion. Then, the audio codec 1223 outputs the speech data after the compression to the communication section 1222. Then, the communication section 1222 encodes and modulates the speech data to generate a transmission signal. Then, the communication section 1222 transmits the generated transmission signal to a base station (not depicted) through the antenna 1221. On the other hand, the communication section 1222 amplifies and frequency converts a wireless signal received through the antenna 1221 to acquire a reception signal. Then, the communication section 1222 demodulates and decodes the reception signal to generate speech data and outputs the generated speech data to the audio codec 1223. The audio codec 1223 decompresses and D/A converts the speech data to generate an analog speech signal. Then, the audio codec 1223 supplies the generated speech signal to the speaker 1224 such that speech is outputted from the speaker 1224.

On the other hand, in the data communication mode, for example, the control section 1231 generates character data that configure an electronic mail in response to operations by the user through the operation section 1232. Further, the control section 1231 controls the display section 1230 to display characters. Further, the control section 1231 generates electronic mail data in response to a transmission instruction from the user through the operation section 1232 and outputs the generated electronic mail data to the communication section 1222. The communication section 1222 encodes and modulates the generated electronic mail data to generate a transmission signal. Then, the communication section 1222 transmits the generated transmission signal to the base station (not depicted) through the antenna 1221. On the other hand, the communication section 1222 amplifies and frequency converts a wireless signal received through the antenna 1221 to acquire a reception signal. Then, the communication section 1222 demodulates and decodes the reception signal to restore the electronic mail data and outputs the restored electronic mail data to the control section 1231. The control section 1231 controls the display section 1230 to display the substance of the electronic mail and supplies the electronic data to the recording and reproduction section 1229 such that the electronic data is written into its recording medium.

The recording and reproduction section 1229 has an arbitrary storage medium that is readable and writable. For example, the storage medium may be a built-in type storage medium such as a RAM, a flash memory or the like or an externally mountable storage medium such as a hard disk, a magnetic disk, a magneto-optical disk, an optical disk, a USB (Universal Serial Bus) memory, a memory card or the like.

Further, in the image pickup mode, for example, the camera section 1226 picks up an image of an image pickup object to generate image data and outputs the generated image data to the image processing section 1227. The image processing section 1227 encodes the image data inputted from the camera section 1226 and supplies the encoded stream to the recording and reproduction section 1229 so as to be written into the storage medium of the same.

Further, in the image display mode, the recording and reproduction section 1229 reads out an encoded stream recorded on the storage medium and outputs the encoded stream to the image processing section 1227. The image processing section 1227 decodes the encoded stream inputted from the recording and reproduction section 1229 and supplies the image data to the display section 1230 such that the image is displayed.

Further, in the videophone mode, for example, the demultiplexing section 1228 multiplexes a video stream encoded by the image processing section 1227 and an audio stream inputted from the audio codec 1223 and outputs the multiplexed stream to the communication section 1222. The communication section 1222 encodes and modulates the stream to generate a transmission signal. Then, the communication section 1222 transmits the generated transmission signal to a base station (not depicted) through the antenna 1221. On the other hand, the communication section 1222 amplifies and frequency converts a wireless signal received through the antenna 1221 to acquire a reception signal. The transmission signal and the reception signal can include an encoded bit stream. Then, the communication section 1222 demodulates and decodes the reception signal to restore the stream and outputs the restored stream to the demultiplexing section 1228. The demultiplexing section 1228 demultiplexes the video stream and the audio stream from the inputted stream and outputs the video stream to the image processing section 1227 while it outputs the audio stream to the audio codec 1223. The image processing section 1227 decodes the video stream to generate video data. The video data is supplied to the display section 1230, by which a series of images are displayed. The audio codec 1223 decompresses and D/A converts the audio stream to generate an analog audio signal. Then, the audio codec 1223 supplies the generated audio signal to the speaker 1224 such that speech is outputted from the speaker 1224.

In the portable telephone set 1220 configured in this manner, for example, the image processing section 1227 may have the function of the encoding apparatus 11 described hereinabove. In short, the image processing section 1227 may encode image data by the methods described in the foregoing description of the embodiment. By such encoding, the portable telephone set 1220 can improve the S/N and the compression efficiency.

Further, in the portable telephone set 1220 configured in this manner, for example, the image processing section 1227 may have the function of the decoding apparatus 12 described hereinabove. In short, the image processing section 1227 may decode encoded data by the method described hereinabove in the foregoing description of the embodiment. By such decoding, the portable telephone set 1220 can improve the S/N and the compression efficiency.

Third Application Example: Recording and Reproduction Apparatus

Figure 101:
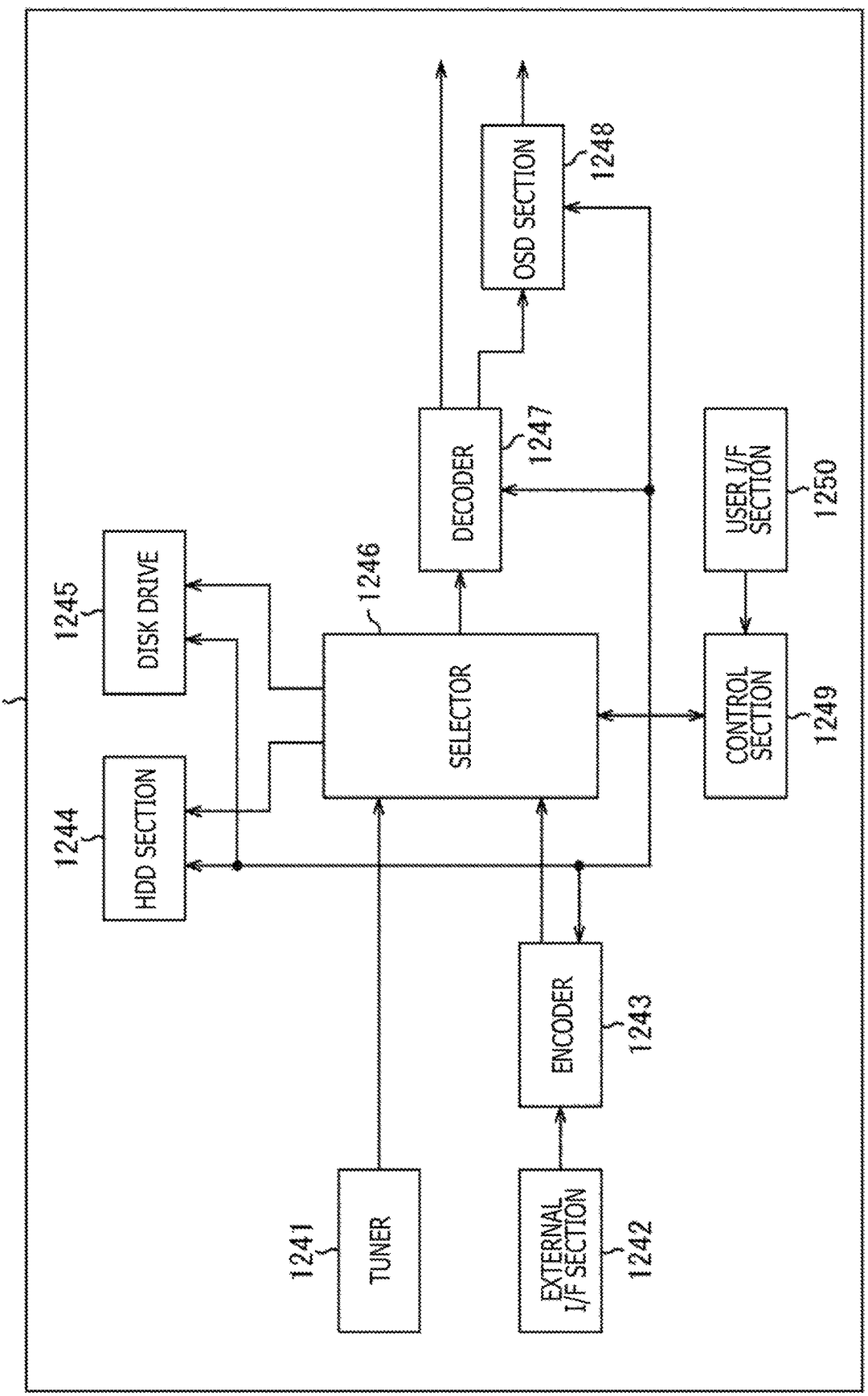
FIG. 101 is a block diagram depicting an example of a schematic configuration of a recording and reproduction apparatus.

FIG. 101 is a view depicting an example of a schematic configuration of a recording and reproduction apparatus to which the embodiment described hereinabove is applied.

The recording and reproduction apparatus 1240 encodes, for example, audio data and video data of a received broadcasting program and records the encoded data on a recording medium. Further, the recording and reproduction apparatus 1240 may encode, for example, audio data and video data acquired from a different apparatus and record the data on a recording medium. Further, the recording and reproduction apparatus 1240 reproduces, for example, data recorded on the recording medium on a monitor and a speaker in response to an instruction of the user. At this time, the recording and reproduction apparatus 1240 decodes audio data and video data.

The recording and reproduction apparatus 1240 includes a tuner 1241, an external interface (I/F) section 1242, an encoder 1243, an HDD (Hard Disk Drive) section 1244, a disk drive 1245, a selector 1246, a decoder 1247, an OSD (On-Screen Display) section 1248, a control section 1249 and a user interface (I/F) 1250.

The tuner 1241 extracts a signal of a desired channel from broadcasting signals received through an antenna (not depicted) and demodulates the extracted signal. Then, the tuner 1241 outputs an encoded bit stream obtained by the demodulation to the selector 1246. In other words, the tuner 1241 has a role as the transmission section in the recording and reproduction apparatus 1240.

The external interface section 1242 is an interface for connecting the recording and reproduction apparatus 1240 and an external apparatus or a network to each other. The external interface section 1242 may be, for example, an IEEE (Institute of Electrical and Electronic Engineers) 1394 interface, a network interface, a USB interface, a flash memory interface or the like. For example, video data and audio data received through the external interface section 1242 are inputted to the encoder 1243. In other words, the external interface section 1242 has a role as a transmission section in the recording and reproduction apparatus 1240.

The encoder 1243 encodes, in the case where video data and audio data inputted from the external interface section 1242 are not in an encoded state, the video data and the audio data. Then, the encoder 1243 outputs an encoded bit stream to the selector 1246.

The HDD section 1244 records an encoded bit stream, in which content data of videos, audios and so forth are compressed, various programs and other data on an internal hard disk. Further, the HDD section 1244 reads out, upon reproduction of videos and audios, such data from the hard disk.

The disk drive 1245 performs recording and reading out of data on and from a recording medium mounted thereon. The recording medium to be mounted on the disk drive 1245 may be, for example, a DVD (Digital Versatile Disc) disk (DVD-Video, DVD-RAM (DVD-Random Access Memory), DVD-R (DVD-Recordable), DVD-RW (DVD-Rewritable), DVD+R (DVD+Recordable), DVD+RW (DVD+Rewriteable) and so forth) or a Blu-ray (registered trademark) disk or the like.

The selector 1246 selects, upon recording of videos and audios, an encoded bit stream inputted from the tuner 1241 or the encoder 1243 and outputs the selected encoded bit stream to the HDD 1244 or the disk drive 1245. On the other hand, upon reproduction of videos and audios, the selector 1246 outputs an encoded bit stream inputted from the HDD 1244 or the disk drive 1245 to the decoder 1247.

The decoder 1247 decodes an encoded bit stream to generate video data and audio data. Then, the decoder 1247 outputs the generated video data to the OSD section 1248. Further, the decoder 1247 outputs the generated audio data to the external speaker.

The OSD section 1248 reproduces the video data inputted from the decoder 1247 and displays a video. Further, the OSD section 1248 may superimpose an image of a GUI such as, for example, a menu, a button, a cursor or the like on the displayed video.

The control section 1249 includes a processor such as a CPU or the like and a memory such as a RAM, a ROM and so forth. The memory stores a program to be executed by the CPU, program data and so forth. The program stored in the memory is read into and executed by the CPU, for example, upon activation of the recording and reproduction apparatus 1240. By executing the program, the CPU controls operation of the recording and reproduction apparatus 1240, for example, in response to an operation signal inputted from the user interface section 1250.

The user interface section 1250 is connected to the control section 1249. The user interface section 1250 includes, for example, a button and a switch for allowing a user to operate the recording and reproduction apparatus 1240, a reception section for a remote controlling signal and so forth. The user interface section 1250 detects an operation by the user through the components to generate an operation signal and outputs the generated operation signal to the control section 1249.

In the recording and reproduction apparatus 1240 configured in this manner, for example, the encoder 1243 may have the functions of the encoding apparatus 11 described above. In short, the encoder 1243 may encode image data by the methods described in the foregoing description of the embodiment. By such encoding, the recording and reproduction apparatus 1240 can improve the S/N and the compression efficiency.

Further, in the recording and reproduction apparatus 1240 configured in this manner, for example, the decoder 1247 may have the functions of the decoding apparatus 12 described hereinabove. In short, the decoder 1247 may decode encoded data by the methods described in the foregoing description of the embodiment. By such decoding, the recording and reproduction apparatus 1240 can improve the S/N and the compression efficiency.

Fourth Application Example: Image Pickup Apparatus

Figure 102:
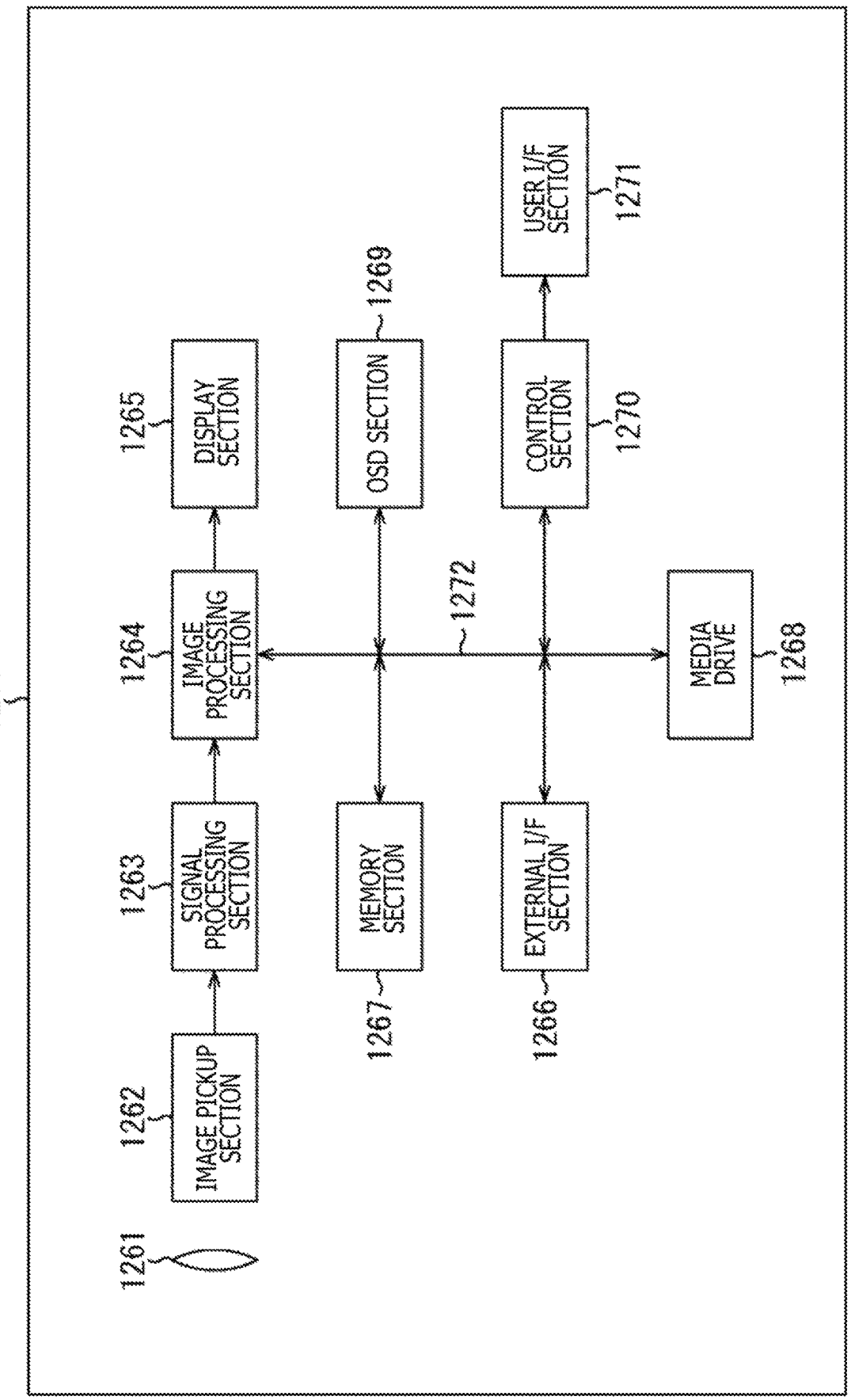
FIG. 102 is a block diagram depicting an example of a schematic configuration of an image pickup apparatus.

FIG. 102 is a view depicting an example of a schematic configuration of an image pickup apparatus to which the embodiment described hereinabove is applied.

The image pickup apparatus 1260 picks up an image of an image pickup object to generate an image and encodes and records image data on a recording medium.

The image pickup apparatus 1260 includes an optical block 1261, an image pickup section 1262, a signal processing section 1263, an image processing section 1264, a display section 1265, an external interface (I/F) section 1266, a memory section 1267, a media drive 1268, an OSD section 1269, a control section 1270, a user interface (I/F) section 1271 and a bus 1272.

The optical block 1261 is connected to the image pickup section 1262. The image pickup section 1262 is connected to the signal processing section 1263. The display section 1265 is connected to the image processing section 1264. The user interface section 1271 is connected to the control section 1270. The bus 1272 connects the image processing section 1264, external interface section 1266, memory section 1267, media drive 1268, OSD section 1269 and control section 1270 to each other.

The optical block 1261 includes a focus lens, a diaphragm mechanism and so forth. The optical block 1261 forms an optical image of an image pickup object on an image pick plane of the image pickup section 1262. The image pickup section 1262 includes an image sensor such as a CCD (Charge Coupled Device) image sensor, a CMOS (Complementary Metal Oxide Semiconductor) image sensor or the like and converts an optical image formed on the image pickup plane into an image signal in the form of an electric signal by photoelectric conversion. Then, the image pickup section 1262 outputs the image signal to the signal processing section 1263.

The signal processing section 1263 performs various camera signal processes such as knee correction, gamma correction, color correction and so forth for an image signal inputted from the image pickup section 1262. The signal processing section 1263 outputs the image data after the camera signal processes to the image processing section 1264.

The image processing section 1264 encodes the image data inputted from the signal processing section 1263 to generate encoded data. Then, the image processing section 1264 outputs the generated encoded data to the external interface section 1266 or the media drive 1268. Further, the image processing section 1264 decodes encoded data inputted from the external interface section 1266 or the media drive 1268 to generate image data. Then, the image processing section 1264 outputs the generated image data to the display section 1265. Further, the image processing section 1264 may output image data inputted from the signal processing section 1263 to the display section 1265 such that an image is displayed. Further, the image processing section 1264 may superimpose display data acquired from the OSD section 1269 on the image to be outputted to the display section 1265.

The OSD section 1269 generates an image of a GUI such as, for example, a menu, a button, a cursor or the like and outputs the generated image to the image processing section 1264.

The external interface section 1266 is configured, for example, as a USB input/output terminal. The external interface section 1266 connects the image pickup apparatus 1260 and a printer, for example, upon printing of an image. Further, as occasion demands, a drive is connected to the external interface section 1266. On the drive, a removable medium such as, for example, a magnetic disk, an optical disk or the like is mounted, and a program read out from the removable medium can be installed into the image pickup apparatus 1260. Furthermore, the external interface section 1266 may be configured as a network interface connected to a network such as a LAN, the internet or the like. In other words, the external interface section 1266 has a role as a transmission section of the image pickup apparatus 1260.

The recording medium to be mounted on the media drive 1268 may be an arbitrary readable and writable removable medium such as, for example, a magnetic disk, a magneto-optical disk, an optical disk, a semiconductor memory or the like. Further, a recording medium may be mounted fixedly on the media drive 1268 such that a non-portable storage section such as, for example, a built-in type hard disk drive or an SSD (Solid State Drive) is configured.

The control section 1270 includes a processor such as a CPU or the like and a memory such as a RAM, a ROM or the like. The memory stores therein a program to be executed by the CPU, program data and so forth. The program stored in the memory is read into and executed by the CPU, for example, upon activation of the image pickup apparatus 1260. By executing the program, the CPU controls operation of the image pickup apparatus 1260, for example, in response to an operation signal inputted from the user interface section 1271.

The user interface section 1271 is connected to the control section 1270. The user interface section 1271 includes, for example, a button, a switch and so forth for allowing the user to operate the image pickup apparatus 1260. The user interface section 1271 detects an operation by the user through the components described to generate an operation signal and outputs the generated operation signal to the control section 1270.

In the image pickup apparatus 1260 configured in this manner, for example, the image processing section 1264 may have the functions of the encoding apparatus 11 described hereinabove. In short, the image processing section 1264 may encode image data by the method described in the foregoing description of the embodiment. By such encoding, the image pickup apparatus 1260 can improve the S/N and the compression efficiency.

Further, in the image pickup apparatus 1260 configured in such a manner as described above, for example, the image processing section 1264 may have the functions of the decoding apparatus 12 described hereinabove. In short, the image processing section 1264 may decode encoded data by the methods described in the foregoing description of the embodiment. By such decoding, the image pickup apparatus 1260 can improve the S/N and the compression efficiency.

Other Application Examples

It is to be noted that present technology can be applied to such HTTP streaming as, for example, MPEG DASH or the like in which appropriate data is selected and used in a unit of a segment from among a plurality of encoded data prepared in advance and having resolutions or the like different from each other. In short, also it is possible for such a plurality of encoded data as just described to share information relating to encoding or decoding.

Further, while the foregoing description is directed to examples of an apparatus, a system and so forth to which the present technology is applied, the present technology is not limited to this and can be carried out also as any constitution to be incorporated in such an apparatus as described above or an apparatus that configures such a system as described above, such as, for example, a processor as a system LSI (Large Scale Integration) or the like, a module that uses a plurality of processors or the like, a unit that uses a plurality of modules or the like, a set in which some other function is added to a unit (namely, some of constitutions of an apparatus).

<Video Set>

An example of a case in which the present technology is carried out as a set is described with reference to FIG. 103.

Figure 103:
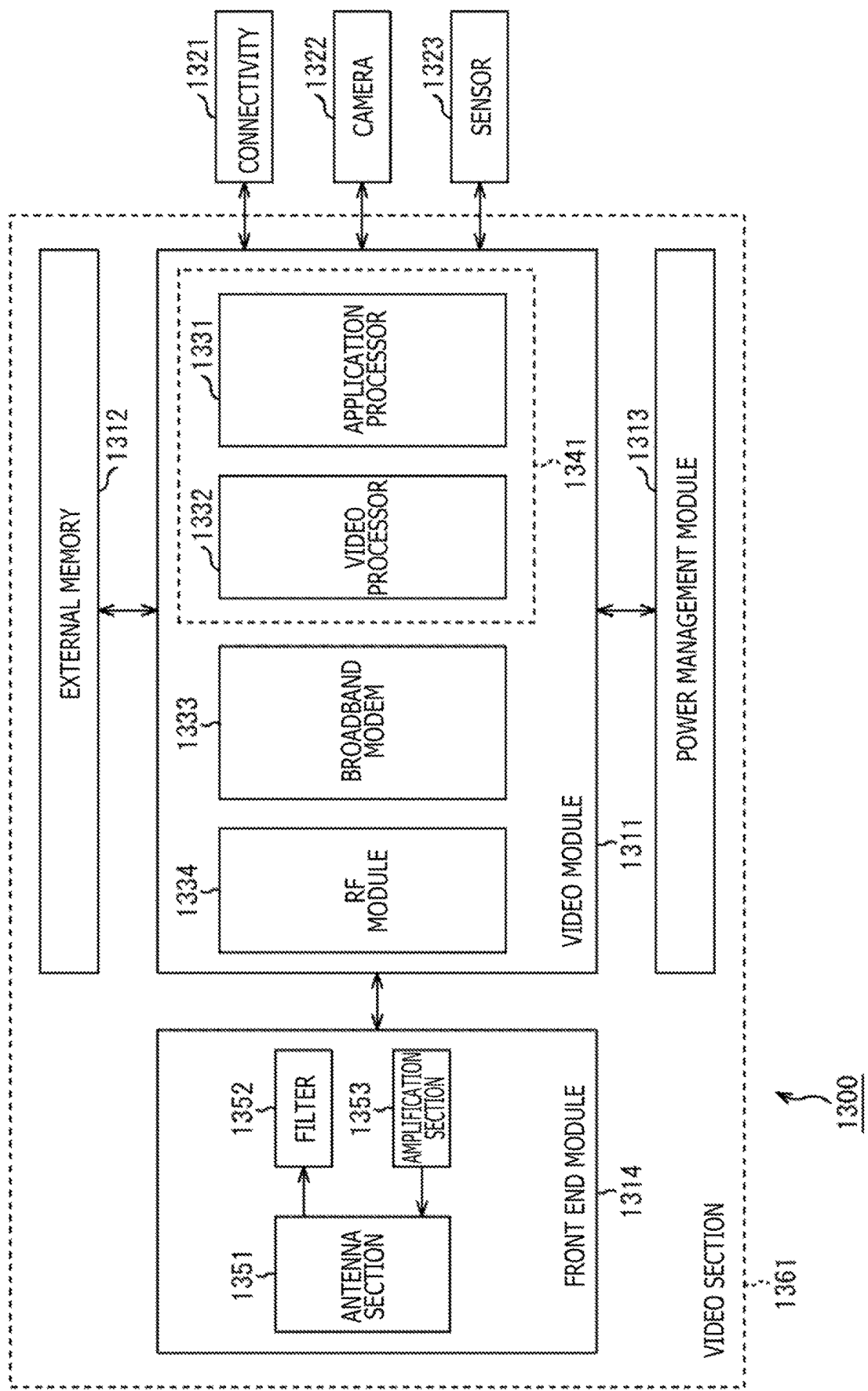
FIG. 103 is a block diagram depicting an example of a schematic configuration of a video set.

FIG. 103 is a view depicting an example of a schematic configuration of a video set to which the present technology is carried out as a set.

In recent years, multifunctionalization of electronic apparatus has been and is proceeding, and in the case where, in development or manufacture, some configuration is carried out as sales, provision or the like, not only a case in which it is carried out as a constitution having one function, but also a case in which a plurality of constitutions having functions associated with each other are combined and carried out as one set having a plurality of functions are found increasingly.

The video set 1300 depicted in FIG. 103 has such a multifunctionalized configuration and is a combination, with a device having a function or functions relating to encoding and/or decoding of an image (one of or both encoding and decoding), a device having some other function relating to the function or functions.

As depicted in FIG. 103, the video set 1300 includes a module group including a video module 1311, an external memory 1312, a power management module 1313, a front end module 1314 and so forth, and a device having relating functions such as a connectivity 1321, a camera 1322, a sensor 1323 and so forth.

A module is a part in which several part functions related to each other are collected such that it has coherent functions. Although a particular physical configuration is arbitrary, for example, a module is conceivable in which electronic circuit elements having individual functions such as a plurality of processors, registers, capacitors and so forth and other devices and so forth are disposed on a wiring board or the like and integrated. Also it is conceivable to combine a module with another module, a process or the like to form a new module.

In the case of the example of FIG. 103, the video module 1311 is a combination of constitutions having functions relating to image processing and includes an application processor 1331, a video processor 1332, a broadband modem 1333 and an RF module 1334.

A processor includes constitutions, which have predetermined functions, integrated on a semiconductor chip by SoC (System On a Chip) and is called, for example, system LSI (Large Scale Integration) or the like. The constitutions having the predetermined functions may be logic circuits (hardware constitutions), may be a CPU, a ROM, a RAM and so forth and a program executed using them (software configuration) or may be a combination of both of them. For example, a processor may include a logic circuit and a CPU, a ROM, a RAM and so forth such that some of functions are implemented by the logic circuit (hardware constitution) and other functions are implemented by a program (software configuration) executed by the CPU.

The application processor 1331 of FIG. 103 is a processor that executes an application relating to image processing. The application executed by the application processor 1331 not only can execute, in order to implement predetermined functions, arithmetic operation processing but also can control constitutions inside and outside of the video module 1311 such as, for example, the video processor 1332 and so forth if necessary.

The video processor 1332 is a processor having a function relating to encoding and/or decoding of an image (one of or both encoding and decoding).

The broadband modem 1333 performs digital modulation or the like for data (digital signal) to be transmitted by wired or wireless (or both wired and wireless) broadband communication performed through a broadband line such as the Internet, a public telephone network or the like to convert the data into an analog signal or converts an analog signal received by such broadband communication to convert the analog signal into data (digital signal). The broadband modem 1333 processes arbitrary information such as, for example, image data to be processed by the video processor 1332, a stream encoded from image data, an application program, setting data or the like.

The RF module 1334 is a module that performs frequency conversion, modulation/demodulation, amplification, filtering and so forth for an RF (Radio Frequency) signal to be transmitted or received through an antenna. For example, the RF module 1334 performs frequency conversion and so forth for a baseband signal generated by the broadband modem 1333 to generate an RF signal. Further, for example, the RF module 1334 performs frequency conversion and so forth for an RF signal received through the front end module 1314 to generate a baseband signal.

It is to be noted that, as indicated by a broken line 1341 in FIG. 103, the application processor 1331 and the video processor 1332 may be integrated so as to be configured as a single processor.

The external memory 1312 is a module provided outside the video module 1311 and having a storage device utilized by the video module 1311. Although the storage device of the external memory 1312 may be implemented by any physical constitution, since generally it is frequently utilized for storage of a large amount of data such as image data of a unit of a frame, it is desirable to implement the storage device by a semiconductor device that is comparatively less expensive and has a large capacity like a DRAM (Dynamic Random Access Memory).

The power management module 1313 manages and controls power supply to the video module 1311 (constitutions in the video module 1311).

The front end module 1314 is a module that provides a front end function (circuit at a transmission/reception end of the antenna side) to the RF module 1334. As depicted in FIG. 103, the front end module 1314 includes, for example, an antenna section 1351, a filter 1352 and an amplification section 1353.

The antenna section 1351 includes an antenna for transmitting and receiving a wireless signal and peripheral constitutions. The antenna section 1351 transmits a signal supplied from the amplification section 1353 as a wireless signal and supplies a received wireless signal as an electric signal (RF signal) to the filter 1352. The filter 1352 performs filter processing and so forth for an RF signal received through the antenna section 1351 and supplies the RF signal after the processing to the RF module 1334. The amplification section 1353 amplifies the RF signal supplied from the RF module 1334 and supplies the amplified RF signal to the antenna section 1351.

The connectivity 1321 is a module having functions relating to connection to the outside. The physical configuration of the connectivity 1321 is arbitrary. For example, the connectivity 1321 includes constitutions having a communication function according to a standard other than a communication standard with which the broadband modem 1333 is compatible, external input and output terminals and so forth.

For example, the connectivity 1321 may include a module having a communication function that complies with a wireless communication standard such as Bluetooth (registered trademark), IEEE 802.11 (for example, Wi-Fi (Wireless fidelity, registered trademark)), NFC (Near Field Communication), IrDA (InfraRed Data Association) or the like, an antenna for transmitting and receiving a signal that complies with the standard, and so forth. Further, for example, the connectivity 1321 may include a module having a communication function that complies with a wired communication standard such as USB (Universal Serial Bus), HDMI (registered trademark) (High-Definition Multimedia Interface) or the like, a terminal that complies with the standard and so forth. Furthermore, for example, the connectivity 1321 may include other data (signal) transmission functions such as analog input and output terminals and so forth.

It is to be noted that the connectivity 1321 may include a device of a transmission destination of data (signal). For example, the connectivity 1321 may include a drive for performing reading out and writing of data from and into a recording medium such as a magnetic disk, an optical disk, a magneto-optical disk, a semiconductor memory or the like (including not only a drive for a removable medium but also a hard disk, a SSD (Solid State Drive), a NAS (Network Attached Storage) and so forth). Further, the connectivity 1321 may include an outputting device of an image or sound (a monitor, a speaker or the like).

The camera 1322 is a module having a function for picking up an image of an image pickup object to obtain image data of the image pickup object. Image data obtained by image pickup of the camera 1322 is, for example, supplied to and encoded by the video processor 1332.

The sensor 1323 is a module having an arbitrary sensor function such as, for example, a sound sensor, an ultrasonic sensor, an optical sensor, an illuminance sensor, an infrared sensor, an image sensor, a rotation sensor, an angle sensor, an angular velocity sensor, a speed sensor, an acceleration sensor, an inclination sensor, a magnetic identification sensor, a shock sensor, a temperature sensor and so forth. Data detected by the sensor 1323 is supplied, for example, to the application processor 1331 and is utilized by an application or the like.

The constitution described as a module in the foregoing description may be implemented as a processor, and conversely, the constitution described as a processor may be implemented as a module.

In the video set 1300 having such a configuration as described above, the present technology can be applied to the video processor 1332 as hereinafter described. Accordingly, the video set 1300 can be carried out as a set to which the present technology is applied.

<Example of Configuration of Video Processor>

Figure 104:
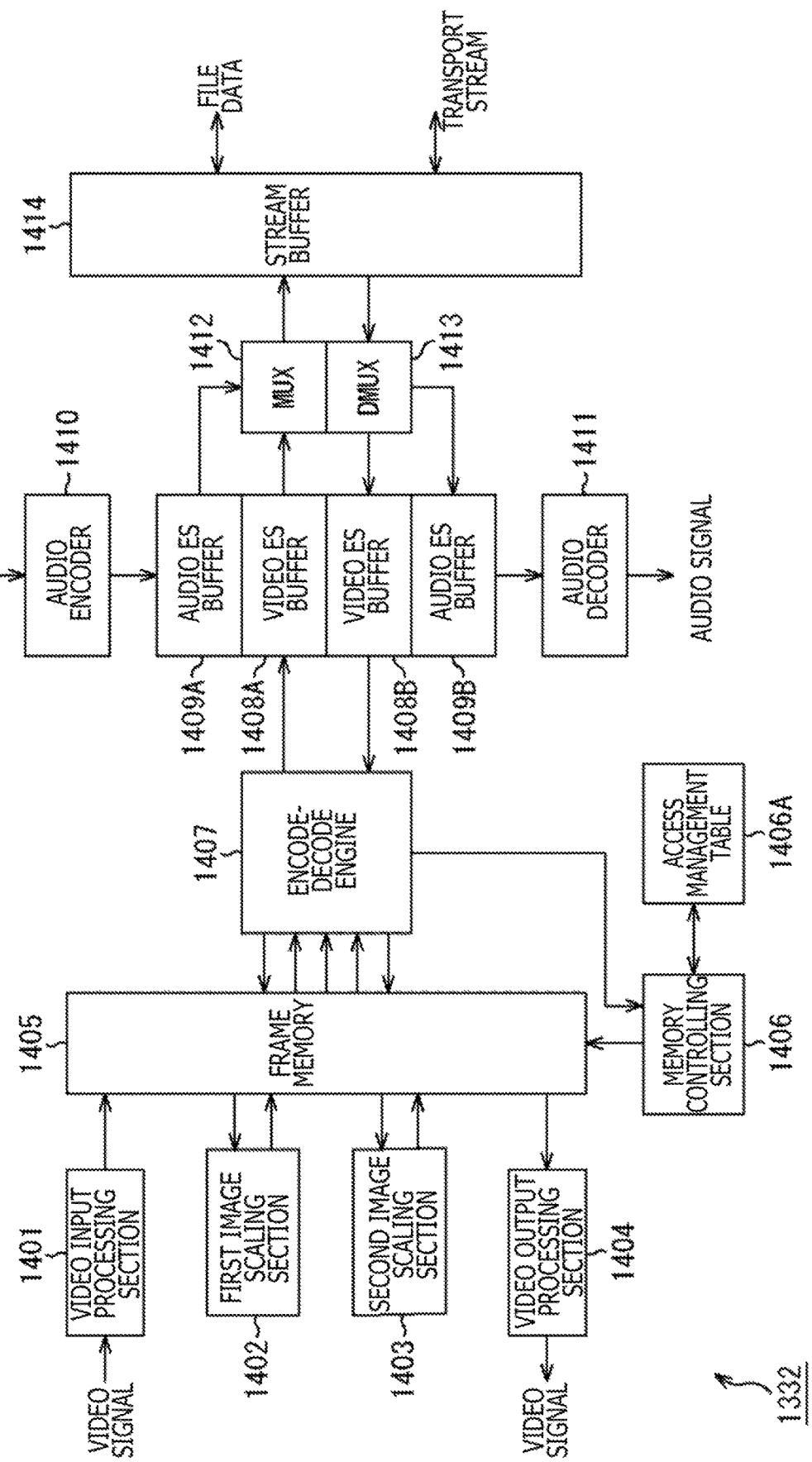
FIG. 104 is a block diagram depicting an example of a schematic configuration of a video processor.

FIG. 104 is a view depicting an example of a schematic configuration of the video processor 1332 (FIG. 103) to which the present technology is applied.

In the case of the example of FIG. 104, the video processor 1332 has a function for receiving an input of a video signal and an audio signal and encoding them by a predetermined method and a function for decoding encoded video data and audio data and reproducing and outputting a video signal and an audio signal.

As depicted in FIG. 104, the video processor 1332 includes a video input processing section 1401, a first image scaling section 1402, a second image scaling section 1403, a video output processing section 1404, a frame memory 1405 and a memory controlling section 1406. The video processor 1332 further includes an encode-decode engine 1407, video ES (Elementary Stream) buffers 1408A and 1408B and audio ES buffers 1409A and 1409B. Furthermore, the video processor 1332 includes an audio encoder 1410, an audio decoder 1411, a multiplexing section (MUX (Multiplexer)) 1412, a demultiplexing section (DMUX (Demultiplexer)) 1413 and a stream buffer 1414.

The video input processing section 1401 acquires a video signal inputted, for example, from the connectivity 1321 (FIG. 103) or the like and converts the video signal into digital image data. The first image scaling section 1402 performs format conversion, a scaling process of an image and so forth for image data. The second image scaling section 1403 performs a scaling process of an image in response to a format at an outputting designation through the video output processing section 1404 and performs format conversion, a scaling process of an image and so forth similar to those by the first image scaling section 1402 for image data. The video output processing section 1404 performs format conversion, conversion into an analog signal and so forth for image data and outputs the resulting analog signal as a reproduced video signal, for example, to the connectivity 1321 and so forth.

The frame memory 1405 is a memory for image data shared by the video input processing section 1401, first image scaling section 1402, second image scaling section 1403, video output processing section 1404 and encode-decode engine 1407. The frame memory 1405 is implemented as a semiconductor memory such as, for example, a DRAM or the like.

The memory controlling section 1406 receives a synchronizing signal from the encode-decode engine 1407 and controls writing and reading out access to the frame memory 1405 in accordance with an access schedule to the frame memory 1405 written in an access management table 1406A. The access management table 1406A is updated by the memory controlling section 1406 in response to a process executed by the encode-decode engine 1407, first image scaling section 1402, second image scaling section 1403 or the like.

The encode-decode engine 1407 performs an encoding process of image data and a decoding process of a video stream that is encoded data of image data. For example, the encode-decode engine 1407 encodes image data read out from the frame memory 1405 and successively writes the encoded image data as a video stream into the video ES buffer 1408A. Further, for example, the encode-decode engine 1407 successively reads out and decodes a video stream from the video ES buffer 1408B and successively writes the decoded video stream as image data into the frame memory 1405. The encode-decode engine 1407 uses the frame memory 1405 as a working area in such encoding and decoding. Further, the encode-decode engine 1407 outputs a synchronizing signal to the memory controlling section 1406 at a timing at which, for example, processing for each macro block is to be started.

The video ES buffer 1408A buffers a video stream generated by the encode-decode engine 1407 and supplies the buffered video stream to the multiplexing section (MUX) 1412. The video ES buffer 1408B buffers a video stream supplied from the demultiplexing section (DMUX) 1413 and supplies the buffered video stream to the encode-decode engine 1407.

The audio ES buffer 1409A buffers an audio stream generated by the audio encoder 1410 and supplies the buffered audio stream to the multiplexing section (MUX) 1412. The audio ES buffer 1409B buffers an audio stream supplied from the demultiplexing section (DMUX) 1413 and supplies the buffered audio stream to the audio decoder 1411.

The audio encoder 1410, for example, digitally converts an audio signal inputted from the connectivity 1321 or the like and encodes the digital audio signal by a predetermined method such as, for example, an MPEG audio method, an AC3 (Audio Code number 3) method or the like. The audio encoder 1410 successively writes an audio stream, which is encoded data of an audio signal, into the audio ES buffer 1409A. The audio decoder 1411 decodes an audio stream supplied from the audio ES buffer 1409B, performs, for example, conversion into an analog signal or the like, and supplies the resulting analog signal as a reproduced audio signal, for example, to the connectivity 1321 or the like.

The multiplexing section (MUX) 1412 multiplexes a video stream and an audio stream. The method of the multiplexing (namely, the format of a bit stream to be generated by the multiplexing) is arbitrary. Further, upon such multiplexing, also it is possible for the multiplexing section (MUX) 1412 to add predetermined header information and so forth to the bit stream. In other words, the multiplexing section (MUX) 1412 can convert the format of the stream by the multiplexing. For example, the multiplexing section (MUX) 1412 multiplexes a video stream and an audio stream to convert the streams into a transport stream that is a bit stream of a format for transfer. Further, for example, the multiplexing section (MUX) 1412 multiplexes a video stream and an audio stream to convert them into data of a file format for recording (file data).

The demultiplexing section (DMUX) 1413 demultiplexes a bit stream, in which a video stream and an audio stream are multiplexed, by a method corresponding to that of the multiplexing by the multiplexing section (MUX) 1412. In short, the demultiplexing section (DMUX) 1413 extracts a video stream and an audio stream from a bit stream read out from the stream buffer 1414 (separates a video stream and an audio stream from each other). In short, the demultiplexing section (DMUX) 1413 can convert the format of a stream by demultiplexing (reverse conversion to the conversion by the multiplexing section (MUX) 1412). For example, the demultiplexing section (DMUX) 1413 can convert a transport stream supplied, for example, from the connectivity 1321, broadband modem 1333 or the like into a video stream and an audio stream by acquiring the transport stream through the stream buffer 1414 and demultiplexing the transport stream. Further, for example, the demultiplexing section (DMUX) 1413 can convert file data read out from various recording media, for example, by the connectivity 1321 into a video stream and an audio stream by acquiring the file data through the stream buffer 1414 and demultiplexing the file data.

The stream buffer 1414 buffers a bit stream. For example, the stream buffer 1414 buffers a transport stream supplied from the multiplexing section (MUX) 1412 and supplies the buffered transport stream, for example, to the connectivity 1321, broadband modem 1333 and so forth at a predetermined timing or on the basis of a request from the outside or the like.

Further, the stream buffer 1414 buffers file data supplied from the multiplexing section (MUX) 1412 and supplies the buffered file data, for example, to the connectivity 1321 and so forth at a predetermined timing or on the basis of a request from the outside or the like such that the file data is recorded on various recording media.

Furthermore, the stream buffer 1414 buffers a transport stream acquired, for example, through the connectivity 1321, broadband modem 1333 or the like and supplies the buffered transport stream to the demultiplexing section (DMUX) 1413 at a predetermined timing or on the basis of a request from the outside or the like.

Further, the stream buffer 1414 buffers file data read out from various recording media, for example, by the connectivity 1321 or the like and supplies the buffered file data to the demultiplexing section (DMUX) 1413 at a predetermined timing or on the basis of a request from the outside or the like.

Now, an example of operation of the video processor 1332 having such a configuration as described above is described. For example, a video signal inputted from the connectivity 1321 or the like to the video processor 1332 is converted into digital image data of a predetermined method such as a 4:2:2 Y/Cb/Cr method or the like by the video input processing section 1401 and is successively written into the frame memory 1405. The digital image data are read out into the first image scaling section 1402 or the second image scaling section 1403 and subjected to format conversion to that of a predetermined method such as the 4:2:0 Y/Cb/Cr method or the like and a scaling process, and then are written into the frame memory 1405 again. The image data is encoded by the encode-decode engine 1407 and written as a video stream into the video ES buffer 1408A.

Meanwhile, an audio signal inputted from the connectivity 1321 or the like to the video processor 1332 is encoded by the audio encoder 1410 and written as an audio stream into the audio ES buffer 1409A.

The video stream of the video ES buffer 1408A and the audio stream of the audio ES buffer 1409A are read out to and multiplexed by the multiplexing section (MUX) 1412 such that they are converted into a transport stream, file data or the like. The transport stream generated by the multiplexing section (MUX) 1412 is buffered by the stream buffer 1414 and then is outputted to an external network, for example, through the connectivity 1321, broadband modem 1333 or the like. Meanwhile, the file data generated by the multiplexing section (MUX) 1412 is buffered by the stream buffer 1414 and then outputted, for example, to the connectivity 1321 or the like and then recorded into various recording media.

On the other hand, a transport stream inputted from an external network to the video processor 1332, for example, through the connectivity 1321, broadband modem 1333 and so forth is buffered by the stream buffer 1414 and then demultiplexed by the demultiplexing section (DMUX) 1413. Meanwhile, file data read out from various recording media, for example, by the connectivity 1321 or the like and inputted to the video processor 1332 is buffered by the stream buffer 1414 and then demultiplexed by the demultiplexing section (DMUX) 1413. In short, a transport stream or file data inputted to the video processor 1332 is demultiplexed into a video stream and an audio stream by the demultiplexing section (DMUX) 1413.

The audio stream is supplied through the audio ES buffer 1409B to and decoded by the audio decoder 1411 to reproduce an audio signal. Meanwhile, the video stream is successively read out, after written into the video ES buffer 1408B, and decoded by the encode-decode engine 1407 and written into the frame memory 1405. The decoded image data is subjected to a scaling process by the second image scaling section 1403 and is written into the frame memory 1405. Then, the decoded image data is read out into the video output processing section 1404 and format converted to a predetermined format such as the 4:2:2 Y/Cb/Cr format, whereafter it is converted into an analog signal and a video signal is reproduced and outputted.

In the case where the present technology is to be applied to the video processor 1332 configured in such a manner as described above, the present technology according to the embodiment described above may be applied to the encode-decode engine 1407. In particular, for example, the encode-decode engine 1407 may have the function of the encoding apparatus 11 or the function of the decoding apparatus 12 described above or both of them. This makes it possible for the video processor 1332 to obtain advantageous effects similar to those of the encoding apparatus 11 or the decoding apparatus 12 of the embodiment described hereinabove.

It is to be noted that, in the encode-decode engine 1407, the present technology (namely, the function of the encoding apparatus 11 or the function of the decoding apparatus 12 or both of them) may be implemented by hardware such as logic circuits or the like or may be implemented by software such as an incorporated program or the like or else may be implemented by both of them.

<Other Configuration Examples of Video Processor>

Figure 105:
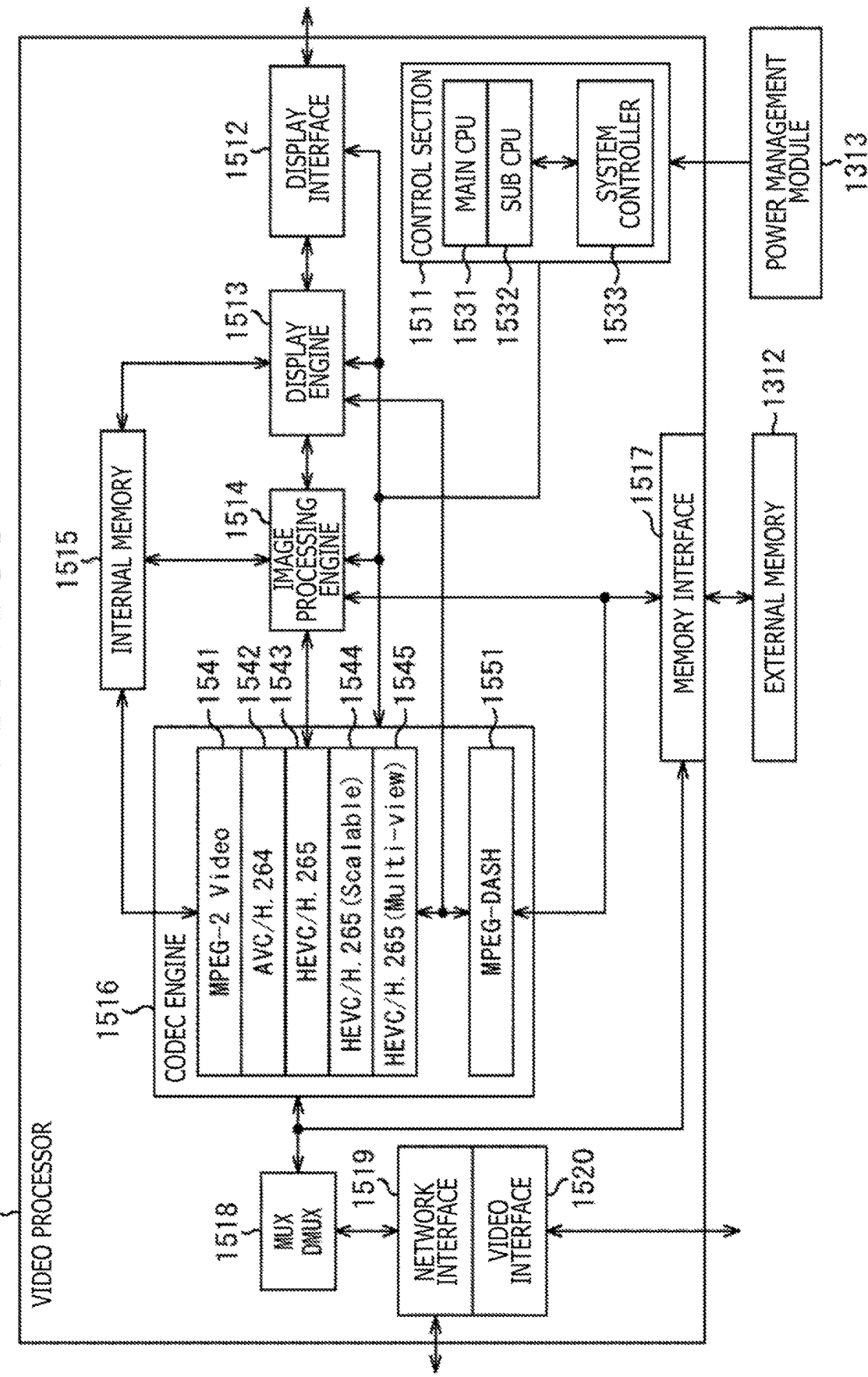
FIG. 105 is a block diagram depicting a different example of a schematic configuration of the video processor.

FIG. 105 is a view depicting a different example of a schematic configuration of the video processor 1332 to which the present technology is applied.

In the case of the example of FIG. 105, the video processor 1332 has a function for encoding and decoding video data by a predetermined method.

More particularly, as depicted in FIG. 105, the video processor 1332 includes a control section 1511, a display interface 1512, a display engine 1513, an image processing engine 1514 and an internal memory 1515. The video processor 1332 further includes a codec engine 1516, a memory interface 1517, a multiplexing and demultiplexing section (MUX DMUX) 1518, a network interface 1519 and a video interface 1520.

The control section 1511 controls operation of the processing sections in the video processor 1332 such as the display interface 1512, display engine 1513, image processing engine 1514, codec engine 1516 and so forth.

As depicted in FIG. 105, the control section 1511 includes, for example, a main CPU 1531, a sub CPU 1532 and a system controller 1533. The main CPU 1531 executes a program and for forth for controlling operation of the processing sections in the video processor 1332. The main CPU 1531 generates a control signal in accordance with the program and so forth and supplies the control signal to the processing sections (namely, controls operation of the processing sections). The sub CPU 1532 plays an auxiliary role of the main CPU 1531. For example, the sub CPU 1532 executes a child process, a subroutine or the like of the program or the like executed by the main CPU 1531. The system controller 1533 controls operation of the main CPU 1531 and the sub CPU 1532 such as to designate programs to be executed by the main CPU 1531 and the sub CPU 1532 or the like.

The display interface 1512 outputs image data, for example, to the connectivity 1321 and so forth under the control of the control section 1511. For example, the display interface 1512 converts image data in the form of digital data into an analog signal and outputs the image data as a reproduced video signal, or the image data of digital data as they are, to a monitor apparatus or the like of the connectivity 1321.

The display engine 1513 performs various conversion processes such as format conversion, size conversion, color region conversion and so forth for the image data under the control of the control section 1511 such that the image data satisfies hardware specifications of a monitor apparatus or the like on which an image of the image data is to be displayed.

The image processing engine 1514 carries out predetermined image processing such as, for example, a filtering process and so forth for picture quality improvement for the image data under the control of the control section 1511.

The internal memory 1515 is a memory provided in the inside of the video processor 1332 such that it is shared by the display engine 1513, image processing engine 1514 and codec engine 1516. The internal memory 1515 is used for transfer of data performed, for example, between the display engine 1513, image processing engine 1514 and codec engine 1516. For example, the internal memory 1515 stores data supplied from the display engine 1513, image processing engine 1514 or codec engine 1516 and supplies, as occasion demands (for example, in accordance with a request), the data to the display engine 1513, image processing engine 1514 or codec engine 1516. Although this internal memory 1515 may be implemented by any storage device, since generally it is frequently utilized for storage of a small amount of data such as image data in a unit of a block, parameters or the like, preferably it is implemented by a semiconductor memory that has a comparatively (for example, in comparison with the external memory 1312) small capacity but is high in response speed like, for example, an SRAM (Static Random Access Memory).

The codec engine 1516 performs processing relating to encoding or decoding of image data. The method for encoding and decoding with which the codec engine 1516 is compatible is arbitrary, and the number of such methods may be one or a plural number. For example, the codec engine 1516 may have codec functions of a plurality of encoding and decoding methods and perform encoding of image data or decoding of encoded data by a codec function selected from the codec functions.

In the example depicted in FIG. 105, the codec engine 1516 includes, as functional blocks for processing relating to the codec, for example, an MPEG-2 Video 1541, an AVC/H.264 1542, an HEVC/H.265 1543, an HEVC/H.265 (Scalable) 1544, an HEVC/H.265 (Multi-view) 1545 and an MPEG-DASH 1551.

The MPEG-2 Video 1541 is a functional block that encodes or decodes image data by the MPEG-2 method. The AVC/H.264 1542 is a functional block that encodes or decodes image data by the AVC method. The HEVC/H.265 1543 is a functional block that encodes or decodes image data by the HEVC method. The HEVC/H.265 (Scalable) 1544 is a functional block that scalably encodes or scalably decodes image data by the HEVC method. The HEVC/H.265 (Multi-view) 1545 is a functional block that multi-visually encodes or multi-visually decodes image data by the HEVC method.

The MPEG-DASH 1551 is a functional block for transmitting and receiving image data by the MPEG-DASH (MPEG-Dynamic Adaptive Streaming over HTTP) method. MPEG-DASH is a technology for performing streaming of a video using the HTTP (HyperText Transfer Protocol) and has one of characteristics in that appropriate encoded data is selected and transmitted in a unit of a segment from among a plurality of encoded data that are prepared in advance and are different from each other in resolution and so forth. The MPEG-DASH 1551 performs generation of a stream that complies with the standard, transmission control of the stream and so forth, and for encoding and decoding of image data, the MPEG-2 Video 1541 to HEVC/H.265 (Multi-view) 1545 described above are utilized.

The memory interface 1517 is an interface for the external memory 1312. Data supplied from the image processing engine 1514 or the codec engine 1516 is supplied to the external memory 1312 through the memory interface 1517. Meanwhile, data read out from the external memory 1312 is supplied to the video processor 1332 (image processing engine 1514 or codec engine 1516) through the memory interface 1517.

The multiplexing and demultiplexing section (MUX DMUX) 1518 performs multiplexing and demultiplexing of various data relating to an image such as a bit stream of encoded data, image data, a video signal and so forth. The method for the multiplexing and demultiplexing is arbitrary. For example, upon multiplexing, the multiplexing and demultiplexing section (MUX DMUX) 1518 not only can collect a plurality of data into one data but also can add predetermined header information and so forth to the data. Further, upon demultiplexing, the multiplexing and demultiplexing section (MUX DMUX) 1518 not only can divide one data into a plurality of data but also can add predetermined header information and so forth to the divisional data. In short, the multiplexing and demultiplexing section (MUX DMUX) 1518 can convert the data format by multiplexing and demultiplexing. For example, the multiplexing and demultiplexing section (MUX DMUX) 1518 can multiplex bit streams to convert them into a transport stream that is a bit stream of a format for transfer or data of a file format for recording (file data). Naturally, the multiplexing and demultiplexing section (MUX DMUX) 1518 can perform inverse conversion by demultiplexing.

The network interface 1519 is an interface, for example, for the broadband model 1333, connectivity 1321 and so forth. The video interface 1520 is an interface, for example, for the connectivity 1321, camera 1322 and so forth.

Now, an example of operation of such a video processor 1332 as described above is described. For example, if a transport stream is received from an external network through the connectivity 1321, broadband modem 1333 or the like, then the transport stream is supplied through the network interface 1519 to and demultiplexed by the multiplexing and demultiplexing section (MUX DMUX) 1518 and then is decoded by the codec engine 1516. Image data obtained by decoding of the codec engine 1516 is subjected, for example, to predetermined image processing by the image processing engine 1514 and further to predetermined conversion by the display engine 1513, and thereafter is supplied, for example, to the connectivity 1321 or the like through the display interface 1512 such that an image thereof is displayed on the monitor. Meanwhile, for example, image data obtained by decoding of the codec engine 1516 is re-encoded by the codec engine 1516 and multiplexed by the multiplexing and demultiplexing section (MUX DMUX) 1518 such that it is converted into file data. The file data is outputted to the connectivity 1321 or the like through the video interface 1520 and is recorded on various recording media.

Furthermore, file data of encoded data, which are encoded image data, read out from a recording medium not depicted, for example, by the connectivity 1321 or the like are supplied through the video interface 1520 to and demultiplexed by the multiplexing and demultiplexing section (MUX DMUX) 1518, and thereafter, they are decoded by the codec engine 1516. Image data obtained by the decoding of the codec engine 1516 are subjected to predetermined image processing by the image processing engine 1514 and further to predetermined conversion by the display engine 1513, and thereafter, they are supplied through the display interface 1512, for example, to the connectivity 1321 or the like such that an image thereof is displayed on the monitor. Meanwhile, for example, image data obtained by decoding of the codec engine 1516 are re-encoded by the codec engine 1516 and multiplexed by the multiplexing and demultiplexing section (MUX DMUX) 1518 such that they are converted into a transport stream. The transport stream is supplied, for example, to the connectivity 1321, broadband modem 1333 and so forth through the network interface 1519 and transmitted to a different apparatus not depicted.

It is to be noted that transfer of image data or other data between the processing sections in the video processor 1332 is performed utilizing, for example, the internal memory 1515 or the external memory 1312. Further, the power management module 1313 controls power supply, for example, to the control section 1511.

In the case where the present technology is applied to the video processor 1332 configured in such a manner as described above, the present technology according to the embodiment described hereinabove may be applied to the codec engine 1516. In short, for example, the codec engine 1516 may have the function of the encoding apparatus 11 or the function of the decoding apparatus 12 described above or both of them. By this configuration, the video processor 1332 can achieve advantageous effects similar to those of the encoding apparatus 11 and the decoding apparatus 12 described hereinabove.

It is to be noted that, in the codec engine 1516, the present technology (namely, the functions of the encoding apparatus 11 and the decoding apparatus 12) may be implemented by hardware such as logic circuits and so forth, may be implemented by software such as an embedded program or the like or may be implemented by both of them.

While two examples of the configuration of the video processor 1332 are exemplified above, the configuration of the video processor 1332 is arbitrary and may be any other than the two examples described above. Further, although this video processor 1332 may be configured as a single semiconductor chip, it may otherwise be configured as a plurality of semiconductor chips. For example, the video processor 1332 may be, for example, a three-dimensional layered LSI in which a plurality of semiconductors are stacked. Further, the video processor 1332 may be implemented by a plurality of LSIs.

Application Example to Apparatus

The video set 1300 can be incorporated into various apparatus that process image data. For example, the video set 1300 can be incorporated into the television apparatus 1200 (FIG. 99), portable telephone set 1220 (FIG. 100), recording and reproduction apparatus 1240 (FIG. 101), image pickup apparatus 1260 (FIG. 102) and so forth. By incorporating the video set 1300 into an apparatus, the apparatus can achieve advantageous effects similar to those of the encoding apparatus 11 or the decoding apparatus 12 described hereinabove.

It is to be noted that even some of the constitutions of the video set 1300 described above can be carried out as the configuration to which the present technology is applied if it includes the video processor 1332. For example, only the video processor 1332 can be carried out as a video processor to which the present technology is applied. Further, for example, the processor indicated by the broke line 1341, the video module 1311 or the like can be carried out as a processor, a module or the like to which the present technology is applied as described hereinabove. Furthermore, for example, the video module 1311, external memory 1312, power management module 1313 and front end module 1314 can be combined such that they are carried out as a video unit 1361 to which the present technology is applied. In the case of any configuration, advantageous effects similar to those of the encoding apparatus 11 or decoding apparatus 12 described above can be achieved.

In short, any configuration can be incorporated into various apparatus that process image data similarly as in the case of the video set 1300 if the configuration includes the video processor 1332. For example, the video processor 1332, processor indicated by the broken line 1341, video module 1311 or video section 1361 can be incorporated into the television apparatus 1200 (FIG. 99), portable telephone set 1220 (FIG. 100), recording and reproduction apparatus 1240 (FIG. 101), image pickup apparatus 1260 (FIG. 102) and so forth. Thus, by incorporating any of the configurations to which the present technology is applied into an apparatus, the apparatus can achieve advantageous effects similar to those of the encoding apparatus 11 or the decoding apparatus 12 described hereinabove similarly as in the case of the video set 1300.

<Others>

It is to be noted that, although the present specification describes an example in which various kinds of information are multiplexed into encoded data (bit stream) and transmitted from the encoding side to the decoding side, the technique for transmitting such information is not limited to the example described above. For example, such various kinds of information may be transmitted or recorded as separate data associated with encoded data without being multiplexed with the encoded data. Here, the term "associate" signifies that it is made possible to link, for example, an image included in the encoded data (such image may be part of an image such as a slice, a block or the like) and information corresponding to the image to each other upon decoding. In particular, the information associated with the encoded data (image) may be transmitted on a transmission line different from that for the encoded data (image). Further, the information associated with the encoded data (image) may be recorded on a recording medium same as that for the encoded data (image) (or in a different recording area of a same recording medium). Furthermore, an image and information that corresponds to the image may be associated with each other in an arbitrary unit such as, for example, a plurality of frames, one frame, part in a frame or the like.

Further, the embodiment of the present technology is not limited to the embodiment described hereinabove but can be altered in various manners without departing from the subject matter of the present technology.

For example, in the present specification, the term system signifies a set of plural components (apparatus, modules (parts) and so forth) and does not matter whether or not all constitutions are placed in a same housing. Accordingly, both of a plurality of apparatus that are accommodated in separate housings and are connected to each other by a network and one apparatus in which a plurality of modules are accommodated in one housing are systems.

Further, for example, a constitution described as one apparatus (or one processing section) may be divided into and configured as a plurality of apparatus (or processing sections). Conversely, constitutions described as a plurality of apparatus (or processing sections) in the foregoing description may be collected such that they are configured as one apparatus (or processing section). Further, a constitution other than those may naturally be added to the configuration of each apparatus (or each processing section). Furthermore, if a constitution or operation as an entire system is substantially same, then some of constitutions of a certain apparatus (or a certain processing section) may be included in constitutions of a different apparatus (or a difference processing section).

Further, for example, the present technology can assume a configuration for cloud computing in which one function is shared and processed in cooperation by a plurality of apparatus through a network.

Further, for example, the program described hereinabove can be executed by an arbitrary apparatus. In this case, the apparatus may be configured such that it has necessary functions (functional blocks and so forth) and can acquire necessary information.

Further, for example, the steps described in connection with the flow charts described hereinabove can be executed by one apparatus and further can be shared and executed by a plurality of apparatus. Furthermore, in the case where a plurality of processes are included in one step, the plurality of processes included in the one step can be executed by one apparatus and also can be shared and executed by a plurality of apparatus.

It is to be noted that the program to be executed by the computer may be of the type by which the processes at steps by which the program is described are executed in a time series in the order as described in the present specification or of the type by which the processes are executed in parallel or executed individually at necessary timings such as when the process is called. In short, the processes at the steps may be executed in an order different from the order described hereinabove unless inconsistency occurs. Furthermore, the processes at the steps by which the program is executed may be executed in parallel to processes of a different program or may be executed in combination with processes of a different apparatus.

It is to be noted that the plurality of present technologies described in the present specification can individually be carried out solely and independently of each other unless inconsistency occurs. Naturally, also it is possible to carry out an arbitrary plurality of present technologies in combination. For example, also it is possible to carry out the present technology described in the description of any embodiment in combination with the present technology described in the description of a different embodiment. Also it is possible to carry out an arbitrary one of the present technologies described hereinabove in combination with a different technology that is not described hereinabove.

Further, the advantageous effects described in the present specification are exemplary to the last and are not restrictive, and other advantageous effects may be applicable.

It is to be noted that the present technology can take the following configurations.

<1>
An encoding apparatus, including:
a filter processing section that includes
a prediction tap selection section configured to select, from within a first image obtained by addition of a residual of prediction encoding and a prediction image, pixels that become a prediction tap to be used for prediction arithmetic operation for determining a pixel value of a corresponding pixel of a second image, which corresponds to a processing target pixel that is a processing target in the first image and is to be used for prediction of the prediction image,
a classification section configured to classify the processing target pixel to one of a plurality of classes,
a tap coefficient acquisition section configured to acquire tap coefficients of the class of the processing target pixel from among tap coefficients obtained using reduction filter information that reduces the tap coefficients for individual ones of the plurality of classes determined by learning that uses a student image equivalent to the first image and a teacher image equivalent to an original image corresponding to the first image, and
an arithmetic operation section configured to determine a pixel value of the corresponding pixel by performing the prediction arithmetic operation using the tap coefficients of the class of the processing target pixel and the prediction tap of the processing target pixel, the filter processing section performing a filter process for the first image to generate the second image; and
a transmission section configured to transmit the reduction filter information.

<2>
The encoding apparatus according to <1>, further including:
a reduction section configured to generate the reduction filter information.

<3>
The encoding apparatus according to <2>, in which
the reduction section outputs, as the reduction filter information, a selection coefficient that is the latest coefficient of a class selected from among the latest coefficients that are the tap coefficients of the plurality of classes determined by the latest learning.

<4>

The encoding apparatus according to <3>, in which the reduction section outputs, as the reduction filter information, the selection coefficient of the class selected from among the latest coefficients of the plurality of classes in response to a merit decision value representative of a degree of a merit in the case where the latest coefficient is used for the prediction arithmetic operation in place of a current coefficient that is the tap coefficient at present.

<5>

The encoding apparatus according to <4>, in which the merit decision value is a value corresponding to
an RD (Rate-Distortion) cost,
an inter-coefficient distance between the latest coefficient and the current coefficient,
an S/N (Signal to Noise Ratio) of the second image determined using the latest coefficient, or
a use frequency in which the tap coefficient of the class is used for the prediction arithmetic operation.

<6>

The encoding apparatus according to any one of <3> to <5>, in which
the reduction section outputs, in the case where the latest coefficient of the number of classes equal to or greater than a given number is selected as a selection coefficient from among the latest coefficients of the plurality of classes, the latest coefficients of all of the plurality of classes are outputted as the reduction filter information.

<7>

The encoding apparatus according to <2>, in which
the reduction section generates
a tap coefficient for each of integration classes where the plurality of classes are integrated into the number of classes equal to or smaller than the plural number of classes, and
corresponding relationship information representative of a corresponding relationship between the plurality of classes and the integration classes
as the reduction filter information.

<8>

The encoding apparatus according to <7>, in which
the reduction section integrates, in response to a tap coefficient evaluation value representative of appropriateness of use of the tap coefficient for each of the integration classes in the case where two or more classes from among the plurality of classes are integrated as an integration candidate class in the prediction arithmetic operation.

<9>

The encoding apparatus according to <8>, in which
the tap coefficient evaluation value is a value corresponding to
an RD (Rate-Distortion) cost,
an inter-coefficient distance between the tap coefficients of different classes,
an S/N (Signal to Noise Ratio) of the second image determined using the tap coefficients,
a use frequency in which the tap coefficient of the class is used in the prediction arithmetic operation, or
a difference between the tap coefficient of a mono class that is a specific one class and the tap coefficient of a different class.

<10>

The encoding apparatus according to <2>, in which
the reduction section generates a seed coefficient for each of the classes by which the tap coefficient is determined by given arithmetic operation with a parameter as the reduction filter information.

<11>

The encoding apparatus according to <10>, further including:
a parameter generation section configured to generate the parameter in response to encoding information relating to the prediction encoding of the original image, in which
the transmission section transmits parameter information relating to the parameter.

<12>

The encoding apparatus according to <11>, in which
the reduction section generates a seed coefficient of an order selected in response to a seed coefficient evaluation value representative of appropriateness of use of the tap coefficient determined from the seed coefficient in prediction arithmetic operation as the reduction filter information.

<13>

The encoding apparatus according to <12>, in which
the seed coefficient evaluation value is a value corresponding to
an RD (Rate-Distortion) cost,
an activity of the original image, or
a code amount target value or a quantization parameter upon prediction encoding of the original image.

<14>

The encoding apparatus according to <2>, in which,
using information relating to the processing target pixel as pixel-related information,
the classification section classifies the processing target pixel to one of the plurality of classes using a plurality of kinds of the pixel-related information, and
the reduction section generates
a tap coefficient for each degeneration class after degeneration of the plurality of classes obtained by degeneration of classes for reducing the plurality of classes by a degeneration method selected from among a plurality of kinds of degeneration methods, and
degeneration information representative of the degeneration method selected from the among the plurality of kinds of degeneration methods as corresponding relationship information representative of a corresponding relationship between the plurality of classes and the degeneration classes
as the reduction filter information.

<15>

The encoding apparatus according to <14>, in which
the reduction section selects the degeneration method in response to a degeneration evaluation value representative of appropriateness of use of individual ones of the tap coefficients for individual ones of a plurality of kinds of the degeneration classes obtained by individual ones of the plurality of kinds of degeneration methods in prediction arithmetic operation.

<16>

The encoding apparatus according to <15>, in which
the degeneration evaluation value is a value corresponding to an RD (Rate-Distortion) cost.

<17>

An encoding method, including:
performing a filter process for a first image to generate a second image, the performing a filter process including
selecting, from within the first image that is obtained by addition of a residual of prediction encoding and a prediction image, pixels that become a prediction tap to be used for prediction arithmetic operation for determining a pixel value of a corresponding pixel of the second image, which corresponds to a processing target pixel that is a processing target in the first image and is to be used for prediction of the prediction image, classifying the processing target pixel to one of a plurality of classes, acquiring tap coefficients of the class of the processing target pixel from among tap coefficients obtained using reduction filter information that reduces the tap coefficients for individual ones of the plurality of classes determined by learning that uses a student image equivalent to the first image and a teacher image equivalent to an original image corresponding to the first image, and determining a pixel value of the corresponding pixel by performing the prediction arithmetic operation using the tap coefficients of the class of the processing target pixel and the prediction tap of the processing target pixel; and transmitting the reduction filter information.

<18>

A decoding apparatus, including:

an acceptance section configured to accept reduction filter information that reduces tap coefficients for individual ones of a plurality of classes determined by learning that uses a student image equivalent to a first image obtained by adding a residual of prediction encoding and a prediction image and a teacher image equivalent to an original image corresponding to the first image; and a filter processing section that includes a prediction tap selection section configured to select, from within the first image, pixels that become a prediction tap to be used for prediction arithmetic operation for determining a pixel value of a corresponding pixel of a second image, which is used for prediction of the prediction image, corresponding to a processing target pixel that is a processing target from within the first image, a classification section configured to classify the processing target pixel to one of the plurality of classes, a tap coefficient acquisition section configured to acquire a tap coefficient of the class of the processing target pixel from the tap coefficients obtained using the reduction filter information, and an arithmetic operation section configured to determine a pixel value of the corresponding pixel by performing the prediction arithmetic operation using the tap coefficient of the class of the processing target pixel and the prediction tap of the processing target pixel, the filter processing section performing a filter process for the first image to generate the second image.

<19>

The decoding apparatus according to <18>, in which the reduction filter information is a selection coefficient that is the latest coefficient of the class selected from among the latest coefficients that are tap coefficients of the plurality of classes determined by the latest learning, and the tap coefficient acquisition section stores the tap coefficients for the individual classed, and updates the tap coefficient of the class of the selection coefficient from among the stored tap coefficients for individual ones of the classes to the selection coefficient.

<20>

The decoding apparatus according to <18>, in which the reduction filter information is a tap coefficient for each integration class when the plurality of classes are integrated into the number of classes equal to or smaller than the number of the plurality of classes, and corresponding relationship information representative of a corresponding relationship between the plurality of classes and the integration classes, and the tap coefficient acquisition section stores the tap coefficients for individual ones of the integration classes, converts the class of the processing target pixel into an integration class of the processing target pixel in accordance with the corresponding relationship information, and acquires the tap coefficient of the integration class of the processing target pixel from the tap coefficients for individual ones of the integration classes.

<21>

The decoding apparatus according to <18>, in which the reduction filter information is a seed coefficient for each of the classes, from which the tap coefficient is determined by given arithmetic operation with a parameter, and the tap coefficient acquisition section determines the tap coefficient by the given arithmetic operation between the parameter and the seed coefficient.

<22>

The decoding apparatus according to <21>, in which the acceptance section accepts parameter information relating to the parameter generated in response to encoding information relating to prediction encoding of the original image by the encoding side by which the prediction encoding of the original image is performed, and the tap coefficient acquisition section determines the tap coefficient by the given arithmetic operation between a parameter obtained from the parameter information and the seed coefficient.

<23>

The decoding apparatus according to <18>, in which the reduction filter information is a tap coefficient for each of degeneration classes after degeneration of the plurality of classes obtained by performing degeneration of classes for reducing the plurality of classes by a degeneration method selected from among a plurality of kinds of degeneration methods, and degeneration information, as corresponding relationship information representative of a corresponding relationship between the plurality of classes and the degeneration classes, representative of the degeneration method selected from among the plurality of kinds of degeneration methods, and the tap coefficient acquisition section stores the tap coefficients for individual ones of the degeneration classes, converts a class of the processing target pixel into a degeneration class of the processing target pixel in accordance with the degeneration information, and acquires the tap coefficient of the degeneration class of the processing target pixel from among the tap coefficients for individual ones of the degeneration classes.

<24>

A decoding method, including:

accepting reduction filter information that reduces tap coefficients for individual ones of a plurality of classes determined by learning that uses a student image equivalent to a first image obtained by adding a residual of prediction encoding and a prediction image and a teacher image equivalent to an original image corresponding to the first image; and performing a filter process for the first image to generate a second image, the performing a filter process including selecting, from within the first image, pixels that become a prediction tap to be used for prediction arithmetic operation for determining a pixel value of a corresponding pixel of a second image, which is used for prediction of the prediction image, corresponding to a processing target pixel that is a processing target from within the first image, classifying the processing target pixel to one of the plurality of classes, acquiring a tap coefficient of the class of the processing target pixel from the tap coefficients obtained using the reduction filter information, and determining a pixel value of the corresponding pixel by performing the prediction arithmetic operation using the tap coefficient of the class of the processing target pixel and the prediction tap of the processing target pixel.

REFERENCE SIGNS LIST

11 Encoding apparatus, 12 Decoding apparatus, 21, 22 Tap selection section, 23 Classification section, 24 Coefficient acquisition section, 25 Prediction arithmetic operation section, 30 Learning apparatus, 31 Teacher data generation section, 32 Student data generation section, 33 Learning section, 41, 42 Tap selection section, 43 Classification section, 44 Addition section, 45 Coefficient calculation section, 61 Parameter generation section, 62 Student data generation section, 63 Learning section, 71 Addition section, 72 Coefficient calculation section, 81, 82 Addition section, 83 Coefficient calculation section, 101 A/D conversion section, 102 Sorting buffer, 103 Arithmetic operation section, 104 Orthogonal transform section, 105 Quantization section, 106 Reversible encoding section, 107 Accumulation buffer, 108 Dequantization section, 109 Inverse orthogonal transform section, 110 Arithmetic operation section, 111 Classification adaptive filter, 112 Frame memory, 113 Selection section, 114 Intra-prediction section, 115 Motion prediction compensation section, 116 Prediction image selection section, 117 Rate controlling section, 131 Learning apparatus, 132 Reduction apparatus, 133 Image conversion apparatus, 141 Selection section, 151 Coefficient acquisition section, 161 Updating section, 162 Storage section, 163 Acquisition section, 201 Accumulation buffer, 202 Reversible decoding section, 203 Dequantization section, 204 Inverse orthogonal transform section, 205 Arithmetic operation section, 206 Classification adaptive filter, 207 Sorting buffer, 208 D/A conversion section, 210 Frame memory, 211 Selection section, 212 Intra-prediction section, 213 Motion prediction compensation section, 214 Selection section, 231 Image conversion apparatus, 241, 242 Tap selection section, 243 Classification section, 244 Coefficient acquisition section, 245 Prediction arithmetic operation section, 251 Updating section, 252 Storage section, 253 Acquisition section, 311 Classification adaptive filter, 321 Reduction apparatus, 323 Image conversion apparatus, 331 Class integration section, 332 Storage section, 333 Corresponding relationship detection section, 334 Storage section, 341 Coefficient acquisition section, 351 Storage section, 352 Integration class conversion section, 353 Acquisition section, 411 Classification adaptive filter, 431 Image conversion apparatus, 441 Coefficient acquisition section, 451 Storage section, 452 Integration class conversion section, 453 Acquisition section, 511 Classification adaptive filter, 531 Learning apparatus, 532 Image conversion apparatus, 541 Parameter generation section, 542 Order setting section, 542 Learning section, 544 Selection section, 561 Parameter generation section, 562 Coefficient acquisition section, 571 Storage section, 572 Tap coefficient calculation section, 573 Storage section, 574 Acquisition section, 611 Classification adaptive filter, 631 Image conversion apparatus, 641 Coefficient acquisition section, 671 Storage section, 672 Tap coefficient calculation section, 673 Storage section, 674 Acquisition section, 711 Tap selection section, 714 Coefficient acquisition section, 715 Prediction arithmetic operation section, 721, 722 Tap selection section, 723 Classification section, 724 Coefficient acquisition section, 725 Prediction arithmetic operation section, 731 Storage section, 732 Degeneration class conversion section, 733 Acquisition section, $741_v$ Degeneration section, $742_v$ Learning section, 751, 752 Tap selection section, 753 Classification section, 754 Addition section, 755 Coefficient calculation section, 756 Degeneration class conversion section, 771, 772 Tap selection section, 773 Classification section, 774 Coefficient acquisition section, 775 Prediction arithmetic operation section, 781 Storage section, 782 Degeneration class conversion section, 783 Acquisition section, 811 Classification adaptive filter, 831 Image conversion apparatus, 841, 842 Tap selection section, 843 Classification section, 844 Coefficient acquisition section, 845 Prediction arithmetic operation section, 851 Storage section, 852 Degeneration class conversion section, 853 Acquisition section, 911 Classification adaptive filter, 931 Learning apparatus, 932 Reduction apparatus, 933 Image conversion apparatus, 940 Learning section, 941, 942 Tap selection section, 943 Classification section, 944 Addition section, 945 Coefficient calculation section, 946 Storage section, $951_h$ Selection section, $952_h$ Information detection section, $953_h$ Subclass classification section, 954 Class configuration section, 971 Degeneration candidate class selection section, 972 Degeneration target class selection section, 973 Class degeneration section, 974 Evaluation value calculation section, 975 Degeneration method selection section, 981 Image conversion section, 932 Selection section, 991 Image conversion section, 992 Degeneration evaluation value calculation section

The invention claimed is:

1. An encoding apparatus, comprising:
a filter processing section that includes
a prediction tap selection section configured to select, from within a first image obtained by addition of a residual of prediction encoding and a prediction image, pixels that become a prediction tap to be used for prediction arithmetic operation for determining a pixel value of a corresponding pixel of a second image, which corresponds to a processing target pixel that is a processing target in the first image and is to be used for prediction of the prediction image,
a classification section configured to classify the processing target pixel to one of a plurality of classes,
a tap coefficient acquisition section configured to acquire tap coefficients of the class of the processing target pixel from among tap coefficients obtained using reduction filter information that reduces the tap coefficients for individual ones of the plurality of classes determined by learning that uses a student image equivalent to the first image and a teacher image equivalent to an original image corresponding to the first image, and
an arithmetic operation section configured to determine a pixel value of the corresponding pixel by performing the prediction arithmetic operation using the tap coefficients of the class of the processing target pixel and the prediction tap of the processing target pixel, the filter processing section performing a filter process for the first image to generate the second image; and a transmission section configured to transmit the reduction filter information, wherein the filter processing section, the prediction tap selection section, the classification section, the tap coefficient acquisition section, the arithmetic operation section, and the transmission section are each implemented via at least one processor.

2. The encoding apparatus according to claim 1, further comprising:

a reduction section configured to generate the reduction filter information, wherein the reduction section is implemented via at least one processor.

3. The encoding apparatus according to claim 2, wherein the reduction section outputs, as the reduction filter information, a selection coefficient that is the latest coefficient of a class selected from among the latest coefficients that are the tap coefficients of the plurality of classes determined by the latest learning.

4. The encoding apparatus according to claim 3, wherein the reduction section outputs, as the reduction filter information, the selection coefficient of the class selected from among the latest coefficients of the plurality of classes in response to a merit decision value representative of a degree of a merit in a case where the latest coefficient is used for the prediction arithmetic operation in place of a current coefficient that is the tap coefficient at present.

5. The encoding apparatus according to claim 4, wherein the merit decision value is a value corresponding to an RD (Rate-Distortion) cost, an inter-coefficient distance between the latest coefficient and the current coefficient, an S/N (Signal to Noise Ratio) of the second image determined using the latest coefficient, or a use frequency in which the tap coefficient of the class is used for the prediction arithmetic operation.

6. The encoding apparatus according to claim 3, wherein the reduction section outputs, in a case where the latest coefficient of the number of classes equal to or greater than a given number is selected as a selection coefficient from among the latest coefficients of the plurality of classes, the latest coefficients of all of the plurality of classes are outputted as the reduction filter information.

7. The encoding apparatus according to claim 2, wherein the reduction section generates a tap coefficient for each of integration classes where the plurality of classes are integrated into the number of classes equal to or smaller than the plural number of classes, and corresponding relationship information representative of a corresponding relationship between the plurality of classes and the integration classes as the reduction filter information.

8. The encoding apparatus according to claim 7, wherein the reduction section integrates, in response to a tap coefficient evaluation value representative of appropriateness of use of the tap coefficient for each of the integration classes in a case where two or more classes from among the plurality of classes are integrated as an integration candidate class in the prediction arithmetic operation.

9. The encoding apparatus according to claim 8, wherein the tap coefficient evaluation value is a value corresponding to an RD (Rate-Distortion) cost, an inter-coefficient distance between the tap coefficients of different classes, an S/N (Signal to Noise Ratio) of the second image determined using the tap coefficients, a use frequency in which the tap coefficient of the class is used in the prediction arithmetic operation, or a difference between the tap coefficient of a mono class that is a specific one class and the tap coefficient of a different class.

10. The encoding apparatus according to claim 2, wherein the reduction section generates a seed coefficient for each of the classes by which the tap coefficient is determined by given arithmetic operation with a parameter as the reduction filter information.

11. The encoding apparatus according to claim 10, further comprising:

a parameter generation section configured to generate the parameter in response to encoding information relating to the prediction encoding of the original image, wherein the transmission section transmits parameter information relating to the parameter, and wherein the parameter generation section is implemented via at least one processor.

12. The encoding apparatus according to claim 10, wherein the reduction section generates a seed coefficient of an order selected in response to a seed coefficient evaluation value representative of appropriateness of use of the tap coefficient determined from the seed coefficient in prediction arithmetic operation as the reduction filter information.

13. The encoding apparatus according to claim 12, wherein the seed coefficient evaluation value is a value corresponding to an RD (Rate-Distortion) cost, an activity of the original image, or a code amount target value or a quantization parameter upon prediction encoding of the original image.

14. The encoding apparatus according to claim 2, wherein, using information relating to the processing target pixel as pixel-related information, the classification section classifies the processing target pixel to one of the plurality of classes using a plurality of kinds of the pixel-related information, and the reduction section generates a tap coefficient for each degeneration class after degeneration of the plurality of classes obtained by degeneration of classes for reducing the plurality of classes by a degeneration method selected from among a plurality of kinds of degeneration methods, and degeneration information representative of the degeneration method selected from the among the plurality of kinds of degeneration methods as corresponding relationship information representative of a corresponding relationship between the plurality of classes and the degeneration classes as the reduction filter information.

15. The encoding apparatus according to claim 14, wherein
the reduction section selects the degeneration method in response to a degeneration evaluation value representative of appropriateness of use of individual ones of the tap coefficients for individual ones of a plurality of kinds of the degeneration classes obtained by individual ones of the plurality of kinds of degeneration methods in prediction arithmetic operation.

16. The encoding apparatus according to claim 15, wherein
the degeneration evaluation value is a value corresponding to an RD (Rate-Distortion) cost.

17. An encoding method, comprising:
performing a filter process for a first image to generate a second image, the performing a filter process including
selecting, from within the first image that is obtained by addition of a residual of prediction encoding and a prediction image, pixels that become a prediction tap to be used for prediction arithmetic operation for determining a pixel value of a corresponding pixel of the second image, which corresponds to a processing target pixel that is a processing target in the first image and is to be used for prediction of the prediction image,
classifying the processing target pixel to one of a plurality of classes,
acquiring tap coefficients of the class of the processing target pixel from among tap coefficients obtained using reduction filter information that reduces the tap coefficients for individual ones of the plurality of classes determined by learning that uses a student image corresponding to the first image and a teacher image equivalent to an original image corresponding to the first image, and
determining a pixel value of the corresponding pixel by performing the prediction arithmetic operation using the tap coefficients of the class of the processing target pixel and the prediction tap of the processing target pixel; and
transmitting the reduction filter information.

18. A decoding apparatus, comprising:
an acceptance section configured to accept reduction filter information that reduces tap coefficients for individual ones of a plurality of classes determined by learning that uses a student image equivalent to a first image obtained by adding a residual of prediction encoding and a prediction image and a teacher image equivalent to an original image corresponding to the first image; and
a filter processing section that includes
a prediction tap selection section configured to select, from within the first image, pixels that become a prediction tap to be used for prediction arithmetic operation for determining a pixel value of a corresponding pixel of a second image, which is used for prediction of the prediction image, corresponding to a processing target pixel that is a processing target from within the first image,
a classification section configured to classify the processing target pixel to one of the plurality of classes,
a tap coefficient acquisition section configured to acquire a tap coefficient of the class of the processing target pixel from the tap coefficients obtained using the reduction filter information, and
an arithmetic operation section configured to determine a pixel value of the corresponding pixel by performing the prediction arithmetic operation using the tap coefficient of the class of the processing target pixel and the prediction tap of the processing target pixel, the filter processing section performing a filter process for the first image to generate the second image,
wherein the acceptance section, the filter processing section, the prediction tap selection section, the classification section, the tap coefficient acquisition section, and the arithmetic operation section are each implemented via at least one processor.

19. The decoding apparatus according to claim 18, wherein
the reduction filter information is a selection coefficient that is the latest coefficient of the class selected from among the latest coefficients that are tap coefficients of the plurality of classes determined by the latest learning, and
the tap coefficient acquisition section
stores the tap coefficients for the individual classed, and
updates the tap coefficient of the class of the selection coefficient from among the stored tap coefficients for individual ones of the classes to the selection coefficient.

20. The decoding apparatus according to claim 18, wherein
the reduction filter information is
a tap coefficient for each integration class when the plurality of classes are integrated into the number of classes equal to or smaller than the number of the plurality of classes, and
corresponding relationship information representative of a corresponding relationship between the plurality of classes and the integration classes, and
the tap coefficient acquisition section
stores the tap coefficients for individual ones of the integration classes,
converts the class of the processing target pixel into an integration class of the processing target pixel in accordance with the corresponding relationship information, and
acquires the tap coefficient of the integration class of the processing target pixel from the tap coefficients for individual ones of the integration classes.

21. The decoding apparatus according to claim 18, wherein
the reduction filter information is a seed coefficient for each of the classes, from which the tap coefficient is determined by given arithmetic operation with a parameter, and
the tap coefficient acquisition section determines the tap coefficient by the given arithmetic operation between the parameter and the seed coefficient.

22. The decoding apparatus according to claim 21, wherein
the acceptance section accepts parameter information relating to the parameter generated in response to encoding information relating to prediction encoding of the original image by the encoding side by which the prediction encoding of the original image is performed, and
the tap coefficient acquisition section determines the tap coefficient by the given arithmetic operation between a parameter obtained from the parameter information and the seed coefficient.

23. The decoding apparatus according to claim 18, wherein
the reduction filter information is
a tap coefficient for each of degeneration classes after degeneration of the plurality of classes obtained by performing degeneration of classes for reducing the plurality of classes by a degeneration method selected from among a plurality of kinds of degeneration methods, and
degeneration information, as corresponding relationship information representative of a corresponding relationship between the plurality of classes and the degeneration classes, representative of the degeneration method selected from among the plurality of kinds of degeneration methods, and
the tap coefficient acquisition section
stores the tap coefficients for individual ones of the degeneration classes,
converts a class of the processing target pixel into a degeneration class of the processing target pixel in accordance with the degeneration information, and
acquires the tap coefficient of the degeneration class of the processing target pixel from among the tap coefficients for individual ones of the degeneration classes.

24. A decoding method, comprising:
accepting reduction filter information that reduces tap coefficients for individual ones of a plurality of classes determined by learning that uses a student image equivalent to a first image obtained by adding a residual of prediction encoding and a prediction image and a teacher image equivalent to an original image corresponding to the first image; and
performing a filter process for the first image to generate a second image, the performing a filter process including
selecting, from within the first image, pixels that become a prediction tap to be used for prediction arithmetic operation for determining a pixel value of a corresponding pixel of a second image, which is used for prediction of the prediction image, corresponding to a processing target pixel that is a processing target from within the first image,
classifying the processing target pixel to one of the plurality of classes,
acquiring a tap coefficient of the class of the processing target pixel from the tap coefficients obtained using the reduction filter information, and
determining a pixel value of the corresponding pixel by performing the prediction arithmetic operation using the tap coefficient of the class of the processing target pixel and the prediction tap of the processing target pixel.

* * * * *